US008887286B2

United States Patent
Dupont et al.

(10) Patent No.: US 8,887,286 B2
(45) Date of Patent: Nov. 11, 2014

(54) CONTINUOUS ANOMALY DETECTION BASED ON BEHAVIOR MODELING AND HETEROGENEOUS INFORMATION ANALYSIS

(71) Applicant: Cataphora, Inc., Redwood City, CA (US)

(72) Inventors: Laurent Dupont, Redwood City, CA (US); Elizabeth B. Charnock, Foster City, CA (US); Steve Roberts, Foster City, CA (US); Eli Yawo Amesefe, San Mateo, CA (US); Keith Eric Schon, San Francisco, CA (US); Richard Thomas Oehrle, Pacific Grove, CA (US)

( * ) Notice: Subject to any disclaimer, the term of this patent is extended or adjusted under 35 U.S.C. 154(b) by 0 days.

(21) Appl. No.: 14/034,008

(22) Filed: Sep. 23, 2013

(65) Prior Publication Data

US 2014/0096249 A1    Apr. 3, 2014

Related U.S. Application Data

(63) Continuation of application No. 12/941,849, filed on Nov. 8, 2010, now abandoned.

(60) Provisional application No. 61/280,791, filed on Nov. 6, 2009.

(51) Int. Cl.
| | |
|---|---|
| *H04L 29/06* | (2006.01) |
| *G06F 21/50* | (2013.01) |
| *G06F 21/55* | (2013.01) |
| *G06F 21/00* | (2013.01) |

(52) U.S. Cl.
CPC .............. *G06F 21/552* (2013.01); *G06F 21/50* (2013.01); *G06F 21/00* (2013.01)
USPC ......................................................... 726/25

(58) Field of Classification Search
CPC ............................... G06F 21/50; G06F 21/552
USPC .......................................................... 726/25
See application file for complete search history.

(56) References Cited

U.S. PATENT DOCUMENTS

| | | | |
|---|---|---|---|
| 7,143,091 | B2 | 11/2006 | Charnock et al. |
| 7,386,439 | B1 | 6/2008 | Charnock et al. |
| 7,421,660 | B2 | 9/2008 | Charnock et al. |
| 7,519,589 | B2 | 4/2009 | Charnock et al. |

OTHER PUBLICATIONS

Ezzedine et al., User of Petri nets for modeling an Agent-Based Interactive System: Basic Principles and Case Study, 2008, pp. 131-148.
Zachary et al., Conversation Exchange Dynamics for Real-Time Network Monitoring and Anomaly Detection, 2004, IEEE, pp. 1-12.

*Primary Examiner* — Hadi Armouche
*Assistant Examiner* — Dao Ho
(74) *Attorney, Agent, or Firm* — Maldjian Law Group LLC; John Maldjian

(57) ABSTRACT

The present disclosure describes a continuous anomaly detection method and system based on multi-dimensional behavior modeling and heterogeneous information analysis. A method includes collecting data, processing and categorizing a plurality of events, continuously clustering the plurality of events, continuously model building for behavior and information analysis, analyzing behavior and information based on a holistic model, detecting anomalies in the data, displaying an animated and interactive visualization of a behavioral model, and displaying an animated and interactive visualization of the detected anomalies.

16 Claims, 121 Drawing Sheets

Architecture of the system

Main data objects analyzed or created by the system

Main concepts used in behavioral modeling

Main data structures presented to a system user

Architecture of the system

Data collection modes and operations

Description of the collection repository

Continuous processing of new data

Continuous detection of periodic patterns

Feature collection process

Periodic pattern frequency component update process

An example of a typical computer memory hierarchy

An example of a typical computer network memory hierarchy

Types of categorization components

Categorization model

Abstract workflow model based on pragmatic tagging

N(CD) = {AB, BC, CD, DE, EF}
Local clusterability(CD) = Σ (weight of edges in N(CD))
    / (max of those weights * num possible edges)
= (1 + 1 + 2 + 2 + 3 + 2 + 2) / (3 * (5*4/2))
= 13/30

Types of features used for anomaly detection

Default referential types used for anomaly detection

State diagram of anomalies

Definition of an anomaly class

User feedback on a detected deviation from baseline patterns

Continuous sequence viewer

Sequence Snapshot Contrast Viewer

Alias usage browser

Navigation using the alias usage browser

Animated graph of attention shift

Animated graph of delegation pattern changes

Animation of the behavior-based alert visualization

Effect of behavioral metric tuning in the behavior-based alert visualization

Figure 118

```
typedef box osf
typedef boxMode ("first", "all")
typedef constraint osf
typedef pattern osf
typedef pathExpr osf
typedef mergeMode ("unify", "append")

typedef cql Is(feature constraint)              118.05
typedef cql IsNot(feature osf pattern?)         118.10
typedef cql And(cql{2,} constraint)             118.15
typedef cql AndNot(cql cql)                     118.20
typedef cql Or(cql{2,})                         118.25
typedef cql Close(cql constraint)               118.30
typedef cql Project(cql pathExpr? constraint)   118.35
typedef cql Traverse(cql pathExpr? constraint)  118.40
typedef cql Within(box cql)                     118.45
typedef cql Outside(box cql)                    118.50
typedef cql Widen(constraint cql boxMode)       118.55
typedef cql Narrow(constraint cql boxMode)      118.60
typedef cql Union(cql{2,} mergeMode)            118.65
typedef cql Intersection(cql{2,} mergeMode)     118.70
typedef cql Annotate(cql constraint)            118.75
```

CONTINUOUS ANOMALY DETECTION BASED ON BEHAVIOR MODELING AND HETEROGENEOUS INFORMATION ANALYSIS

CROSS-REFERENCE TO RELATED APPLICATIONS

This application is a continuation of U.S. patent application Ser. No. 12/941,849, filed Nov. 8, 2010, which claims the benefit of U.S. Provisional Patent Application No. 61/280,791 filed on Nov. 6, 2009. The contents of all the above-listed patent applications are hereby incorporated by reference in their entirety.

FIELD OF THE INVENTION

The present disclosure falls into the general area of anomaly detection, and more particularly, anomaly in human behavior analyzed from electronic data. It can be applied to a number of domain-specific scenarios such as compliance monitoring or risk management in high-risk domains such as investment banking or intelligence. It is also applicable to malicious insider detection in areas ranging from corporate theft to counter-intelligence or the broader intelligence community.

BACKGROUND

Anomaly detection is a general goal that can fulfill a number of missions, ranging from the prevention of activities perpetrated by malicious insiders to unintentional threats, as well as more generally managing human and operational risk.

Previous approaches to anomaly detection have included:
Rule-based compliance systems based on keyword matches or content identification (for example using a fingerprinting technology).
Correlation engines where different types of events are put in relation and the rules to trigger an alert are somewhat more flexible than the previous type of systems (producing for example one-dimensional anomalies based on histograms).

There are essential limitations shared by all these systems. One of the main limitations is that they can be circumvented due to the static character of the rules used to configure them, so that they are unable to cover the infinite spectrum of potentially damaging behaviors and actions that can take place in a large organization.

In addition, even the most efficient of these previous systems are restricted to a vertical business domain, as the definition of the rules and correlation methods is highly dependent on the underlying business data and processes. Furthermore, even very domain-specific work is usually done in a cross-media, cross-system manner, in which (for example) emails, instant messages and phone calls can be an integral part of processes which in theory are implemented with a dedicated application. Nevertheless such unstructured, out-of-band communication is usually ignored by existing systems. An example of such a vertical domain is the banking and financial services industry in which compliance systems are very often tied to specific transactional systems.

Also, the fact that these systems rely on rules or patterns which, even when they are learned automatically by a machine, correspond to confirmed signs of malicious or otherwise risk-carrying activities, implies that they only detect these events after the fact, and that there is no way to anticipate them. This is a major limitation in their detection capabilities, since recent studies of espionage and IT sabotage cases have shown that nearly half of malicious insiders exhibited some inappropriate, unusual, or concerning behavior prior to the incident, but had no recorded incidents of violating organizational policies.

Most of these systems are limited in their analysis scope to data sources located within a particular organization, without the capability to take into account external sources such as public websites or personal communication channels [156] on which insiders also interact and exchange information.

Finally, most anomaly detection systems only report threats once they have harmed the organization or its employees. In particular, malicious insiders are typically flagged once they have perpetrated their actions (when they are flagged) and the associated damage can then only be mitigated rather than prevented.

SUMMARY

The present disclosure addresses the prior limitations noted above.

Firstly, the present system is considerably more difficult, and in most situations almost impossible, to circumvent. This is because it builds a holistic model, which covers both structured and unstructured data, but which also covers human behavior, including communications [123] among people and interactions between people and data. That model can be integrated with the organization's infrastructure to provide complete coverage of human and machine activities. A key aspect of this model is the determination of regularity in behavior, both at the individual and group level; behavior, especially in an organizational context, is anything but random. This disclosure is data-driven, and not primarily rule-driven, so that it can automatically adapt to changes in the analyzed data or in the environment, including when human behavior itself is changing. (It should be noted however that this disclosure also supports the definition of rules as an essential requirement, since they are an intrinsic part of many regulatory or internal policies in place in large organizations.)

Secondly, the problem of applicability scope mentioned above is also addressed by the present disclosure, as it is suitable for any type of domain. This is because it does not require the explicit definition of a set of rules or anomalous patterns, but also because it handles unstructured data in a generic manner, and is able to correlate that data with the type of structured data to which vertical anomaly detection systems are often restricted.

Thirdly, the present disclosure establishes a multi-dimensional behavioral model that is based on normalcy, i.e. on how people habitually communicate, work, and interact, rather than on expected behavior defined by a predefined number of dimensions. Every risk-generating activity is characterized by at least some change in behavior: even malicious insiders who go to great lengths to circumvent detection mechanisms in place will leave some trace in electronic form that will result in a deviation from baseline behavior—whether from their own established baseline or that of their peer group—even when no rule has been violated, and when the malicious activities in question do not fit any scenario known a priori.

Finally, in contrast to the reactive mode of operation of most anomaly detection systems, the present disclosure provides techniques that allow an organization to proactively detect such threats by spotting precursory signs of malicious activity, and thus intervene and prevent the threats from being executed. Such signs always precede the perpetration of the malicious insider's actions however they are only detectable by a system which performs holistic analysis and which detects any significant and therefore possibly relevant deviations from normal behavior—as opposed to a finite number of pre-defined rule violations (also known as patterns or "signatures").

The novel way in which the systems and methods of the present disclosure solves these and other common limitations relies heavily on the following characteristics:

- A holistic analysis of information, which takes into account relationships between data items, between comparable individuals and groups, between formal or informal processes, and across these different entities (for example, a method called document lifecycle analysis allows the present disclosure to model relationships between people and the data they exchange or manipulate).
- A rich, extensible mechanism to accurately model human behavior and to detect anomalies in this behavior with respect to temporal, organizational, or other dimensions.
- A scalable method of applying these behavior modeling and holistic information analysis capabilities to massive volumes of data, processed in a continuous manner.
- A unique combination of reactive and proactive anomaly detection mechanisms—this combination produces a manageable quantity of alerts that are consistent and directly interpretable. Without being able to constrain the number of alerts and manage their quality, an anomaly detection system such as the one described here would not be realistically deployable.
- Automatic quality assessment and performance guarantees obtained by auto-adjustment of the system, both with respect to data characteristics and to user input.

An extensible application framework to efficiently visualize patterns derived from analyzing electronic data and human behavior, and to show how those patterns evolve over time and across the organization.

In one embodiment, the present disclosure describes a system and a method to enable a holistic and continuous analysis of information to accurately model human behavior and to detect anomalies in this behavior with respect to, but not limited to, temporal, organizational, or other dimensions.

The system is able to infer potentially damaging activities, whether of unintentional or malicious nature, without requiring the prior definition of the type and characteristics of these activities. It relies on the analysis of potentially massive volumes of heterogeneous electronic data (includes both text-bearing and non-text-bearing records) stored inside or outside any organization. That analysis can be performed either in discrete increments or in real-time. The present disclosure establishes structural and semantic patterns from the analyzed data and builds a predictive multi-dimensional model of both individual and collective behavior which allows detecting abnormal patterns in these behaviors as well.

Some embodiments of this system are intended to run at a much smaller scale than much of what is described here. The smallest scale is at the level of individual personal use, to observe or monitor one's personal ecosystem through all available communication channels, including social media such as Facebook or Twitter. Such personal usage would not include a compliance system for example, but could be used to do things such as observe shifts in popularity, influence, stress within one's circle, and other things that are described in this application and in previous ones. Somewhat larger scale usage for small business would likewise be unlikely to have enterprise systems present such as an HR system, an accounting system, or a compliance system, but could nevertheless very beneficially be used to do things like identify which processes were causing friction amongst the staff, who is "buck passing", etc.

Some embodiments will therefore make suggestions directly to the user based on evidence. To take a simple example, in single user use, the system could point out that the user was very slow to respond to their grandmother—maybe it is time to call her or send her mail; that the user tends to "yell" about certain topics and should avoid doing so in future; or that they are spending way more time this year than they did last year on the NCAA betting pool during working hours, etc.

BRIEF DESCRIPTION OF THE DRAWINGS

The present disclosure is illustrated by way of example, and not by way of limitation, in the accompanying drawings which are described below. Like reference numerals may refer to similar elements and the figures may not be drawn to scale.

FIG. 118 is a diagram of featured query operators in accordance with an embodiment of the present disclosure.

FIG. 120 is a diagram of the discussion building process in accordance with an embodiment of the present disclosure.

FIG. 121 is a diagram of a faceted evidence representation in accordance with an embodiment of the present disclosure.

DETAILED DESCRIPTION

Overview

The present disclosure efficiently performs continuous monitoring of data produced or circulating within an entity, or social network, whether it is within a specific entity or on the world wide web, especially when relying on a high volume of electronic data, and uses novel behavioral analysis techniques in order to detect, report and/or make users aware of possibly preventable damaging events, of an accidental or fraudulent nature.

Figure 1:
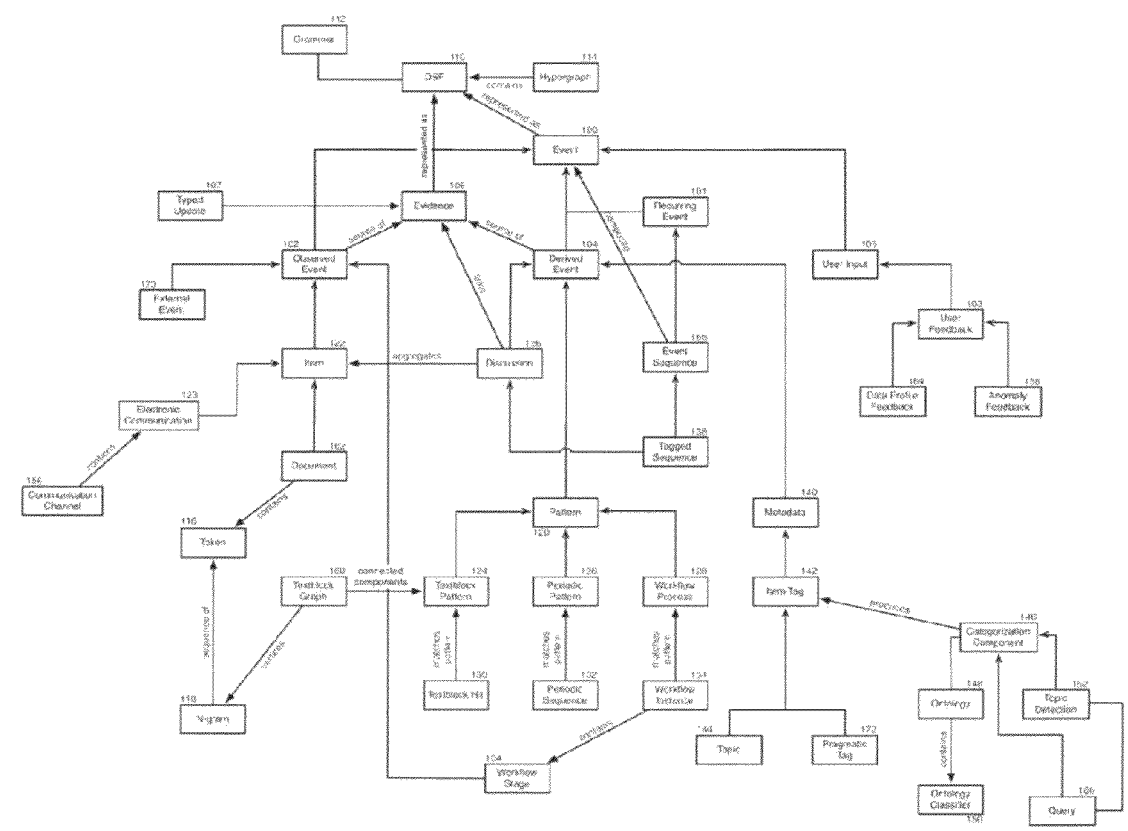
FIG. 1 is a block diagram of the main data objects analyzed or created by the system in accordance with an embodiment of the present disclosure.
Figure 2:
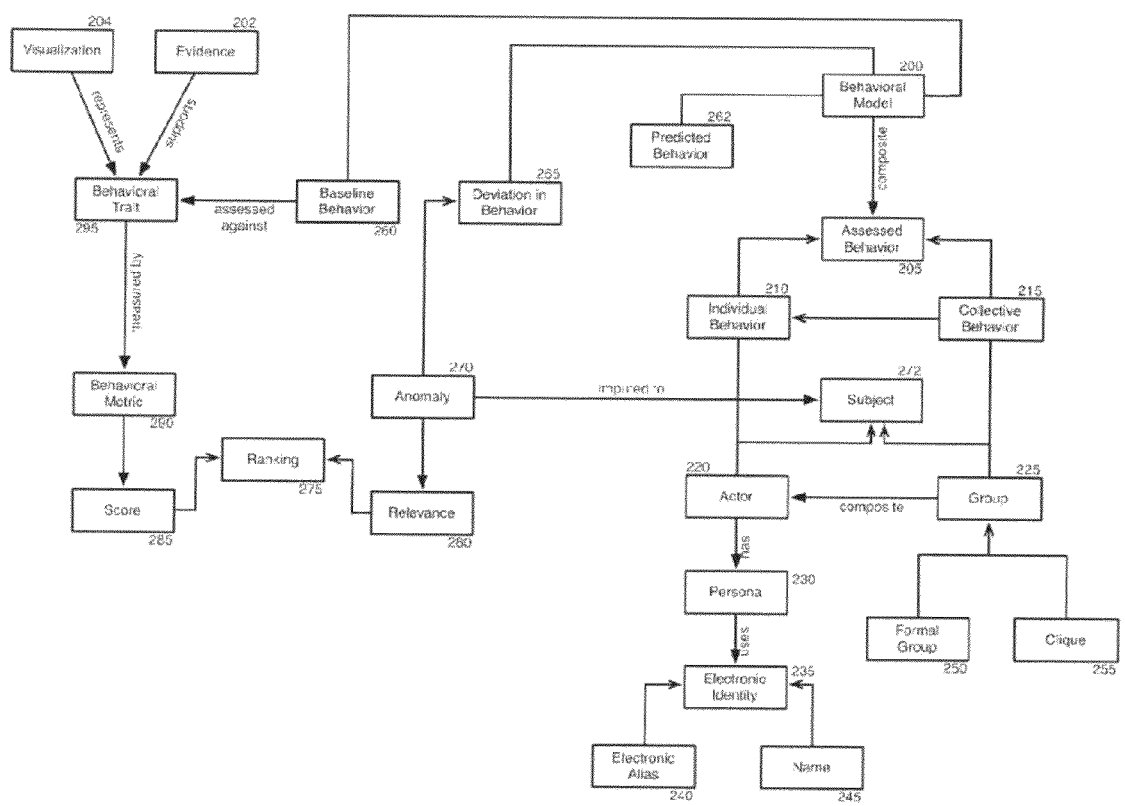
FIG. 2 is a block diagram of the main concepts used for behavioral modeling and anomaly detection in accordance with an embodiment of the present disclosure.
Figure 3:
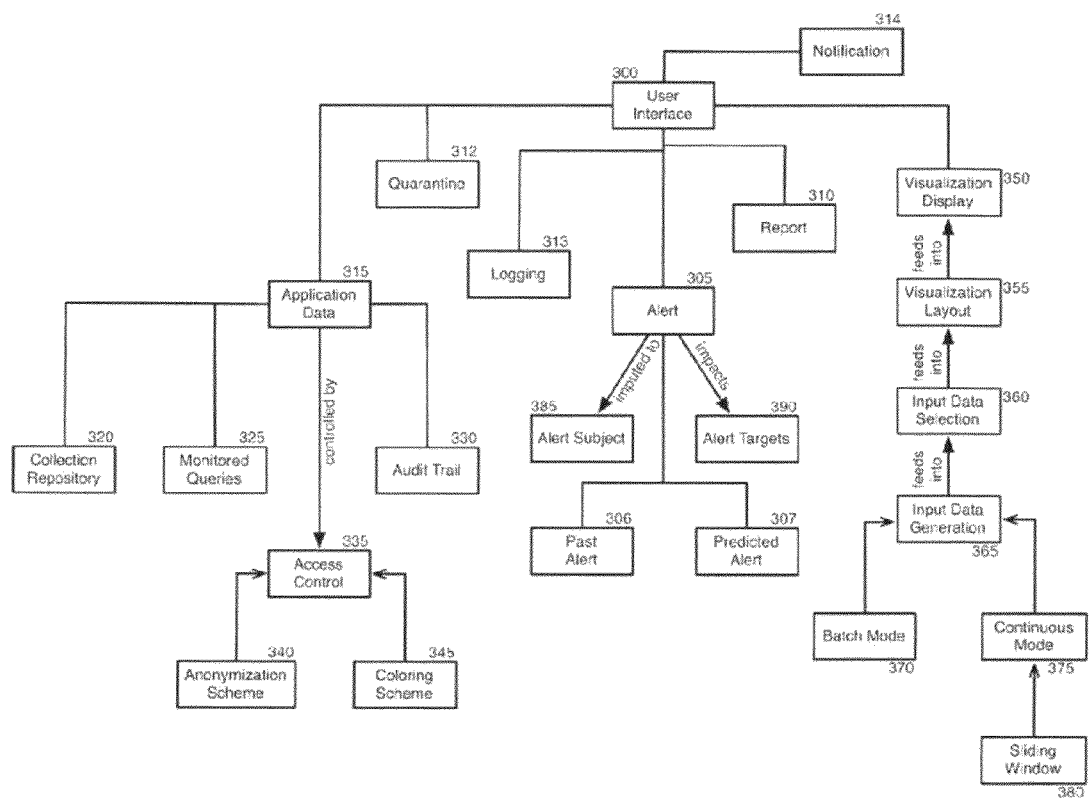
FIG. 3 is a block diagram of the main data structures presented to a user of the system in accordance with an embodiment of the present disclosure.

FIGS. 1, 2, and 3 depict the key elements and concepts of the system described in accordance with an embodiment of the present disclosure.

Event [100]: The central unit of analysis of the present disclosure. Depending on its origin, an event can be an observed event [102] exogenous to the system, a derived event [104] produced by the system, or user input [106] manually entered through an embodiment of the disclosure.

Evidence [108] is derived by the system after collecting, processing, and analyzing events [100]. Evidence is represented by the system as OSF [110] or order sorted features structures for which grammar [112] rules can be defined. OSF's [110] are stored as a hypergraph [114] model in one embodiment.

Token [116]: The smallest unit of analysis of the disclosure. In one embodiment, this atomic unit of analysis is a linguistic term. In another embodiment, it is a single character. N-grams [118] are continuous sequences of tokens [116] of length n, where n is a fixed, pre-determined integer.

Pattern [120]: A model for a number of features shared by multiple items [122] and to represent the structure underlying those items [122]. Each such pattern [120] can be matched by one or more pieces of evidence [108] derived by the system. A textblock pattern [124] is a model for contiguous blocks of text that is associated with one author, and is substantive enough to be treated potentially as an independent object in the system. Textblock patterns [124] are derived by the system from building a textblock graph [160] which contains transitions between n-grams [118]. A periodic pattern [126] is a model of events [100] that are occurring at exactly or approximately regular intervals over time. A workflow process [128] is a formal or ad hoc source of evidence [108] that constrains specific events [100] to be performed according to a number of workflow stages [154]

Discussion [136]: A possibly heterogeneous partially ordered set of electronic record items [122] for which it is presumed that any item [122] is causally related to all items [122] immediately following it by one or more sources of evidence [108].

Items [122], such as electronic communications [123] collected from any kind of communication channel [156] or electronic documents [162] can; upon processing by this disclosure, be assigned a number of item tags [142] which are a form of metadata [140] computed by the system on the basis of categorization components [146] such as an ontology [148] composed of a set of ontology classifiers [150], or a topic detection [152] method. A discussion [136] in which items [122] have been marked using item tags [142] constitutes a tagged sequence [138].

Actor [220]: A human or computer system which produces items [122] and is associated with one or more distinct electronic identities [235] such as email accounts, IM handles, system logins, etc. An actor [220] may be deemed to have more than one personality OSF [230] if the content created or received by at least one of the different electronic identities [235] varies significantly from that of the others, where an electronic identity [235] can be an electronic alias [240] on some communication channel [156] or any reference to an individual, for example by name [245].

A group [225] is a container object for actors [220]. They can be formal groups [250], for example when an organizational chart is available to the system. Other types of groups [225] can be derived by the system from sociological and behavioral analysis, such as cliques [255] also known as circles of trust, which are a set of actors who consistently correspond in a closed loop with one another.

A typed update [107] is a light representation of an incremental change to an evidence or event that can be forwarded to different components, A typed update [107] references one or several evidences or events that are affected by the changes. Because we are dealing with continuous and very large streams of data, forwarding typed updates [107] instead of resending whole results every time an evidence or event is updated greatly reduces the amount of traffic between components, especially when it comes to updating previously computed results. In some embodiments, typed updates [107] can take the form of deltas or simple incremental data changes. In other embodiments, a typed update [107] can consist of a function or set of declarations and operations to be applied to existing data in order to mutate it.

According to one aspect, anomaly detection means that the system is able to infer potentially damaging activities, whether of unintentional or malicious nature, without requiring the prior definition of the type and characteristics of these activities.

According to one aspect, heterogeneous information analysis means that all kinds of electronic information stored in a corporation or another kind of organization can be processed by the system in a unified manner and consistently lend themselves to the detection of abnormal patterns in the data. This includes both text-bearing and non-text-bearing records.

According to one aspect, multi-dimensional behavioral modeling means that in addition to analyzing pieces of information, the building of a predictive multi-dimensional model of both individual and collective behaviors allows detecting abnormal patterns in these behaviors as well.

The present disclosure describes a method for building and continuously maintaining a behavioral model [200]. This model represents assessed behavior [205] which can be either individual behavior [210] or collective behavior [215]. In order to detect anomalies [270], the system establishes baseline behaviors [260] which are a synthetic representation of communication habits and normal interactions, then assesses deviations [265] by comparing assessed behaviors [205] to such a baseline. This allows the detection of anomalies in recent or past behavior, however the system also attempts to predict behavior [262] in the near future based on the behavioral model [200]. To compute that behavioral model [200], the disclosure relies on a number of behavioral traits [295] which are dimensions according to which an actor's [220] personality and behavior can be reliably measured, and are computed based on a set of behavioral metrics [290]. Actors [220] and their assessed behaviors [205] can then be evaluated on an absolute scale using scores [285], and on a relative scale using ranking [275] mechanisms, in order to assess the relevance [280] of any detected anomaly [270].

The behavioral model [200] computed by the system, as well as the anomalies [270] produced, are presented by the system using supporting evidence [202] and visualizations [204] in one embodiment.

A visualization [204] is produced in several stages. Data is generated [365] over time either by an iterative process over batches of data [370], or on a continuous basis [375] using for example a sliding window mechanism [380]. Input data [365] for a particular visualization [204] is then selected [360] either automatically by the system or interactively by a user. A layout [355] is then produced to efficiently display [350] the visualization as part of the system's user interface [300].

The system continuously raises alerts [305] about behavior flagged as anomalous, for which notifications can be automatically sent to the user. An alert [305] can be a past alert [306] based solely on already analyzed events [100], or a predicted alert [307] based on the likelihood of some events [100] occurring in a near future and associated to anomalous behavior or patterns. Alternatively, reports [310] on behavior and information analysis can be regularly scheduled or generated on-demand. The system can be set up to continuously monitor specific queries [325]. Finally, a complete audit trail [330] is available that comprises collected data as well as all types of evidence [100] stored in the collection repository [320]. Access to this audit trail [330], like the rest of the application data [315], is restricted by access controls [335] whose scope is determined by a coloring scheme [345] and whose restrictions are defined at a fine-grained level using an anonymization scheme [340].

Figure 4:
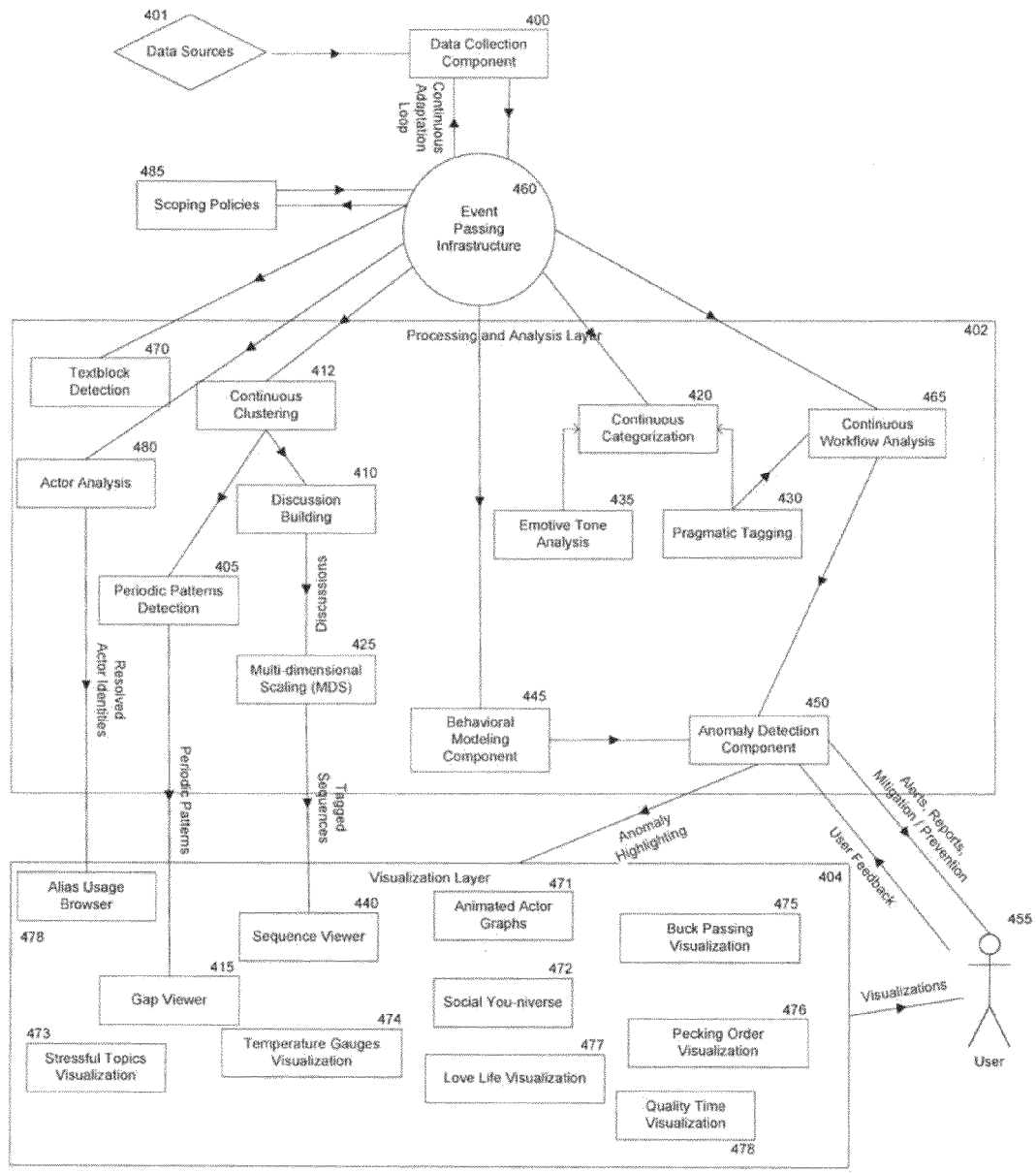
FIG. 4 is an architecture diagram of the system in accordance with an embodiment of the present disclosure.

FIG. 4 illustrates the general architecture of the system in accordance with an embodiment of the present disclosure.

A user of the system [455] is typically an analyst or human operator whose role is to respond to alerts raised by the system before a malicious act is perpetrated, or right after unintentional damage has occurred, as well as to actively investigate any leads or patterns with the help of the system's analysis results.

A central event passing infrastructure [460] is used by all components in the system to exchange data. That infrastructure can be distributed and ideally tries to keep data in flight as much as possible to maximize the system's throughput. That exchanged data comprises:

Observed events [102] that have been collected and captured by the data collection component, including but not limited to documents [162], messages exchanged on a communication channel [156] such as email, instant messages, phone logs and voicemail, as well as structured events such as database records;

Derived events [104] including but not limited to the output of the processing and analysis layer [402] (discussions [136], patterns [120], item tags [142], detected anomalies [270]); and Any kind of user input [106].

Data handled by the event passing infrastructure [460] is pushed to components in the processing and analysis layer [402]. In one embodiment, events [100] are serialized as OSFs [110].

A set of scoping policies [485], such as sliding windows [380] over the incoming data stream, are used in some embodiments to regulate the processing of events [100] by downstream components. The data collection component [400] collects data continuously or in batch mode from a variety of heterogeneous data sources [401], extracts their content and their metadata and stores the extraction results for access by downstream components of the system.

The continuous categorization component [420] analyzes the incoming stream of events [100] to assign one or more categories to those events [100], using any number and variety of categorization components [146], and maintaining the validity and quality of the results even in the case of categorization components [146] that are inherently data-dependent.

The continuous discussion building component [410] establishes discussions [136] as a structure linking causally related items [122]. The discussion-building mechanism described in the present disclosure builds on the disclosure described in U.S. Pat. No. 7,143,091 to support a continuous mode of operation [375] in a highly-scalable manner.

The continuous clustering component [412] produces clusters of items [122] or events [100] from the incoming data stream on a continuous basis. It is a required stage of continuous discussion building [410].

The continuous periodic patterns detection component [405] analyzes the incoming stream of events [100] to find event sequences [166] that are recurrent over time and occur at roughly periodic intervals, thereby constructing periodic patterns [126] on a continuous basis.

The continuous workflow analysis component [465] automatically detects ad hoc workflow processes [128] from the incoming stream of events [100] and analyzes the workflow instances [134] corresponding to those processes [128], including the detection of anomalies [270] in their realization.

The continuous emotive tone analysis component [435] is used in some embodiments by the system to identify and analyze occurrences of emotional expression in electronic communications [123], which provide valuable categorization information to other components of the system, particularly the behavioral modeling component [445].

The pragmatic tagging component [430] is another component used in some embodiments of the system which is based on linguistic analysis: it categorizes the communicative and discourse properties of electronic communications [123]. In particular, its output produces an abstract workflow model that lets the system detect and analyze workflow processes [128] associated to the realization of specific tasks.

The textblock detection component [470] automatically identifies maximum contiguous sequences of sentences or sentence fragments which can likely be attributed to a single author. Once these textblock patterns [124] have been detected, any item [122] that contains that textblock or a significant portion of it is flagged by the system as a textblock hit [130], which allows the system to assess how information is exchanged or disseminated by specific actors [220].

The behavioral modeling component [445] builds and maintains a model [200] of individual behavior [210] and collective behavior [215], which is defined by any number of behavioral and personality traits [295] that can be determined in the specific scenario at hand. A user of the system [455] can view that behavioral model [200] using a number of visualizations [204] described in the present disclosure.

The anomaly detection component [450] continuously monitors the incoming stream of events [100] (both observed [102] and derived [104], including the behavioral model [200]) with the main goal of spotting anomalous behavior and anomalous patterns in the data based on statistical, analytical, and other types of properties associated to both recent data and historical data. The anomaly detection component [450] also produces alerts [305] by aggregating anomalies [270] and reports [310] sent to the user [455]. The system also comprises time-based and behavior-based continuous visualizations [204] of those alerts [305]. Anomalies [270] detected by this component are also fed to visualizations [204] in order to highlight anomalous patterns to the user [455], and can optionally trigger mitigating or preventive actions. In some embodiments, the anomaly detection component [450] includes an anomaly detection tuning scheme which maintains the relevance and the accuracy of produced anomalies [270] based among other things on anomaly feedback [158]. However, in most such embodiments, all alerts [305] are still calculated and the user [455] is informed when significant numbers of different types of anomalies [270] associated with the same actor [220] are observed by the system; at any rate, all such instances are logged. These measures are to prevent the system behavior largely defaulting to that of a traditional system if users [455] should treat it as a rule-based system (e.g. by specifying what types of anomalies [270] they do want to see and which ones they don't, thus defeating the idea that change or deviation is by itself interesting and potentially critically important.)

The continuous multi-dimensional scaling component [425] computes a low-dimensional layout of an incoming stream of events [100]. Its output is particularly useful for the sequence viewer [440] which shows a potentially massive number of tagged sequences [138], for example those corresponding to the realization of a particular workflow process [128], thereby outlining dominant patterns and outliers in the instances [134] of that workflow process [128].

The alias usage browser [478] is a visualization [204] used in the present disclosure to efficiently display and navigate through the results of actor analysis [480], for example performed as described in U.S. Pat. No. 7,143,091 which is incorporated by reference herein for all purposes.

Finally, a number of continuous visualizations [204] show patterns [120] derived by the system from the data and from human interactions and behaviors, as well as the anomalies [270] that may have been detected in those patterns. These continuous visualizations [204] include, but are not limited to: animated actor graph visualizations [471], the social youniverse visualization [472], the stressful topics visualization [473], the temperature gauges visualization [474], the buck passing visualization [475], the pecking order visualization [476], and the love life visualization [477]

In the following sections, each of these components is specified in more details, along with one or more embodiments and how it relates to the other components in the present disclosure.

Data Sources

The system described in the present disclosure processes and analyzes electronic data continuously collected from any number of data sources [401]. Those data sources can be of virtually any type: a particular embodiment of the present disclosure only needs to extract the data and metadata from types of data sources relevant to the scenario at hand. Types of data sources that can be leveraged by the system for behavioral modeling and anomaly detection purposes include, but are not limited to the following.

Electronic communication channels: emails (collected from email clients or from email transfer agents), instant messaging, calendar events, etc.

Electronic document sources: document management systems, file shares, desktop files, etc.

Phone data sources, including phone logs, phone conversation transcripts, and voicemail.

Log files: application log files, system log files such as syslog events [100], etc.

Databases: changes to table rows in a relational database or more generally events [100] captured in real time during a transaction.

Public social networks, such as Facebook, Twitter, etc.

Other public data feeds: market data feeds, news feeds, etc.

Physical data sources: physical access logs (keycards, biometrics, etc.), sensors and sensor networks (including RFID readers), geo-location information collected from portable devices, etc.

External monitoring system: as described in this disclosure, any external monitoring system can be integrated as a data source, for example rule-based compliance systems or network intrusion detection systems.

Individual data collected from internal sources: travel and financial information, background check and psychological evaluations of individuals in the organization, results of internal investigations, etc.

Individual data collected from external sources, personal communication channels (such as email accounts, weblogs or websites), data publicly available on the internet, data subpoenaed in the case of a law enforcement organization, wiretaps and intelligence collected from the field in the case of an intelligence organization, etc.

Scoping Policies

The first component which regulates how data flows through the system in many embodiments is the scoping policies component [485]. In presence of a quasi-infinite stream of data, as is usually the case with continuous applications, the system needs to possess extensive data flow management and data aging policies.

This role is carried out by the scoping policies component [485]. Its functionality is transversally used by all other data manipulating components of the system. Most embodiments maintain an audit trail of changes to the scoping policies. The scoping policies component may have multiple policies defined, the highest priority being executed first. The scoping policies component [485] is essential to the continuous mode of operation of other components, such as the data collection component [400] and the continuous clustering component [412].

One of the simplest examples of a scoping policy is an aging policy where a sliding window [380] of time is maintained over the incoming stream of data. Every time a piece of data falls out of the window [380], a notification message is sent to all the components notifying them that they are free to discard that data.

Another type of scoping policy can evict data based on a set of predicates. For example, a predicate that states that every email coming from a certain group of actors [225] should be first to be discarded when resources are low, or based upon an order from a properly authorized user of the system [455] requiring certain sensitive data be removed from the system.

The scoping policies component [485], based on the configuration, will or will not attempt to enforce any action to be taken by processing and analysis components. In case the scoping policies component [485] is configured to not enforce its policies, the other components should decide by themselves what to do when they receive the notifications.

In one embodiment, asynchronous procedures can be launched to effectively "garbage collect" the discarded records from the caches. Some policies, such as the aging policy illustrated above, can also be coupled with archival systems or historical databases which will guarantee exploration of the data outside of the continuous flow. Setting up archival systems or historical databases is optional, however, and is not necessary for the proper operation of the system.

Data Collection

The data collection stage of the present disclosure builds on the method described in U.S. Provisional Patent Application No. 61/280,791, the disclosure of which is incorporated by reference herein for all purposes, while integrating that method into an anomaly detection scenario and adapting it to a continuous mode of operation [375]. The main implication of the latter requirement is that due to new data being processed continuously by the system, a pruning mechanism is necessary to keep the volume of persisted data bounded, or at least to keep the increase rate of that volume bounded.

Figure 5:
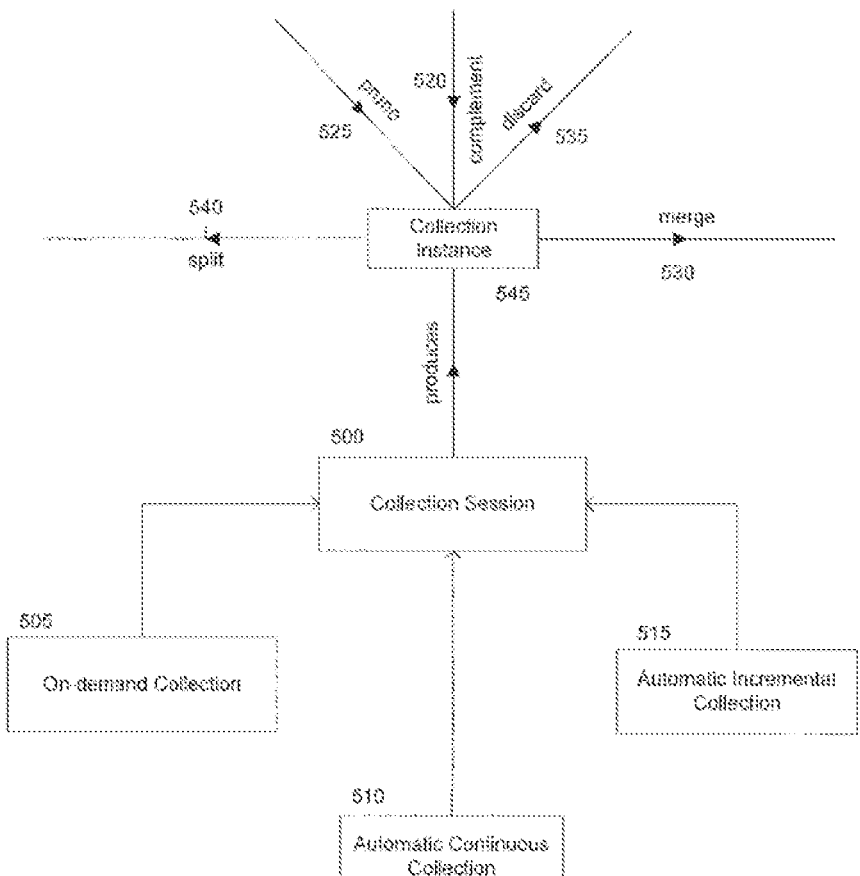
FIG. 5 is a block diagram of the different data collection modes in accordance with an embodiment of the present disclosure.

As shown in FIG. 5, data collection is performed by the data collection component [400] within a collection session [500] in any combination of the following ways.

A human user launching a collection session [500] from a machine hosting the data collection component [400] or remotely [505].

The data collection component [400] automatically collecting data in a continuous mode [510].

The data collection component [400] automatically collecting data in incremental mode [515], i.e. as a series of batch operations.

Any of these collection modes can be combined within the same collection session [500]. In particular, when the system is being run for the first time, collection will be initiated in a continuous mode [510] to collect future data (such as data captured in real-time from external data sources [401]) but the user can also at the same time, or at a later time, set up incremental collections [515] from data sources [401] hosting historical data. This allows the system to provide input data [365] to analytical visualizations [204] as early as possible, while other components such as the behavioral modeling component [445] require historical data to have been processed and analyzed in order to establish a behavioral baseline [260].

Collection Rate Adaptation

The continuous data collection component [400] described in the present disclosure has a collection rate adaptation scheme which takes into account several elements to adjust the rate, including but not limited to the following:

1. Data collection throughput and load from the various data sources [401], in order to avoid any disruption of live sources [401] (such as mail servers) and ensure a pre-defined level of quality of service. In one embodiment of the present disclosure, a set of performance goals are defined in the system configuration, which consists of a maximum CPU usage ratio, and of a maximum I/O usage ratio on each machine hosting all or part of a data source [401].
2. Data processing throughput, which is maximized with respect to the other constraints. In one embodiment, a performance goal is defined in the system configuration by a minimum processing throughput value. In another embodiment, the performance goal is the priority threshold above which a data source [401] must be fully processed (i.e. the entirety of its events [100] must be collected and analyzed by the system in any given time interval). To ensure that the performance goal for processing throughput is achieved, the data collection component [400] is able to enroll additional processing machines at any time to distribute the load; conversely, it is able to free processing machines when the performance goal is exceeded by a pre-defined value.
3. Priorities of the different data sources [401] (and the fine-grained locations within each data source [401]), depending both on user prioritization and on system judgments. In one embodiment of the present disclosure, the system checks at regular intervals whether data collection throughput is saturated; if it is, then the data source [401] with lowest priority is set into an inactive state; in the contrary case, the inactive source [401] with highest priority is activated.

Collection Scope

Data collection covers both structured and unstructured data available from locations, including but not limited to:

At the organization's boundaries (internet, intranet)
On servers (document repositories, file shares, etc.)
At the endpoints (desktops, laptops, mobile devices, etc.)
From public data sources [401] (for example, information about a company publicly available on the web, financial market data, data from social networking platforms— whether business-oriented or not)

The data model underlying the collection process is detailed in U.S. Pat. No. 7,143,091, the disclosure of which is incorporated by reference herein for all purposes. One of its most important characteristics is that it models associations between structured and unstructured data (more precisely, attributes and textual content are indexed and processed identically) as well as associations between business transactional data and generic professional data (in particular using actor analysis [480] and discussion building [410]).

The new, fundamentally different characteristic in the context of the present disclosure is that the model, in addition to being highly scalable, needs to be pruned over time since it represents an infinite data stream. Different strategies are described in the rest of this section which allow the present disclosure to prune, among other elements, the index, the item relationships (entity to instance, parent entity to child entity, etc.), and the actor and communication graph. Possible pruning strategies are explained in the section on Collection management. Additionally, the model also needs to deal with discussions [136] that are still in progress, i.e. have not reached a resolution or another form of completion.

Structure of Collection Instances

Collection instances [545] are central elements of the system's mode of operation. They are designed to fulfill the requirements of this invention, namely to provide a single data structure underlying all analytical tasks, including the storage of the complete revision history of documents and allowing the system of the present disclosure to determine the origin of all analyzed data.

Figure 6:
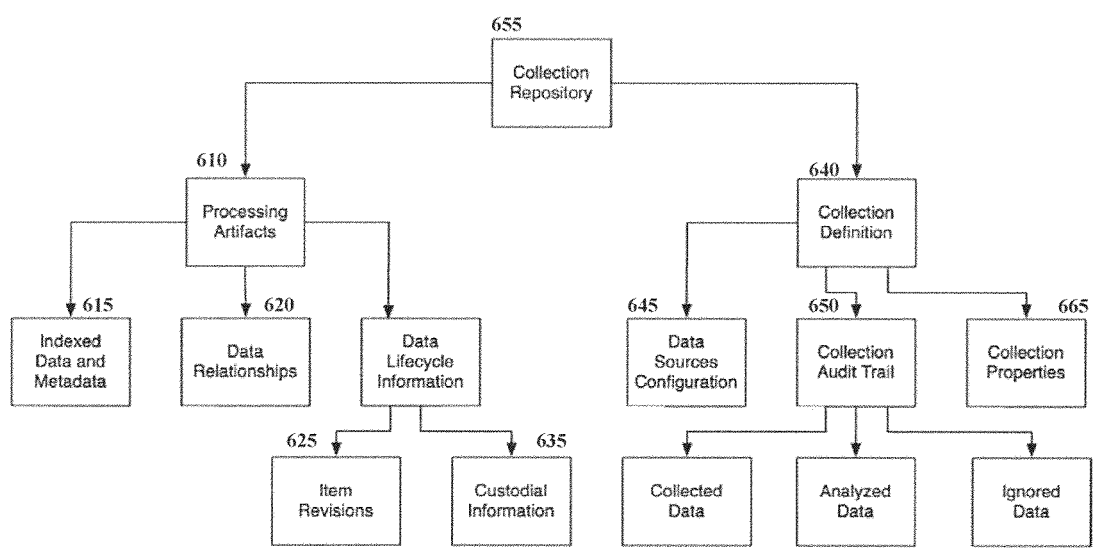
FIG. 6 is a block diagram showing the structure of the collection repository content in accordance with an embodiment of the present disclosure.
Figure 7:
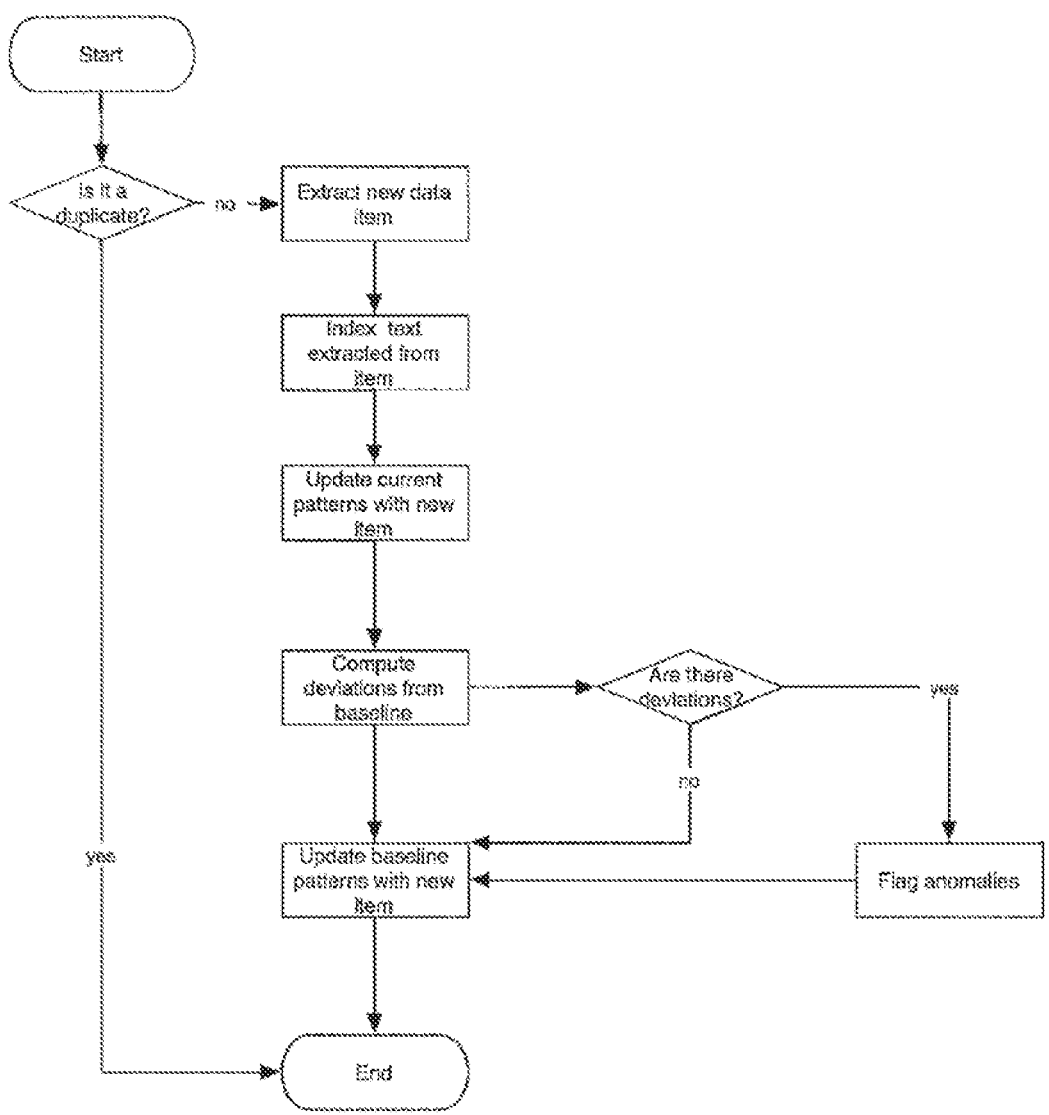
FIG. 7 is a flowchart describing the continuous processing of new data in accordance with an embodiment of the present disclosure.

As described in FIG. 6, a collection comprises a number of elements and properties, which can be categorized under collection parameters and collection artifacts.

The collection operation's definition and parameters [640] in some embodiments include:

Configuration [645] of the data sources [401]
Complete audit trail [650] of the collection, including which data has been collected and stored in the collection repository [655], which data has been collected and submitted for analysis [660], but then discarded to only retain the derived model, and which data has been ignored due to configuration (initial or overriding parameters) of the data collection component [670].
User-specified properties of the collection [665] including its name, optional description, associated matters or projects, collection mode (batch mode [370] or continuous mode [375]), owner, delete-by-date property.

The processing artifacts [610] include:
The set of all original items [122].
The results of extracting, processing, and post-processing those original items [122] (unless explicitly configured not to skip some of these stages on a particular data set) including indexed content [615] (both data and metadata), relationships between data elements [620], and custodial information [635].
Optionally, a collection instance [545] contains the full lifecycle of the original data items [122], i.e. the revisions [625] (deletion, creation, and data modification) associated with the relevant data sources [401] and the collection.

Collection instances [545] are stored in one or more secure collection repositories that are only accessible to administrators of the system, and any other users to whom an administrator has explicitly granted access.

Such a repository may contain collections of different natures. In particular, it holds both dynamic collection instances [545] and static collection instances [545]: the former corresponds to the results of ongoing collection using the data collection component in continuous mode [375], the latter to the results of a single collection operation or of a data intake from a set of physical media. It is important to provide a single point of storage for both kinds of collected data.

Collection instances [545] thus contain information about the lifecycle of the original data items. This means in particular that each collected item is flagged in the collection repository with a number of attributes including the following: which custodians or systems currently have which revisions of the item [122] (if more than one revision exists), which custodians (or systems) deleted or edited the item [122] and when these edits were made, and optionally the full item [122] revision history. (This is optional because it can increase storage requirements and the volume of information to post-process.)

Note that the persistence of the full information lifecycle allows the anomaly detection component of the system to detect anomalies [270] related to that lifecycle, including the following examples:
- A document [162] was edited an unusually large number of times, and in an unusual number of ways.
- A document [162] was edited by an unusual number of actors [220] relative to what is normal for this type of document [162]
- Many custodians of a particular document [162] all deleting it within a very short time span of one another.

As described above, the collection audit trail contains information about different types of data, namely the items [122] that have been collected and stored; the items [122] that have been collected and discarded; finally, the items [122] that have been ignored.

To illustrate the point of organizing the collected data in this way, the case of ephemeral data can be considered. For example, system and application logs produce far too much content to store persistently over the long run, however the patterns that can be automatically inferred from these logs (such as periodic usage patterns) are interesting to observe since any significant aberration from such patterns would be worth showing.

More generally, one the fundamental benefits of the system is that there is no need to exhaustively store the whole data that has been analyzed, since in most cases the patterns resulting from statistical analysis of that data are sufficient to establish a behavioral baseline [260] and thus to detect anomalies [270]. In particular, this yields—if desired—very strong privacy protection guarantees because the original data items [122] collected from different sources are not necessarily persisted by the system, and also because in case they contain confidential data, some of their properties can still be leveraged by the behavioral model [200] without infringing on privacy by looking at the data.

Data Collection Scenarios

Different usage scenarios will benefit from different levels of accuracy and completeness in the collection model, which is the main rationale for the previously defined flexible model.

Very coarse-grained collections can be configured in some specific scenarios, which in turn speeds up processing of collection results. In a common application scenario, a collection session is designed to support a long-term investigation or monitoring case based on a substantial amount of previously collected data. In that case, analysis results from that prior data can be leveraged by the anomaly detection component [450], hence it is of great benefit to store the full history of successive item revisions [625] in the repository [655], including but not limited to the following reasons:
- A complex model of what constitutes normal behavior in the organization (part of the baseline model [200] built by the system) will have been inferred from months or years of collected data, thus allowing reliable detection of anomalous behavior as soon as continuous monitoring starts on recent data.
- Conversely, the system-derived model, including document lifecycles, allows the system to derive associations between actors [220] on the one hand, and events [100] on the other hand, based on who actually does what—and how. In one embodiment of the present disclosure, this allows the system to determine which actors [220] are typically involved in the lifecycle of any particular type of document [162], for example the quarterly filing of a corporation's financial results.

Collection Management

In one embodiment of the present disclosure, collection management is performed in the administration console, and offers various maintenance and administration functionalities, detailed in the rest of this section.

Merging [530] collection instances [545]: A common and convenient operation is merging two independently created collection instances [545] This means that the original data sets are merged into a new collection instance [545], along with all associated processing artifacts.

Pruning [525] collection instances [545]: The size of collection artifacts from collection operations, both in batch mode [370], and in continuous mode [375], tends to increase on the long term. After running for several weeks or months they may contain extremely large volumes of extracted data and metadata, especially when complete item revision [625] histories are stored.

In that case, collection instances [545] can be manually pruned, by removing information prior to a given date, or for particular manually performed investigations and data analysis operations that are no longer relevant, or for particular custodians of the data, etc.

In addition, the system optionally performs automatic pruning [525] of the collection instances [545]. This is done by assigning a pruning mode to any given collection instance [545], which is enforced by the scoping policies component [485]. As described earlier in this disclosure, the scoping policies component [485] provides a number of scoping policy types, which when applied to collection instances include but are not limited to the following:
- Aging policy specified by the length of the sliding window [380], so that the data collection component [400] will at any time only retain data in that collection instance [545] which is for example at most 6 months old.
- Predicate-based policy, for example a least-relevant-data-first pruning strategy: In conjunction with a maximum volume assigned to the collection instance [545], this policy enforces the predicate that data deemed the least relevant to the matter or project at hand will be pruned to keep the volume of a collection instance [545] below that limit.

Splitting [540] collection instances [545]: Dividing collection instances [545] according to certain criteria is useful when, for example, a new investigation or monitoring case has to be processed which corresponds to a subset of the data collected for a prior case.

Complementing [520] collection instances [545]: This consists of creating a new collection instance [545] from a prior collection session [500] and running it in an incremental mode so as to collect data that has been added since the prior collection session [500], but also metadata updates, deleted data, etc.

Discarding [535] collection instances [545]: Finally, collection instances [545] can finally be deleted in a safe and verifiable manner, for example to comply with a destruction order or a retention policy. In one embodiment, all constituents of the collection instance [545] are erased.

Continuous Clustering

The continuous clustering component [412] produces clusters of items [122] or more generally events [100] from a set or a data stream on a continuous basis. A cluster is defined as a grouping of events [100] similar with respect to some observed features. The similarity measures are configurable.

Preliminary Definitions

A similarity measure is a function that ascertains similarity between events. In its simplest form, it takes two events [100] and returns true if they should be considered similar, or false if not. Similarity measures can also provide a degree of similarity between two events instead of a binary answer. A degree of similarity can be a number in a specific interval, usually from 0 to 1. This allows us to perform fuzzy clustering. Custom similarity measures can be defined to fit the different types of data that are being processed.

An embodiment of a similarity measure can be set up to receive two emails and return true if their tf-idf vectors' cosine exceeds a certain threshold, and false otherwise.

Another embodiment can take two phone logs and return true if the caller and receiver on both phone logs are the same, and false otherwise.

Another embodiment can be a set to operate on any type of event [100] that represents a communication [123] between two actors [220] and return true if two events have exactly the same set of actors [220], regardless of the type or channel [156] of the event [100]

A similarity measure definition is thus very flexible, and is not necessarily constrained by the use of heterogeneous event [100] types.

The method is fully continuous, which implies that it produces usable results (sets of clusters) and updates them as it acquires the events [100] from the underlying data stream.

The method is stable and incremental. Running it on the same set of events [100] streamed in different orders produces the same result.

The method runs on heterogeneous types of electronic events [100] as long as a similarity measure can be defined on them.

The method can be configured to prioritize the processing of certain events [100].

We assume a stream of events [100] flowing into the continuous clustering component [412]. In case the system needs to operate on a static dataset (i.e. in batch mode [370]), we can simply iterate through the static dataset and provide the events [100] to the system as a stream, hence adding no additional difficulty when processing static datasets.

Workflow

The continuous clustering is organized around a flow of events [100] through a set of components that process the events [100] as they receive them, and immediately forward the results needed by the downstream components, usually in the form of typed updates.

Raw event stream [905]: The continuous clustering component [412] connects to a provider of raw events [100] which in the default embodiment of the present disclosure is the event passing infrastructure [460] which relays data collected by the data collection component [400] from any other source of raw electronic events such as:

Financial market data feeds
Online Press data feeds
Others: news articles, editorials, blogs, tweets Feature collection phase [910]: A feature is a labeled and typed value copied directly or derived from an event [100] or its underlying items. In case of a derived value, the derivation is free to use information from other events [100] but a resulting feature is directly associated to the event [100] itself. A feature can be shared among multiple events [100]. Depending on their type, sets of operations can be defined between different features or structures of features, notably, some of those operations establish equality, equivalence or order between two or more features.

Figure 10:
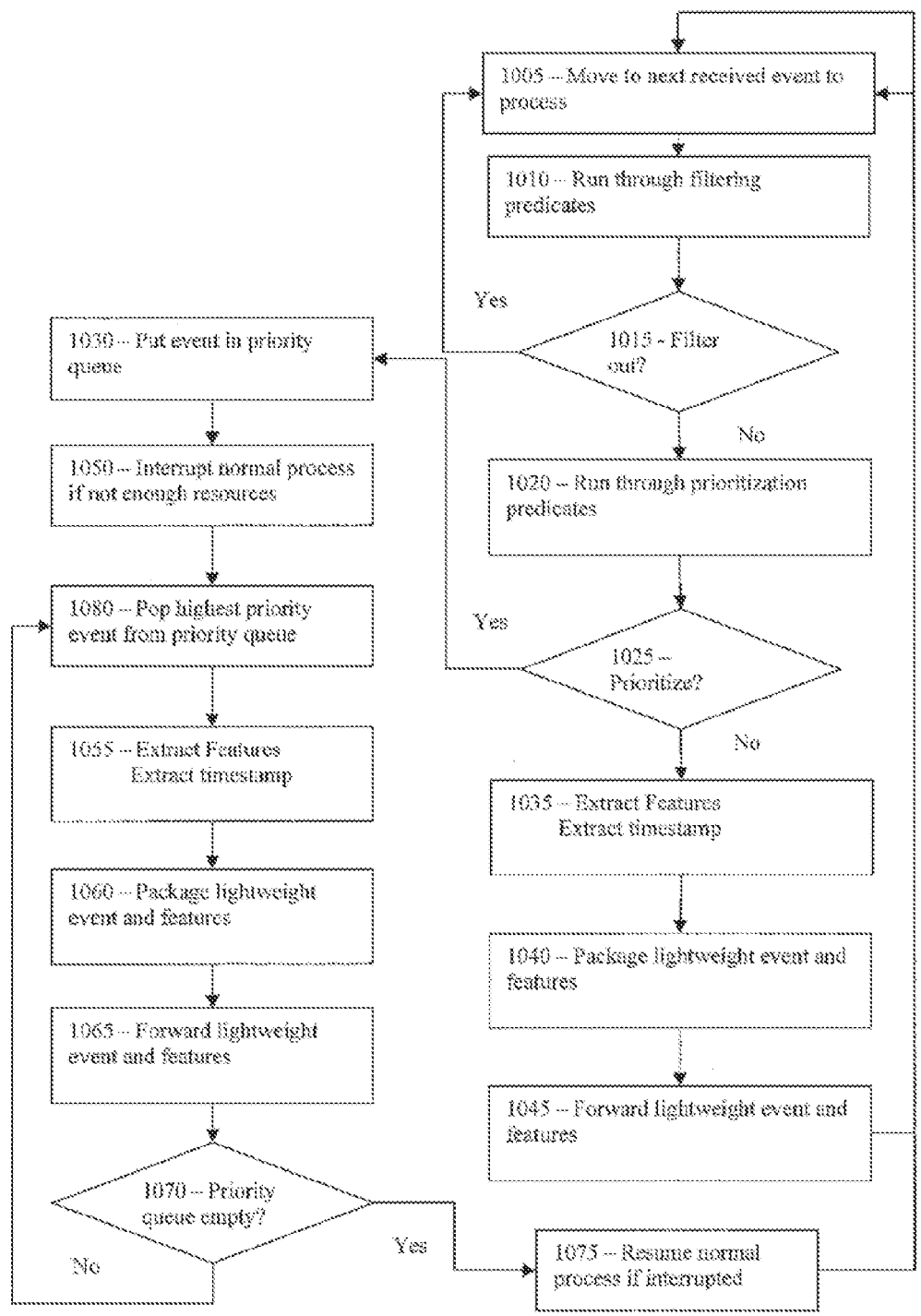
FIG. 10 is a flowchart of the feature collection process in accordance with an embodiment of the present disclosure.

A few examples of features are:
The set of all named entities directly extracted from an email text A list of key terms from the text of an email with their tf-idf score calculated by using document frequency information from other emails A duration of a phone call written on a phone log Feature collection: The feature collection phase collects, for each observed event, the necessary information needed by the downstream components. It is a fully configurable component allowing the specification of all the subsets of the data stream, as well as the snippets of information to retain from each event. Its high level functions are described in FIG. 10:

1. Filter incoming events [100] using filtering predicates [1010]
2. Prioritize incoming events [100] based on configurable prioritization predicates [1020]
3. Extract features necessary for the remaining of the overall computation by the downstream components. This results in a lighter process since only the necessary subset of events data is forwarded [1035]
4. Extract time stamps needed by the downstream components [1040]
5. Allow update of the filtering and feature extraction configurations live, while the system is still running Example 1

This example illustrates filtering and feature extraction. An embodiment of a feature collector can be set up to only pass emails and IMs to the downstream components (filtering out, for example, phone logs, key card accesses and any other non email or IM records).

This feature collector could then be set up to extract, for each email and IM, the sent date, which will be used as a time stamp, the title, the sender, receivers and other participants, and instead of passing around the whole raw content, would extract a shorter set of the named entities of the content and their modifying verbs, the feature collector would then compress the whole set of features and pass it along to the next component.

Example 2

This example illustrates prioritization. An embodiment of a feature collector can be set up to automatically prioritize certain types of events [100] by attaching a priority level to every event that satisfies a prioritization predicate. Examples of such prioritization predicates can be:

A communication [123] occurs within a specific group of actors [225].
A financial order with a certain symbol and a price that surpasses a certain threshold from a high frequency trading firm is acquired
A key card access to a critical server room within a software company is acquired Every time an event is acquired and matches a specified prioritization predicate, the feature collector will prioritize its processing [1030]. If there already are prioritized events being processed, the latest prioritized event will be queued for rapid processing, along with the other prioritized events, in a position corresponding to its priority level [1080].

Light Event Representation and Forwarding

Each event [100] not filtered out by the aforementioned feature collection phase now has an internal lightweight representation consisting of only the data needed by the downstream components.

Those events [100] are forwarded as they come to the other components guaranteeing the continuous nature of the whole method Continuous Clustering Component The continuous clustering component [412] creates and updates sets of clusters of events [100] continuously as it receives them (in our current setting, from the feature collector).

The clustering method is an extension of the document [162] clustering method described in U.S. Pat. No. 7,143,091, the disclosure of which is incorporated by reference herein for all purposes. At a high level, the current method augments the previous one with the following functionalities:

The process is now made continuous and every new event [100] is immediately clustered, and the result is immediately forwarded to downstream components.

The clustering component now listens to notifications from a scoping policies component [485] which notifies of which event [100] is to be discarded.

The Continuous Aspect

In an embodiment of the continuous clustering component [412], the main operations are performed using of two main data structures:

A main event index or lookup table which maps every event ID with the event data and allows its retrieval in constant time An inverted index which is another lookup table that associates for every feature the set of event IDs that possess that feature. The associated set of IDs is called a posting The continuous aspect is achieved by performing the following operations every time a new event [100] is acquired:
1. For every extracted feature of the newly acquired event [100], retrieve an initial set of other events [100] that share the same feature. That set is the posting that we can retrieve by using the inverted index.
2. Collect and de-duplicate all the postings associated with each of its features. The events [100] whose IDs constitute the postings are called a neighborhood. They can be looked up in constant time using the event index. The remaining operations will be performed only on the neighborhood which will greatly reduce the amount of computation since the neighborhood's size is smaller than the whole set of events [100].
3. Apply a similarity measure between elements of the neighborhood to reduce the set and maintain only a smaller set consisting of the events [100] that are close enough to the new event [100] with respect to the similarity measure. The small subset of the neighborhood will be referred to as a clump.
4. Check if the newly computed clump can be merged with existing clusters. Merge or split if needed.
5. Forward the changes to the downstream components in the form of deltas.

The above operations can also be performed in other embodiments by using data structures other than the ones listed here. In essence, every data structure that allows constant time lookup of the events [100] coupled with any data structure that allows the retrieval of a given event's [100] neighborhood, based on similarity of their features, can be used.

Handling of Scoping Policy Notifications

Upon reception of a discard notification from a scoping policies component [485], an embodiment of the clustering component [412] could do the following:
1. Locate the events [100] to be discarded from its index and remove them.
2. For every feature of every event [100] removed from the index, look up its posting and remove the event [100] from the list of associated events [100].
3. Create and send a delta notification with the appropriate removal declarations to all the components that use clustering results.

Live Operations

The continuous clustering component [412] also provides methods to query and manipulate its state while it is still running. In some embodiments, examples of those methods are:
1. Iterate through all current clusters
2. Get all events [100] of a cluster
3. Remove an event [100] from all clusters
4. Remove a cluster from the set of available clusters Incremental Updates to Clusters Creation and changes to clusters are propagated by sending change representations we will refer to as deltas [925]

Deltas are a form of typed update [107] used in order to avoid re-sending whole clusters around when a change has been made to them. In its simplest embodiment, a delta is made of a cluster identifier, and a set of update declarations. The update declarations are either additions to the identified cluster or removals from the identified cluster. A simple example of delta can be represented as:

$$\text{delta}=(\text{id0},\{-\text{event0},+\text{event1},+\text{event2}\}) \quad (\text{Eq-1})$$

This will be interpreted as: the cluster with identifier id0, has gained two events: [100] event1 and event2 and has lost the event [100] event0.

This way of only propagating update information in the form of deltas is a significant gain on performance and overall load on the computational resources. On large scale deployments, where different components reside on different machines connected via a network, this greatly reduces the amount of network traffic and the amount of update information to be processed.

Each update declaration is also interpreted as an idempotent operation, therefore, if by any forwarding or network glitch, the same delta is received twice or more by any component, it will have the same effect as if it was received only once.

Notice that this representation of deltas still allows the representation of the whole content of any duster if need be. Representing the whole duster comes down to making sure all the events contained in the cluster are stated as additions in the delta.

This abstract structure is the basis on which the downstream components which use clustering information depend.

Continuous Detection of Periodic Patterns

We describe a method that finds within a set or a stream of events [100], sequences of events [166] that are recurrent over time and occur at roughly periodic intervals. The method yields the actual sequences of events [166] that correspond to the realization of those periodic patterns [166], and are called periodic sequences [132]. It does this without any prior indication of the periodicity (for example daily, weekly, yearly, or every six hours and twenty minutes) or any prior indication of what the possible recurring events [101] themselves might be.

Preliminary Definitions

A unique identifier is synthesized for every event [100], calculated as described in U.S. Pat. No. 7,143,091. Examples of events [100] considered by the periodic patterns detection component [405] in one embodiment of the present disclosure are:

An email with its associated sent date

An IM session with its associated start date

A phone log with its associated call time

An electronic meeting invitation note with the associated meeting date

An electronic meeting invitation note with its associated sent time (as opposed to the time when the actual meeting is supposed to take place)

A Financial market order and its associated time stamp

A Financial stock tick with its associated time stamp

A key card usage record with its associated time stamp

A document with its associated creation, update or delete time stamps

A record of actor [220] A communicating with actor [220] B in private (regardless of the communication channel [156] used) with the communication's [123] date and time Notice the heterogeneous types of items or combination thereof that can be considered events [100] for the periodic patterns detection component [405].

Each association between a type of event [100] and the right type of time stamps is either directly inferred when there is no ambiguity, or can be configured. Some events [100] also have a duration.

It should be noted that the definition of an event [100] does not require a one-to-one relationship with an electronic item. A simple class of events can be defined as a dialogue of a certain maximum duration, another class of events [100] can consist of all the electronic records constituting a financial transaction. The periodic patterns detection component [405] therefore allows any logical, identifiable and detectable bundle or derivative of electronic behavior, to be treated as an event [100].

A periodic pattern [126] is an event [100] or a group of events that is recurrent over time and occurs at roughly periodic intervals. Examples of such patterns [126] are:

A weekly meeting

A yearly employee review process

A periodic sequence [132] is an actual sequence of events that matches a periodic pattern [126].

This section describes a method that finds within a set or a stream of events [100], the periodic patterns [126] and yields the actual sequences of events [100] that correspond to the realization of the periodic patterns [126]. It does this without any prior indication of the periodicity or possible periodic events [100] themselves.

The method even finds the periodic patterns [126] that have changing frequency components over time.

The method is fully continuous, updating relevant periodic patterns [126] as new events [100] enter the system.

The method is robust against incomplete or locally irregular data and localized changes of frequencies of the events [100].

To illustrate this previous point, let us imagine a particular sequence of meeting invitations in a company, scheduled every week, on Monday, for a year. We continuously receive all data as they become available, starting from the beginning of the year. All meeting-related data is buried among the other types of data and we are not told in advance that this particular sequence of meetings will be a candidate for periodicity. If the sequence is ideal and always occurs every Monday, It will result in our method identifying a periodic pattern [126] of period one week that covers a year. Now, let us imagine that there is still a weekly company meeting but sometimes, maybe due to schedule conflicts, it is held another day of the week instead of Mondays. Each two successive meetings are not necessarily separated by exactly one week anymore. In addition to those slight irregularities, it often happens that such real-life events are skipped for a considerable period of time, maybe the attendants of the meeting have gone on vacation, perhaps for a few months. To finish, there can also be a different type of change: a frequency change when the previously weekly meeting turns into a daily meeting for a few months, maybe due to some tight deadline to meet.

This illustration presents some of the challenges solved by the present disclosure in most datasets, because regardless of those irregularities, it still identifies the relevant periodic patterns [126]. This method is designed from the ground up to take them into account and still come up with a comprehensive result.

The method will return, for this illustration:

A periodic pattern [126] consisting of two distinct frequencies, a weekly frequency followed by a daily frequency A clear indication of the small disturbances (when the meetings were not held on Mondays but later in the week) and gaps (when everyone was in vacation) within the periodic patterns [126]

It should be noted that those results will be yielded and updated as soon as the data is processed and we do not need to wait until the end of the year to produce the first results: The results are available on a continuous basis.

The resulting set of periodic patterns [126] can also be queried by both its structural information: What periodic sequences share the same gap? What periodic sequences have a gap of size X during time period Y?

Or its semantic information: Which periodic sequences [132] correspond to meetings? Which ones correspond to professional activities? Which ones have changes that coincide with external events [170]?

This method can also recombine previously discovered periodic patterns [126] into higher order periodic patterns [126] that provide a richer picture of the regularities or irregularities of the data set or data stream.

The present disclosure assumes a stream of events [100] flowing into the periodic patterns detection component [405] In case the system needs to operate on a static dataset (i.e. in batch mode [370]), it simply iterates through the static dataset and provide the events [100] to the periodic patterns detection component [405], hence adding no additional difficulty when processing static datasets.

Workflow

The periodic patterns detection component [405] operates on a set of clusters of events [100] forwarded by the continuous clustering component [412] described in this disclosure. It receives a set of deltas [See section below for a definition of deltas] and updates the periodic patterns [126] that have the elements of the dusters as their underlying events [100].

In order to continuously build the dusters of events [100] and forward them to the periodic patterns detection component [405], the following steps are performed by the clustering component [412] described earlier in this disclosure:

Raw event streams listener

Feature collection phase

Light event representation and forwarding

Continuous clustering component

Incremental updates to clusters

The following describes the periodic pattern [126] detection steps performed once the deltas are received from the clustering component [412].

Periodic Patterns Detection

Detection: The periodic patterns detection component [405] performs the following actions:

1. Continuously receives a stream of deltas,
2. Searches for frequency components within each cluster,
3. Attempts to combine the periodic patterns found within different dusters to form higher order periodic patterns if possible.

An embodiment of a method to find the periodic patterns [126] is outlined below.

Binned Sequence

Upon reception of a delta, a process is spun off by the periodic patterns detection component [405] and locally reloads all necessary information for continuing the analysis of the corresponding clusters.

The search for frequency components happens at different fixed time resolutions. The available time resolutions can, for example, range from a very fine grained resolution such as second or below, to coarser grained resolutions such as hour, day, week, month, etc. The analysis starts with the smallest resolution.

For each resolution, the list of events [100] is sorted and binned according to the resolution. The resulting binned sequence can be treated as an array with each of its elements corresponding to the content of an individual time bin. Each element of the binned sequence can therefore represent:

- A single event [100] within a time bin
- A list of several events [100] that ended up together in the same time bin
- An empty time bin representing a non-event, which can be interpreted as a time bin where nothing relevant was observed.

Once a binned sequence has been built, the system proceeds to reading it into a sparse transition matrix.

From here the system only operates within a specific time resolution at a time, meaning the time axis is slotted into time bins of constant width. This helps reduce upfront a set of small variances and errors in time interval measurement. This also implies that several events [100] can end up in the same time bin. In the rest of this section, the term time bin will sometimes be used as a unit of measure or time just like a natural unit would be used such as day or month.

Sparse Transition Matrix

The sparse transition matrix T is a matrix that has event classes on its rows and integers on its columns. An event class is defined here as a set of events [100] that are similar. An example of event class is a set of all instances of a particular meeting notification email.

An entry T[i,j] of the matrix is a structure a containing an integer indicating the number of times instances of events [100] of the class denoted by the index i follow each other separated by a distance of j time bins. This number contained in the entry will be referred to as a repetition count. If the integer contained in the structure s of the entry T[e,4] is 10, that implies that events [100] of class e have been recorded to succeed each other every 4 time bins 10 times. The structure s also records the intervals where those successions occur in order to allow the location of the time intervals when those transitions occur. It also records, for each event class encountered in a time bin, the number of instances of that class observed.

Updating the Sparse Transition Matrix

Let us illustrate the creation and update of a sparse transition matrix with a small example:

Let us consider a binned sequence containing two classes of events. The class e={e1, e2, e3, e4, e5, e6, e7, e8, . . . } and the class f={f1, f2, f3, . . . }

(Portion 1) e1|*|e2|*|e3|*|e4|*|*|*|e5 f1|*|e6|f2|*|e7|*|e8 f3

Reading this binned sequence will produce or update a sparse transition matrix with the following repetition counts (we omit detailing the whole structure of the entries).

T[e,2]=6 repetitions, at intervals [1, 7] [11, 17]
T[e,4]=1 repetition, at interval [7, 11]
T[f,3]=2 repetition, at interval [11, 17]

The creation and update of a sparse transition matrix is a linear operation with respect to the size of the binned sequence. Using two pointers along the binned sequence, one could record all transitions for each event class in one pass.

Detecting Frequency Components

From this matrix we only consider entries that have a minimum number of repetitions, and satisfy a minimum set of contiguous disjoint occurrences (derived from looking at the intervals). The minimum number of repetitions can be adjusted for each time resolution in the above example, if our minimum repetition is 2, then we only consider entries T[e,2] and T[f,3].

We can automatically infer from these entries the frequency component (e,*) which means an event [100] of class e occurs every 2 time bins as well as the frequency component (f,*,*) meaning an event [100] of class f occurs every 3 time bins. (The symbol * denotes a contextual non-event, or more generally a time bin when observations do not participate in the periodic pattern [126] considered).

It should be noted that the frequency components will still be detected even if noise—in the form of a set of unrelated events [100] scattered across the binned sequence—is added to the binned sequence. This adds to the robustness of the method.

Furthermore, because we record the number of instances of every event class per time bin, we are able to produce periodic patterns with accurate amplitude information. As a simple example, if we augment the sequence represented by (Portion 1) in order to have two instances of the event class e at each occurrence:

(Portion 1 augmented) e1 e101|*|e2 e102|*|e3 e103|*|e4 e104|*|*|*|e5 e105 f1|*|e6 e106|f2|e7 e107|*|e8 e108 f3

We would be able to detect the corresponding, more informative frequency component (2e,*) indicating that two occurrences of events of class e occur every 2 time bins.

Recombination and Higher-Order Periodic Patterns

Once the basic frequency components and periodic patterns [126] are detected a new step is taken to recombine them into higher-order periodic patterns [126].

A higher-order periodic pattern is any complex periodic pattern obtained via recombination of previously detected standalone periodic patterns.

Previously built periodic patterns [126] can be automatically recombined if they satisfy two types of conditions:

Semantic conditions
Structural conditions

Semantic Conditions

A semantic condition is any condition that triggers a recombination attempt while not being based on the pure periodic structure of the periodic patterns [126] to be recombined. Such conditions include, for example, an attempt to recombine two periodic patterns [126] because their underlying event classes have been declared similar and therefore merged into the same cluster by an upstream component. Semantic conditions, even though they serve as triggers, are sometimes not sufficient to mandate a recombination. Often, the recombination needs to be validated by satisfying further structural conditions.

Structural Conditions

A structural condition is any condition based solely on the structure of the periodic pattern [126]. Structural conditions are built around information about periodicity, time span, intervals of occurrence, disturbances or gaps. Everything else not related to the structure of the periodic pattern [126] is labeled as a semantic condition.

To illustrate an embodiment of a recombination step, let us consider the following binned sequence:

(Recombination) e1|f1|e2|*|e3|f2|e4|*|e5|f2|e6|e7|f2|e8|*|

This binned sequence yields at first two distinct periodic patterns [126]: A first one with a frequency component (e,*) which indicates that an event of class e occurs every 2 time bins and a second one (f,*,*,*) which indicates that an event of class f occurs every 4 time bins.

An automatic recombination of these two periodic patterns [126] will result in a richer higher order periodic pattern [126] (e,f,e,*) indicating an event [100] of class a followed by an event [100] of class f followed again by an event [100] of class e every 4 time bins.

Structural conditions, in this example where both original periodic patterns [126] are flat, can be stated as follows:
- The length of one of the periodic patterns [126] must be a multiple of the other, with a bounded multiplicative factor selected based on the time resolution at which the binned sequence has been built.
- The two periodic sequences [132] must satisfy a set of structural invariants, one example of which is a notion of bounded phase difference variance meaning that the oriented difference of positions between pivotal events [100] of each occurrence of the periodic patterns [126] is constant or bounded to a small variation with respect to the time resolution at which the binned sequence has been built. A simple example of a pivotal event is the one that starts every occurrence or repetition of a periodic pattern.

Those two examples are sufficient for flat periodic patterns [126] such as the ones illustrated here to be automatically recombined. The periodic patterns [126] (e,*) and (f,*,*,*) have respective period or length of 2 and 4 which are multiples. Furthermore, we can observe that every fi is always preceded and followed by a pair ei, ej. This satisfies the bounded phase difference variance condition, giving us enough confidence to recombine the two periodic patterns [126].

It should be noted that because we store the intervals and positions where the actual events [100] take place in our sparse transition matrix, the above structural conditions are tested in less than linear time (with respect to the binned sequence's length). These conditions can therefore be reevaluated as needed when the underlying event [100] sets are updated to ascertain whether or not the periodic patterns [126] should be kept combined or not.

Structural conditions are not limited to the one illustrated in the above example. In addition to hounded phase difference variance, other conditions such as alignments of disturbances or gaps, where the time intervals representing the disturbances or gaps of a set of periodic pattern line up with a very small variation, can also be used.

In one embodiment of the present disclosure, recombinations can also be made offline by using the querying mechanism on periodic patterns [126] stored by the system in a periodic patterns [126] database.

Continuous Caching

Every time the system finishes wrapping up frequency components into periodic patterns [126], a set of attributes is cached until the underlying clusters that contain the events [100] are updated again, requiring an update of the associated periodic patterns [126]. The cached attributes contain:
- The current state of the different sparse transition matrices and their associated time resolutions, with flags on the entries allowing changes to be versioned. This allows operations such as: "provide from a sparse transition matrix only the entries modified after version X"
- The list of IDs of the underlying clusters
- A set of information kept around to avoid rebuilding the binned sequences ail over again every time the underlying clusters change. This information allows the frequency component detection to be carried only on the new binned sequences built from the deltas associated with a cluster change. A summary of that information includes:
  - saving the overall length of the binned sequence,
  - saving the latest position of each last instance of every class of event,
  - a saving all events [100] in the most recent time bin for every time resolution.

These attributes are indexed in a constant-access memory cache backed up by a persistent store by the cluster IDs and the periodic pattern IDs allowing a fast retrieval when clusters or periodic patterns need to be updated.

Handling of Scoping Policy Notifications

Upon reception of a notification from a scoping policies component [485] declaring for example that an event [100] has been aged out, an embodiment of the periodic patterns detection component [405] could remove the corresponding event [100] from its caches and persistent stores and keep only its identifier and time stamp within a compressed representation of the periodic patterns [126] the event [100] appears in. This is another way to save the amount of space used for caching results from continuous periodic pattern detection.

Parallelization and Distributability

Because all the events [100] are only read and never modified during the usually very short frequency detection phase, which in addition operates on a partitioned subset of the available clusters, the system ends up with a high number of very localized and short processes. Every frequency detection and periodic pattern [126] update process is therefore spun off within its own parallel process for every subset. This factor allows the system to scale the computation through the parallelization and distribution of the frequency detection processes on the whole data stream. Depending on the concurrency mechanism available, an independent short lived process can be dedicated to any local set of classes of events for each update.

Incremental Aspect of the Process

In addition to the operations described above, every sparse matrix is continuously updatable and the frequency component detection happens incrementally.

This also means that any binned sequence need not be passed to the system in its entirety in one pass. Being able to build the whole binned sequence in one shot is often impossible anyway because of the continuous nature of the system: the periodic patterns detection component [405] processes events [100] as it receives them.

Figure 11:
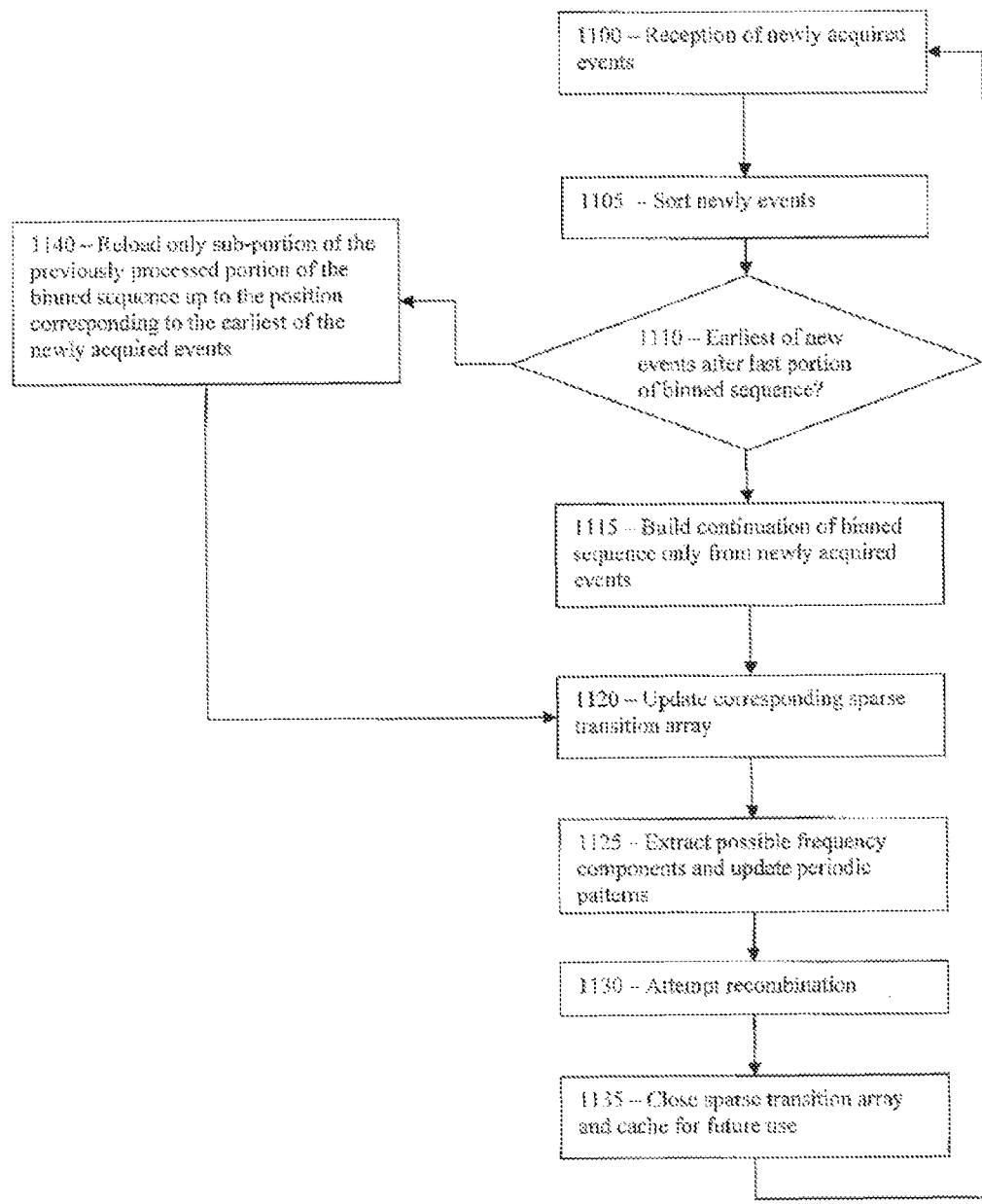
FIG. 11 is a flowchart of the periodic pattern frequency component update process in accordance with an embodiment of the present disclosure.
Figure 12:
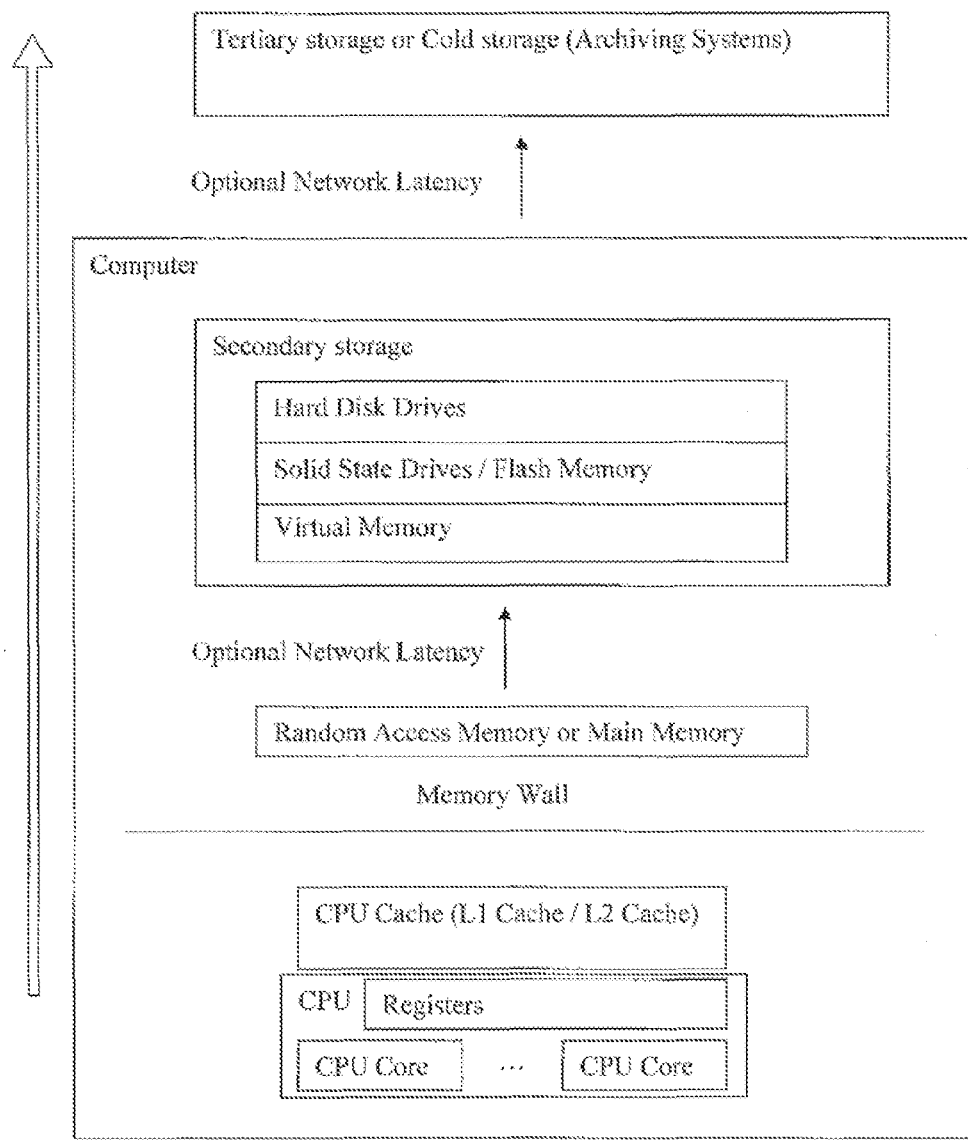
FIG. 12 is a block diagram of a computer memory hierarchy example in accordance with an embodiment of the present disclosure.
Figure 13:
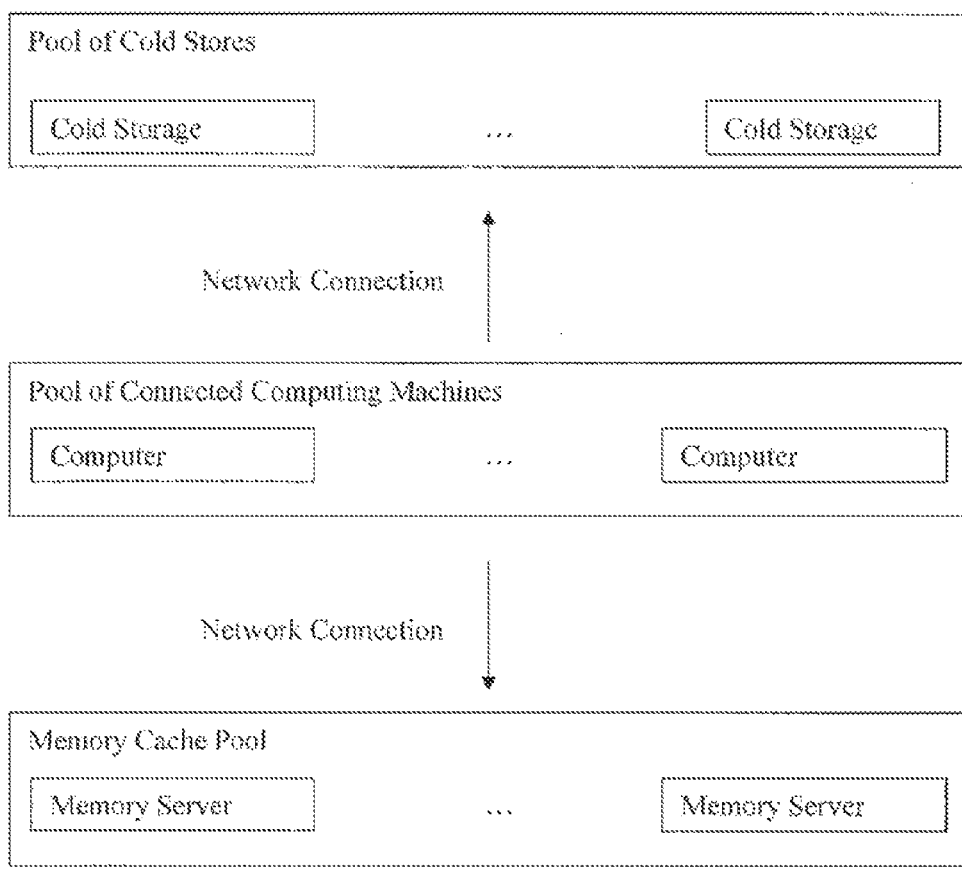
FIG. 13 is a block diagram of a computer network memory hierarchy example in accordance with an embodiment of the present disclosure.

Therefore, small sections of the binned sequence are built as the underlying events [100] are acquired from the continuous clustering component [412] using for example deltas (see FIG. 11):
- In case the stream of events [100] needed to build a binned sequence arrives in increasing order with respect to their timestamps, the previously processed portion of the binned sequence is not needed since every newly arriving event falls at the end of the previously built binned sequence. A continuation of the binned sequence can be built only from the newly acquired events and used to update the sparse transition matrix [1115]. This operation is therefore akin to an "append".
- In case the stream of events [100] arrives in no particular order, the newly acquired events are first sorted in increasing order. If the earliest event [100] from the newly acquired events [100] happened after the last time bin of the previous binned sequence, the previous portion of the binned sequence does not have to be reloaded or rebuilt [1140]. Otherwise, a sub-portion of the previously processed portion of the binned sequence is reloaded up to the position corresponding to the earliest of the newly acquired events [100].

To continue with the above illustration, let us assume that new events [100] are added to the binned sequence (Portion 1) in the form of (Portion 2) below (We assume that we are using time bins of the same length). This will happen very often as deltas are received from the clustering component [412]:
(Portion 2) e9|*|e10|*|e11|*|e12

If the earliest of the newly acquired events [100], represented by e9, had a timestamp such that, relative to the previous portion (Portion 1) of the binned sequence, e9 falls after the time bin that contains e8 and f3, we can carry on without reloading any previous portion of the binned sequence and updating the sparse transition matrix will be the same as if we have had the whole binned sequence in one pass.

However, if e9 fell within the previous portion (Portion 1), say at position 9, which was previously occupied by a non-event, we would have to reload only the sub-portion of the previous array up to, and including position 9, meaning:
(Reloaded sub-portion) . . . *|*|e5 f1|*|e6|f2|e7|*|e8 f3 . . . .

And we would insert the newly acquired events [100] to obtain
(Reloaded sub-portion updated) . . . e9|*|e5 f1 e10|*|e6 e11|f2|e7 e12|*|e8 f3 . . . .

Notice that in this last case the number of occurrences in this time interval as well as a previous gap at position 9 will have to be updated.

Only the entry T[e,2] will have changed triggering only an update of the frequency component (e,*) and its associated intervals of occurrence and positions information.

This type of incrementality can be achieved using a dirty flag for each matrix and setting it to true every time an update is made to the matrix, along with the set of two indices pointing to the modified entries. After a matrix is updated from a new binned sequence, process only the entries that have been marked as updated and reset the dirty flag to false.

The possibility to locally carry on the computation and still produce meaningful updates without having to reload or rebuild previously used portions of the binned sequence is yet another win in terms of computational performance since we avoid, when the events being acquired are mostly sorted, many slow computer input/output operations and/or network traffic that would occur with high demand for previously computed data such as previous portions of binned sequences or unchanged entries in sparse transition matrices.

Representations

The data structure representing a periodic pattern [126] has, but is not limited to, the following attributes:
1. A unique periodic pattern ID
2. A label which is a short, readable text typically used in displays to label the periodic pattern [126]. Labels are modifiable by external labeling programs even after a periodic pattern [126] has been created.
3. A set of cluster IDs representing the event [100] clusters from which the pattern [126] has been detected
4. A list of the frequency components found in the periodic pattern [126] and the time resolutions at which they were detected
5. For each frequency component, a list of segments and disturbances.
   a. A segment is an interval delimiting contiguous disjoint matches of a pattern [126] in a time binned sequence. It is therefore dependent on a specified time resolution. It simply corresponds to the intervals where a pattern [126] occurs when looking at a binned sequence derived from sorting and binning the events [100].
   b. A disturbance is an interval which delimits spans of time where a pattern [126] did not occur even though it should have when inferring from it frequency components.
6. The list of all event IDs constituting the periodic sequence [132]

To these attributes can optionally be added any number of other attributes such as the different actors [220] linked to every periodic pattern [126].

Segments and disturbances are also continuously indexed to allow querying based on time intervals. An embodiment of the data structure used to index segments and disturbances is a slightly modified version of an interval tree as described in [Cormen 2009] in which an extra annotation is added to every interval node to point to the corresponding periodic pattern ID.

Periodic patterns [126] are not forwarded to other components or databases in their entirety. Because the present disclosure supports operating in a continuous mode where it must produce results as it receives events [100] and update results accordingly, creations and updates of periodic patterns [126] are forwarded in the form of periodic pattern mutations.

A periodic pattern mutation is a form of typed update [107] consisting of enough information needed by any component receiving it to construct a new periodic pattern [126] or update an existing one. Its attributes include but are not limited to:
1. A unique periodic pattern ID
2. A set of cluster IDS representing the event [100] clusters from which the periodic pattern [126] has been detected
3. A list of newly added events [100]
4. A list of the frequency components to add to the periodic pattern [126] and the time resolutions at which they were detected
5. A list of frequency components to remove from the periodic pattern [126] and the time resolutions at which they where detected
6. For each frequency component, a list of segments and disturbances to add to the existing ones using interval merging operations (or create if there are no existing ones)
7. For each frequency component, a list of segments and disturbances to remove from the existing ones using interval subtraction operations
8. An optional new label.

An example of a consumer of such periodic pattern mutations is the periodic patterns database which upon reception of each periodic pattern mutation updates or creates the corresponding periodic pattern [126] and saves it in the database for future use.

Incremental Production and Updates to Periodic Patterns

This process performs the following actions upon reception of a periodic pattern mutation data structure:
1. For a newly found periodic pattern and its associated periodic sequence, store into database
2. For a continuous update to an existing periodic pattern, update stored information within the database.

Periodic Patterns Database

The periodic patterns database [940] is the main repository for all periodic sequences [132] and their associated periodic patterns [126]. It is continuously updated.

It is internally designed to allow:
1. Real-time queries and structural analysis based on structural information such as periodic sequence [132] length, periods, gaps, etc 2. Real-time queries and semantic analysis based on semantic information In the default embodiment, structural analysis queries take the following forms:
1. Given a time interval, find all periodic sequences [132] that have an overlap with that interval.
2. Given a periodic sequence [132], find all periodic sequences [132] that have an overlap with that periodic sequence [132]. The results can be sorted by decreasing overlap.
3. Bring up all periodic sequence [132] clusters (i.e. groups of most similar periodic sequences [132] with respect to the time intervals during which they occur or not)

The database [940] also allows ad hoc combinations of similar periodic sequences [132] to form new ones.

Continuous Categorization

The present disclosure comprises a continuous categorization component [420], which is leveraged in multiple ways, including but not limited to the following use cases:

Whenever categorization is used and its results are continuously evaluated and updated: the categorization results are taken into account, in addition to various features built and continuously updated in the data model. This allows the anomaly detection component [450] to produce categorization anomalies as appropriate.

Whenever an alert [305] is raised or any other type of preventive or mitigation action is taken, categories that have been automatically associated to the corresponding data are reflected in the alert [305]. Thus the alerts [305] themselves, and similarly all types of post-analysis actions, are systematically categorized.

Finally, a user of the system can also perform online queries on any processed data using the different categories available. Continuous categorization here guarantees that up-to-date results are returned.

Figure 16:
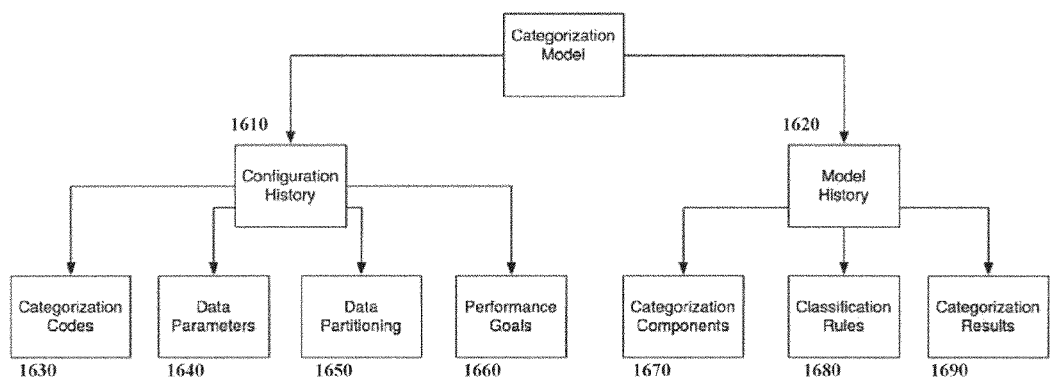
FIG. 16 is a block diagram of the categorization data model in accordance with an embodiment of the present disclosure.

The categorization model [1470] is initially built during system setup, and is later maintained throughout the system operation. Its primary purpose is to evaluate the results produced by the categorization components [1400] and to ensure their consistency and quality. The structure of the categorization model [1460] is summarized in FIG. 16, which shows a particular snapshot of the model. The complete history of the categorization model [1460] is actually persisted, along with the system or user decisions that resulted in each new model version.

This model is initially built on the results of knowledge engineering (which includes defining and tuning ontology classifiers [1410] and other categorization components [1400]) and on the reference data provided to the system, where reference data includes but is not limited to the following constituents:

Monitoring rules such as compliance rules [865] used by the anomaly detection component [450] to detect specific types of anomalies [270]

Organizational structure information including an organizational chart if one was provided to the system, information on actors [220] and groups [225], and a list and definition of workflow processes [128].

After the initial construction of the categorization model [1470] and once the system has been continuously running for a while, the relevance model stores elements of information including but not limited to:

History of all successive versions of the knowledge base (ontology classifiers [150], custom queries [1530], etc.)

History of all successive versions of the categorization components [1670]

History of all successive versions of the classification rules [1680]

History of all categorization results [1590], including detected profile changes [1465] as described later in this section.

Figure 14:
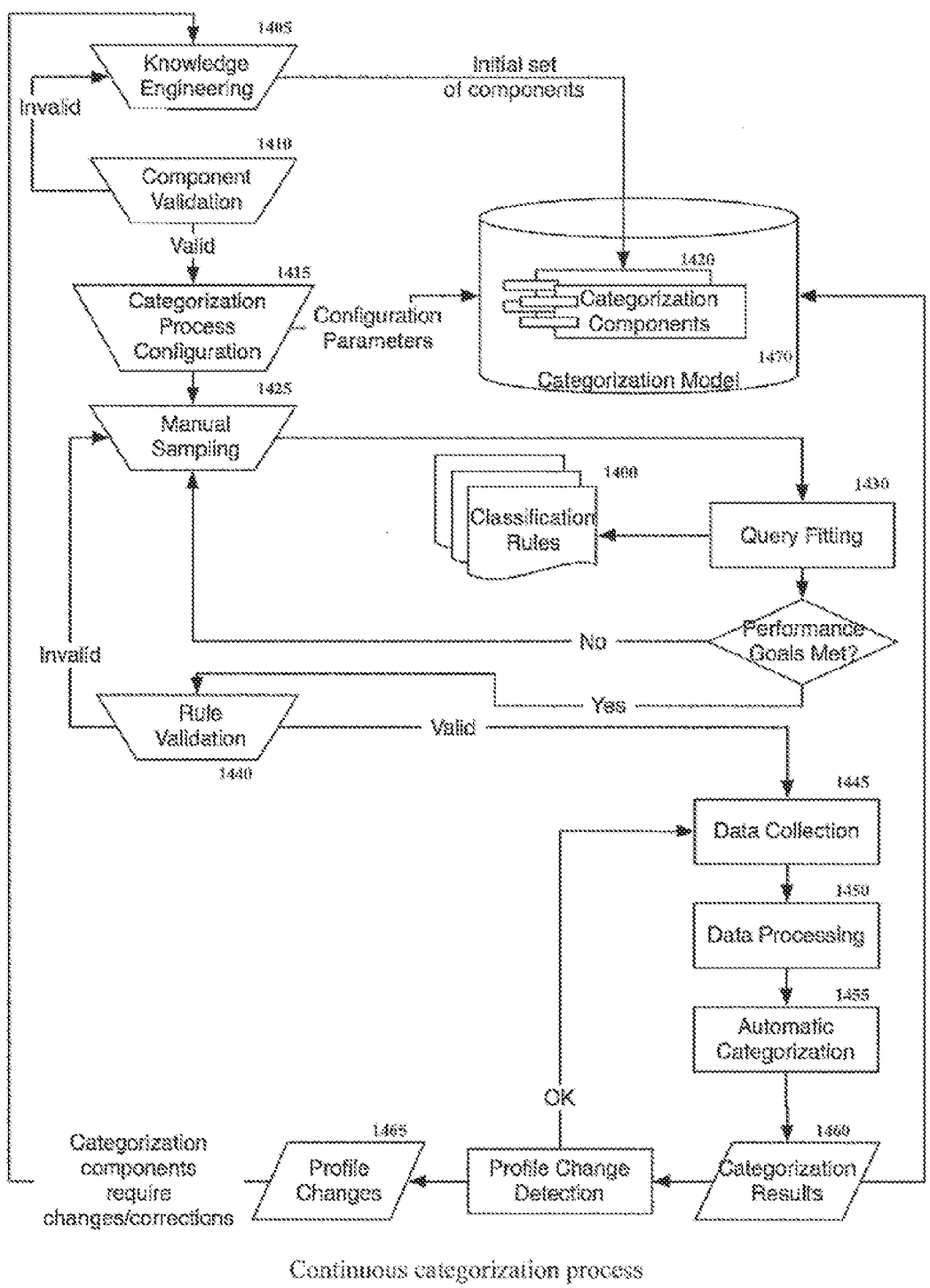
FIG. 14 is a flowchart showing the continuous categorization process in accordance with an embodiment of the present disclosure.
Figure 15:
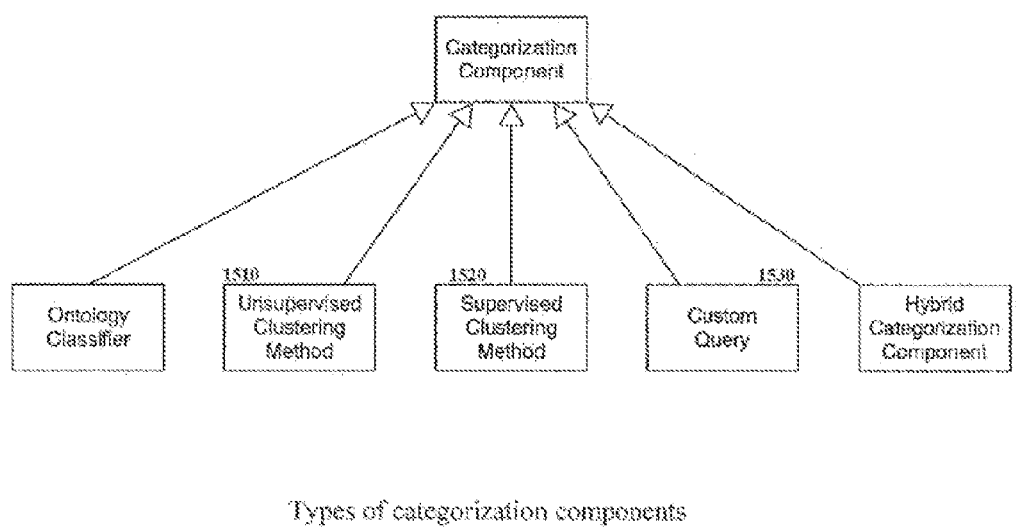
FIG. 15 is a block diagram showing the different types of categorization components in accordance with an embodiment of the present disclosure.

FIG. 14 shows the preferred embodiment of the categorization process, which can be broken down into three main phases: initialization, adaptation, and iteration.

Initialization Phase:
Knowledge engineering [1405] is composed of several sub-steps and consists in building, maintaining, and enhancing a set of categorization components [1420] available to the system.

The set of categorization components [1420] initially built or modified during maintenance of the process are manually validated by a series of sanity checks [1410].

An analyst configures the process by defining the scope of the categorization process, its performance targets, and all parameters determining the exact process behavior [1415].

Adaptation Phase:
The user reviews data sampled by the system [1425].

A "best fit" of categorization components [1420] that generalize sampling decisions to newly collected data in a near-optimal manner, as described for example in U.S. Provisional Patent Application No. 61/280,791, the disclosure of which is incorporated by reference herein for all purposes [1430].

The user then performs a series of sanity checks on the classification rules that have been modified during an execution of this phase [1440]

Iteration Phase:
Data is collected as described in another section of this disclosure [1445].

Data is processed [1450], which includes data and metadata extraction and item tagging among other stages.

The system then automatically applies the classification rules [1400] computed previously to all content extracted from the data [1455].

This produces new categorization results [1460], which are then used to update the categorization model [1470].

In parallel, the distribution of categorized data is monitored, which prevents deterioration of the process performance by detecting profile changes [1465] and re-running the adaptation phase when appropriate Categorization Components The set of categorization components [1420] available to the system comprises components of different types, as shown in FIG. 14. This enumeration is not exhaustive and can be extended to include any method defining subsets of the data set.

An initial set of components [1420] is built at the beginning of the continuous categorization process. These components [1420] are continuously maintained, meaning that some new components [1420] can be added and existing components [1420] can be deleted or modified. This happens either when a significant model change has been automatically detected in the data, or when an administrator needs to implement a new policy (whether internal or external to the organization).

The following describes multiple methods provided by the system to assess quality of categorization results and automatically adapt in response to deteriorating quality or unexpected results.

Classification Rules Validation

The system automatically evaluates the classification rules [1400] produced at the query fitting stage [1430] with respect to performance goals defined in the categorization scope. This comprises many variants of validity checks, for example by computing performance targets either on the basis of each classification rule [1400] retained by the algorithm, or on the basis of the final categorization decisions resulting from applying the whole set of rules [1400] Different validity checks are also available when some categorization codes include unknown values or values corresponding to a high level of uncertainty.

Further statistical validation can optionally be performed to assess the generalization power of the classification rules [1400]: for example, verifying the self-similarity of the categorization results [1460] (by expanding categorization beyond the manual sample) ensures that there is no major over-fitting with respect to the manual sample [1425].

In addition to these automatic validation mechanisms, a manual validation stage [1440] needs to be performed. This verification is a sanity check, mainly consisting of controlling that the associations established between categorization rules [1400] and category codes make sense and that there are no obvious indications of over-fitting, i.e. of excessive adaptation of the rules [1400] to the data sample that clearly would not generalize to the data in its entirety. Also, manual validation of the classification rules [1400] is made easier by having the rules contain as much human-readable information as possible, for example, ontology classifiers [150] have an expressive name and a textual description.

Categorization Results Evaluation

Following the assignment of category codes to the content of a batch or of data collected in real-time, the continuous categorization component [420] automatically evaluates the categorization results against the categorized data. This evaluation is done in addition to the manual and automatic validation steps already performed on the classification rules themselves. Furthermore, the user [455] implicitly evaluates the global categorization results by reading the reports generated by the process.

A variety of techniques are used in this assessment: a basic technique consists of comparing results from a manual sample with results generalized over the whole data set.

Profile Change Detection

Profile change detection is a key step in assessing and guaranteeing quality of the output produced by the continuous categorization component [420]. When the data profile, i.e. the statistical distribution of the data analyzed by the system in a continuous manner, changes over time, the classification rules and the categorization components [1420] themselves risk becoming obsolete and decrease both in recall and in accuracy, thus deteriorating the quality of data processing and hence the overall quality of anomaly detection. Therefore in such cases an analyst needs to be notified that either manual re-sampling or component [1420] updating is necessary.

There are different types of profile changes. Some profile changes can be automatically detected by the model: for example when a connector allows data collection from HR applications, the appearance of a large volume of data associated to a new employee can be related by the categorization process to that employee's information recorded in the HR system. This case of profile change usually does not reveal any flaw in the categorization components [1420] and only requires sampling data for the new actor [220].

In most cases however, profile changes cannot be directly explained and a manual decision is necessary: such changes may indicate changes in the categorization results [1460], changes in the set of topics detected, changes in the actors [220] and groups [225] involved with the data, etc. In order to automatically detect as many changes as possible, the system relies on the categorization model [1470] described previously.

The different types of categorization model [1470] refinements following a profile change include, but are not limited to, the following:

1. Patching existing categorization components [1420]
2. Creation of a new component [1420]
3. Suppression of an obsolete or invalid component [1420]
4. Combination or re-organization of existing components [1420]

A variety of profile changes can be monitored, depending on the particular usage scenario. In the default embodiment of this disclosure, a default set of data profile changes are monitored, including but not limited to the following list (which also suggests examples of typical cases where such a change occurs):

The hit ratio of a categorization component [1420] decreases significantly: Insufficient coverage by a component [1420] may indicate an incompletely defined ontology [148].

The hit ratio of a categorization component [1420] increases significantly: The component [1420] may overlap with unrelated content recently that has appeared in the data, such as a commonly occurring topic [144].

Change in topic map has been detected: New topics [144] are discovered, or previously important topics [144] are no longer present in the data.

Mismatch between ontology-based classification and unsupervised clustering: Several items [122] with highly similar content are categorized differently by the ontology [148]. This may be due to over-fitting of the ontology classifiers [150].

A significant volume of data is categorized as relevant but not attributed to any actor [220]: Some new actors [220] have appeared that are involved with relevant data, or it may indicate any other kind of important change in actor [220] interactions and social status.

The volume of data categorized as relevant for an actor [220] decreases significantly. This may reveal insufficient accuracy of a categorization component [1420] in the context of this actor's [220] data or it may indicate any other kind of important change in actor interactions and social network relationships.

Instances of a formal or ad-hoc workflow disappear this happens when business processes are formally updated or when work habits simply evolve over time.

In the absence of such changes, re-sampling is still performed at a regular frequency, the interval between such re-samplings being optionally defined at the process configuration stage.

It should be noted that each such profile change depends on a number of criteria. In the default embodiment, these criteria are available as detection thresholds including but not limited to the following.

Absolute thresholds: for example, the minimum ratio of relevant data that should be attributed to an actor [220] (given that there will necessarily always be some content that cannot be assigned, such as unsolicited data or personal communications [123].

Relative thresholds: for example, the relative variation in the hit ratio of a categorization component [1420] that should be flagged as a profile change.

Other metrics: for example, detection of a mismatch between the results of ontology classifiers [150] and those of an unsupervised clustering method [1510]

depends on a clustering similarity metric. The most appropriate metric depends on the exact typology of the categorized data; however general scale-invariant metrics can also be used such as the variation of information distance.

Continuous Discussion Building

The previously described method in U.S. Pat. No. 7,143,091, the disclosure of which is incorporated by reference herein for all purposes, works by building a sub-graph in a regular graph (that is, not a hypergraph [114]), and then finding within it skeletons which conform to discussions [136].

We now extend the prior invention with the use of a hypergraph [114] data structure, which greatly increases expressivity over a conventional graph, as edges [115.20] can now be incident on any number of vertices [115.21] or other edges [115.20]. Using this model, a much greater variety of structures can be represented in the hypergraph [114] in a more efficient and easier to use fashion. Many embodiments will also use the hypergraph [114] to cache partial results in computations where doing so has advantages over re-deriving them (though there are many cases where rederivation can be superior, there are tradeoffs in both directions). The hypergraph [114] system defined here is designed to be used in an environment where elements are continuously added to the hypergraph [114] and may trigger incremental computations to update derived structures in the hypergraph [114], of which discussions [136] are an important example.

As discussed in more detail below, most embodiments rebuild the sections of the hypergraph [114] in a localized area around where a new evidence [108] is detected. The closure and traversal hypergraph operations [115.26] are particularly good for this. Most embodiments will opt to accumulate some number of changes to be triggered in batches at a later time. A set of hypergraph operations [115.26] are defined which facilitate different strategies for defining the neighborhood of an element.

In most embodiments including the default one, the continuous embodiment of discussion [136] building is based on accumulation of relationships between actors [220], events [100] and items [122] stored in a hypergraph [114] data structure. These relationships and the subsequent structures built on them are all considered evidences [108] to be used in the discussion [136] building procedure. The hypergraph [114] system is a generic framework supporting incremental hypergraph [114] computations, described here for the purpose of building discussions [136] on a continuous basis. In the default embodiment the hypergraph [114] is represented as a set of OSF [110] values serialized and stored in records [115.24] in a hypergraph store [115.22] which in most embodiments consists of one or more large archives. Rather than using a keyed database, in these embodiments OSF [110] records [115.24] are referred to via their address in the hypergraph store [115.22]. In the default embodiment the hypergraph store [115.22] is tiled into segments [115.23], and addresses have the form of a segment [115.23] and an offset within that segment [115.23]. A segment table [115.25] is stored which contains state information over all segments [115.23] allocated at any time. If a segment [115.23] is unused it can be reallocated as an active segment [115.23], but the entries for prior uses of the segment [115.23] will be retained in the segment table [115.25]. New OSF [110] records [115.24] are added to the end of the newest segment [115.23] as they come in. Records [115.24] are only retained in the hypergraph [114] for a certain period of time, old records [115.24] and in some embodiments shadowed records [115.24] that are no longer accessible are removed from the hypergraph store [115.22] via the garbage collection scheme. The other main feature is that OSF [110] records [115.24] are immutable. When updating an existing record, a new version of a record to be updated is appended to the hypergraph store [115.22]. In the case where an updated record is used in the computation of derived records [115.24] or is otherwise referred to by existing records [115.24], new versions of those records [115.24] must be appended in order to make it visible. In practice this fits very well with the continuous computation model, as new evidence [108] added to the hypergraph [114] will trigger revisiting existing discussions [136] or other structures for which it is relevant. Thus the relevant entities that may have to be updated will be anyway visited as part of the incremental algorithm.

In the default embodiment garbage collection is effected by simply removing segments [115.23] when they pass an age threshold. In this embodiment, items [122] that have become too aged are no longer directly used in the computation of new discussions [136] or other structures. It is important to note that different embodiments will implement the notion of "too old" in different manners depending on their primary use cases. While some embodiments may simply use a calendar threshold, others will operate on the basis of obsolescence. For example, data relating to an actor [220] who is no longer on the scene may be deemed obsolete faster than the same sorts of data for an actor [220] who remains in the universe. Likewise data relating to routine occurrences of something is less valuable than data which involves anomalous behavior [270], and therefore will be slower to obsolesce. One reason for doing this is to be able to make all computations responsive to recent trends in the data and not be completely overwhelmed by historical patterns. However, longer term trends are important as well, even if they have a smaller effect in most computations. Therefore a special set of segments [115.23] is set aside for storing models of these long term trends, patterns and other statistics. These segments [115.23] are handled differently; in most embodiments they don't store OSF [110] records [115.24] and are mutable and periodically updated with information in old segments [115.23] being removed from the hypergraph store [115.22] The segment table [115.25] entries for collected segments [115.23] are not removed but rather modified to indicate that any references to records [115.24] previously stored in those segments [115.23] will be handled specialty. In most embodiments, the process attempting to access those records [115.24] will be notified that they are no longer active and will be directed to the relevant segment(s) [115.23] containing trend information.

For purposes of scalability the system focuses on locality in hypergraph operations [115.26], that is, operations based on looking at elements in the hypergraph [114] within a neighborhood of a triggering element or set of triggering elements. In the embodiment described here, additional subsystems are used for storing the original data from which records [115.24] in the hypergraph [114] have been derived as well as for storing the final computed structures, such as discussions [136], used by downstream modules and applications. Other embodiments may choose to store all or some of this data in the hypergraph store [115.22] as well. In such embodiments, segments [115.23] would be tagged for different roles, and only those segments [115.23] involved in incrementally computed results would undergo a collection process. Other embodiments may flag collected segments [115.23] so as to redirect the referring process to an external, longer term data store.

There are many important advantages to immutability in the data store. Multi-threaded or multi-process access to the hypergraph store [115.22] becomes much simplified, with minimal to no requirements for record locking. The use of the OSF [110] formalism and the concept of unification of structures creates many opportunities for sharding and layering of the hypergraph [114] in a consistent and efficient manner. The key concept is that hypergraph [114] elements can be split up in different ways and unification can be used to rejoin them. The type system implemented for OSFs [110] allows us to place constraints on allowable modifications to parts of an element that have been placed in separate locations, thus helping to enforce consistency when they are eventually rejoined. These characteristics can be used to simplify sharding of a hypergraph [114], e.g. splitting it up into subsets to be distributed. Subsets can contain redundant information, or can split apart elements. New OSF [110] types can be created and sent with the shard to be used as constraints to make sure that modifications are handled consistently. Layering of the hypergraph [114] can be handled by splitting all elements in the hypergraph [114] based on subsets of features.

Additionally, a general philosophy of recombining smaller pieces of an entity when the whole entity is needed allows us to make algorithms lazy in more ways. This is a benefit to incremental computations as we build up partial results during complex computations. In general those results will be stored as new hypergraph [114] elements. It is likely that only a smaller subset of those elements will be useful to more derived results such as discussions [136], e.g. not all actor identities [235] will show up in a discussion [136] for example. If we spend less resources to place the partial results in the hypergraph [114], then we avoid extra work for those that are not used in later computations.

Most embodiments of the system define a set of hypergraph operations [115.26] on the hypergraph [114] including but not limited to the following: closure, projection, traversal and a set of hypergraph [114] path algebra operations. In the OSF-based embodiment [110] described here these operations may specify additional OSF [110] constraints [115.9]. For example the projection operation [115.28] would start with a set of edges [115.20] and select only those that unified with an OSF [110] value to be used as a constraint [115.9]. The system uses an additional method of constraining the elements that these hypergraph operations [115.26] can access, called "boxing". A box [115.15] is simply a set of atoms [115.19] from the hypergraph [114]. The purpose of boxing [115.15] is to create groups of hypergraph [114] elements that are related by more complex relationships than can easily be expressed in queries [115.1]. These groups may also be determined by external factors not stored in or referenced from the hypergraph [114]. In many cases the boxes [115.15] may simply be useful for optimizing constraints during query [115.1] execution, by effectively pre-caching the relevant sets of items [122] conforming to the constraint. In the default embodiment, a box [115.15] is defined for each discussion [136]. In addition to the core elements of the discussion [136] (e.g. the external items and relationships between them) these boxes [115.15] may also include other elements of the hypergraph [114] that were considered to be the relevant evidence for the discussion [136] or related to the discussion [136] in other ways.

In most embodiments, a query [115.1] mechanism is used both for ad-hoc retrieval of records [115.24] from the hypergraph store [115.22] as well as to continuously evaluate an active query [115.1] set on new records [115.24] as they are added to the hypergraph store [115.22]. In a normal graph representation, vertices and edges can be indexed fairly simply. For the hypergraph [114] implementation the system implements a set of query operators [115.30] to deal with the more complex nature of the hypergraph [114] elements.

Incremental computations are triggered when records [115.24] are matched by the continuous queries [115.1]. In the default OSF [110] based embodiment, query matches [115.16] are produced as an OSF [110] value. These values include descriptions of the matched items [122] built up during query [115.1] evaluation, using unification constraints [115.9] in a manner similar to unification based parsing systems, or logic languages like prolog. When a query [115.1] is matched, the resulting match record [115.16] will determine which of the incremental update procedures should be triggered. The query [115.1] language is designed so that the query operators [115.30] can be used to build up a working set [115.17] of related hypergraph [114] elements during the evaluation of the query [115.1].

In most embodiments, external indices are built to aid in query [115.1] execution. In the OSF [110] embodiment described here, skip lists are used as the indexing [115.11] mechanism. In this embodiment, the indexing [115.11] is used to speed up linear scans over records [115.24] from the hypergraph store [115.22] rather than fast random access. Some embodiments may also include index [115.11] schemes emphasizing random access, such as b-tree indices. Any of the skip list solutions described here could also be augmented to an inverted index [115.13] representation as commonly used in text search engines. Indexing [115.11] boxes [115.15] uses a form of skip lists as well.

The primary goal for this default embodiment is to be able to build all of these indices by simply appending new entries without modification to the older entries. Thus the indices are meant to be read backwards, from the newest entries to the oldest. This works well in conjunction with the structure of the hypergraph store [115.22] in which newer versions of a record shadow the older ones. Various embodiments may use different methods for detecting when elements have been shadowed. One embodiment assigns a logical ID to records [115.24]. When a new version of a record is written, both records [115.24] share the same ID. Many embodiments will simply include the address of the earlier version of the record as an attribute. In both cases the query matching procedure [115.10] needs to keep a set of the first seen IDs or addresses that will indicate that later records [115.24] are shadowed. OSF [110] based embodiments can also use type information attached to a record to determine how it is related to the prior version. In one embodiment there are two types of records [115.24], records [115.24] storing just the changes between the two versions and records [115.24] that replace the prior version. Many other schemes are possible, so long as they efficiently and effectively dispatch data events [100] to the appropriate handler based on the record types.

Some Comments on OSF Values

OSF [110] values and OSF [110] records [115.24] (an OSF [110] value serialized and stored in an archive record) are referenced frequently throughout the description of the hypergraph [114] system. The acronym OSF [110] refers to a particular type of feature structure called an "Order Sorted Feature Structure", which is well documented in research literature. Feature structures are used throughout AI and natural language processing applications, again we refer to the literature for standard definitions and usages where these concepts well developed and widely understood. The central operation of feature structures is unification, which in essence merges two feature structures (where the values for features that appear in both structures are themselves unified). Only those usages that differ from common practice will be noted here.

The most relevant feature of the OSF [110] formalism for purposes of the present disclosure is the type system. Types in a feature structure system are handled somewhat differently than in a conventional programming language. Types are themselves represented as feature structures and are available as values which can be unified against. This also means that types can be defined dynamically at runtime. While types are defined within a type lattice, in the default OSF [110] embodiment described here, one or more types can be attached to an OSF [110] value as long as they are consistent (i.e. can be unified with) the value, rather than the value being an instance of the type. In essence types are used to tag values. However types can also contain instance values in addition to the general classes (such as String, Number, Feature Structure and so on). This can make types useful a templates that store values common to all members of the type. In some embodiments these instantiated values are never stored directly in instance values, instead the implementation looks up the value from a type associated in the instance when it is not present. Values can also be uninstantiated and in this way function similarly to a type, i.e. the value represents a class of potential values. The default embodiment defines some additional intrinsic types in addition to those normally found in feature structure implementations; one representing a set of Choices over an enumerated set of values, and another for ranges for values that have a natural order associated with them.

When constraints [115.9] are referenced in the context of an OSF [110] embodiment the representation is that of a set of OSF [110] values that are the equivalent of a set of unification equations as seen in common practice. One of the characteristics of feature structures is that multiple features (or feature paths) in the structure may point to the same value instance. This is what distinguishes feature structures from representations such as nested property lists. When setting up a constraint [115.9], the set of OSF [110] values each become a feature of a larger OSF [110] value, and some feature (paths) that exist in multiple of the OSF [110] values are modified to point to the same value instance. In this way, when we unify against the value of one of the subfeatures in the constraint [115.9], some of the resulting feature values may then be visible in other subfeature's. This property makes constraints [115.9] bi-directional, which is exploited in query [115.1] representations. If we have a chain of constraints [115.9], we can impose a restriction on all members of the chain by unifying a value against the final sub-feature value in the chain to produce a new, restricted constraint [115.9]. When a matching network [115.5] in an OSF [110] embodiment is generated, the operator nodes [115.7] are linked via a tree of dependent constraints [115.9] (e.g. the values produced from constraints [115.9] on sub-trees in the network [115.5] are used as inputs to the constraint [115.9] on their common root node [115.7]). In this case one of the subfeatures is designated the right hand side of the equation (the RHS) and will be used as the OSF [110] value derived for the root node [115.7] after unifying values reported from the node's [115.7] children in the matching network [115.5].

Key Object Types

Hypergraph: The mathematical definition extends standard graphs to allow for edges connecting any number of vertices. The hypergraph [114] system described here extends this definition further by allowing an edge [115.20] to connect any number of vertices [115.21] and edges [115.20]. The list of atoms [115.19] composing an edge [115.20] are subject to an ordering constraint. There are three classes of ordering constraint. The simplest defines no ordering relationships at all, resulting in an unordered edge [115.20]. The most common case is that a total order is specified, which is straightforwardly represented as the order of occurrence of the atoms [115.19] comprising an edge [115.20]. In the most extreme case a separate partial order is defined and can be referenced as the ordering constraint for the edge [115.20]. The partial order is defined separately so that it can be reused across edges [115.20].

Hypergraph store: the physical unit of storage for elements of the hypergraph [114]. It should be noted that there is no requirement that only hypergraph [114] elements appear in the hypergraph store [115.22]. The hypergraph [114] may be represented as one subset out of all the records [115.24] in the hypergraph store [115.22].

Store address: An important characteristic of the system is that records [115.24] in the hypergraph store [115.22] are accessed via a direct address rather than by keyed lookup as would be done in database systems. In one embodiment this address consists of segment id and offset parts, indicating an offset into a of data in the hypergraph store [115.22] In such embodiments the hypergraph store [115.22] maintains a master table.

Atom [115.19]: Any hypergraph [114] element. As stated before, the default embodiment uses OSF [110] records [115.24] to store all atoms [115.19] will be referred to as the OSF [110] embodiment. Other embodiments may use data representations other than OSF [110] so long as they store a sufficient description of the atom [115.19]. In OSF-based embodiments [110], a set of types will be predefined by the system that correspond to the two kinds of atoms [115.19]. There may be more than one type defined for each kind of atom [115.19] because for example the system may allow successive versions of an atom [115.19] to be represented either by storing only the differences between the pairs or by adding a record that completely shadows the old version. In such an embodiment, records [115.24] of multiple types could then be used in the same hypergraph store [115.22], allowing the system flexibility when to use one method versus the other (for instance small atoms [115.19] may use the shadowing method, whereas large atoms [115.19] may use the difference method). In some embodiments atoms [115.19] may require an attribute that represents a "logical ID", i.e. an id that uniquely identifies the atom [115.19] and is shared across successive versions of the atom [115.19] in the underlying hypergraph store [115.22].

Vertex [115.21]: The fundamental unit from which hypergraphs [114] are formed. The OSF [110] embodiment will predefine a base type for OSF [110] records [115.24] representing vertices [115.21].

Edge [115.20]: A relationship between a set of atoms [115.19]. Edges [115.20] minimally require an attribute containing a list of atoms [115.19]. In some embodiments the edges [115.20] may be ordered, the equivalent to directed edges in conventional graphs. The OSF [110] embodiment will predefine a base type for OSF [110] records [115.24] representing edges [115.20]. Additionally subtypes for distinguishing ordered and unordered edges [115.20] may be defined. Ordered edges [115.20] are the hypergraph [114] equivalent to directed edges in a conventional graph, where the directed edge places an ordering on the pair of vertices that it relates. One point of difference from conventional graphs is that there is no advantage to storing a reversed version of an ordered edge [115.20]. In a conventional graph it is often an advantage to index edges by either head or tail, which can then entail storing reverted versions of edges. As the hypergraph [114] has a more complex structure traversal, retrieval and other operations on the hypergraph [114] need to use a more general model.

Index [115.11]: The hypergraph [114] system relies on additional structures to aid in the location and retrieval of atoms [115.19] from the hypergraph store [115.22]. The indices stored by the system do not necessarily aid in quickly finding a random element of the hypergraph store [115.22]. In particular they are more often used to iterate over elements in the hypergraph store [115.22] more efficiently. The goal for these indices is that they be very cheap to update as new data elements are added to the hypergraph store [115.22]. For this reason the skip list data structure is often useful: there is a standard body of practice on using skip lists to efficiently create balanced index structures.

Hypergraph operations: The system defines a generic set of high level operations for working with the hypergraph [114]. These operations work by modifying a working set [115.17] consisting of atoms [115.19]. There are three core operations listed below.

Closure operation: The set of elements reachable from an initial atom [115.19] or set of atoms [115.19]. The system defines a closure operation [115.29] that computes and adds this set of atoms [115.19] to a working set [115.17]. Closures potentially can be quite large and encompass the whole hypergraph [114] therefore most embodiments of the system use constraints [115.9] to only return elements of the closure that fall in some smaller neighborhood. In addition to the constraints [115.9], the closure operation [115.29] implements some extra conditions which separate it from a traversal operation [115.27]. An additional notion of consistency is often used when determining which atoms [115.19] are reachable. Different embodiments may choose from any number of consistency measures. In the OSF [110] embodiment described here, closure results in a set of edges [115.20]. The resulting set is restricted to be edges [115.20] that share a minimum number of atoms [115.19] in common. This measure is evaluated over the whole set. This calculation corresponds to a limited form of clustering and is intended to partially or fully replace the clustering operations that were used in prior implementations of the discussion [136] building process.

Projection operation: Removes elements from a working set [115.17]. The elements are chosen via constraints [115.9] and other filters. Embodiments may use characteristics such as edge [115.20] weights, arity and so on to select edges [115.20] in the projection. In some embodiments edge [115.20] paths contained in the working set [115.17] are replaced with new edges [115.20]. This is accomplished through the use of a path algebra. In the default embodiment the path algebra operations are specified via an OSF [110] value and a set of types are predefined for that purpose.

Traversal operation: Adds elements to a working set [115.17], starting from elements that are in the working set [115.17] and following edges [115.20] incident on those elements. The operation shares similarities with the closure operation [115.29], but is focused on more fine grained control of the traversal rather than properties of the resulting set. The operation can be parameterized to run according to a traversal pattern. In the default OSF [110] embodiment the traversal pattern is specified via an OSF [110] record. Breadth-first patterns add elements from successive neighborhoods out to a certain number of layers or hops. Depth-first patterns are used to select paths out to a certain number of hops. For example, a depth-first pattern may specify the first n-many paths, or the n highest weighted paths.

Hypergraph Query: The system implements an engine for running queries [115.1] against atoms [115.19] in the hypergraph [114]. A query [115.1] is represented as a nested expression [115.2]. Expressions [115.2] consist of terms [115.4] and functions [115.3] over terms [115.4] and functions [115.3]. Terms [115.4] define a match condition. In OSF [110] embodiments a term [115.4] is represented as a feature value pair. The feature is used to select a value from the OSF [110] value representing an atom [115.19] and the match condition is satisfied if the two values can be unified successfully. Query expressions [115.2] map to a set of operators [115.30]. These operators [115.30] operate on match records [115.16] that contain a payload [115.18] value and a working set [115.17] of atoms [115.19]. One set of operators [115.30] simply wrap the hypergraph operations [115.26] defined by the system. The modifications to the working set [115.17] performed by these operators [115.30] are limited by a set of constraints [115.91], i.e. only atoms [115.19] that pass the constraints [115.9] may be added/removed (or considered for addition/removal depending on what is most efficient for the operator [115.30] in question). Typically there will be several constraints [115.9] active. Most of the individual operators [115.30] will take a constraint [115.9] argument and there are other constraint mechanisms described below. As defined earlier, in OSF [110] embodiments constraints [115.9] are implemented via unification equations. This also means that a new OSF [110] record will be created as a result of evaluating the equation. Thus in OSF [110] embodiments constraints [115.9] can be used both as a mechanism for licensing an operation and for building up OSF [110] records [115.24] that describe the atoms [115.19] in a working set [115.17] in a match [115.16]. It should also be noted that operators [115.30] may define new transitory edges [115.20] that only exist in the working set [115.17]. In some cases those edges [115.20] may be placed back in the hypergraph store [115.22], but often this mechanism is used to reconstruct an edge [115.20] that was never directly placed in the hypergraph store [115.22]. This is used to implement lazy algorithms.

Query Operators: These are the operators [115.30] used to specify queries [115.1] against hypergraph [114] elements. When evaluated a query operator [115.30] works on one working set [115.17], but a query procedure [115.10] maintains a list of working sets [115.17]. Each atom [115.19] initially matched in a query [115.1] spawns a working set [115.17] which may be expanded during the evaluation of query operators [115.30]. An embodiment of a set of query operators [115.30] appears later in this section.

Box: An additional indexing [115.11] mechanism over atoms [115.19]. This mechanism is used to implement constraints that are in force during a query [115.1]. As stated earlier a box [115.15] is simply a set of atoms [115.19]. In some embodiments boxes [115.15] may simply be one type of edge [115.20] stored in the hypergraph [114]. In the embodiment described here boxes [115.15] are stored in a supplementary store. Boxes [115.15] are related to each other by containment, so the set of boxes [115.15] can be placed in their own graph structure with directed edges [115.20] from each box [115.15] to the largest boxes [115.15] contained within it. This means that if boxA contains boxB contains boxC, links only exist from A to B and B to C. Mathematically this structure is a finite lattice. Hypergraph [114] query operators [115.30] can specify that sub-operators [115.30] are constrained to work within (or outside of) a box [115.15]. Boxes [115.15] can be selected in several ways, and there are query operators [115.30] that can change the current box [115.15] by moving up or down in the hierarchy.

Hypergraph Store Implementation

In one embodiment, the hypergraph store [115.22] is an archive or set of archives that are split up into segments [115.23]. New segments [115.23] are allocated as the hypergraph [114] grows, and aged elements are removed from the hypergraph [114] by removing segments [115.23]. In order to allocate a new segment [115.23] the system first looks to see if there are any collected segments [115.23] (i.e. they have been removed from active use), or extends the archive to allocate a new segment [115.23]. The hypergraph store [115.22] has a master segment table [115.25] that indicates the type and status of a segment [115.23]. New entries are always appended when a segment [115.23] is allocated, This is because there may be dangling references to collected segments [115.23] in the active part of the hypergraph store [115.22]. The record for the freed segment [115.23] will contain information used to determine how dangling references are resolved as described earlier in this document. In the OSF [110] embodiment OSF [110] records [115.24] are stored at offsets into a segment [115.23], therefore they can be addressed with a segment id:offset pair as the address. As already noted, the OSF [110] records [115.24] represent elements of the hypergraph [114], called atoms [115.19]. However they are not restricted to that purpose, therefore the hypergraph [114] may be augmented with additional record types, or these additional records [115.24] may be used to do bookkeeping for storing partial state of an ongoing computation, etc. In one OSF-based embodiment [110], the OSF [110] records [115.24] are immutable. As discussed above, this places additional requirements on how hypergraph [114] structures are to be updated, but greatly simplifies management of the hypergraph store [115.22], particularly in multi-threaded or multi-process implementations. As the hypergraph store [115.22] is to be continuously updated, we seek to minimize the cost of adding new elements to the hypergraph store [115.22]. Hypergraph [114] computations that are triggered by the addition of new elements will then use lazy algorithms that only build out structures that are directly needed. The motivating factor for this design is that in many cases it can take more time to compute a result and store it in a way that it can be efficiently retrieved than to simply re-derive it as and when necessary. The hypergraph [114] system is designed to take advantage of these cases wherever possible.

As described earlier, all OSF [110] records [115.24] are associated with one or more types. One set of types will determine what kind of atom [115.19] the record represents. However additional types associated to the record can be used to determine how the record should be handled by the system. Here we describe two of these additional distinctions: how a record is related to prior versions and the inclusion of special processing instructions for individual atoms [115.19].

In one OSF [110] embodiment new versions of a record can be added by either completely shadowing the prior version or by describing a set of differences from the old version. For example when dealing with a large edge [115.20] the system may only store new members added to the edge [115.20] rather than storing an entirely new copy. Using this differential storage creates opportunities for new synergies with the query matching procedure [115.22] described below. For example, in a case where the query [115.1] only specifies the traversal of the most recent n paths in a match [115.16], those paths will usually be found in the last delta added for an edge [115.20]. In that case we have avoided retrieving and updating the edge [115.20] as well as any other atoms [115.19] dependent on it, by only storing the difference into the hypergraph [114]. This scheme has potential costs as well, since we need to retrieve multiple records [115.24] to reconstruct the state of the whole edge [115.20]. The OSF [110] type system enables the implementation to select a tradeoff between these methods atom [115.19] by atom [115.19]. The details of specialized handling of records [115.24] are hidden behind the hypergraph operations [115.26] described above. This allows the system to evolve and add new representations without modifying existing applications.

When analyzing real world data, no algorithm is perfect. When problems are identified, OSF-based [110] embodiments of the system allow for "fixes" to be placed in the hypergraph [114] in the form of specialized processing instructions in most embodiments. Embodiments using other record formats may be able to implement a similar scheme. In the OSF [110] embodiments, a predefined set of OSF [110] types represent additional instructions that can be given to the various algorithms used by the system. In an embodiment that computes actor identities [235] as elsewhere described, a possible problem might be that a particular pair of aliases [240] is erroneously associated with the same actor identity [235]. This system would allow an annotation to be placed on the respective alias [240] atoms [115.19] ing the combination of the two. These could be added to elements due to user feedback or other procedures detecting inconsistencies or problems in derived hypergraph [114] structures.

Hypergraph Query Mechanism

Queries [115.1] have two purposes: to retrieve elements from the hypergraph [114] and to trigger hypergraph [114] computations in response to new atoms [115.19] being added to the hypergraph store [115.22]. The same query matching procedure [115.10] is used for both purposes.

The query [115.1] functionality covers three areas in most embodiments: matching features of OSF [110] records [115.24], augmenting a query working set [115.17] with hypergraph operations [115.26], and placing constraints on the hypergraph operations [115.26] either by additional feature tests or by membership or non-membership in a box [115.15].

The default embodiment described here represents query operators [115.30] as a set of functions [115.3], whose arguments are either other query operators [115.30] or feature structures to use as terms or to use as constraints [115.9]. Functions [115.3] accept match records [115.16] from their constituent arguments and produce a match record [115.16] if their condition is met. Match records [115.16] are represented as an OSF [110] record. This record contains bookkeeping information about the partial match [115.16] as well as a "payload" [115.18] feature that pulls some or all of the values out of its arguments. The initial match records [115.16] are created by comparing the leaf feature structures to atoms [115.19] in the hypergraph store [115.22]. If the feature structure unifies, a match record [115.16] created with the unified result as the payload [115.18]. If the operator [115.30] has a constraint [115.9], we attempt to unify the constraint [115.9] values against a match record [115.16] and the constraint [115.9] is satisfied if it succeeds. In one embodiment the constraint [115.9] is a unification equation that relates values in two feature structures. The resulting match record [115.16] contains the RHS value after successful unification of incoming match records [115.16] against the LHS. Note this same mechanism can be used to introduce new values into the match record [115.16] as well.

In one embodiment the set of operators [115.30] is represented as a network [115.5] of vertices representing the operators [115.30] and edges that link operators [115.30] to any enclosing operators [115.30] The highest operator [115.30] is linked to a final reporting node [115.8]. Any match records [115.16] that flow through to that node [115.8] are reported as results.

Note that this structure can represent multiple queries [115.1], as the penultimate node [115.7] must be unique to each query [115.1]. When building the hypergraph [114] we reuse sub-queries [115.1] and only add nodes [115.7] for new ones. We can also turn off queries [115.1] by keeping a reference count of the number of active downstream nodes [115.7]. To deactivate a query [115.1] set the reference count on its penultimate node [115.7] to zero, and walk through its children decrementing the count. Only those nodes [115.7] with a positive reference count will report results forward.

Query Language Operators

The query procedure [115.10] effectively creates a working set [115.17] for each atom [115.19] that it examines. Some query operators [115.30] are just wrappers around hypergraph operations [115.26] that expand or filter that working set [115.17]. We do not distinguish between atom [115.19] types in most embodiments as that can be done by selecting the atoms [115.19] that go into an index [115.11], as well as by feature matching and constraints [115.9].

In most embodiments query operators [115.30] will include, but will not be limited to, the following:

Is(feat, value) [118.05]: if the atom [115.19] contains "feat" and its value unifies with value, then create a partial match record [115.16] containing the unified value.

IsNot(feat, value, [opt] pattern) [118.10]: if the atom [115.19] doesn't contain "feat" or it does and the value does not unify, create a match record [115.16]. If the optional third argument is specified, return the part of the atom [115.19] matching pattern.

And(operator+, constraint) [118.15]: if all operator arguments produce a match record [115.16], pass on a new match record [115.16] based on a merge of the incoming match record [115.16]. The constraint [115.9] maps values from the incoming match records [115.16] to the result AndNot(operator, operator) [118.20]: if arg1 matches and arg2 does not, then pass on arg1.

Or(operator+) [118.25]: pass through first matching argument, alternately pass through unification of all match records [115.16]

Close(operator, constraint) [118.30]: calculate the closure of an atom [115.19], i.e. find the set of all directly connected elements. i.e. if edge123 shares an atom [115.19] with edge234 they are both in the same closure. The operator allows for a feature structure that can be used as a constraint/filter on items [122] that are added to a closure. Closure calculation specifies the amount of overlap required between items [122], (e.g. only if they share x % atoms [115.19]) this is just a modified form of what we do in the clustering framework with hashes, so in fact we can use the closure operator [115.30] to do clustering.

Project(operator, [opt] expression, constraint) [118.35]: take a subset of the working set [115.17]. As above a feature argument can be used as a fitter. A path algebra expression can be used in some embodiments to create a new working set [115.17] with edges [115.20] based on paths found in the current working set [115.17]. In OSF [110] embodiments the path algebra expression will be represented as an OSF [110] record.

Traverse(operator, [opt] expression, constraint) [118.40]: expand the working set [115.17]. By default this just adds the neighborhood for atoms [115.19] in the working set [115.17]. The operator [115.30] accepts an optional expression controlling the traversal as described for the hypergraph [114] traversal operation [115.27] In OSF [110] embodiments the traversal instructions are passed in as an OSF [110] record.

Within(box, operator) [118.45]: a box [115.15] is selected based on arg1. All operations within arg2 are constrained to atoms [115.19] within this box [115.15]. This box [115.15] overrides any box [115.15] selected by enclosing operators [115.30], similarly a sub-operator [115.30] may specify a box [115.15] that overrides the one chosen at this level. In OSF [110] embodiments argument1 is an OSF [110] record that is to be matched against a list of box [115.15] descriptors.

Outside(box, operator) [118.50]: as above but the constraint is reversed.

Widen(constraint, operator, mode) [118.55]: it is an error if no enclosing operator [115.30] specifies a box [115.15]. Select a box [115.15] that is higher in the hierarchy, using arg1 as a constraint against the box [115.15] descriptor. Arg3 determines whether all boxes [115.15] matching the constraint are used or the first one.

Narrow(constraint, operator, mode) [118.60]: as above but move down in the hierarchy Union(operator+, mode) [118.65]: the mode determines whether or not we try to unify match record [115.16] payloads [115.18] or not. If unification is indicated the operation proceeds only if the payloads [115.18] can be unified and the unified result is used as the new match record's [115.16] payload [115.18]. Otherwise, a new OSF [110] value is created that contains each of the original payloads [115.18] as a feature. The union of the working sets [115.17] from argument match records [115.16] is returned.

Intersection(operator, operator+) [118.70]: only succeeds if the intersection is non empty. The mode argument specifies how to handle the payloads [115.18] of arguments that have members in the resulting working set [115.17]. If unification is indicated the operation proceeds only if the payloads [115.18] can be unified and the unified result is used as the new match record's [115.16] payload [115.18]. Otherwise, a new OSF [110] value is created that contains each of the original payloads [115.18] as a feature. The intersection of the working sets [115.17] from argument match records [115.16] is returned.

Annotate(operator, constraint) [118.75]: in the OSF [110] embodiments, the constraint [115.9] will create a new match record [115.16]. If the match record [115.16] unifies with the constraint [115.9] LHS pass on a new match record [115.16] constructed from the constraint's [115.9] RHS.

Maintaining Indices

The embodiments of the system described here have all assumed the presence of an index [115.11] based on skip lists. The system in fact does not necessarily require the presence of an index [115.11], any of the techniques described here can be used by scanning through the OSF [110] records [115.24] in the hypergraph store [115.22]. The value of skip lists is two fold: they are very cheap to maintain, and they implement a technique to speed traversal of the indexes [115.11]. The embodiment of skip lists described here orders the atoms [115.19] they index by time of arrival in the hypergraph store [115.22]. Alternatively they can support indexing based on other orders, but generally at a cost which is greater than the technique described here.

We describe an embodiment of the system in which the skip lists are built in reverse order. The normal skip list model needs to be augmented so that we know how far forward a skip will go and there also needs to be a way to coordinate skip lengths across the indices. All indices will add atoms [115.19] in the same order, and a simple solution to the second problem is just to add every atom [115.19] whether its a useful member of the list or not. However, that simple solution is not very desirable and can be improved by counting the atoms [115.19] that are not members of the list in the skip lengths.

The base entries [116.05] in the list each contain a pair of the feature value for an atom [115.19] and its address. Additionally entries [116.05] contain a variable length array of pointer and skip count pairs [116.10] that are used to link entries together. Skip list entries can therefore be a member of multiple linked lists. The technique used here is that each successive level in the skip list skips a larger number of entries in the list. The goal is to be able to skip over a large number of entries in a small number of steps. In order to skip a number of entries [116.05] from the current entry [116.05], find the level with the largest skip count that is less than or equal to the remaining number of entries [116.05] to skip. Follow the pointer to the next entry on that level and subtract the skip counter from the remaining number of entries, terminating when the remaining count reaches zero. This procedure is used during query [115.1] execution to speed traversal of the hypergraph [114] when there are multiple query terms [115.4] Every time query [115.1] matching fails for an atom [115.19], we can skip over the entries [116.05] for that atom [115.19] in the lists that have not yet been visited for that atom [115.19]. As a consequence of the design, queries [115.1] that are more restrictive and/or have a larger number of terms [115.4] and sub-expressions [115.2] will gain the most, due to being able to maximize skip lengths. This is because in general more skips will accumulate before revisiting one of the later index [115.11] lists. An embodiment may optimize query [115.1] execution speed by ordering term [115.4] tests such that indices referencing fewer atoms [115.19] or indices or tests that are determined to be more likely to fail are visited first. In this way the procedure can find skips both earlier and by visiting a smaller number of index [115.11] lists. As we only visit the later lists when the query [115.1] evaluation for an atom [115.19] has not already failed, this has the result of producing larger skips in those lists.

Construction of the list is relatively simple and requires a counter that is incremented for each new item added to the hypergraph store [115.22]. When a new item is added to the hypergraph store [115.22], determine which skip lists to update. For each skip list, add a new entry [116.05], and determine how many levels of the skip list to include it in. For instance to have skips of increasing orders of magnitude, place it in the second level if the current counter is a multiple of 10, and in the third level if a multiple of 100 and so on. When there are atoms [115.19] that are not to be included in a list, this may result in more level entries than necessary. In one embodiment this problem is handled by keeping a separate relative counter for atoms [115.19] added to the list and use that counter to determine the number of levels, however record the skip count based on the first counter. This will require that the last positions used at each level from the first counter be tracked. When adding entries to a skip list with a level array [116.10] of length x we first increment the head's [116.15] skip counters for each level then copy the first x level pairs from the head [116.15] of the list into the new entry's [116.05] level list [116.10] and update the first x level pointers in the head to point to the new entry [116.05]. Finally, set the first x skip counters to zero.

Augmenting the skip list to be an inverted index [115.13] is fairly straightforward. It has the same structure as the skip list above (see [116.20] [116.25] [116.30]), however the level lists are constructed slightly differently. An inverted index [115.13] essentially acts like a collection of skip lists in this context. We add an extra table [116.35] that maps from each feature value entry to the head [116.30] of a set of skip list levels used for just that value. The construction procedure is the same as above with the change that we append together the level lists [116.30] for each of the skip lists that reference the atom [115.19]. One embodiment will retain the feature value in skip list entries [116.20] so that values contained in the head table [116.35] may be used to denote a range of possible values (which can be used to reduce the number of posting lists). In this embodiment each value contained at the head table [116.35] must be able to successfully unify with all of the values contained in its associated set of levels [116.30] [116.25].

Figure 117:
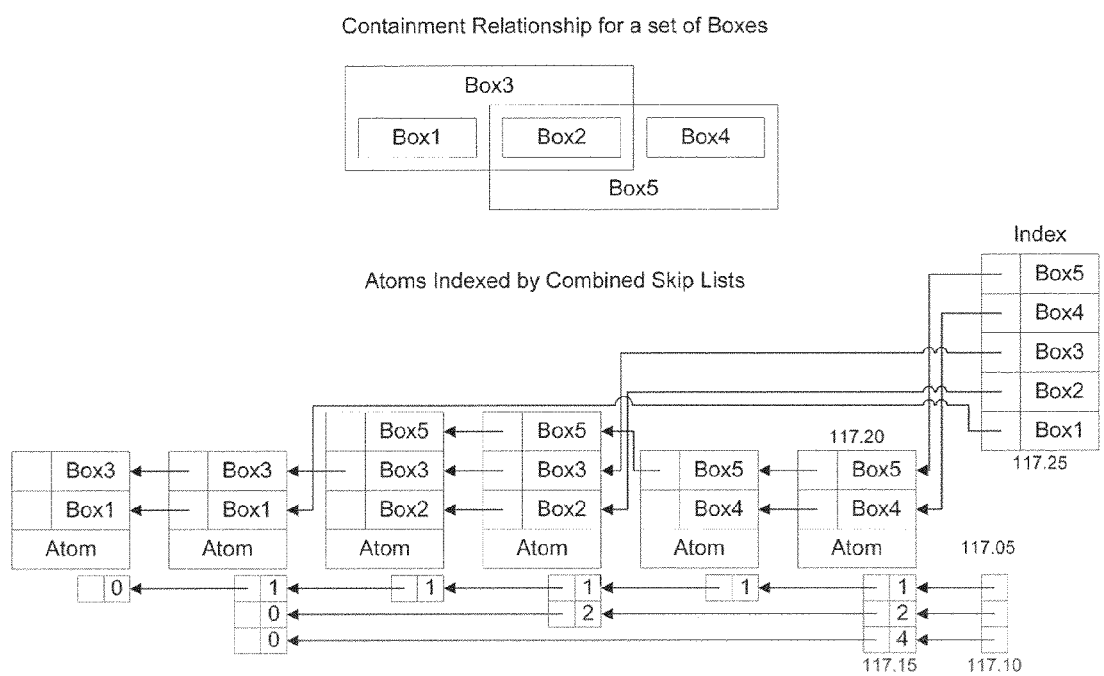
FIG. 117 is a diagram of Indexed Data Sources in accordance with an embodiment of the present disclosure.

The skip list index [115.31] used for boxes [115.15] has an additional purpose beyond the skip lists described above. It is desirable to be able to directly enumerate the members of a box [115.15]. To do this we add to the skip list representation above a set of levels consisting of <boxId, pointer> pairs. These allow us to chase pointers to recover the members of a box [115.15] as well as skipping using the other levels. One set of skip list levels [117.05] [117.10] [117.15] is constructed similarly to the skip lists described above, however a feature value is not required to be stored in the base list entry [117.05]. An additional set of levels [117.20] is added for each of the box [115.15] membership lists, along with an array of the heads of each level [117.25]. In order to be more space efficient, an embodiment can choose to store only those containing boxes [115.15] at the bottom of the box [115.15] hierarchy. For example in FIG. 117, Box1, Box2, Box4 are the only ones that would need to be placed in membership lists [117.20]. Membership in other boxes [115.15] could be found by searching the parents of these boxes [115.15] in the hierarchy. The embodiments described use a separate data structure to track the hierarchy of containment relationships between boxes [115.15]. In one embodiment the box [115.15] hierarchy is simply kept in the hypergraph [114] itself.

Hypergraph Query Matching Procedure

The following description of query [115.1] matching is written assuming an OSF [110] embodiment. However the logic of the procedure [115.10] is not dependent on an OSF [110] representation. There are some asides in the description below that apply to an OSF [110] record representation and they do not limit the applicability of the procedure [115.10].

Figure 119:
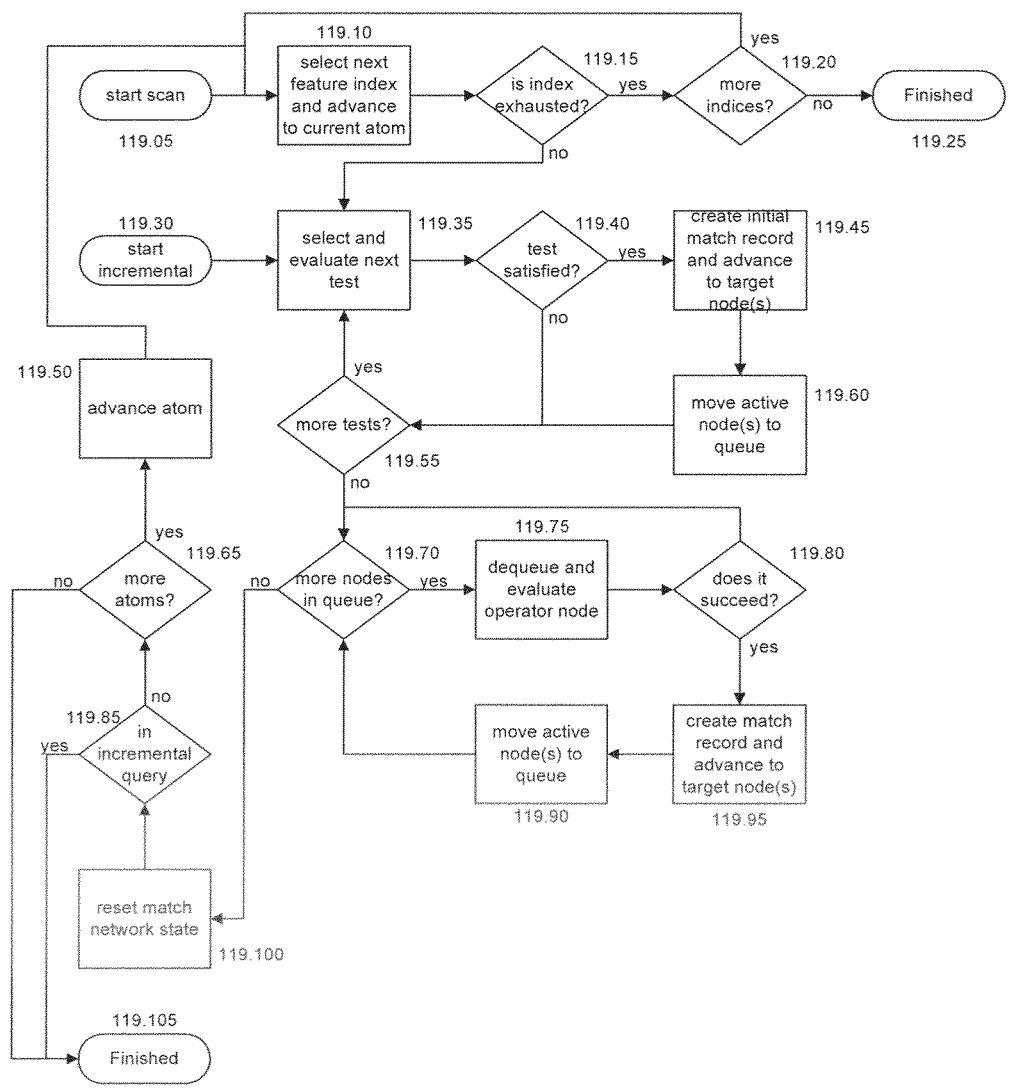
FIG. 119 is diagram of the query matching procedure in accordance with an embodiment of the present disclosure.
Figure 120:
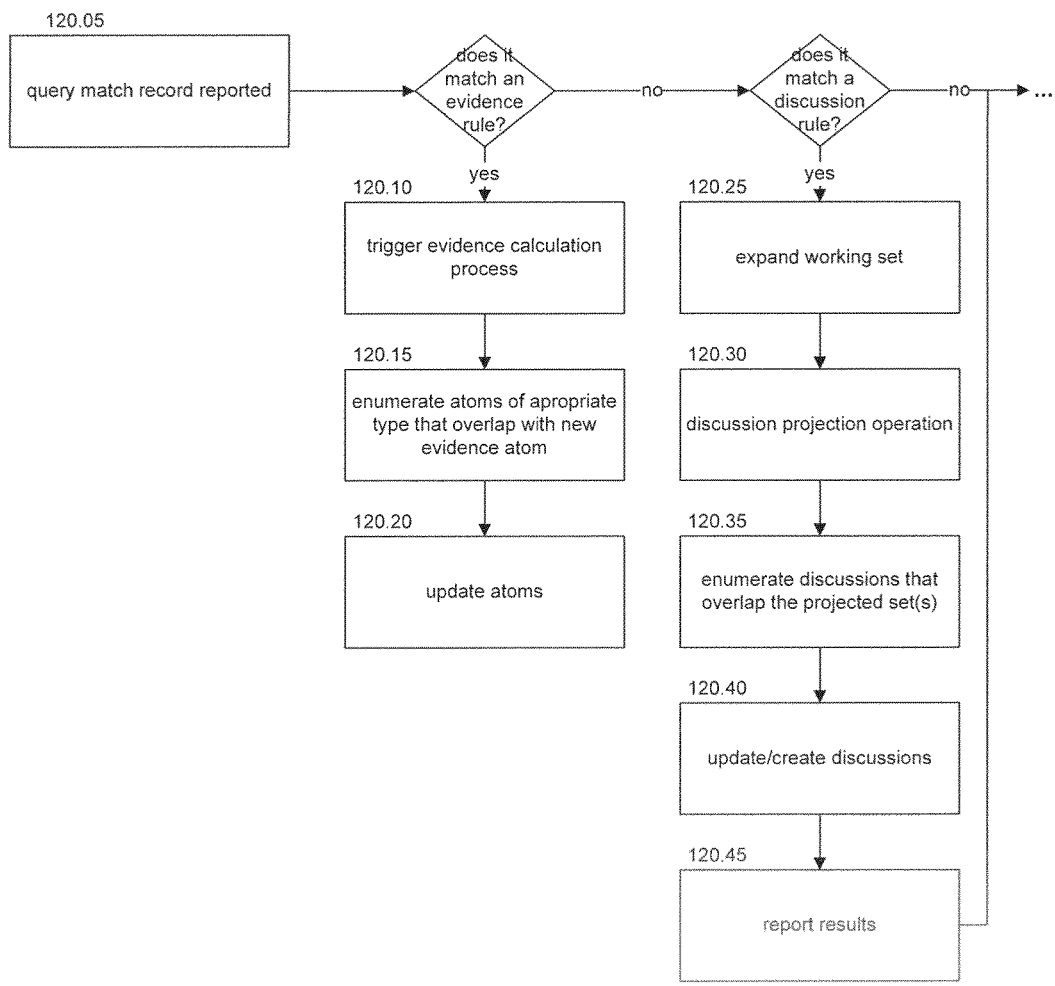

FIG. 119 defines the logical structure of the query matching procedure [115.10] that will be used in many embodiments. The figure contains branches for both indexed and continuous queries [115.1]. For indexed queries [115.1] a list of indexes [115.11] is kept. An index [115.11] is marked as exhausted when the procedure [115.10] reaches the end of the index [115.11]. If an index [115.11] entry refers to an atom [115.19] from a segment [115.23] that has been collected, then depending on the garbage collection strategy used by the embodiment, the end of the list may have effectively been reached. Each index [115.11] is associated with a particular feature, and an additional list of the tests based on that feature is kept for each index [115.11].

When running a continuous query [115.1] the procedure [115.10] has access to the OSF [110] record itself in most embodiments. An embodiment may choose to bypass the scan over indices and scan over atoms [115.19] in the hypergraph [114], retrieving the OSF [110] records [115.24] and Tests for the continuous queries [115.1] first retrieve a value from the atom [115.19] based on the feature. The test can specify whether or not the value is required to be non-empty. If it can be non-empty the test succeeds vacuously, otherwise the test succeeds if the test value can be unified against the retrieved value. The following text describes the workflow used in one embodiment.

Starting from [119.05] an indexed query procedure [115.10] enters a top level loop that scans through the set of indices. First it selects an index [115.11] [119.10]. If the index [115.11] is exhausted [119.15] then check to see if there are any more indices [119.20]. If not then the procedure [115.10] terminates. Otherwise we enter a loop that evaluates all the initial feature tests [119.35].

A continuous query procedure [115.10] [119.30] will bypass the loop that scans through indices and start at [119.35] as well. At [119.35] the procedure [115.10] selects the next test and checks to see if it is satisfied [119.40]. If so then we create an initial match record [115.16] and advance it to all target nodes [115.7] associated with that test [119.45]. If a test appears in more than one immediately containing expression [115.2], then it is linked to the operator nodes [115.7] created for all those expressions [115.2]. When a match record [115.16] is advanced to a node [115.7] it may become active. The activation of an operator node [115.7] depends on its type. However the decision is generally based on receiving the appropriate arguments and any initial tests or constraints [115.9] to be satisfied. If a node [115.7] does not become active then the match record [115.16] advanced to it will be stored, in case other match records [115.16] are reported to the node [115.7] later in the procedure [115.10] and it then becomes active. The procedure [115.10] next moves all nodes [115.7] that became active in the last step into the active node queue [119.60]. If there are more tests [119.55] then the procedure [115.10] continues [119.35]. Otherwise we move to a loop [119.70] that continues attempting to activate operator nodes [115.7]. Note that if we are running an indexed query [115.1], then at [119.55] the test checks to see if any tests remain in the list for the current index [115.11].

It should be noted that the operator nodes [115.7] corresponding to the outermost query expressions [115.2] are linked to a final reporting node [115.8]. The final node [115.8] does not become active as operator nodes [115.7] do, rather when a match record [115.16] is advanced to the final node [115.8] it is reported as a query [115.1] match. While there are more nodes [115.7] in the active node queue [119.70], remove an operator node [115.7] from the queue and evaluate it [119.75]. If the evaluation fails [119.80] then continue with the loop. Otherwise, we create a match record [115.16] and advance it to any down stream nodes [115.7] [119.95]. As with the initial tests, during generation of the matching network [115.5] an embodiment may detect shared sub-expressions [115.2] and connect the sub-network [115.5] generated for the sub-expression [115.2] to the operator nodes [115.7] generated for all immediately containing expressions [115.2]. Any nodes [115.7] that became active in the prior step are placed in the queue [119.90].

When the queue empties [119.35], any completed query matches [116.16] will have been advanced to the final node [115.8] and reported. The procedure [115.10] resets the matching network [115.5] state by removing all match records [115.16] from operator nodes [115.7] [119.100]. If this is a continuous query [115.1] [119.85] then we are finished. Otherwise if there are no more atoms [115.19] [119.65] then we are finished. Otherwise we advance to the next atom [115.19] [119.50] and reenter the initial loop [119.10]. In one embodiment the procedure [115.10] only need check that there are unexhausted indices and it will set the current atom [115.19] to the next atom [115.19] in the next entry of the first index [115.11] it chooses.

There are several conceivable ways that embodiments can optimize this procedure [115.10], the optimizations will in general be different for the continuous and indexed cases.

One of the most valuable areas to optimize is the initial tests against feature values. One embodiment will substitute more inexpensive test routines for commonly recognized patterns in the OSF [110] values and thereby avoid the unification step. This procedure [115.10] may be simplified by introducing a set of OSF [110] types for which optimizations have been determined. In continuous queries [115.1] one embodiment unifies several or all of the test conditions so that they can all be checked with only one unification operation. For example several tests feeding into an "and" operator [115.30] may be combined this way. This lets the unification code find the most optimal strategy for the two values. Again, the type system may be used within the unification implementation to dispatch to possible optimizations.

Discussion Building Architecture

The following procedure describes how the hypergraph [114] system is used to enable building of discussions [136] in a continuous usage mode. It should be noted that the hypergraph [114] system described here is a general purpose tool; it is used to continuously compute a large variety of complex structures in addition to discussions [136]. The embodiments referenced here reference discussions [136] but the use of the system is not limited to this one procedure.

For continuous processing a large set of queries [115.1] are set up to be run continuously. These queries [115.1] are intended to trigger computations in response to new atoms [115.19] added to the hypergraph [114]. The system contains a set of dispatch rules that determine which incremental computation (if any) should be run in response to query matches [115.16]. These rules trigger computations intended to synthesize new pieces of evidence as well as the procedure(s) used to create or update discussions [136].

In one OSF [110] embodiment queries [115.1] produce OSF [110] values as part of the matching procedure [115.10]. These queries [115.1] also contain constraints [115.9] expressed as unification equations that are used to build up the resulting match record [115.16] values. These queries [115.1] do not have to look for particular values, and would not be very useful for incremental computation if they did. In the OSF [110] embodiment queries [115.1] can easily be set up to detect broad classes of evidence. This is because OSF [110] feature structures can contain empty, typed values as well as choice and range values that can unify against a set of possible values. This OSF [110] embodiment will also use constraints [115.9] to represent the dispatch rules triggering incremental computations. As elsewhere: these constraints [115.9] can be used to construct a new OSF [110] value based on the value that they unify against. In this context that functionality can be used to pass instructions on to the routine carrying out the incremental computation. One way of describing this system is as a feed-forward inference engine, and is subject to the same sorts of optimizations as those systems. When a computation is triggered both the payload [115.18] and working set [115.17] from the match record [115.16] are passed to the triggered procedure.

An example of the general flow of processing is as follows. An email is added to the hypergraph [114]. Evidence rules are triggered which perform computations such as resolving aliases of the sender and recipients of the email to actors, possibly creating new actors [220] as a side effect. Various other relationships might be found for content in the email and so on. As any new evidences are added to the hypergraph [114] new query matches [115.16] may be produced. At some point, a query [115.1] which checks to see if the actors [220] associated to the email are consistent with actors [220] in one or more discussions [136] or emails (via the closure query operator [115.30]) triggers a computation to see if the email should be added to one or more of those discussions [136] or cause the formation of a new one.

Embodiments have a great deal of flexibility in how to handle this flow. For example an embodiment may run match records [115.16] or incrementally triggered computations in batches to share work in computing updates. The order in which computations are triggered may be important as well. Embodiments may use a queueing methodology, embed conditions in the dispatch rules or other mechanisms to establish orderings. Any such approaches are heavily dependant on the rules used, the set of computations that are available and details of how they work.

The structure of the procedure is fairly straightforward. When a match record [115.16] is reported [120.05] it is compared to a list of dispatch rules. For each rule that is matched, if it is an evidence rule (e.g. used to calculate some intermediate result), an evidence calculation procedure is triggered [120.10] The procedure may run immediately at this point or be scheduled to run later or in a batch. At the point the procedure runs, it may either enumerate the current evidences that are affected by the new data, or simply produce a new evidence and in the next step the overlapping or otherwise affected evidences are determined [120.15]. Once this set is determined a set of updates to the hypergraph [114] have to be decided [120.20], as noted elsewhere these updates may be new atoms [115.19] that shadow the old definition or atoms [115.19] that specify a set of changes to the earlier version of the atom [115.19]. The decisions here are dependant on the type and content of the new evidence•atom(s) [115.19].

If a matched rule triggers a discussion [136] building computation the sequence is somewhat more involved. First the working set [115.17] of the query [115.1] is expanded to produce an on the fly hypergraph [114] of evidences (i.e. the working set [115.17]) related to the item and any discussions [136] that triggered the computation [120.25]. This expansion of the working set [115.17] may also create new transitory edges [115.20] reflecting heuristics and other ad-hoc methods for specifying or limiting relationships. At a broad level the discussion [136] is built by taking a projection from this evidence hypergraph [114] [120.30]. Projection in this sense is defined similarly to the hypergraph [114] projection operation [115.28]. In one embodiment the working set [115.17] is transformed into a set of pairwise edges [115.20] and the projection is found by running a maximum spanning tree algorithm. In other embodiments the algorithm is modified to run on a hypergraph [114] directly. The algorithm is further augmented by conditions that disallow links to be used by the algorithm. The general result of this is that the algorithm will act as if the hypergraph [114] is split into components and spanning trees will be computed for each of the components.

As with the calculation of evidences the set of current affected discussions [136] is enumerated [120.35]. The new discussions [136] are added to the hypergraph [114]. [120.40]. In one embodiment discussions [136] are represented as an edge [115.20] and a partial order on the items on other constituent structures in the discussion [136]. In an alternate embodiment the edge [115.20] is unordered and any process viewing the discussion [136] will decide how to order and display the members of the discussion [136] based on retrieving associated edges [115.20]. In what is perhaps the most flexible scheme, an embodiment will simply define a discussion [136] as a box [115.15], and the reported result will be the ID of the box [115.15]. A process can then construct a view of the discussion [136] or discussions [136] related to an item by running a query [115.1] constrained by the box [115.15], or simply return all the members of the box [115.15]. The system assumes that the discussions [136] are reported [120.45] to an external process or store or other similar mechanism. In one embodiment the address of a discussion [136] edge [115.20] is reported. In this manner the client can be notified when there are changes to a discussion [136] or a new discussion [136] has been added. Then rather than running a query [115.1], the client can directly retrieve the edge [115.20] and traverse to related atoms [115.19].

Mapping Data Sources to the Hypergraph

An important assumption is that atoms [115.19] describe a subset of relevant characteristics of source actors [220], items and events. In most embodiments, the source data for these entities will be archived separately and atoms [115.19] will contain location data for the source data corresponding to each atom [115.19]. In the description below, as elsewhere, an OSF [110] based embodiment will be assumed. Embodiments that use other representations will need to be able to at least minimally represent the characteristics described below.

The core concept is that the structure of atoms [115.19] be defined by a set of facet types [121.40]. The intent is that the structure of an atom [115.19] can be determined by unifying a list of facet types. The implication of this is that facet types do not define individual values contained in atoms [115.19], rather they are a slice of the final atom [115.19]. The set of facet types associated with an atom [115.19] provide an efficient mechanism for dispatching to incremental computation procedures. The set of types is intended to have the effect that most dispatch rules need only test for one or more of these types in order to determine what to trigger for an atom [115.19].

Figure 121:
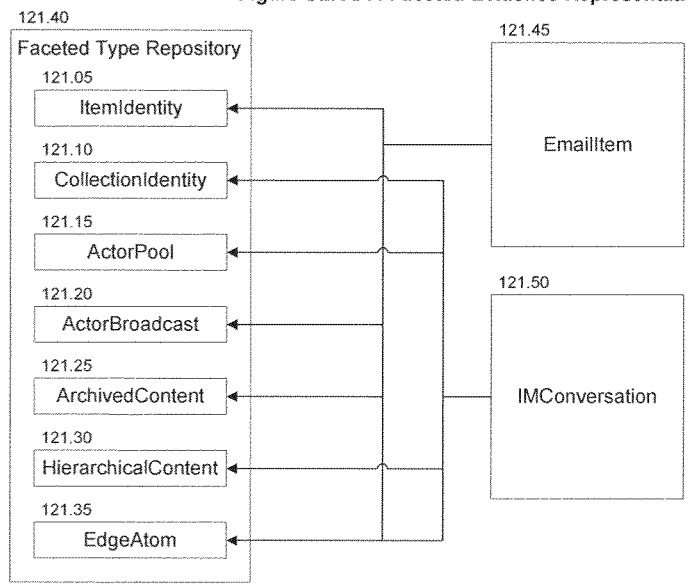

FIG. 121 provides a highly schematic example of how atoms [115.19] are associated with facet types in one embodiment. A type EmailItem [121.45] is defined as the unification of the types ItemIdentity [121.05], ActorBroadcast [121.20], ArchivedContent [121.25] and EdgeAtom [121.35]. EdgeAtom [121.35] defines the set of characteristics necessary for an edge [115.20] atom, i.e. an address, a logical ID, a list of incident atoms [115.19] and so on. ItemIdentity [121.05] contains characteristics that identify the source item. ActorBroadcast [121.20] is used for messages that are broadcast from sender to a list of recipients. ArchivedContent [121.25] defines fields that specify where the email's content can be found. For comparison, a type IMConversation [121.50] represents a set of IM messages that have been determined to be part of one conversation. Therefore it is associated with a collection of items and uses the CollectionIdentity [121.10] facet. The set of actors [220] associated with a conversation (in some IM systems conference rooms can be set up which allow for more than 2 participants) is an unstructured list, therefore the ActorPool [121.15] facet is used. The content of the conversation is structured into a hierarchy of exchanges, turns and so on which is represented via the HierarchicalContent [121.30] facet.

The Cataphora system is deployed in a world with an extremely broad variety of real world data sources and use cases. In the real world, many companies and other environments will have unique types of items. As an example consider an email system such as Lotus Notes, where templates for forms and other custom message types can be added to the system. In such cases, messages that can be handled as conventional email are a just a subset of the traffic carried by the internal, potentially highly customized Lotus Notes system.

One embodiment of the Cataphora system will have a set of complex computational procedures that will be difficult to implement and change. For all practical purposes these are a fixed set, though they can be changed and updated over time. In order to bridge the gap, these procedures are built to recognize facets of items. The system does not have any intrinsic notion of email, but rather what types of relationships are relevant to a message that is broadcast to a list of recipients.

The strategy employed to integrate data sources into most embodiments of the Cataphora system is to determine what set of facets best represents each item items are archived external to the hypergraph store [115.22], and an OSF [110] record is created conforming to the set of facet types chosen for each item or event or other object to be represented in the system. An advantage of the OSF [110] formalism as opposed to other formalisms for feature structure types is that it does not require total typing, i.e. an OSF [110] Value can have features and values in addition to those specified by the type of the value. The implication for the system is that we associate a set of types to a value rather than making it an instance of a type per se.

Since every organizational computing environment is different, most embodiments support the addition of arbitrary new types of evidence sources [108]. An evidence source [108] is defined to be any system which produces regular records that can reliably be linked to one or more actors in the relevant universe. Most valid evidence sources [108] will have a time and date stamp associated with each unique event record that they generate, however some embodiments will support evidence sources [108] that lack this, and instead use indirect means to infer a time and date (such as the arrival of an event between two other events which do have such a timestamp.) Common examples of evidence sources [108] include but are certainly in no way limited to: transactional systems, scheduling systems, HR systems, accounting systems, intelligence monitoring systems, and systems which crawl the web looking for comments in areas of specific interest.

Each new evidence source [108] represents at least one new dimension in the model; what is really the case is that each distinct type of event does. For example, transactions which are cancelled in a trading system are likely to be considered a different vector than transactions which exceed some externally specified level of risk. In many embodiments therefore, each broad class of event will be considered a vector in a minimal integration, though of course whoever is performing the integration can decide what vectors make sense for their particular purposes if they wish. Most embodiments will also allow non-orthogonal vectors to be expressed because so doing will often add significant value. For example, a marked overall increase in the dimension of emotive tone on the part of an actor may be considered noteworthy in many instances of the system's deployment that such increase is largely the result of a particular topic or is in relation to another specific actor is also often well worth knowing in such cases. While this of course can be set up manually, many embodiments will also automatically perform such combinations whenever it is merited by a statistically uneven distribution of data such as in the example just above. Some such embodiments will generalize and expand the dimensionality of the model based on such empirical observation. Some embodiments may opt to maintain a "virgin" model that factors in no user feedback as a security control.

This approach is critical to being able to describe a rich, high dimensional model of behavior which allows for even relatively small, subtle changes in behavior to be trapped. Even more importantly, such a model can be defined without any definition of rules, which tend to have a very limiting effect. That is, they look for behavior that is believed to be bad based on some prior incident, rather than having the aim of identifying unexplained changes in behavior that especially when used in conjunction with other types of data or evidence sources [108] can help predict a dangerous incident before it occurs.

Continuous Workflow Analysis

As described in U.S. Pat. No. 7,143,091, the disclosure of which is incorporated by reference herein, ad hoc workflows are processes [128] that differ from formal processes [128] in at least one of two ways: they are not documented (or not documented thoroughly) as formal workflow processes [128], and they are not subjected to such strict enforcement as formal workflow processes [128], i.e. they can tolerate various kinds of deviations from the expected model, such as missing stages [154], additional stages [154], unusual number of iterations, etc. The present invention expands on this definition to continuously detect the presence of significant workflow processes [128] and to assess how regularly these workflows are performed by various actors [220], which in turn allows detection of anomalies [270] in assessed behavior [205] in that regard.

More precisely, ad-hoc workflow models are detected during the analysis of the input event stream by the continuous workflow analysis component [465]. In the default embodiment, a new workflow model is built whenever a statistically significant volume of event sequences [166] are identified which conform to a particular pattern, including but not limited to the following types of patterns:

1. A sequence of documents [162] (including templated documents) of given nature (i.e. document type) and function (i.e. business attributes) appear in the same relative order. For example, a recruitment process in a small or medium business may be characterized by the exchange of candidate resumes, of interviewer feedback following interviews, and of an offer letter—all these events involving actors [220] within the HR department as well as within another specific department.
2. A sequence of communications [123] or other events [100] involving actors [220] within a given group [225] and have topical and/or pragmatic tagging constraints. For example the development of a service proposal for a customer may not be formalized within the corporation but follow an informal, iterative review process on topic [144] X, with pragmatic tags [172] such as the following: a work product is sent, a work product's reception is acknowledged, agreement or disagreement with some work product, approval or rejection of the final version of the work product, etc.
3. A combination of any of the previous patterns. For example, transactions in a financial organization involving over-the-counter instruments (i.e. those not traded on a public exchange) tend to follow similar series of steps although these are not strictly formalized or constrained in the daily course of business: back-and-forth negotiation of a deal between a trader and one or more brokers (using any type of communication channel [156]), followed by a confirmation phone call, followed by a back-office operation to record the deal in the bank's database systems, etc.

In one embodiment of the present disclosure, once a pattern has been detected as significant in the baseline data analyzed for the whole set of actors [220] or a subset of those, the workflow model is built as a higher-order Markov chain whose states are composed of the individual event [100] and item [122] patterns, including but not limited to:

Type of event [100]
Document [162] attributes in the case of the creation, modification, deletion, check-in, check-out, etc. of a document Topics [144] and pragmatic tags [172] associated to the event [100]

Sender and recipient group [225] when the event [100] is an electronic communication [123]

These states are augmented with primitives to accommodate the expressiveness of ad-hoc workflow processes [128]:

Fork primitive to represent parallel paths in the workflow

Iteration primitive to represent basic loops in the workflow (where the number of iterations is by default unbounded).

Conditional loops, whereby each iteration step is condition on a predicate being satisfied.

In another embodiment for better completeness and space efficiency, a probabilistic suffix automaton is used instead of a higher-order Markov chain.

In either case, as described in the following, the model is trained on a training set defined for example as a group's baseline window of events. In the default embodiment, retraining occurs at regular intervals defined in the system configuration (which, depending on the business domain considered, may be in the order of weeks or months). In another embodiment, a load-balancing component adapts the training frequency so as to find an adequate trade-off between maintaining a recent model and not overload the machines hosting the various components of the processing and analysis layer [402].

The ad-hoc workflow model thus built is leveraged by the present disclosure in two different ways: anomaly visualization and outlier detection.

Workflow Anomaly Visualization

Firstly, as described in U.S. Pat. No. 7,519,589, the disclosure of which is incorporated by reference herein for all purposes, the ad-hoc workflow model is visualized so as to very efficiently spot any abnormal information flow or steps in any process, particularly a critical one. Such anomalies include but are not limited to:

Missing stages [154] in the workflow.

Additional, unexpected stages [154] in the workflow (including when the process unexpectedly morphs into several workflows)

Unusual number of iterations in a looping step (for example, for a deal negotiation that usually requires at least 3 rounds of deal terms review, there is never more than a single round when a given sales person is in charge of the deal).

Unexpected time intervals between events [100] (either significantly shorter or significantly longer than the usual delay).

Anomaly in the workflow structure: for example if a parallel step is supposed to be performed under certain conditions (such as a background check when hiring for an executive position), that parallel step may be bypassed when the conditions are met, or conversely may be unduly performed to eliminate specific candidates from the hiring process.

Anomalies detected outside the workflow process [128], but affecting some of the actors/groups involved in the workflow and within the same time frame: e.g. 2 actors systematically changing their communication patterns at a given step of the process, or an external event that exhibits a strong correlation with the process [128].

Outlier Workflow Detection

Secondly, the model is used to detect outlier workflow instances [134]: these are instances [134] that match the informal process [128] definition (because they exhibit the properties previously described in terms of document types, actors [220] and groups [225], topics [144] and pragmatic tags [172], etc.) but have a very low probability of having been generated by the model.

Using the implementation artifacts described above (higher-order Markov chains and probabilistic suffix automata), this outlier detection mechanism is straightforward as the generation probability is given by the model.

For example, when the workflow process [128] is modeled by a probabilistic suffix automata, one embodiment of the present disclosure uses the following similarity measures for detecting outliers:

Compute the probability that an input workflow instance [134] has been generated by the model as the product of all transition probabilities and compare this probability to the probability of its being a randomly generated sequence as the product of the distribution probabilities of each state. If the first probability is higher than the second, the workflow instance [134] is flagged as an outlier.

Alternatively, compute the normalized log-probability of the input workflow instance with respect to the workflow model. If this probability is within a given multiple of standard deviations (typically 3) from the average probability of workflow instances [134] within the training set, this instance [134] is flagged as an outlier.

It should be noted that outliers, as well as anomalies, are defined by assessing the normalcy of an input workflow instance [134] with respect to a model derived from the observation of instances [134] as training set. As is the case for the general case of detecting anomalies by deviation [805], this training set or referential can be defined in a number of ways, including but not limited to the following important definitions:

Instances for the same actor groups [225] at a prior time (peer-group referential, as formalized in the section on Anomaly detection). This allows detection of deviations from an informal workflow process [128] over time within a certain set of individual actors [220] in the organization, as well as specific actors [220] who do not follow the same workflow as the majority of the other actors [220] in the group [225] (for example, it might be interesting to detect actors [220] who are systematically sloppy and skip important stages [154] in a workflow process [128]).

Instances for the exact same actors [220] at a prior time (called baseline referential). This allows the system to detect deviations associated to a particular actor [220]. The benefit of this referential compared to the previous one is that by definition, ad-hoc workflow processes [128] do not impose strict constraints on the sequence of stages [154] that constitute them, and the fact that an actor usually performs a process in a different way from the rest of his peers does not constitute an anomaly [270] by itself but only denotes somewhat different working habits or modes of communication and interaction. However, the fact that the workflow performed by that particular actor [202] exhibits significant and a priori unexplained changes at some point in time, is worth being flagged as unusual by the system.

Emotive Tone Analysis

We claim a method and system to identify and analyze occurrences of subjective emotional expression in electronic communication. Human evaluation involves subjective and objective components. If we judge a steak by saying "This steak is prime, by USDA standards", the judgment is relatively objective. If we judge a steak by saying, "Wow! What a delicious steak!", subjective elements are in play. Systems of

"sentiment analysis" or "opinion mining" (comprehensively surveyed in [Pang 2008], pp. 1-135) typically don't distinguish these different (but sometimes overlapping) forms of evaluation and expression. While they often do recognize a distinction between subjective and objective aspects of appraisal, the relevant notion of subjectivity is decoupled from direct emotional expression. Focusing on direction emotional expression of an individual provides important and useful information about the relation of that individual to events in the immediate environment as well as insight into the relation of that individual to those he or she is communicating with.

The emotive tone analysis method included in the present invention has the following characteristics:

It distinguishes emotional expression (subjective component) from appraisal (objective component). Identifying emotional expression depends on a variety of indicators: lexical choice (specific words and phrases, including the interjections and the "responsive cries" studied in [Goffman 1981]), person distinctions (first person ("I", "me", "my", "mine", "we", etc.), involvement is especially important), tense distinctions (favoring present tense), syntactic constructions (such as exclamative structures like "What a beautiful day it is!"), modification. Different factors play different roles for different emotions.

The emotive tone analysis component [435] recognizes a set of basic emotions and cognitive states. These include (among others) anger, surprise, fear, confusion, frustration. These overlap with, but are not coextensive with the set of basic emotions identified and studied by Paul Ekman that are typically communicated not linguistically, but by physiognomic gestures (see [Ekman 2003]).

Like the emotions signaled physiognomically, these basic emotions are scalar in nature. In the case of physiognomic gestures, greater intensity is indicated by increased magnitude of the gesture. In the case of linguistically communicated emotions, scalar properties are indicated in a variety of ways:

lexically: "livid" is a description of a more extreme range of anger than "angry" (a claim that can be supported by the range of modifiers that occur with the two expressions);

by augmentative modifiers like "very" or "extremely" that indicate an increase in the range of intensity;

by mitigating modifiers like "a bit" or "somewhat" that indicate a diminution or decrease in the range of intensity;

by punctuation or capitalization or other forms of Loud Talking (see that Digital Mirror section)

In one embodiment of the system, the range of any emotion can be modeled by the emotive tone analysis component [435] as an open interval. Basic individual expressions ("livid", "angry", "upset", etc.) can be associated with a basic sub-interval of such an interval. Modifiers can be interpreted as affecting this range. The basic observation is that initial modification has a greater effect than subsequent modification. For example, the difference between A and B below is greater than the difference between C and D:

A: "I'm angry."
B: "I'm very angry."
C: "I'm very very very very very very very very angry."
D: "I'm very very very very very very very very very angry."

Figure 38:
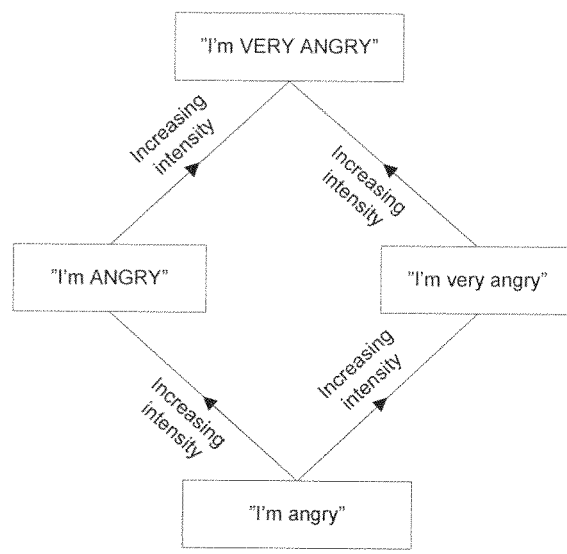
FIG. 38 is a Hasse diagram showing an example of emotional intensity assessment in accordance with an embodiment of the present disclosure.

In another embodiment of the system, the range of any emotion can be modeled by the emotive tone analysis component [435] as a partial ordering. The utility of this model is that in a partial ordering, different modes of increasing intensity may not be directly comparable. FIG. 38 shows a simple Hasse diagram (where points higher on the diagram indicate greater intensity) that illustrates two modes of increasing intensity are indicated: capitalization and modification by intensifiers (here, "very"). These two modes are compatible (which forms an upper bound for both in the diagram), but the two modes are not easy to rank subjectively in relative intensity.

In some cases, there are causal links between specific basic emotions and specific cognitive states. For example, ignorance is a cause of confusion. These causal links can be exploited in both directions: confessions of ignorance can be interpreted as evidence for confusion; expressions of anger may be linked to interesting causal events. (The existence of such stable links is an important reason to study and analyze emotional expression.)

In the model computed by the emotive tone analysis component [435], emotional intensity varies across individual actors [220], across pairs of actors [220], across events [100], across social groups [225], etc. Measuring intensity (as described above) makes it possible to filter and analyze emotionally expressive communication in various ways. In one implementation, the focus of interest may be the statistical outliers in emotional expression, on the assumption that these occurrences are most likely to correlate with other events of interest.

The analysis of emotional expression performed by the emotive tone analysis component [435] is compatible without restriction with a wide variety of other analytic methods: topical [144] filtering, actor-based [220] or domain-based filtering, temporal filtering (by interval, by time of day, etc.).

Finally, the emotive tone analysis component [435] can identify and analyze emotional expression either statically, i.e. on a fixed dataset, when the system is running in batch mode [370] or dynamically, i.e. on a data stream, when the system is running in continuous mode [375]. In continuous mode, the analysis of emotional expression can be carried out not only retrospectively (as in the case of a fixed static dataset), but also prospectively so that future emotionally-involved events may be anticipated.

Pragmatic Tagging
Overview

The system described in the present invention includes a pragmatic tagging component [430] that will categorize the communicative and discourse properties of individual electronic communications [123]. This pragmatic tagging component [430] is a further development and implementation of the system described in U.S. Pat. No. 7,143,091, the disclosure of which is incorporated by reference herein for all purposes, and is designed to support a variety of functions, including but not limited to the following.

Workflow analysis: an important feature of electronic communications [123] is how they relate to a workflow processes [128] i.e. the set of corporate tasks associated with normal business. Salient aspects of such communications [123] include requests for information or deliverables, negotiations concerning such requests, status updates, delivery of results, acknowledgment of receipt of information or deliverables, etc., together with a range of communicative information related to the social relations of those communicating (such as positive and negative forms of politeness, including thanks, praise, etc.).

Discussion building: sets of electronic communications [123] (on any kind of communication channel [156]) typically have various levels of structure, including a first-order structure involving the individual elements of the set, and higher order structures that link first-order structures together in various ways (see, e.g., U.S. Pat. No. 7,143,091 for details).

A very simple example is a case in which an email message that ends with a request is linked to a subsequent message acknowledging the request and perhaps fulfilling it. It is possible to postulate hypothetical links between first-order electronic communications [123] based completely on their metadata [140]: what actors [220] are involved, what temporal properties are involved, common properties of subject lines (including indications of forwarding or response added by a mailer or other software application used to format and transfer electronic communications [123]). Pragmatic tags [172] offer a different basis for postulating hypothetical links, one which can be used to strengthen or confirm hypotheses based on other sources of information.

Lexical analytics: the form of words that individuals use in communicating about a workflow process [128] or topics [144] of mutual interest often reveals attitudes and presumptions that the communicants convey directly or indirectly; access to these overt or implicit attitudes is often useful in assessing motives with regard to the tasks at hand or to other actions or events.

Relational analytics: linguistic aspects of email communication also convey mutual understanding of the personal and social relations among the participants, including points at which the strength of these relations is tested in some way and points at which such relations undergo significant changes.

Pragmatic Tagging Architecture

An adequate system of pragmatic tagging requires:
- An abstract model of social interaction and social communication;
- A set of pragmatic tags [172] that are, on the one hand, interpretable in this abstract model (so that the presence of a particular pragmatic tag [172] provides evidence of the existence of a specific kind of social event or social interaction or social communication) and can, on the other hand, be defined directly by linguistic properties (that is, by the presence of specific expressions or specific syntactic combinations of specific expressions);
- A method of analysis of individual electronic communications [123] through which the linguistic reflexes of particular pragmatic tags [172] can be identified.

Figure 17:
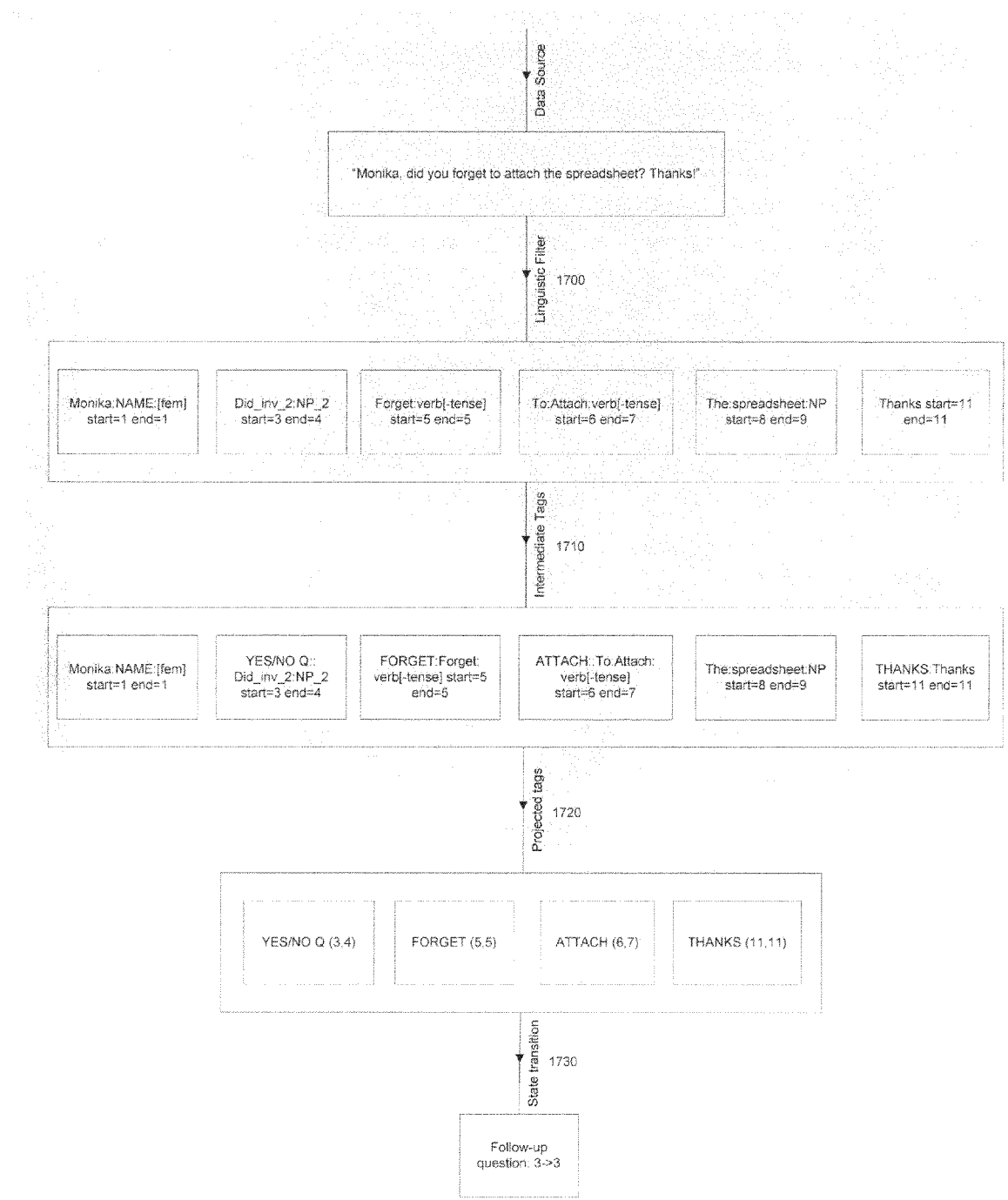
FIG. 17 is a flowchart of the pragmatic tagging component in accordance with an embodiment of the present disclosure.

In one implementation, such a system can be realized as a cascade of transducers, as illustrated in FIG. 17. For example, an electronic document is passed through a linguistic filter [1700] token by token. Individual words and grammatical constructions (such as inverted sentences of the kind that occur in English yes-no questions or wh-questions) are detected. Each detected instance is replaced by an intermediate tag [1710]; non-matching tokens [116] are disregarded (though in some implementations it may be useful to count them or measure the distance from the onset of a message to the first recognized expression or the distance between recognized expressions). The resulting set of intermediate tags is then analyzed further, with the intermediate tags possibly replaced by a final set of projected tags [1720].

Transducers of this kind have the property that they preserve the relative order of the input expressions: that is, if $tag_i$ follows $tag_k$ at a given level, then the evidence for $tag_i$ follows the evidence for $tag_k$ at the previous level. This is not a trivial property. If the word "Thanks" appears initially in a communication [123], it serves as an acknowledgment or appreciation of a previous action on the part of the addressee of the communication [123]. If it appears following a request (as in: "Please get back to me with the requested information by 5:00 this afternoon. Thanks."), it serves to acknowledge a presumptive acceptance of the request it immediately follows. If the relative order of information is not preserved, this distinction is lost. And in the absence of correct order information, the effectiveness of the tagging in linking different messages together correctly would be degraded.

A further reason to have a cascade of transducers (as in the implementation favored here) involves the complex relation between linguistic form and pragmatic interpretation (in terms of speech acts and dialogue acts). It is well known that speech act or dialogue act interpretation is constrained in important ways by syntactic form. Consider the examples:
"Pass the salt!"
"Did you pass me the salt?"
"You passed me the salt."

The first can be used as a command or request. The second two cannot. The second can be used to request information. The first and third cannot. The third can be used to make an assertion. The first and second cannot. But in a variety of more complex cases, the relation between syntactic form and pragmatic interpretation is less straightforward.

In the cases of commands, for example, we find a hierarchy based on directness and explicitness, very partially represented below:
"Pass the salt, dammit!"
"Pass the salt, please."
"Could you pass the salt."
"Can you please pass the salt."
"Do you think you could pass the salt."
"Would you mind passing the salt."

As many authors have noted, a sentence like "Can you pass the salt?" can be interpreted as a request for information or as a request for salt. (Of course, when "please" is inserted, it can only be a request for salt, not for information.) But as a request, it is less demanding than the explicit "Pass the salt, dammit." We model this abstractly in the presumptions these speech acts make and the effect they have on the relations of the conversational participants. Theoretically, one would like to appeal to a logic of conversation (to use Grice's terminology) that allows one to derive the associated presumptions and effects from properties of form (the individual components of the expression and its structure) and properties of the context. But for practical purposes, it is enough to recognize and respect the relevant differences: that is, while each of the above sentences can be used to make a request, the requests are themselves organized in a way that reflects a decrease in directness and a concomitant increase in deference to the addressee.

The same kind of distinction can be made with respect to other basic speech act types. In the case of requests for information, we have a hierarchy similar to the one above:
"Who won the battle of Alma?"
"Do you know who won the battle of Alma?"
"Can you tell me you won the battle of Alma?"
"Do you happen to know who won the battle of Alma?"

The last of these represents less of an imposition on the addressee (and thus represents a decrease in potential threat to the addressee's "face", to use terminology of Goffman adapted by Brown and Levinson.)

And we have a similar hierarchy for representatives (to use a term of Searle's that covers assertions as a special case):
"It's raining."
"Are you aware that it's raining?"
"Did I mention that it's raining?"
"You might want to check whether it's raining." (Uttered when the speaker knows that its raining.)

Each of these sentences can be used to inform the addressee or make the addressee aware that it's raining. But like the previous cases, they have different presumptions governing their appropriateness in context and they have different effects on these contexts. For example, in some cases, it is regarded as perhaps more tactful to be more indirect—but this is a way of saying that the possible risk to the social relations between speaker and addressee is playing a more prominent role.

As mentioned above, there are many possible approaches to such phenomena. At one extreme is an approach which attempts to derive all these effects from first principles. In another implementation, the grammatical system (first-level transducer) is sensitive both to basic properties of syntactic and to a set of sentence-initial operators:

[Imperative Sentence]
can you (please) . . . .
could you (please) . . . .
do you think you can . . . .
do you think you could . . . .
would you mind . . . .
. . . .
do you know . . . .
does anybody know . . . .
can you tell me . . . .
can anyone tell me . . . .
do you happen to know . . . .
would anyone know . . . .

Each of these operators is associated with a pair of pragmatic tags [172]: one associates a basic speech act type with the sentence as a whole; the other provides scalar information associated with the pragmatic context—particularly the way the pragmatic interpretation of the sentence bears on the social relations between speaker and addressee.

A third reason to have a cascade of transducers involves context-dependent information. The study of indirect speech acts has brought out the ambiguity or vagueness of such sentences as "Can you jump over that wall", and has emphasized the social utility that indirectness involves. Yet context often reveals how the utterance of such a sentence is interpreted by the conversational participants. If the answer to "Can you jump over that wall" is "ok", the answerer interprets the sentence as a request for a jump. If the answer is "I believe so", it seems more likely in this case that the speaker interprets the sentence as a request for information, not action. It is simpler to resolve the vagueness or ambiguity of this question at an intermediate level than at the lowest level.

A fourth reason to have a cascade of transducers, related to the third, involves the fact that information in dialogue is typically distributed across different dialogue acts (or "dialogue turns"). A central example of this involves questions and their answers. From a question like "Did you receive the documents?", one cannot infer that the addressee either received the documents in question or did not receive the documents in question. Suppose the answer is "Yes, I did". From this elliptical sentence, one can also not in general infer that the speaker either received the documents or did not receive the documents. But suppose the utterances of these two sentences are appropriately coupled in dialogue (or similar electronic communication [123]), as below:

A: "Did you receive the documents?"
B: "Yes, I did."

This structured dialogue supports the inference that B received the documents in question (assuming such things as that B is trustworthy). This inference process is enhanced by one or more intermediate levels of representation. To consider the nature of these levels of representation, it is useful to examine in more detail the nature of questions and their answers.

Our system employs a novel framework for the analysis of question/answer dialogue structures. This system analyzes the overall problem into a set of cases, with each case being associated with a variety of linguistic forms (on the one hand) and with a set of inference-supporting properties (on the other). (For brevity, we focus here on direct yes/no questions.)

Case 1. The answer completely resolves the question.
Question: "Did you receive the documents?"
Complete answers: "Yes"/"No"/"Absolutely"/"Not at all"/ . . . .
Case 2. The answer resolves a more general question or a more particular question.
Question: "Did you receive the documents?"
Answer to a narrower question: "Not from Jonathan"
Question: "Did you receive the documents?"
Answer to a broader question: "And not just the documents."
Question: "Did you receive the documents?"
Answer to a broader question: "Not yet."
[provides more information than a simple "no"]
Case 3. Answerer responds with information about what he/she knows about the situation:
Question: "Did you receive the documents?"
Answer: "I don't know. I haven't checked my mail yet today."
Question: "Did you receive the documents?"
Answer: "Not that I know of."
Case 4. Answerer cannot resolve the question, but can address the possibility of a positive or a negative answer:
Question: "Did you receive the documents?"
Answer: "Possibly: I haven't checked my mail today."
Question: "Does 9 divide 333?"
Answer: "Well, 3 divides 333 . . . " (implicates that the speaker doesn't know (other things being equal), but that the answer is still possibly positive).
Case 5. Answerer cannot resolve the question, but can assess the probability of a positive or a negative answer
Question. "Did you receive the documents?"
Answer: "They're probably in my mailbox."
(As used here, "possibility" involves what set of situations are relevant to the event space; "probability" involves an association of a scalar (or something like a scalar) with an element of the event space.)

An Abstract Workflow Model.

We model workflow and other social interaction both abstractly and (in specific implementations) concretely.

At the abstract level, for each relevant pair of actors [220] (or groups of actors [225], when the group plays the role of an individual), we recognize different types of relations holding between them (personal relations, familial relations, professional relations of different kinds). For example, it is not unknown for a doctor or a professor to have personal relations with a patient or a student. (A special role is played by the notion of a possibly distinguished personality [230] associated with a specific electronic alias [240]. The set of relations posited here is the counterpart of this notion at the level of personal interaction.)

For each relevant pair and each posited relation holding between them, we may associate a shared agenda: a mutually recognized set of tasks or obligations or benefits that they are mutually committed to; in addition, each member A of a relevant pair {A,B} may be associated with a private agenda—not shared and not necessarily mutually committed to—which directs, governs, or constraints actions and responses by A toward B.

Particular agenda items will in general have many specific particular properties. Items on the agenda may range from very general requirements ("share amusing pieces of information") to very specific tasks ("read and sign the 10-K form by tomorrow at noon"), and these vary greatly across different kinds of social relations. One of the virtues of abstraction is that these particulars may be ignored in modeling properties of the postulated agenda. The basic questions are:

How does a task get added to an agenda?
How does a task get removed from an agenda?

These basic questions generate a variety of subsidiary questions which may or may not arise in specific circumstances:

How are the specifications of a task negotiated in advance?
How is the addition of a task acknowledged by the parties concerned?
What intermediate status reports are involved and how are they initiated and responded to?
How is the completion/abandonment of a task communicated and acknowledged, so that the task is no longer regarded as part of the mutual agenda?

Figure 18:
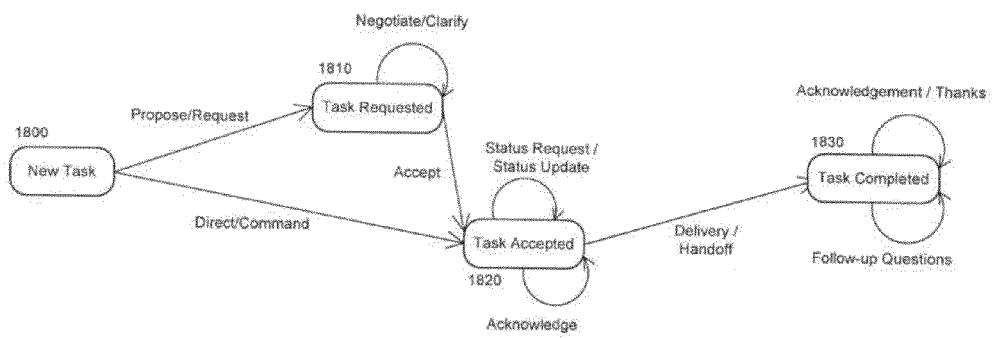
FIG. 18 is a state diagram of the pragmatic workflow model in accordance with an embodiment of the present disclosure.

This abstract workflow model corresponds to a simple finite state machine, illustrated in FIG. 18. The required flow through this machine is from an initial state representing a new task [1800] through an intermediate required state representing the addition of a task to the agenda [1810] to a final state representing the removal of the task from the agenda [1830].

All the subsidiary questions of the kind just discussed above correspond to loops around task request [1810], task acceptance [1820], or task completion [1830]. The loops around task request [1810] correspond to negotiations concerning the nature of the task. The loops around task acceptance [1820] correspond to communications [123] among the participants during the period that task is mutually recognized but not discharged. Loops around task completion [1830] correspond to acknowledgments and thanks and other later assessments.

A specific task can fall off the agenda in more than way, including but not limited to:

The task can be satisfactorily completed;
The task can be abandoned or die off (via a sunset clause, or . . . )

In some embodiments, the model of generic tasks (such as marriage vows) may never reach task acceptance [1820] or may involve linking sub-models representing the agendas of individual members of a pair. Mutually dependent situations of this kind may be modeled to a first approximation by finite state transducers (like a FSA, but with arcs labeled by pairs), where the first element of any pair represents the cause of the transition, and the second represents the value to one or the other party.

Actor Influence Analysis

This behavioral modeling component [445] allows the system to compute several measures of influence for a particular actor [220] by assessing the changes in behavior [205] of people around that actor [220] before, during, after a significant absence of some kind, both in terms of how completely their behavior returns to the norm after that period, and how quickly it does so.

In general, measuring the individual behavior [210] and collective behavior [215] of people around an actor [220] both before and after a period of absence or lack of interaction with the rest of the network is a very insightful measure of that actor's [220] influence level, because if the person is important enough then the behavior of the network will snap back to its prior behavior quickly—and completely—once the person has returned. Conversely, if the person's influence was fragile or not shared by the majority of people interacting with her, not only will the behavior in her neighborhood take much longer to go back to normal, but the new norm will also be significantly different from the former baseline behavior [260], with new connections created to third-parties, more erratic communication patterns, etc.

A period of absence can be due to whether vacation, business travel that causes the person to be largely out of touch, dealing with family issues, etc. In one embodiment these periods of absence are derived using a number of methods including but not limited to:

Data pulled from HR systems
Automatic out-of-the-office email replies
Detection of inactivity periods, for example using the very common statistical criterion that the number of events [100] originating from the actor is below the average over the baseline by at least k standard deviations, typically with k=3.

Every time a period of absence or inactivity has been detected, the system computes a divergence on the distribution of per-actor activities between a baseline period $P_1$ (e.g. sliding window of 1 year) and a period $P_2$ of inactivity (typically a small number of weeks) for the actor [220] which will be referred to as the subject in the following. The distributions are computed over all actors [220] having significantly interacted with the subject in one of these periods. Both for $P_1$ and $P_2$: we prune the elements in which the subject is involved (for $P_2$ this is to get rid of the residual activity, such as a long-running discussion [136] that was started in the presence of the subject). Pruning is done either by only removing individual events [100] involving the subject, or by removing all discussions [136] containing at least one such event [100].

Furthermore, any divergence metric can be used. In one embodiment the K–L divergence $H(P_1, P_2)-H(P_1)$ is used where H refers to the entropy of a distribution. In another embodiment the system uses the variation of information $H(P_1)+H(P_2)-2I(P_1, P_2)$ where $I(P_1, P_2)$ is the mutual information between $P_1$ and $P_2$. The divergence measured by this method constitutes an assessment of how the absence of the subject impacts her environment and her closest professional or social contacts.

The activity model used in this method is also entirely configurable. Activities taken into account in the default embodiment cover all types of communication channels [156], from which the system derives events [104] that are either individual communications [123] (i.e. random variables taking values such as "A emails B" or "A calls B") or entire discussions [136] (i.e. random variables taking a value such as "A emails B,C; B emails A").

An additional, closely related assessment of the subject's influence takes $P_1$ to be the period of inactivity and $P_2$ to be the same-duration period following the actor's return: by comparing it to the baseline behavior [260], this gives an indication of how completely and quickly the environment returns to normal. This is called the snapback effect exerted by the subject on the rest of the network. When taken together, these two metrics evaluate the importance of the subject: how badly others miss her when she is away, and how easily others get over her instead of returning to normal behavior once she is back.

Also, when evaluating influence, actors [220] such as managers whose sign-off is necessary to approve certain actions and events are excluded from consideration by the system. This is because such actors [220] will by definition impact the behavior of people reporting to them, without that causal relationship bearing any implication on their actual level of influence.

Detecting Textblocks Via N-Gram Transition Graphs

Textblocks are defined in U.S. Pat. No. 7,143,091: "Textblocks consist of the maximum contiguous sequence of sentences or sentence fragments which can be attributed to a single author. In certain cases, especially emails, a different author may interpose responses in the midst of a textblock. However, the textblock retains its core identity for as long as it remains recognizable."

Figure 19:
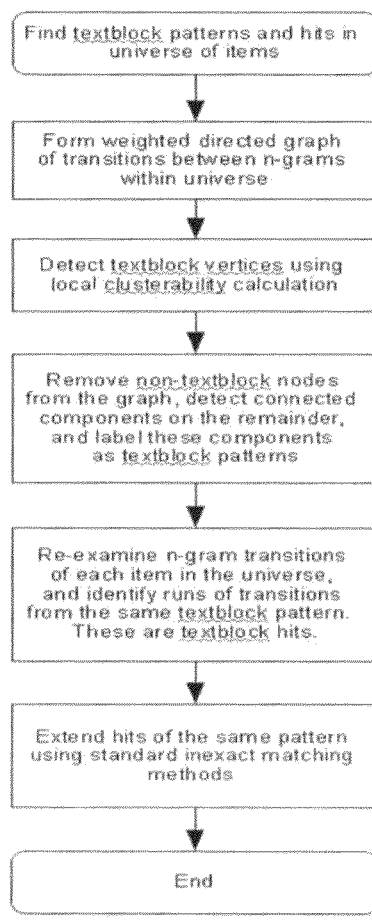
FIG. 19 is a flowchart showing a high-level process for detecting both textblock patterns and textblock hits in accordance with an embodiment of the present disclosure.

A method is also given there for detecting textblocks. That method has certain limitations in terms of both recall and memory footprint. The method described here is superior in both respects (see FIG. 19). This method is also amenable to continuous computation and hence provides the preferred embodiment for the textblock detection component [470]. The idea of this method is to find collections of text fragments in different text-containing items [122] which are similar enough to infer that they were duplicated from a single original item [122], and hence have a single author. We shall distinguish between an abstraction of such a collection of fragments, which we shall call a textblock pattern [124], and a particular fragment of text in a particular item, which we shall call a textblock hit [130].

Figure 20:
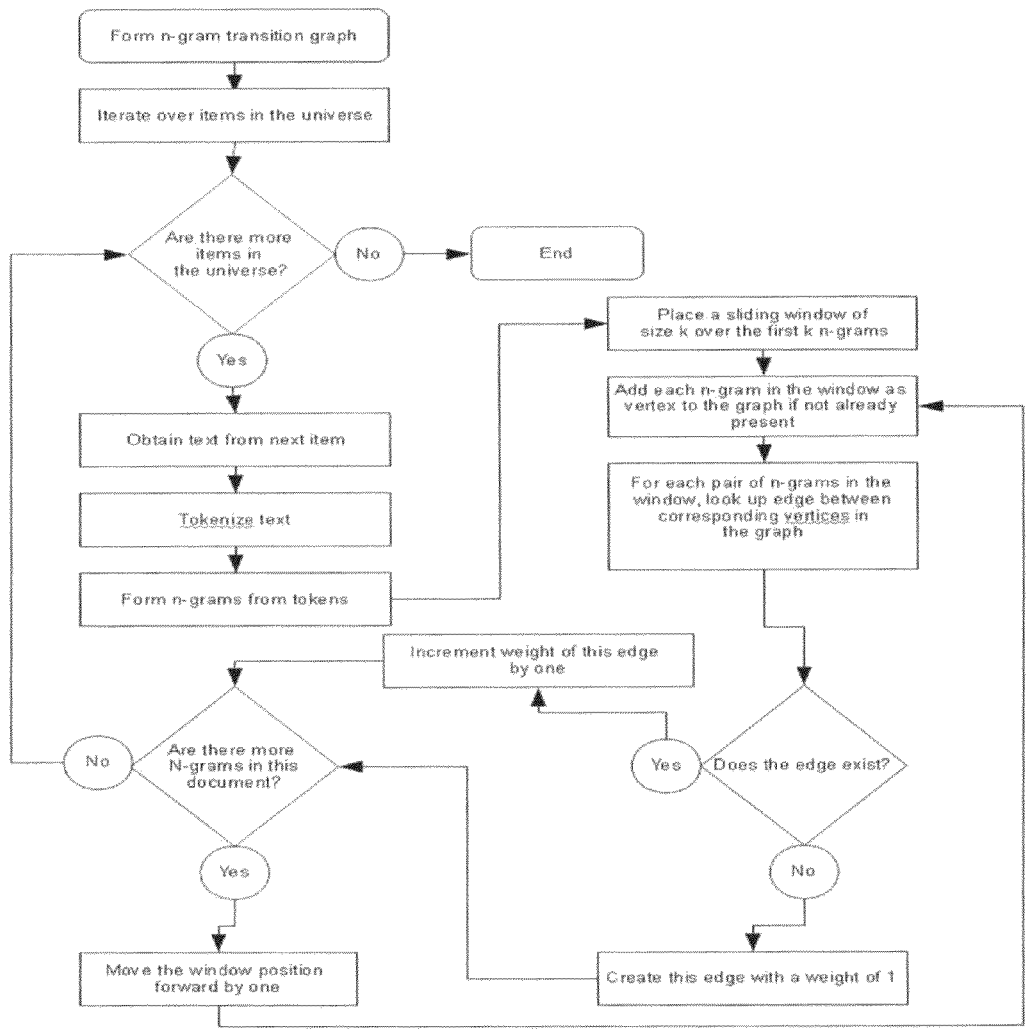
FIG. 20 is a flowchart showing the process for producing a textblock graph, i.e. a graph of transitions between n-grams in a sliding window of size k, in accordance with an embodiment of the present disclosure.

We begin by constructing a graph of n-gram [118] transitions within the universe of items [122] (see FIG. 20), also called a textblock graph [160]. For each item [122], examine its text one token [116] at a time. Form n-grams [118] of successive tokens [116] for some value of n that will remain constant throughout and which is small compared to the size of a typical item [122]. Successive n-grams [118] may overlap. For example, in the text "one two three four five", the 2-grams would be "one, two", "two, three", "three, four", and "four, five". Keep a sliding window of size k over the successive n-grams [118]. This window will initially contain the first k n-grams [118] in the document [162]. At each step, the window will be moved forward so that the first n-gram [118] in the window will be removed and the next n-gram [118] in the document [162] will be added to the end of the window.

We will produce a graph of transitions between n-grams [118] in this sliding window. Begin with an empty graph. Add each of the k n-grams [118] initially in the window as vertices to the graph. For each of the k*(k−1)/2 pairs of n-grams [118] in the sliding window, add a directed edge with weight 1 between the corresponding vertices, with the head corresponding to the n-gram [118] appearing first in the window, and the tail corresponding to the latter n-gram [118].

Each time the sliding window moves forward, an n-gram [118] is added to it. Add this n-gram [118] as a vertex to the graph if it was not already there. For each of the up to k−1 other n-grams [118] in the window, do a look-up for a directed, weighted edge in the graph pointing from that n-gram [118] to the one that was just added. If such an edge did not exist, add it to the graph and give it a weight of 1. If such an edge did exist, increase its weight by 1. In the example given above, if k=3, we would create, or increment the weight of, the following edges:
"one, two"→"two, three"
"one, two"→"three, four"
"two, three"→"three, four"
"two, three"→"four, five"
"three, four"→"four, five"

Continue in this way for each item [122] in the universe of items [122]. Textblock patterns [124] consist of tokens [116] that are used in roughly the same sequence over and over again, with some modification. This means that their n-grams [118] will be used in roughly the same order. To the extent that these n-grams [118] are not commonly used in other contexts, we expect to see a particular pattern in the local environment of each such n-gram [118] within the graph.

Figure 25:
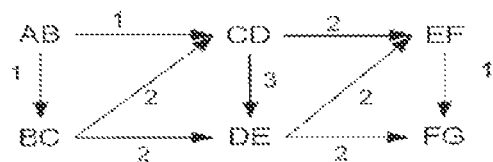
FIG. 25 is an illustration showing an example of how local clusterability is calculated in accordance with an embodiment of the present disclosure.

Consider the neighborhood N of an n-gram [118] p. That is, N contains all vertices which are connected to p by edges, as well as p itself. Let M be the maximum number of directed edges possible with both head and tail in N, excluding loops. Then $M=|N|*(|N|-1)$, where $|N|$ is the size of N. For each pair of vertices q and r in N, let w(q, r) be defined as:
w(q, r)=weight of the edge from q to r, if such an edge exists
w(q, r)=0, otherwise
Let W be max(w(q,r)) for all q, r in N. Define the local clusterability of p, LC(p), to be (see FIG. 25);
LC(p)=(sum of w(q, r) over all q, r in N)/(M*W)

LC(p) provides a measure of how evenly interconnected the neighborhood of p is, and as such is key to this algorithm for detecting textblocks. Now consider a relatively unique sequence of terms, such that its n-grams [118] are found within the universe of items [122] only within this sequence (although the sequence may be repeated in its entirety many times within the universe). Consider an n-gram [118] P that appears in the middle of this sequence. Then we expect that n-gram [118] P to be connected in the graph we are making to the k−1 n-grams [118] before it, and to the k−1 n-grams [118] after of it, and nothing else. N contains all the neighbors of P plus P itself, so $|N|=2(k-1)+1=2k-1$, and $M=(2k-1)*(2k-2)$. All edges in N will have the same weight, so w(q, r)=W for any q, r in N such that q and r share an edge, and 0 otherwise.

Now consider how many edges there will be in N. The edges that are within N (i.e. both the head and tail of the edges are in N) are precisely those created by the k positions of the sliding window such that the window contains P. As the sliding window moves along, P goes from being the last item [122] in the window to being the first. In the window's first such position, every n-gram [118] is connected by one edge to every other, so this window contains k*(k−1)/2 edges. Whenever the window moves forward, a new n-gram [118] is added and is connected to every n-gram [118] before it in the window by one edge, so this adds k−1 more edges (all other edges in this window were already present in the previous window). The window moves forward k−1 times (once for each of the k positions under consideration except the initial position), so the total number of edges in N is $k*(k-1)/2+(k-1)^2$. Thus:

$$LC(P) = W * [k*(k-1)/2 + (k-1)^2] / [(2k-1)*(2k-2)*W]$$

$$= [k*(k-1)/2 + (k-1)^2] / [(2k-1)*(2k-2)]$$

So the expected local clusterability depends only on the size of the sliding window.

The sequence of tokens [116] we have considered is a type of textblock-exactly the same sequence of tokens, which form n-grams [118] that are not used anyplace else. In practice, we are interested in finding cases where the sequence is sometimes different, additional tokens [116] are added or removed, and/or tokens [116] are re-ordered. In this case the graph connecting tokens [116] in the textblock will look similar to what we have considered, but the edges will not all have exactly the same weight, and there may be additional edges with low weights. This will affect local clusterability by an amount roughly proportional to how large such changes are. Likewise, an n-gram [118] in a textblock may appear in more than one context within the universe of items [122]. If it only appears once within the textblock pattern [124] and appears in that pattern much more often than in other contexts, its local clusterability will be close to the expected value calculated above. Thus, most n-grams [118] within the textblock will have LC close to the expected value.

Figure 21:
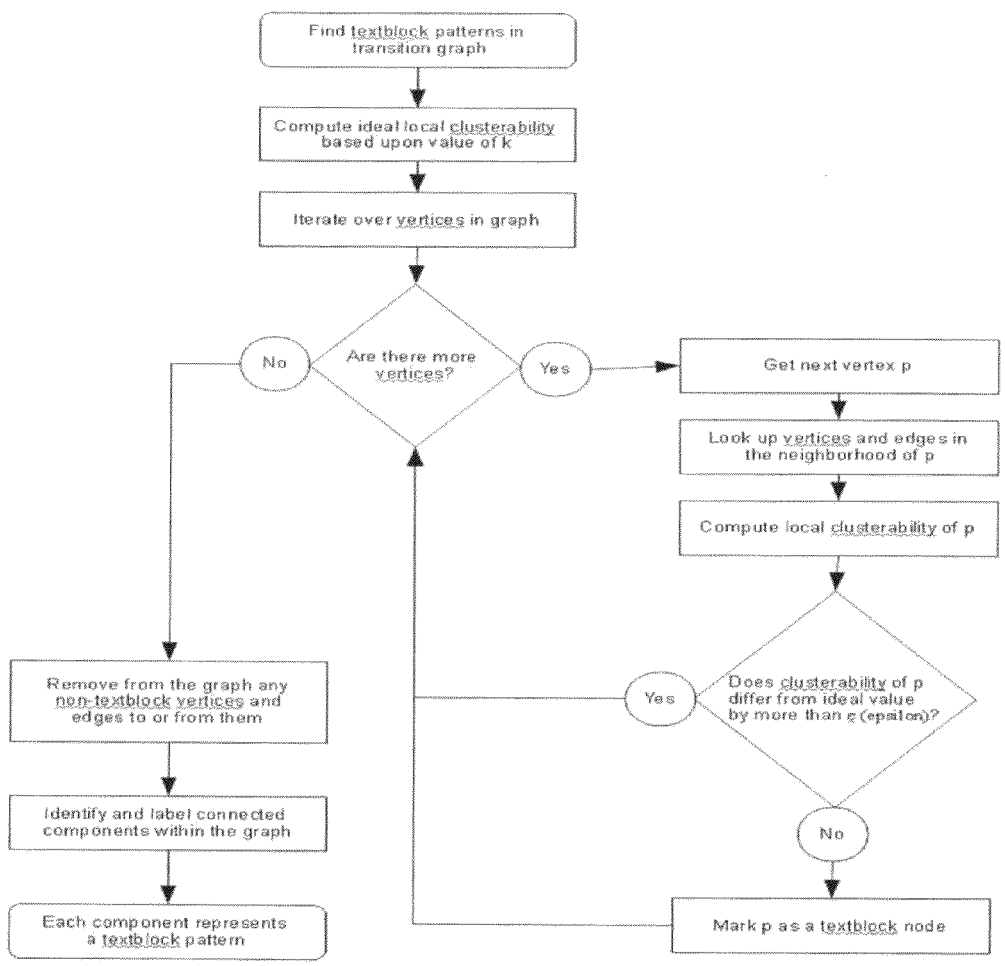
FIG. 21 is a flowchart showing the process for isolating textblock patterns from the textblock graph in accordance with an embodiment of the present disclosure.

We obtain textblock patterns [124] from the transition graph [160] as follows (see FIG. 21). Examine the vertices of the graph [160] one at a time. For each vertex, compute its local clusterability. If this value differs from the expected value by less than some pre-chosen threshold ϵ, mark the vertex as a textblock-vertex. When this is done, remove all vertices that are not textblock-vertices. Now find and label the connected components within the remaining graph [160]. Each of these connected components represents a textblock pattern [124].

The most time-consuming part of this algorithm is the local clusterability calculation. Because it may require comparing every pair of items [122] in a neighborhood N, it's running time may be $O(|N|^2)$. Since this must be done for every vertex, the running time of this calculation would be $O(n^3)$, where n is the number of vertices in the graph [160], if the graph [160] were nearly completely connected. (However, in common natural language prose, few n-grams [118] will be this highly connected.) In one embodiment, the algorithm handles this problem by not considering vertices for which |N| is greater than some pre-chosen threshold. The most connected n-grams [118] are unlikely to be useful in detecting textblocks, so this has little effect on the accuracy of this method. The rest of the algorithm described so far runs in time that grows linearly with the total summed length of the items in the universe, provided that all graph look-up and modification steps run in constant time. This is possible if the graph [160] is small enough to fit in constant-access memory.

This method for finding patterns has two phases-a first phase in which the transition graph [160] is built, and a second phase in which the transition graph [160] is pruned and connected components and identified. The first phase considers only one item [122] at a time and hence can be performed against a pseudo-infinite stream of text-containing items [122] in a continuous monitoring context. The second phase cannot. In one embodiment, the graph [160] is periodically cloned so that a separate process can perform the second phase and update the set of textblock patterns [124]. While this pruning occurs, the original process can continue to add new incoming items [122] to the graph [160]. In a second embodiment, textblock patterns [124] are detected within overlapping time periods. For instance, textblock patterns [124] might be detected within bins of two months each, with each bin overlapping the bin after it by one month. In a third embodiment, patterns [124] are kept for some pre-determined amount of time and then discarded. In a fourth embodiment, patterns are discarded after some amount of time following when the most recent hit for that pattern was detected.

Figure 22:
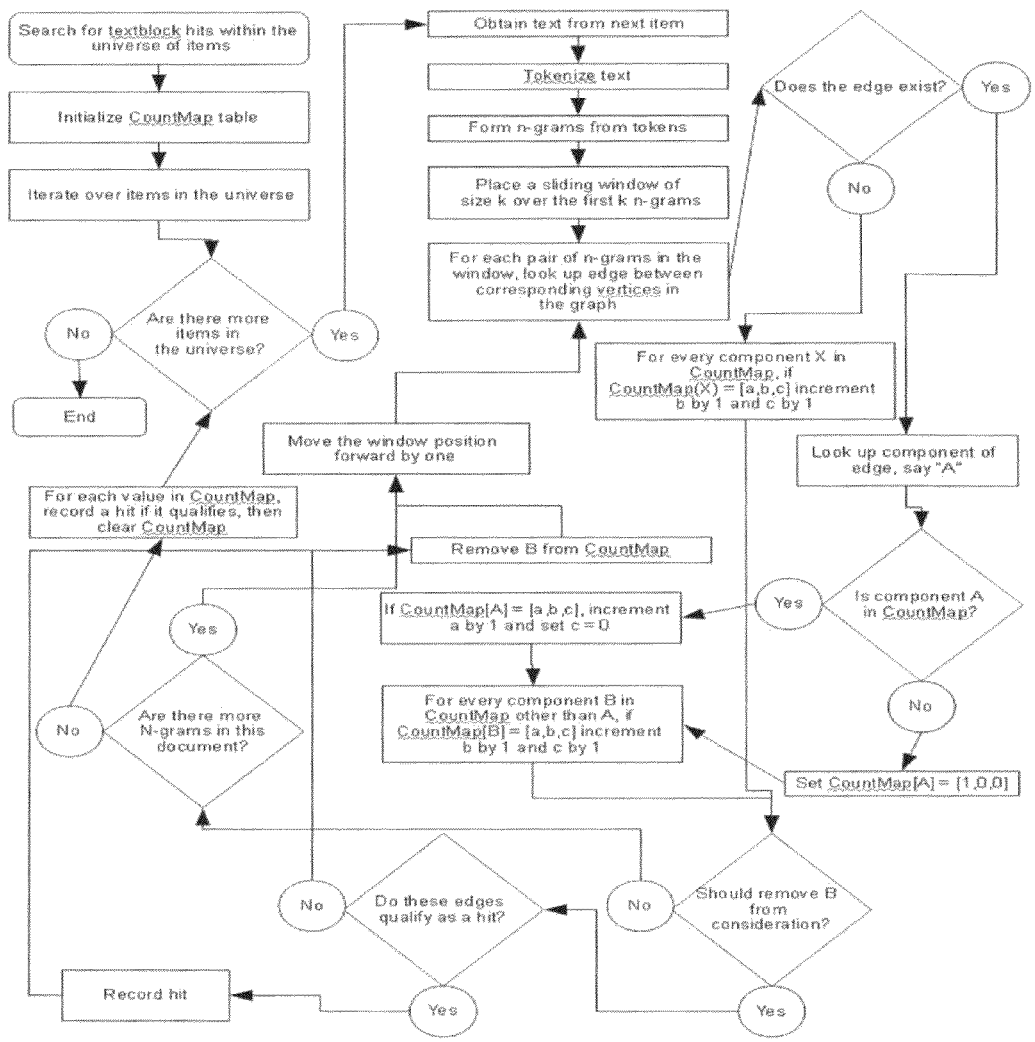
FIG. 22 is a flowchart showing the process for finding textblock hits in items within the universe in accordance with an embodiment of the present disclosure.

We find textblock hits [130] for textblock patterns [124] in an item [122] as follows (see FIG. 22). Begin by creating an initially empty lookup-table "CountMap". This table will have as keys the IDs of textblock patterns [124] currently being considered as potential matches, and maps each such ID "A" to a tuple CountMap(A)=[a, b, c], where "a" is the number of edges found which might be in "A," "b" is the number of non-matching edges, and "c" is the number of trailing non-matching edges. Now proceed in a manner similar to that used to find the patterns [124]. Examine the tokens [116] of the item [122] in order. Run a sliding window of size k over the resulting n-grams [118], using the same values of n and k used to find the patterns [124]. For each transition edge E, do a lookup in the graph [160] to determine if the edge is part of a pattern [124]. If the edge is found in the graph [160] and has pattern [124] ID A, and if there is no current entry CountMap(A), then set CountMap(A)=[1, 0, 0]. If CountMap (A) already has a value [a, b, c], increment a by 1 and set c to 0 For every pattern [124] ID X in CountMap where X does not equal A (or, if the edge E was not in a pattern [124], then for every pattern ID in CountMap), look up CountMap(X)=[a, b, c]. First increment both b and c each by 1, then decide whether to drop this pattern [124] from consideration. In one embodiment, we drop from consideration any pattern [124] for which c is above a pre-set threshold. Whenever a pattern [124] drops from consideration, first determine whether the edges found so far constitute a hit [130], then remove the entry for that pattern [124] from CountMap. Likewise, when the end of the item [122] is found, consider whether the edges found so far constitute a match for each value in CountMap, then clear CountMap. In another embodiment, we determine whether edges found constitute a hit [130] using pre-chosen thresholds for recall (were enough edges from the pattern [124] found in the item [122]?) and precision (were enough of the edges from the item [122] in the pattern [124]?).

A hit [130] found in this manner will not constitute an entire textblock under the definition given above, but rather will constitute a portion of a textblock. In general, textblocks may be broken into pieces by n-grams [118] that are used in many contexts, or by the presence of even smaller segments which are also repeated by themselves. Also, at the beginning and end of the textblock n-grams [118] may not have the clusterability predicted here. But once we have found a set of items [122] containing hits [130] of a common textblock pattern [124], we can expand the hits [130] using standard methods for inexact string matching which would not be feasible on the entire universe. These methods may include dynamic programming or suffix tree construction.

It should be obvious to a practitioner skilled in the art that, assuming the computer running this algorithm has sufficient constant-access memory to allow constant time look-ups in the transition graph [160], the hit [130] finding algorithm will run in time linear in the length of the text of the item [122] so examined. Hence, finding hits [130] in the universe of items will run in time linear to the total length of all items [122] in the universe.

As the method for finding textblock hits [130] considers only one text-containing item [122] at a time and compares it against a static graph, it can be used in a continuous monitoring context against a pseudo-infinite stream of items [122].

Improvements

Figure 26:
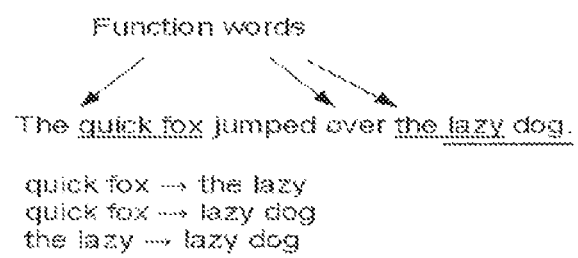
FIG. 26 is an illustration showing a method for limiting the size of the graph to be examined by only considering n-grams following function words in accordance with an embodiment of the present disclosure.
Figure 27:
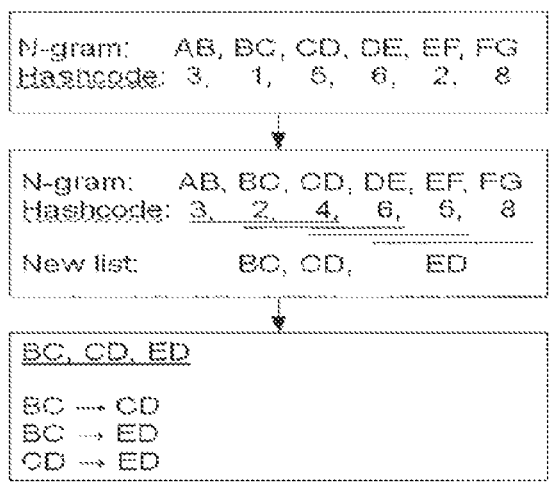
FIG. 27 is an illustration showing a method for limiting the size of the graph to be examined by winnowing the list of n-grams to be considered in accordance with an embodiment of the present disclosure.

The textblock pattern [124] detection portion of this method will run poorly if the transition graph [160] is so large that it cannot be held in constant-access memory. In some embodiments, only a subset of transitions will be recorded as edges so as to reduce the total size of the graph [160]. In one embodiment a list of functional words appropriate to the language of the text is used (see FIG. 26). In English, for example, prepositions, articles, and pronouns might be used. Only n-grams [118] immediately following such functional words are placed in the sliding window. In another embodiment, the full list of n-grams [118] is produced, but is then reduced to a smaller list using a winnowing method similar to that described in [Schleimer 2003] (see FIG. 27). N-grams [118] are hashed and the hashes are placed in a sliding window. The smallest hash at any given time will be noted, and the n-gram [118] it came from will be placed in the derived list. If, for a given window position, the n-gram [118] with the smallest hash is the same as it was in the last window position, then it is not added again. From the derived list, transitions will be recorded as edges.

Figure 23:
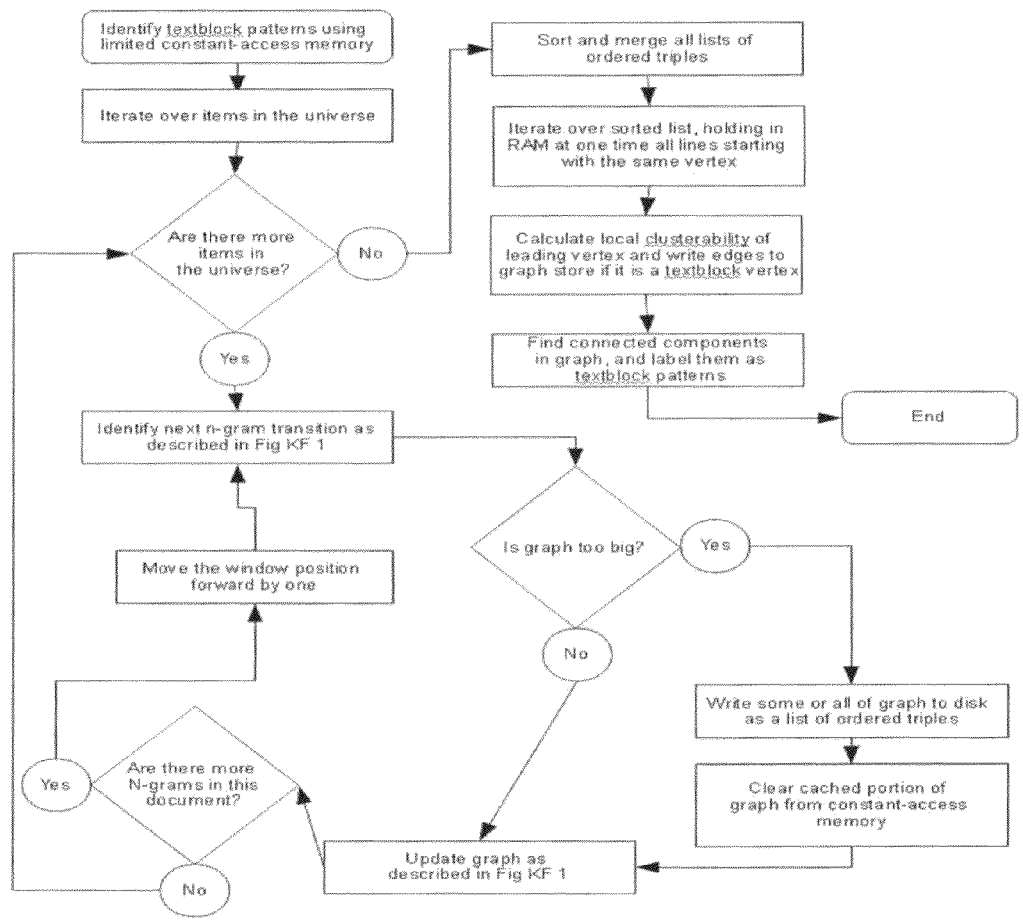
FIG. 23 is a flowchart showing an alternate process for finding textblock patterns which uses bounded constant-access memory in accordance with an embodiment of the present disclosure.
Figure 24:
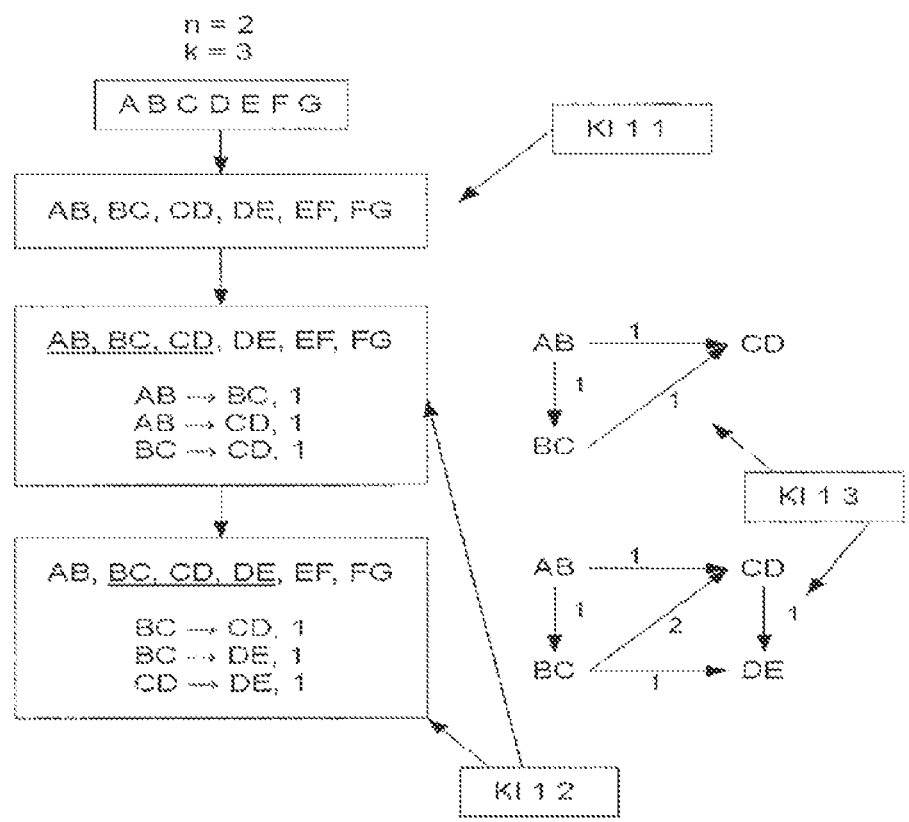
FIG. 24 is an illustration showing how n-gram transition edges are added to the textblock graph based upon a particular series of tokens in accordance with an embodiment of the present disclosure.

A modification of this algorithm will perform well even when the transition graph [160] is too large to fit in random-access memory (see FIG. 23). Proceed as before, but place a maximum size on how large the transition graph [160] is allowed to grow. In one embodiment, when the graph [160] reaches this size, the entire graph [160] is written to disk (or some other slower portion of the memory hierarchy) and the constant-access memory structure is emptied. In another embodiment, vertices in the graph [160] are held in memory in a Least-Recently Used (LRU) cache. When a vertex is ejected from the cache, edges within its neighborhood are written to disk (or other form of slower memory) and then purged from constant-access memory. In any embodiment the portion written to disk (or slower memory) is recorded as ordered triples of n-grams [118] connected by edges. For example, in the text "one two three four five", using 1-grams we would record:

"one, two, three"
"one, two, four"
"one, two, five"
"one, three, four"
"one, three, five"
"one, four, five"
"two, three, four"
"two, three, five"
"two, four, five"
"three, four, five"

These ordered triples are written to a file or similar storage structure, one per line: followed by a weight, which will initially be one. Periodically, this file can be compressed. To do so, sort the file. Lines containing the same triplet will now be adjacent. In another pass over the file, replace n lines containing the same triplet with 1 line containing their summed total weight. This process can be parallelized by having multiple processors or different computers examine different sets of items [122], where such items [122] partition the universe of items [122], and each processor will write to its own file. When this process is done, the various files can be joined using the merge-sort algorithm, and lines containing the same triplet can be combined. Sorting and merging files on disk is a well-studied problem, and can generally be done in running time that is O(n*log(n)), where n is the total length of the files involved. Hence, the entire process so far will run in time O(n*log(n)), where n is the total length of all items [122] in the universe.

Once the final list has been created, iterate over it from the beginning. Because the list is sorted, for any n-gram [118] P, all lines containing P in the first position will be adjacent in the list. Thus we can reconstruct the approximate neighborhood of each vertex, and calculate its local clusterability, one vertex at a time, without ever holding more than one neighborhood in constant-access memory at a time, and without doing random-access disk lookups. Some information about a neighborhood may be lost because P's neighbors are found adjacent in a window in which P itself is not found, but in general this will not unduly affect the results.

Information Dissemination Profiles

The system creates and continuously maintains content re-use profiles that characterize the extent to which individual actors [220] produce a certain category of information, how they modify such information, and how they consume it.

Valuable information can be defined in any number of ways. In the default embodiment, valuable content is generally defined as the result of filtering all items [122] collected and processed by ontology classifiers [150] associated to business-relevant topics [144]. Alternatively and in a more specific corporate application scenario within a corporate environment, valuable content is defined as intellectual property assets such as research artifacts or software code.

The system relies on continuous textblock detection as described in this invention. Two libraries of textblocks are maintained: a global library of textblocks and a library of recently disseminated textblocks.

To build and maintain the global library of textblocks, the algorithm described previously is run over a large dataset, such as all historical valuable data or all valuable data in the past n years. Once the textblock patterns [124] have been discovered, all textblock hits [130] (which represent usage of that content) are scanned and sorted by date, then used as the basis for building content-relaying events. Each content-relaying event is a (Textblock pattern, Date, Sender, Recipient) tuple. One such tuple is created for each (Sender, Recipient) pair associated to the item [122] in which the textblock hit [130] was found—by definition there can be one or more such pairs per item [122]. The date of a content re-use event is defined as the representative date of the item [122] in which the textblock hit [130] occurs. In one embodiment of the present disclosure, the representative date is the sent date of an electronic communication [123] (such as an email message or an IM turn), the last modification date of an item [122] collected from a file (or from a database table), etc.

The system will then compute scores, called create-score, consume-score, and relay-score, for each actor [220]. In addition, a list of all received textblock patterns [124] is maintained for each actor [220]. To do this, it scans all content re-use events in date-ascending order.

The first time a given textblock pattern [124] is encountered during this scan, the create-score of the sender is updated. In one embodiment of the present disclosure, this update consists of a unit increment of the create-score. In another embodiment, it is an increasing function of the textblock pattern [124] length. In yet another embodiment, it is a decreasing function of the number of textblock hits [130] found for the pattern [124] throughout the whole dataset.

For every re-use event, the receive-score of the recipient is updated (the update function is similar to the update of the send-score described previously), the textblock pattern [124] is added to the list of received patterns [124] for the recipient if it was not already present, and if the textblock pattern [124] belonged to the list of received patterns [124] for the sender then the sender's relay-score is updated. In one embodiment of the present disclosure, the update of the relay-score consists of a unit increment. In another embodiment, it is proportional to the ratio of the textblock hit [130] length over the textblock pattern [124] length. In a third embodiment, the list of received patterns [124] is augmented to keep track of the token [116] range of each received pattern [124] that has also been relayed, and the update consists of adding the ratio of the textblock pattern [124] length that was not covered (in other words, this differs from the previous embodiment in that information relayed multiple times is only counted once).

The present invention is not restricted to a specific dissemination profile calculation method. In the default embodiment of the system, the scores defined above simply measure the level and type of interaction among actors [220] by counting items exchanged through communication channels [156] or loose documents [162]. In another embodiment, they also take into account how often that content is being viewed, downloaded or copied, and, by contrast, which content is simply ignored. The resulting profiles are much more accurate and more difficult to game than simple counts in large enterprise networks, where actors [220] who tend to send superfluous content in large quantities are often not contributing to the overall productivity of that organization. In yet another embodiment, scores are also a function of the actual roles and responsibilities of actors [220] as derived from example from their involvement in discussions [136] that represent workflow processes [128], including but not limited to how often they initiate, close, or contribute to discussions [136], whether they are decision-makers (as defined by the measure of that trait [295] in the behavioral model [200]), whether they review work products, etc.

Possible enterprise application scenarios of information dissemination profiling include but are not limited to.

Determination of who to promote, who to demote, or lay off;

Assessment of the impact of an organizational change, such as a merger or acquisition or a major restructuring;

More generally, the rewarding of employees who are collaborative, and who focus on what is good for the overall organization rather than for their own promotion or their particular business unit.

Finally, the system ranks each actor [220] along a number of information dissemination profiles based on the scores [285] that have just been computed. In one embodiment of the present disclosure, information dissemination profiles are:

Creator, which represents an actor's [220] tendency to create valuable content, i.e. content that is re-used by others in meaningful ways;

Curator, which indicates to what extent the actor [220] spots valuable information then relays part or all of it across the network, potentially modifying it along the way:

Consumer, which quantifies the volume of valuable information which is simply received by the actor [220].

The ranking [275] mechanism can be configured by the user. By default, actors 1220 are ranked as follows: creators are ranked by decreasing their sender-score, consumers are ranked by decreasing their receive-score, and curators are ranked by decreasing their relay-score.

Once the system has been initialized by building the global library of textblocks, it starts maintaining a library of recently disseminated textblocks, which allows analysis of trends in dissemination behaviors.

In one embodiment of the invention, a library of recently disseminated textblocks is built at regular intervals (for example, on a monthly basis). The list of content re-use events is computed similarly to the global library construction, except that the create-score of the sender of a re-use event is updated only when the textblock pattern [124] is encountered for the first time in this scan and it is not present in the global library. If either condition is not satisfied, then the sender's relay-score is updated as in the global library construction. The result of this scan over re-use events is a ranking of actors [220] on the corresponding time period.

Figure 28:
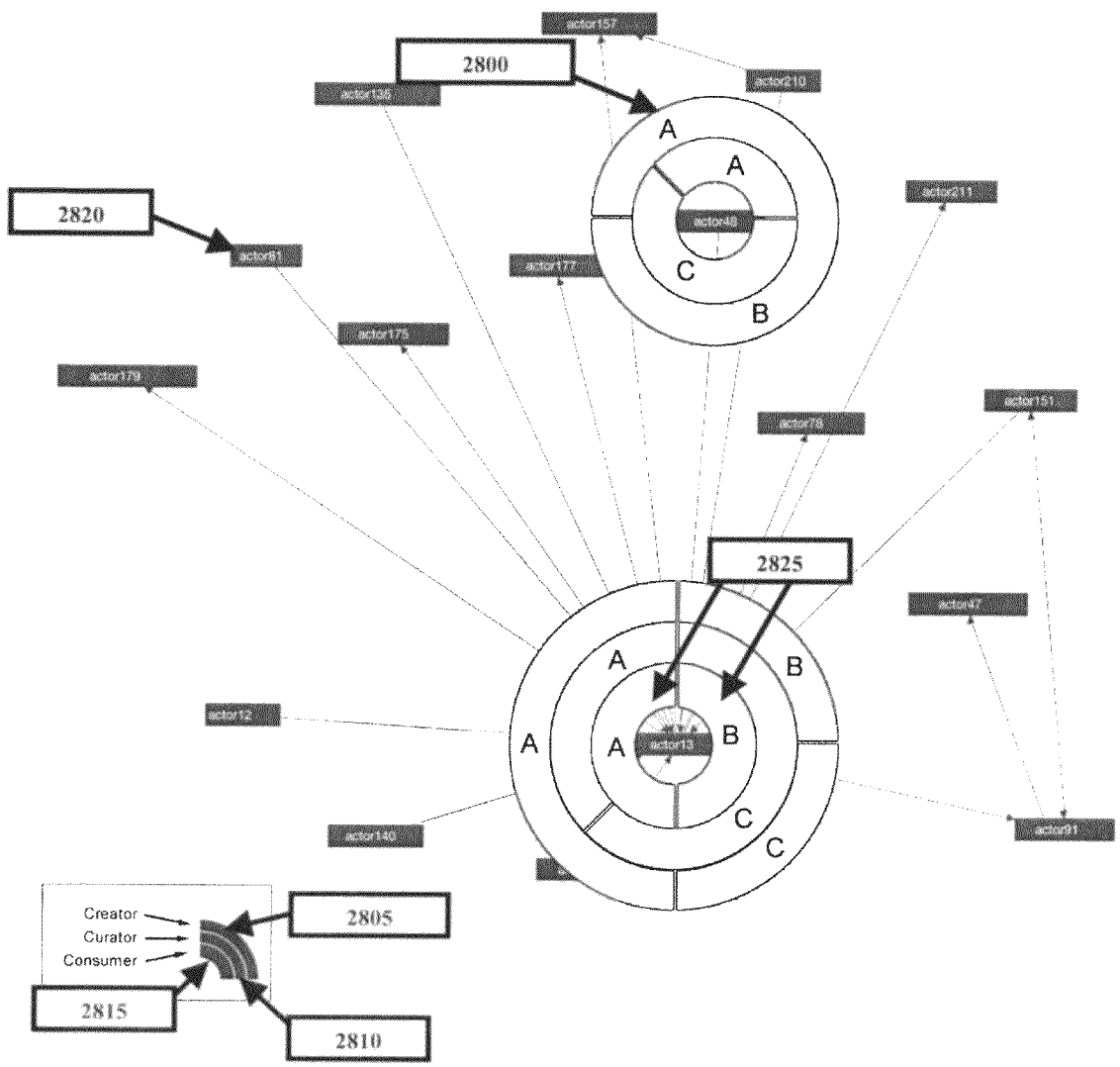
FIG. 28 is a graph of information dissemination profiles computed by the system in accordance with an embodiment of the present disclosure.

FIG. 28 shows a graph visualization of information dissemination profiles provided by the system.

This visualization shows actors [220] as nodes in the graph, and dissemination relationships as edges. The identity [2820] (potentially anonymized depending on the anonymization scheme [340] in place) of the actor [220] decorates each node. Around a given actor [220], zero, one or more annuli [2800] (also called donuts) are drawn to represent that actor's [220] dissemination profiles computed as previously described. Some nodes, such as [2820], do not have any circle because they do not significantly contribute to dissemination of information deemed as valuable in the particular context of that visualization (i.e. they are not involved in items [122] filtered during input data selection [360]).

The width of annuli [2800] (i.e. the difference between their external and internal radii) drawn around an actor denotes the relative amount of information respectively produced, received, or relayed.

Color codes are used to distinguish profiles. In the default embodiment, blue circles indicate creators [2805], green circles indicate curators [2810], and red circles indicate consumers [2815]. In addition, a saturation level is used as a visual indicator of the content's value or relevance: the darker the color, the more valuable the information created, relayed, or consumed. This provides an additional dimension to the dissemination profile established by the system. For example, the darker the blue circle around an actor [220], the more likely that actor [220] is to be a thought leader; the darker a green circle around an actor [220], the more actively that actor [220] is contributing to spreading knowledge or expertise throughout the organization.

Optionally, valuable information can be further categorized by the system using any type of categorization component [146]. In an intelligence application scenario for example, a set of categories would be classification levels, thus adding another dimension to the visualization. Each annulus [2800] is split into one or more annular sectors [2825], with the angle of a sector proportional to the relative volume of the corresponding category found in that actor's [220] dissemination profile. For instance in FIG. 27, the actor identified as "actor 13" creates significant volumes of information categorized as A or B [2825] in roughly equal proportions, but produces comparatively little if any information categorized as C.

The evolution of rankings [275] over time can also be visualized in an animated variant of the graph of information dissemination profiles graph described previously.

Behavioral Profiles

The behavioral modeling component [445] leverages the output of the other components in the processing and analysis layer [402] to establish a behavioral model [200] which is the core model from which a behavioral norm is determined and anomalies are detected by the anomaly detection component [450] based among other things on deviations from that norm.

To build that behavioral model [200], the present disclosure defines the concept of an individual behavior profile, which can be used for different purposes, including but not limited to the following.

First, an individual behavior profile is useful in and of itself to show a behavioral portrait of the person (whether a snapshot of assessed behavior [205] over a recent period of time, or a baseline behavior [260] computed over a decade), while letting a human analyst derive any conclusions on his own. For example, certain organizations may want to investigate any actor [220] who has been deemed to possess an inflated ego and also appears to exhibit a low level of satisfaction with respect to his job.

Second, an individual behavior [210] can be leveraged to analyze changes over time in the individual's behavior, in order to derive a level of associated risk or alternatively to produce anomalies [270] that should be investigated further. For example, someone who isolates himself from the rest of the organization (whether socially, professionally, or in both respects) over a period of time has a situation worth investigating.

Third, an individual behavior [210] can be used to contrast the individual's behavior with her peers' behavior in order to yield another kind of assessment of anomalous behavior as with changes over time. For example, someone whose level of stress increases considerably more than his co-workers' stress is a significant anomaly, much more so than a collective increase in stress levels which might be imputable to internal tensions and difficulties or to exogenous circumstances.

Personality Archetypes

The primary function accomplished by the construction and maintenance of the behavioral model [200] in the present invention is to map each important actor [220] in the electronic dataset to one or more individual personality types. Note that these personality types can also be called archetypes since they are a necessarily simplified model of any real human personality, in that the more complex traits have been omitted while emphasizing other traits more relevant to the particular scenario, for example psychopathological traits.

An actor [220] that matches at least one of these archetypes would typically be flagged for investigation if for example the corresponding archetype(s) suggest a level of present or future insider threat, where an insider threat is defined as a series of malevolent or unintentional actions by a person trusted by the organization with access to sensitive or valuable information and/or assets.

In particular, the behavioral model [200] can provide evidence suggesting that the individual in question is a malicious insider. This covers three main types of situations described below, each of which presents a significant threat to the organization if it goes undetected until irreversible malicious acts are committed, unless a system such as the one described in this invention flags those individuals by raising alerts [305] based on the established behavioral model [200].

- A first type of malicious insider is an individual starting to work for the organization with the intention of committing malicious actions, but undetected until now.
- A second type of malicious insider is an individual starting with good intentions, being turned around by another individual or another organization for a variety of reasons (typically a mixture of greed, ideology, and other internal or external conflicts)
- A third type of malicious insider that the behavioral model [200] helps to detect is an individual with psychopathological tendencies or other predispositions to commit such malicious acts in the future. Such an individual may have been allowed to enter the organization because he or she was not filtered out in the initial recruiting process, or who developed those tendencies later.

The set of personality archetypes is completely configurable, to allow for either a very generally applicable model of human personality, or a custom model more targeted toward a specific organization.

In one embodiment, the set of personality archetypes represents the Big Five factors, which are a scientifically validated definition of human personality along five broad domains: Extraversion, Agreeableness, Conscientiousness, Neuroticism, and Openness. The advantage of such a generic model, besides lending itself to cross-validation of results produced by the present invention and by another personality assessment scheme, is that it does not assume a unique categorical attribute to define an individual personality, since the Big Five factors are modeled as 5 numerical features (generally expressed as a percentile value). Thus for example, by selecting the two factors Neuroticism and Agreeableness, the system provides a picture of actors [220] prone to anger control issues.

In another embodiment, the set of personality archetypes is defined to represent the main behavioral risk factors present in any business organization, and are as follows:

Personal dissatisfaction: this essentially consists of self-esteem issues, such as the actor [220] not living in harmony with reality and experiencing conflicts about himself or herself intrinsically (as opposed for instance to physical appearance)

Professional dissatisfaction: this archetype is similar to personal satisfaction issues but pertains to the actor's [220] Job and overall work life as opposed to her personal life Negativity: this archetype corresponds to the actor [220] expressing repeatedly high levels of negative sentiment and showing durable signs of physical, mental, or emotional tension Sociability issues: this archetype corresponds to the actor [220] avoiding almost any interaction (or interacting very poorly) with other individual actors [220] or groups [225], thereby establishing no personal relationships or failing to sustain them.

Behavioral Traits

The behavioral model [200] involved in the present invention relies on the assessment of the presence and intensity of a number of behavioral and personality traits [295] for every individual actor [220] or group [225] for which a sufficient volume of data has been processed and analyzed. Each personality type—or archetype—as described previously is then detectable by the presence of behavior traits that are associated to such a personality. In the default embodiment of the invention, each behavioral trait is associated to a positive or negative correlation with each archetype based on empirical and/or theoretical data: for example, when using the Big Five factors as personality archetypes, undervaluation is a behavioral trait that is measured by the system as positively correlated to the Neuroticism factor; once all behavioral traits have been accounted for, numerical values are available for each individual along each factor—from which percentile values can further be deduced using a reference sample appropriate to the scenario at hand.

Note that a behavioral trait [295] might correlate to several archetypes; in some cases it might even correlate positively to an archetype and negatively to another. For instance, egocentric personalities are characterized (among other things) by a lack of empathy whereas influenceable personalities can be manipulated by others using their empathy (either towards the manipulator or a third party in case the manipulator resorts to coercion). In other words, the model assumes that each pair of random variables composed of a behavioral trait [295] and a personality type shows either no correlation, a positive correlation, or a negative correlation. In one embodiment, all such correlations are assumed to be linear correlations in the sense that actors [220] are scored along a personality type using a weighted sum (with positive or negative coefficients) over all behavioral traits [295] for which a score [285] has been computed.

The rest of this section lists a number of behavioral traits [295] provided by the default embodiment of this invention. This list is not limitative, and a key characteristic of this invention is to support augmenting the anomaly detection mechanism with any behavioral trait [295] that can be measured for a given actor [220]. For each trait, a brief explanation is given of how to score an actor [220] along that trait [295] in one embodiment among all possible embodiments; essentially each trait [295] can be measured along a number of vectors either directly observable in the data or derived during processing or post-processing by the system. For clarity, the behavioral traits [295] supported by the system are broken down into broad categories: in this default embodiment, the categories are job performance, job satisfaction, perception by peers, communication patterns, and character traits.

Traits Related to Job Performance

Job performance traits correspond to professional achievements and work habits, but also a measure of reliability, i.e. how well the actor [220] performs her job. The rest of this section describes such traits [295] that can be measured in the default embodiment of this invention.

Disengagement

Disengagement measures the actor's [220] involvement in various professional responsibilities.

In the default embodiment of the Invention, an actor's [220] disengagement is measured by first filtering discussions

[136] computed by the system to retain those that involve the actor [220] as a primary participant, are business-relevant, and optionally by filtering according to topics addressed in the elements of those discussions [136]. Then the system computes a number of behavioral metrics [290] including but not limited to:

The lengths of those discussions [136] either over time or with the discussions [136] involving the actor's [220] peers, Their frequency over time.

The actor's [220] level of participation. The level of participation can be measured using the results of a tagging subsystem, for example pragmatic tags [172]: in one embodiment, this is computed as A−U/T where A is the number of requests replied to by the actor [220] (by sending a work product or any relevant answer), U=R−A the number of requests left unanswered, R the total number of requests sent to the actor [220] (for example request for work product, for feedback, etc.), and T the total number of communications [123] received and sent by the actor [220].

In the default embodiment, the system lets a user visualize patterns of disengagement for a given actor [220] by using the sequence viewer described in this invention to show discussions [136] involving that actor [220].

Stability

Stability measures the regularity and stability in the distribution of time and effort for a given actor [220] across workflow processes [128] such as business workflows and activities.

In one embodiment, stability is measured using periodic patterns [126] derived by the periodic patterns detection component [405]; both a high frequency and an increasing frequency of gaps and disturbances in the business-relevant periodic patterns [126] involving the actor [220] denote an unstable behavior.

In the default embodiment: the system lets a user visualize patterns of stability for a given actor [220] by using the gap viewer described in this invention to show periodic patterns [126] involving that actor.

Delegation

This behavioral trait [295] assesses how the actor [220] delegates professional tasks and responsibilities.

In one embodiment, the level of delegation for a given actor [220] is measured as the centrality measure in the graph of instruction relaying (as defined in U.S. Pat. No. 7,143,091). Optionally, the graph can be filtered to only retain explicitly actionable instructions, such as those accompanied by an attached email or a list of tasks, which provide a more accurate reflection of work delegation than the transmission of more vague, non-directly actionable instructions, or mere forwards.

The system allows the user to efficiently visualize delegation patterns: either when an anomaly [270] has been flagged, or on-demand by the means of a particular type of animated actor graph [471].

Diligence

This behavioral trait [295] assesses the actors [220] ability to respect deadlines and to complete tasks delegated to her.

Measurements of an actor's [220] diligence include, but are not limited to the level of regularity in periodic sequences [132] originating from that actor [220], such as the submission of reports following a regularly scheduled meeting, or the frequency of indicators found in the analyzed data that the actor [220] was late or absent from important meetings without a valid reason being found for that absence or lateness.

Discipline

This behavioral trait [295] assesses the level of discipline shown by an actor [220] in the workplace, as well as her respect for procedures and hierarchy.

Measures of an actor's [220] level of discipline include but are not limited to:

Degree of absenteeism or unusual work schedules, as measured, for example, from a data source providing keycard access logs;

Explicit disregard for authority, as measured, for example, from applying the appropriate ontology classifiers [150] to messages sent by the actor [220] but also messages about the actor [220], such as language used by other people and suggesting that the subject is "dragging his feet", or that he should receive a warning;

Non-compliance with internal policies, as measured, for example, from the output produced by a compliance system communicating with the present invention.

Job Performance

In the default embodiment of the present invention, two types of definitions are combined for assessing an actors [220] job performance: an objective definition and a subjective definition.

Objective performance is assessed based on criteria including but not limited to production of high-quality content (i.e. frequently and broadly re-used in content authored by other actors [220]), or the dominant archetype taken by the actor [220] using role assessment (e.g. leader who frequently initiates discussions [136] vs. follower who passively observes discussions [136]).

Subjective performance is assessed based on criteria including but not limited to results of performance review (as directly recorded in numerical values in an HR system or as a polarity value evaluated from linguistic analysis of those reviews' content), any sanctions received by the employee, as well as the expression of a particularly positive or negative judgment on the actor's [220] performance as inferred from hits produced by appropriate ontology classifiers [150].

Mixing Professional and Personal Contexts

This behavioral trait [295] corresponds to an actor spending a lot of time and directing significant attention or effort towards non-business issues and topics [144] during work hours, as well as to repeated and impactful interferences of personal issues with behavior in the workplace.

It should be noted that another interesting trait [295] to measure is the reverse of this one, i.e. where electronic data produced during time out of the office contains large amounts of work products and other job-related content.

In the default embodiment of this invention, this is measured by criteria including but not limited to:

The proportion of items pertaining to at least one personal and one professional topic [144], as derived, for example, from running ontology classifiers [150] on electronic communications [123] authored by the actor [220];

The amount of time spent by the actor [220] on non-business-related activities using electronic systems and applications in the workplace;

Attention shift toward external contacts, as observed from an increasing proportion of communications [123] being sent to actors [220] external to the organization.

Traits Related to Job Satisfaction

Job satisfaction describes how the considered actor [220] feels about her job at a given point in time or over time. The behavioral model [200] should contain as many traits [295] as possible in this category to reliably quantify the level of satisfaction as well as assess the topics [144] and related entities associated to the highest (resp. the lowest) degree of satisfaction for a particular actor [220]. The rest of this section describes such traits [295] that can be measured in the default embodiment of this invention.

Disgruntlement

This behavioral trait [295] corresponds to chronic discontentment transpiring in the organization.

In the default embodiment of this invention, this is measured by the volume of negative language related to the actor's [220] current responsibilities, to organizational policies, to coworkers, etc. In particular, the system measures resentment expressed by the actor [220] about people higher up than she is.

When measuring this behavioral trait [295], the system discounts any changes in sociability that are health- or family-related. An exception to this is when those personal issues become so critical that they turn into motivations for harming other actors [220], the organization, or the society, for example if they result from financial distress; this can be measured by linguistic analysis, or any method for monitoring the actor's [220] financial situation.

Grievance

This behavioral trait [295] corresponds to indicators of envy, jealousy, or any presence of grief in an actor [220], including a vindictive attitude.

This is measured by criteria including but not limited to:

Repeated expression of envy or jealousy towards other actors [220]

Being often irritable, directing anger toward a multitude of unrelated topics [144] or actors [220], particularly in light of the success of others. In the default embodiment of this invention, the system detects this situation by observing internal and external events [100] such as someone else getting promoted, getting married, or anyone else in the actor's [220] community or workgroup getting lots of non-negative attention regardless of the specific reason;

A passive-aggressive behavior, which can e.g. be detected as a combination of derogatory comments toward another actor [220] and repeatedly ignoring that other actor's [220] request for advice or for input in their professional tasks.

In one embodiment, the system lets a user visualize grievance patterns exhibited by a particular actor [220] using the stressful topics visualization described in this invention, using that actor [220] as the subject of interest.

Greed

This behavioral trait [295] is defined as the manifestation of excessive greed, but also more generally of an overachievement behavior. This is particularly important for anomaly detection aimed at spotting malicious behavior since excessive greed is often characteristic of an individual ready to go to extreme lengths, including malevolent ones, to reach her goals; such individuals try to rationalize unreasonable financial aspirations, thereby suggesting that they are struggling with internal conflicts due to considering malicious or otherwise unauthorized actions.

In one embodiment, excessive greed is detected by ontology classifiers [150] capturing constructs such as repeated complaints of "wanting a better X" for various values of X, or reflecting an obsession about the recognition (financial or other) of one's achievements Undervaluation In the default embodiment of the present invention, two types of definitions are combined for assessing an actor's [220] sense of undervaluation, similarly to the case of job performance assessment: an objective definition and a subjective definition.

Subjective undervaluation can be measured by criteria including but not limited to:

The actor [220] complaining in electronic communications that he is passed over for a promotion by less able individuals:

The actor [220] complaining in electronic communications [123] that she feels underpaid;

Objective undervaluation can be measured by criteria including but not limited to:

Increase in actual responsibility without being promoted, as observed from a formal HR system if available, or from pragmatic analysis combined with the detection of work projects and responsibilities;

How often the actor [220] is consulted on her domain of expertise;

How often the actor [220] uses her specific skills.

Traits Related to Perception by Peers

These traits [295] constitute the external perception of the actor by a number of different people and together provide a collective wisdom portrait which constitutes a far more accurate and reliable picture of an actor's [220] personality and baseline behavior [260] than when only looking at that actor's [220] own point of view. The rest of this section describes such traits [295] that can be measured in the default embodiment of this invention.

Acceptance of Criticism

This behavioral trait [295] corresponds to how well the actor [220] receives feedback and constructive criticism, as well as her willingness to acknowledge and learn from past errors.

In one embodiment of the invention, acceptance of criticism is measured by methods including but not limited to:

Detecting events [100] related to the assessment of the actor's [220] performance then assessing their emotional impact by analyzing mood changes following such events [100], especially the strongly negative ones. Relevant events [100] comprise job performance reviews, informal evaluation by peers or hierarchical superiors, and more indirect evidence [108] such as the presence of calendar events for one-to-one meetings with a manager:

Assessing whether the actor [220] takes into account feedback and guidance that have been provided to her into her behavior or ignores them, and how often and how completely she incorporates into her work products changes suggested by others. The latter can be assessed using textblock analysis to compute the lineage of work-related documents [162] produced by the actor [220], and looking if the versions of such documents are updated to include a textblock pattern [124] found in content sent or otherwise submitted by a peer.

Perceptive Bias

This behavioral trait [295] corresponds to how closely the way others see the actor [220] matches her own self-perception.

Measuring this trait [295] is particularly useful because a high contrast between how a person is perceived by others and their self-perception is often associated to discontentment and in more extreme cases to psychological troubles.

In one embodiment of the invention, the level of perceptive bias for an actor [220] is measured by methods including but not limited to.
- Assessing the similarity of other actors' [220] negative (resp. positive) language relative to the actor's competence with her own expression of her skills and value;
- Analyzing how fairly and realistically the actor [220] presents her own achievements. This can be detected by linguistic constructs such as other people blaming the actor [220] for taking undue credit, and the actor [220] reacting very strongly or inappropriately to criticism from management or from peers.

Influence

This behavioral trait [295] measures the breadth and the level of influence exerted by the actor [220] over his peers, for example his co-workers.

A low level of influence occurs when the actor [220] has no significant impact on others, which depending on the context might be an important anomaly [270] to detect. Also, a suddenly increasing level of influence might reveal that the actor [220] is trying to become a power broker, possibly with the intent to extort information from others or coerce them for malicious purposes.

In one embodiment of the invention, the level of influence exerted by an actor [220] is measured by methods including but not limited to:
- Computing the importance of the actor [220] in the communication graph filtered appropriately, for example using the graph of relaying implicit instructions (also called Mere Forwards, as described in U.S. Pat. No. 7,519,589, the disclosure of which is incorporated by reference herein for all purposes):
- Detecting memes that originate from the actor [220], which provides a measure of linguistic or topical influence;
- Assessing the role of the actor [220] in discussions [136] based on the relative frequency with which the actor [220] is a primary actor in discussions [306], where the primary actor is defined as the originator of one or more resolution items (as described in U.S. Pat. No. 7,143, 091).
- Assessing the impact of the actor's [220] presence or absence on the other actors [220], as described in the section on Actor influence analysis.

Reliability

Reliability as a behavioral trait [295] indicates how dependable the actor [220] is considered, in particular how much actual trust others put into her beyond purely professional interactions.

In one embodiment of the invention, the reliability of an actor [220] is measured by methods including but not limited to:
- Identification of linguistic markers of respect and deference (and lack thereof);
- Detection of negative judgments, repeated criticism, and derogatory language about that actor [220], especially when coming from multiple actors [220] who are not closely related to one another.

Popularity

This behavioral trait [295] indicates the status of an actor [220] in the eyes of her peers, particularly in the domain of their professional interactions.

In one embodiment of the invention, the popularity of an actor [220] is measured by methods including but not limited to:
- Assessing the level of formality of interactions between that actor [220] and other actors [220], especially when that level is asymmetric (e.g. when the actor [220] is very formal in his messages but replies from various other people are unusually terse and informal);
- Measuring the responsiveness of others to requests made by the actor [220];
- Measuring how often the actor [220] is blown off by others [220];
- Conversely, measuring how often the actor [220] is consulted by others;
- Assessing how often the actor [220] is included in events or distribution lists after the fact: for example, someone who is often added to email recipient lists, especially on sensitive issues, is typically more popular than the average since others think about including her in the loop and implicitly value her opinion;
- Computing the actor's [220] pecking order score (see section on Pecking order visualization);
- Computing a measure of authority for that actor [220] in the graph built from invitations to meetings, which can be done using a well-known hubs and authority algorithm. It should be noted that meeting invitations are an essential behavioral indicator in many organizational environments, especially those where the more relevant or risky facts are rarely put in writing. Thus the graph of who invites, and demonstrably does not invite, whom to meetings is very valuable and can be used to assess an individual's perception by his peers. A measure of an authority for the node representing an actor [220] in the graph of meeting invitations thus indicates how many people invite her who are themselves considered important enough to be invited to other meetings, thereby providing an important objective component in the assessment of that actor's [220] popularity.

Connectedness

This behavioral trait [295] measures the extent to which an actor [220] is included in business workflows, and how much she interacts with coworkers.

This trait [295] is an important component of an individual behavior [210] since isolation patterns, which reflect a significant lack of interaction or generally poor-quality interactions, are a worrying sign in most organizations. Conversely, the unexplained disappearance of isolation patterns is also suspicious in many situations, since e.g. someone reclusive who becomes very popular might actually be trying to manipulate people in the parent organization in order to gain unauthorized access to sensitive information.

In one embodiment of the invention, the connectedness of an actor [220] is measured by methods including but not limited to:
- Computing the hub value for that actor [220] in the communication graph filtered by work-related content and where connections across distant groups [225] are more heavily weighed, once again using a classical hubs and authority algorithm:
- Computing a measure of betweenness for that actor [220] in the graph of meeting invitations (described in the paragraph on popularity assessment). In a graph where nodes represent actors [220] and edges represent a certain type of connection, a measure of betweenness for a particular node indicates how many pairs of otherwise disconnected actors [220] the considered actor [220] connects with each other: therefore, the betweenness in the graph of meeting invitations is a reliable indicator of connectedness with the rest of the organization;
- Measuring how often the actor [220] makes regular and significant contributions to collective tasks, and how often she collaborates on coworkers' assignments. This can be measured for example using pragmatic tags [172]

computed on workflow instances [134], as performed by the pragmatic tagging component [430].

The system allows the user to efficiently visualize connectedness assessment for a particular actor [220], either when an anomaly [270] has been flagged or on-demand by the means of a graph showing changes of position within the actor network, which is one of the animated actor graphs [471] provided by the system.

Confrontational Behavior

This behavioral trait [295] reflects the tendency of an actor [220], in the face of conflicts involving other actors [220] in the organization, to either make those conflicts worse by her actors or speech, or, in contrast, to attempt to nip emerging conflicts in the bud, or more generally to solve existing interpersonal issues.

In one embodiment of the invention, an actor's [220] propensity to confrontation is measured by methods including but not limited to:

Detecting language and behavior causing aggravation of conflicts, such as frequent use of an aggressive tone;

Conversely, detect language and behavior causing mitigation of conflicts, such as using a neutral tone in consecutive communications [123] resulting in an agreement being reached between the parties involved in the conflict;

Measuring the impact of the actor's [220] involvement in a discussion [136]. In the default embodiment, this is measured by computing two different scores for an actor [220], as explained in the following.

When assessing an actor's [220] tendency towards confrontational behavior, the reply-based confrontation score [285] takes into account that actor's [220] response to negative sentiment. For example, if in the course of a discussion [136] that contains very little (if any) negative sentiment, the actor [220] sends out a very aggressive email, this will significantly increase her reply-based confrontation score [285]. By contrast, the effect-based confrontation score [285] takes into account that actor's [220] communications' [123] effects on others. For example, if in the course of a highly tense discussion [136] the actor [220] sends a neutral reply that has a clear mitigating effect on the following items [122] in the discussion [136], this will significantly decrease the actor's [220] effect-based confrontation score [285]. These two scores [285] take positive values and are computed as follows in the default embodiment. We denote n the length of a discussion [136], $stm_i$ the polarity of the i-th item [122] in the discussion [136] for $1<=i<=n$ (positive values indicate positive sentiment), and author; its author (e.g. sender of an email). Then, to compute A's reply-based confrontation score, we tally all values taken by the expression $$1 \leq i \leq k, stm_i<0, author_j=A, i<j\leq n, author_j \neq A: \text{Max}(-stm_j, 0)$$

and compute its mean over all discussions [136]. To compute A's effect-based confrontation score [285] we tally all values taken by the expression $$1 \leq i \leq k, stm_i<0, author_i=A, i<j\leq n, author_j \neq A: -stm_i/(n-j)*\Sigma_{j<k\leq n}\text{Max}(-stm_j, 0)$$

and compute its mean over all discussions [136].

Traits Related to Communication Patterns

The following describes behavioral traits [295] related to individual and collective communication patterns and how they can be measured in the default embodiment of this invention.

Self-Centeredness

This behavioral trait [295] assesses whether the actor [220] is only concerned with her own interests or has other people's interests in mind.

In one embodiment of the invention, an actor's [220] self-centered behavior is measured by methods including but not limited to:

The presence of generic linguistic markers of narcissism and egotism. In particular, someone who talks about herself more than the norm, especially in a strictly professional context, is suspicious;

The absence of expressed interest for others;

The lack of thankful language as detected using pragmatic tags [166] derived from discourse analysis.

Stress Management Issues

In one embodiment of the system, stress management issues are detected using linguistic markers including but not limited to:

A significant increase in the amount of negative sentiment detected in communications [123] sent by the actor [220];

The adoption or a terse language structures, as observed e.g. from punctuation usage;

More specific signs of stress such as changes in the structure of the actor's [220] email replies, e.g. no longer taking case of in-lining replies within the original email's content.

Polarized Behavior

Polarized behavior corresponds to the presence of both highly negative and highly positive sentiments expressed by the actor [220] on a certain topic [144] or relative to certain actor [220].

This is important in many situations as a factor of behavioral risk because polarized interactions and responses can suggest a vindictive attitude, but also more generally identity issues, especially when originating from the effort to maintain a façade of allegiance to the parent organization.

In one embodiment of the invention, a polarized attitude is detected by methods including but not limited to:

Measuring the presence of reverse sentiments expressed by the actor [220] toward other actors [220] or actor groups [225] when communicating with different audiences (for example, trusted persons and confidants vs. distant relationships);

Detecting the use of deceptive language, including flattery, which might imply in some cases that the actor [220] is hiding or distorting the truth to promote a hidden agenda. In that embodiment, deceptive language is detected using linguistic cues generally associated to deceptive writing, such as reduced first-person usage, increased usage of negative-emotion terms, a lower volume of exclusive terms, and a higher volume of action verbs.

Information Dissemination

Information dissemination analyzes how specific knowledge and data spreads through the organization, e.g. if it typically travels through a single level of management, or more vertically, and how long it takes to become general knowledge, etc.

This behavioral trait [295] is particularly useful for analyzing the spread of highly valuable or sensitive information, as well as the effectiveness of knowledge acquisition throughout the organization.

To measure information dissemination behavior, actor profiles are built according to a model of knowledge creation and transfer. In the default embodiment of this invention, profiles are creators of information, couriers, and consumers. A method to rank actors [220] against each such profile is described in the section on Information dissemination profiles, along with a novel way to efficiently visualize these profiles on the whole actor network.

Optionally, the input data can be filtered by topic [144] or by ontology classifier [150], etc. to only retain information relevant to a specific scenario.

Clique Emergence

This behavioral trait [295] measures a particularly interesting social network pattern, namely the emergence of cliques [255], i.e. groups of tightly connected people. This is especially relevant in relation to other significant patterns or topics [144], and especially when these cliques [255] have a secretive nature.

In addition, people tend to aggregate around their likes, so that clique [255] members will often share similar behavioral traits [295], which can provide supporting evidence for the system's behavioral model [200] construction that an actor [220] matches a particular profile type. In other words, anomalous patterns for this behavioral trait [295] include, but are not limited to, a sudden change in an actor's [220] tendency to form cliques [255], and the inclusion of an actor [220] in one or more cliques [255] around another actor [220] who has previously been flagged—manually or automatically—as suspicious.

In the default embodiment of the invention, an actor's [220] tendency to form cliques [255] is assessed by detecting patterns including but not limited to:

- A small group of actors [220] who have no common professional responsibilities and mostly communicate on a personal level, except that they systematically regroup after the occurrence of some event in the organization (e.g. they exchange IM to agree to meet offline after every internal meeting on a particular project);
- Distinct communication channels [156] between certain groups [225], in comparison to official channels. This is considered particularly suspicious behavior when work groups [220] are supposed to be separated by clear boundaries, because somebody trying to gather info they should not have access to would go out of their way to socialize with members of other groups [220], which is often reflected in communication channels [156] that are clearly separate from the organizational ones.

The system allows the user to efficiently visualize the emergence, decay, and evolution of cliques. This is done either upon detecting an anomaly in relation to cliques [255] including a particular actor [220], or on demand from the user, by the means of an animated graph of cliques, which is one of the animated actor graphs [471] provided by the system.

Social Proximity

This behavioral trait [295] measures an actor's [220] tendency to develop and sustain personal relationships with co-workers.

In one embodiment of the invention, the level of social proximity of an actor [220] is assessed by computing metrics [290] including but not limited to:

- The number of topics discussed with other actors [220];
- The average level of formality between that actor [220] and all other actors [220] with whom she socially interacts;
- The variety of emotive tones in that actor's [220] social interactions;
- The number of communication channels [156] for each actor [220] she socially interacts with;
- The number of foreign languages spoken (when applicable);
- The time-spread of social interactions, such as time of day or day of week;
- The frequency of invitations to social events;
- The length of non-work-related discussions [136];
- The proportion of time spent in social interactions;
- The actor's [220] ability to form long-lasting relationships, e.g. measured as how often the actor [220] keeps in touch with former co-workers and for how long.

The system allows the user to efficiently visualize and assess social proximity and its evolution for a particular actor [220] on a continuous basis, using the Social You-niverse visualization [472].

Elicitation Patterns

Elicitation patterns detected by the system include but are not limited to:

- Use of flattery to force other actors [220] to cooperate or unknowingly provide information;
- Attempts to defuse a defensive reaction when seemingly trying to extort sensitive or otherwise valuable information.

In one embodiment of the invention, elicitation is detected using methods such as:

- Flagging linguistic markers of flattery and elicitation attempts. For example phrases such as "Can I ask you a favor" might be an attempt to defuse a defensive reaction when trying to extort sensitive information. Also, malicious insiders often manage to convince others that they are committing their acts for a good cause, e.g. that leaking confidential information outside the organization actually helps that organization by demonstrating the ineffectiveness of the data leak prevention systems it has put in place. Therefore, phrases such as "We're all on the same side here" are also positively correlated with elicitation attempts;
- Detecting drastic changes in the level of influence between two actors [220], which is one of many indicators that elicitation attempts could be succeeding.

Character Traits

In addition to observed behavioral traits [295], some indicators of an actor's [220] personality or character are valuable for anomaly detection. The rest of this section describes such traits [295] and how they can be measured in the default embodiment of this invention.

Self-Esteem Issues

This character trait [295] corresponds to detecting extreme values of an actor's [220] apparent self-esteem. Both extremes result in anti-social behavior that might put the organization or other individuals at risk: a lack of self-esteem might lead the actor [220] to be easily influenced or to act irrationally, and when extremely low can even denote socio-pathological tendencies. Conversely, an inflated ego—and ego satisfaction issues in general—results in a lack of consideration for others and in a tendency to manipulate other actors [220] while rationalizing malicious actions. Also, a major decrease in self-esteem is also considered a cause for concern and therefore such a pattern is flagged by the system as anomalous.

In one embodiment of the invention, the likely existence of self-esteem issues is assessed using the following methods:

- Detecting patterns where the actor [220] repeatedly seeks out those who flatter her. This can be done by measuring quality time (as shown in the Quality time visualization [478]) and computing proximity based on communication [123] initiation;
- Conversely, detecting patterns where the actor [220] tries to avoid others to the extent possible especially after expressive negative feelings about herself;

Significant mood swings according to whom the actor [220] is primarily interacting with;

Signs of an inflated ego, detected using linguistic constructs and ontology classifiers [150], which include an inability to cope with delayed gratification, a strong sense of entitlement, and constant looking for validation by other actors [220].

Individual Behavior Assessment

Based on a number of behavioral traits [295] including but not limited to the ones previously described, each of which can be scored along one or more behavioral metrics [290], the system establishes an assessment of the behavior of all individual actors [220] as follows.

For each behavioral trait [295], a per-actor [220] score [285] is computed as a linear combination of the values taken by each normalized metric [290] for that trait. Metrics [290] are normalized against all actors [220] for which they are defined (since no value might be available if for example no data relevant to the metric [290] is associated to a particular actor [220]) so as to have a zero mean and unit standard deviation. The set of weights involved in the linear combination of metric scores [285] is independent from the actor [220] considered. In one embodiment of the invention, the user [455] completely specifies the weight for each metric [290] of a given trait. In another embodiment, the system is initialized with identical weights, following which those weights are continuously adjusted based on user feedback [160], as described in the section on Anomaly detection tuning. This allows the system to fine-tune the assessment of a behavioral trait [295] based on input from a human expert since the comparative reliability e.g. of an actor network metric and of an ontology classifier metric is subject to interpretation and therefore can not be automatically determined by the system.

This linear combination yields a scalar value for each actor [220] against a particular behavioral trait [295], which in turn does not need to be normalized since it constitutes a relative scoring mechanism across the actor set; the system thus uses these values to rank the actors [220] by decreasing score [285]. These rankings [275] can then be leveraged in multiple ways, including having the system automatically generate alerts [305] for the top-ranked actors [220] against a particular trait [295] (as described in the section on Anomaly detection) or by letting the user query the behavioral model [200] against a trait [295] and returning the top-ranked actors [220].

Collective Behavior Assessment

The system is also able to determine the main characteristics of actor groups [225] using a model similar to the one used in individual behavior [210] assessment. This is useful to measure behavior at a coarser granularity than on a per-actor [220] basis. It is also essential to application scenarios where risk is presumed to originate not only from malicious insiders acting on their own or with accomplices external to the organization but also from conspiracies involving multiple actors [220].

To do this, the system defines and measures a number of collective behavioral traits [295] Which together compose a collective behavior [215]. Each of these traits [295] is derived from the individual behavior traits [295] of the group [225] members—which are measured as described previously—in a straightforward manner using simple aggregate metrics [290]. This allows the system to rank actor groups [225] against each of these traits [295] and thus lets the anomaly detection component [450] raise behavioral alerts [305] as appropriate. Those alerts [305] will thus be imputed to a group [225] rather than a single actor [220].

In the default embodiment of the invention, the system aggregates every single behavioral trait [295] for each actor [220] who belongs to a given group [225] by simply computing the average score [285]. This allows for example, to determine a score [285] and thus a ranking [275] for all formal or informal groups [225] against the disengagement trait described previously.

The system presents the resulting collective behavior [215] model to the user by underlining simple statistical measures over the corresponding behavioral traits [295]; such as the average score [285] against that trait [295], highest and lowest score [285], and standard deviation, for each actor group [225] for which the trait [295] has been measured. In one embodiment, this last condition is defined as having a significant number of individual trait measurements, for example at least 6 individual actor [220] scores [285].

In addition, all visualizations [204] of behavioral patterns described in this invention can be adapted to represent group behavior [215] rather than individual behavior [210]. For example, the social universe visualization uses planets [4820] to represents either individual actors [220] or groups [225]; matrix visualizations such as stressful topics and emotive tones represent either individual actors [220] or groups [225] as rows in the matrix; and visualizations [204] based on selecting input data [360] according to the actors [220] involved, such as the sequence viewer, can also filter that data according to the groups [225] involved.

Anomaly Detection

Figure 8:
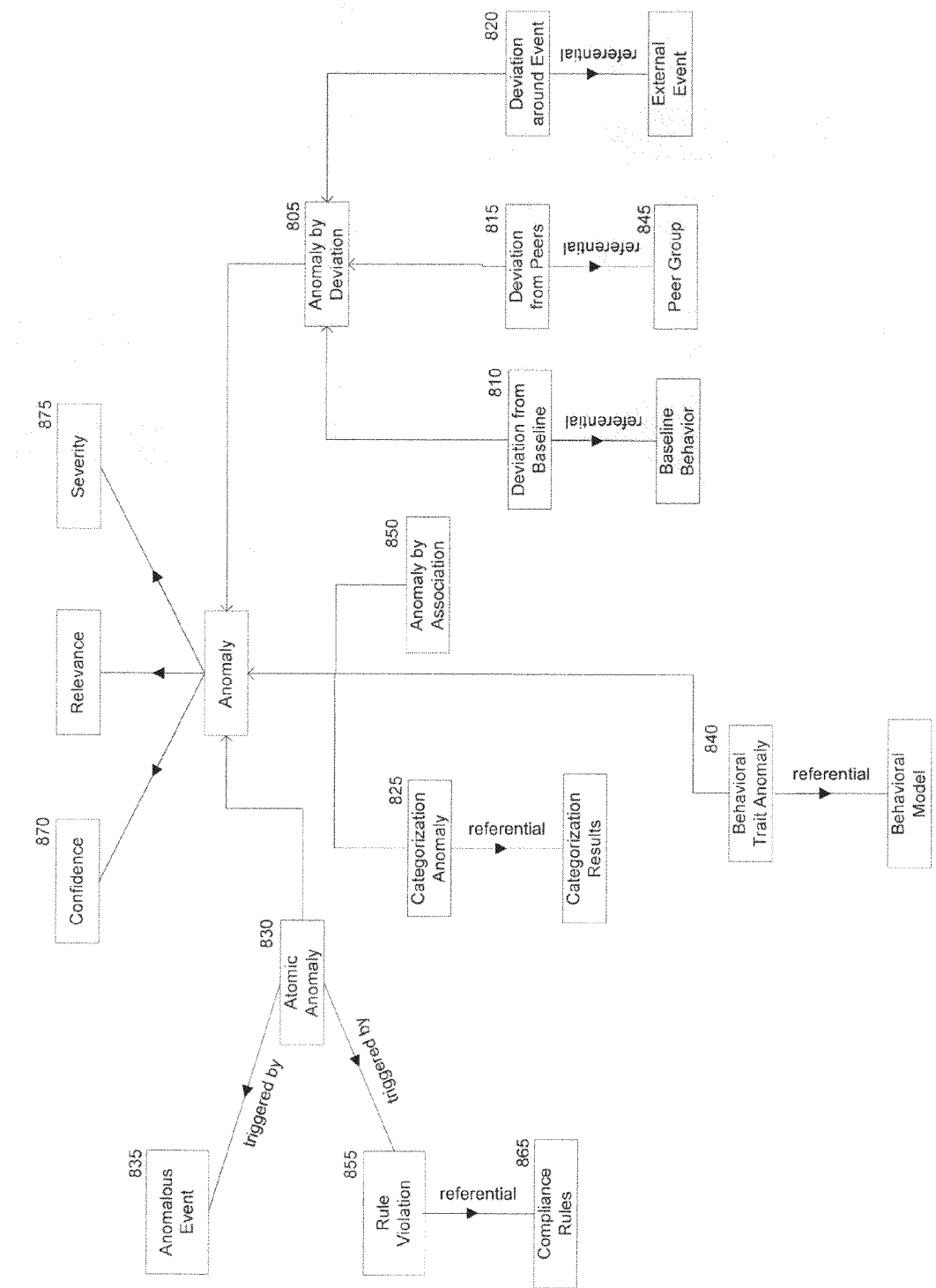
FIG. 8 is a block diagram showing the different types of anomalies generated by the system in accordance with an embodiment of the present disclosure.
Figure 9:
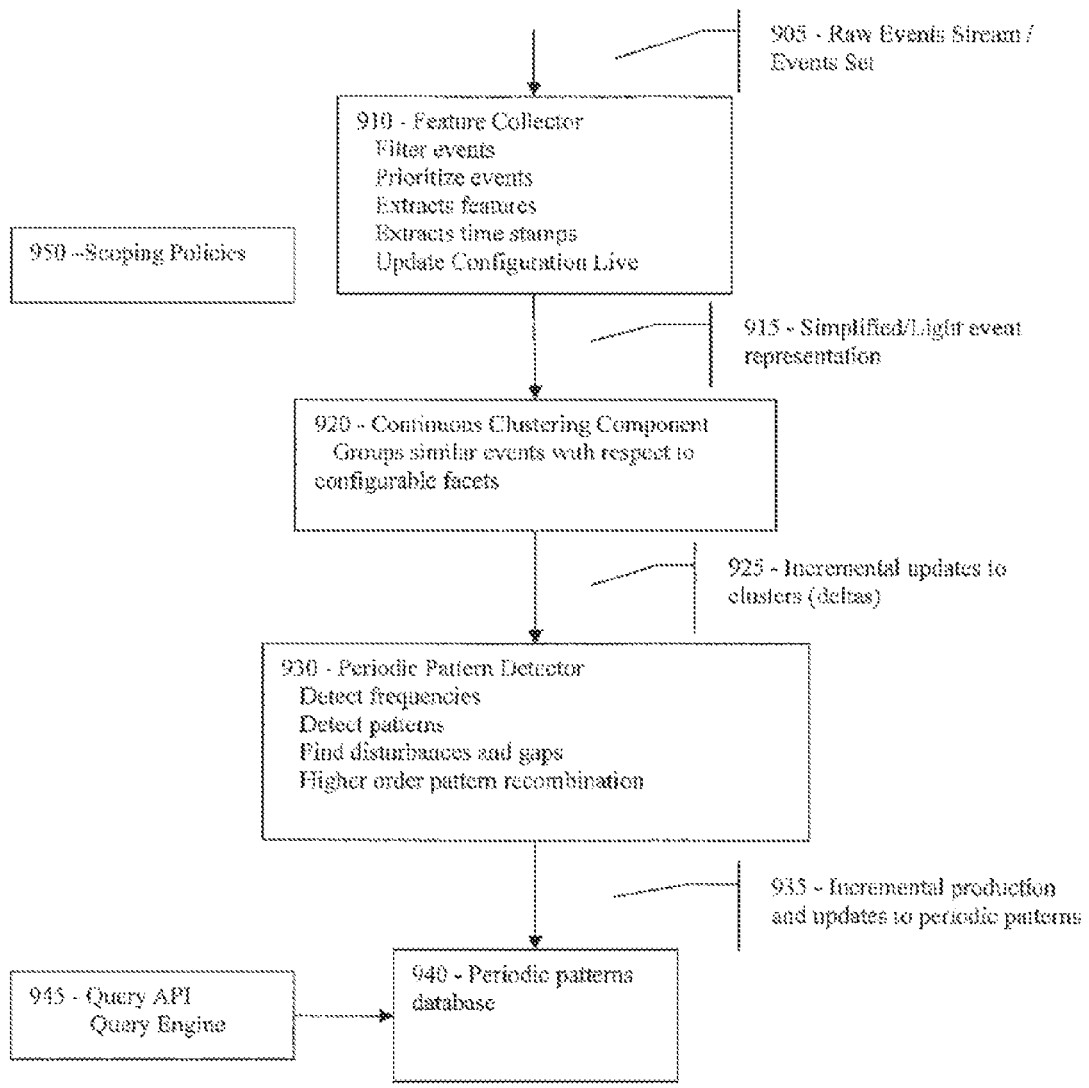
FIG. 9 is a flowchart of the continuous periodic pattern detection process in accordance with an embodiment of the present disclosure.

FIG. 8 shows a partial hierarchy of anomalies [270] generated by the anomaly detection component [450] of the system.

An anomaly [270] is associated to one or more events [100] that triggered the anomalous patterns, and to zero, one or more subjects [272], each subject [272] being an actor [220], a group [225], a workflow process [128], or an external event [170] to which the anomaly is imputed. The anomaly subject is defined as follows:

If the behavioral modeling component [445] has flagged an individual behavior as anomalous for a particular actor [220] or group [225], that actor [220] or group [225] is the subject of the anomaly.

If the continuous workflow analysis component [465] has detected an outlier workflow instance [134], the corresponding workflow process [128] is the subject of the anomaly.

If the anomaly detection component [450] has correlated the anomaly with a particular point in time or external circumstances, the corresponding external event [170] is the subject of the anomaly.

The quality of the output produced by a reliable anomaly detection system cannot be evaluated by a single metric. Therefore, an anomaly [270] generated by the present invention possesses a set of properties: confidence [870], relevance [880], and severity [875], which are described in the following.

Confidence [870] is a property endogenous to the model and indicates the current likelihood (as a positive numerical value estimated by the system) that the facts underlying the anomaly [270] are deemed valid in the physical world. This includes, but is not limited to, the following considerations: how strong the chain of evidence [100] is, and how many associations are established to produce the anomaly [270].

Relevance [280] is a property which is computed by combining user input [106] and information derived by the system. It represents the importance of the risk associated to the anomaly [270]. That is, a highly relevant anomaly [270] indicates behavior that can be malevolent or accidental but carries a significant risk (business risk, operational risk, etc.) whereas a low relevance [280] indicates abnormal but harmless behavior. Relevance [280] is a positive numerical value initialized to 1 for any newly detected anomaly [270]

Severity [875] is a property defined by human users and indicates the impact (for example in terms of material or financial damage) that the anomaly [270] would lead to if it is actually confirmed and carries a risk. In the default embodiment of the invention, the severity [870] is defined by a set of system-configurable parameters and is assigned to alerts [305] and other actions posterior to anomaly detection, but is not used by the system in its computations.

Anomalies [270] are generated by the anomaly detection component [450] and can be of different types, including but not limited to:

- An atomic anomaly [830] is the most basic type of anomaly. An atomic anomaly [830] can be triggered by an anomalous event [835], which corresponds to observed events [102] having features which are abnormal in and of themselves. An atomic anomaly [830] can also be triggered by a rule violation [855] which corresponds to an observed event [102] having breached a compliance rule [865] or any part of an internal or regulatory policy.
- A categorization anomaly [825] corresponds to unexpected categorization results of the data associated with a subject [272] with respect to that subject's [272] past categorization results.
- An anomaly by association [850] groups several anomalies [270] that have strong causal relationship as derived from evidence links [108].
- An anomaly by deviation [805] indicates that an individual actor [220], a group of actors [225], or even a workflow process [128] is showing characteristics that are unusual with respect to their normal characteristics, where normal is defined either with respect to past behavior or to the behavior of similar actors [220] or groups [225].
- A behavioral trait anomaly [840] indicates that relatively to other actors [220] in the organization, an actor [220] has one of the most anomalous scores [285] with respect to a particular behavioral trait [295], as described in the section on the Behavioral model.

Each of these types of anomalies [270] is described in more detail in the following sections, along with one or more proposed methods for detecting such anomalies [270]. It should be noted that these anomaly types are not mutually exclusive: for example, an anomaly [270] may be justified by a single anomalous event [835] which also triggered a categorization anomaly [825].

Atomic Anomalies

The simplest type of anomaly [270] that is raised by the anomaly detection component [450] is an atomic anomaly [830] due to an anomalous event [835]. For example, emotive tone analysis as described in this invention may have detected derogatory or cursing language on certain internal communication channels [156], which can constitute anomalous behavior which should be further investigated, and thus results in an atomic anomaly [830] imputed to the author of these communications [123].

In one embodiment of the system, the anomaly detection component [450] can also be configured to trigger atomic anomalies [830] based on rule violations [855], such as compliance rules [865]. An example of rule violation is when a particular topic [144] may have been blacklisted so as to express that no communications [123] pertaining to that topic [144] should be exchanged among certain actors [220]. In this case, the communication [123] between two such actors [220], or alternatively the creation by one such actor [220], of a document [162] associated to that topic [144] is flagged by the system as a rule violation.

Categorization Anomalies

Categorization anomalies [825] are produced on two types of categorical features.

The first type of categorical features corresponds to categories produced by any type of categorization component [146] as part of the continuous categorization component [420], such as detected topics [144]. An example of categorization anomaly in that case is when the topical map for a given subject [272] shows an abrupt and unjustified change at some point in time.

The Second type of categorical features corresponds to built-in features of the system, such as detected emotive tones or entities (event names, people names, geographical locations, etc.) which are derived from the analysis of data and metadata extracted from events [100], including periodic sequences [132] that match a periodic pattern [126]. An example of categorization anomaly in that case is when the set of closest actors [220] has significantly changed for a given actor [220].

Categorization anomalies [825] are produced for any profile change detected as explained in the section on Continuous categorization Anomalies by Association Some events [100] can be flagged as an anomaly not by itself but because it is associated with another anomaly [270] by dint of some relationship inferred from one or more pieces of evidence [108], including but not limited to:

Content similarity
Causal relationship (as detected by discussion building)
Referential relationship (as detected by entity analysis)
Temporal relationship (for example temporal proximity between the two events [100], or proximity with different instances of a periodic sequence [132])
Geographical proximity
Organizational proximity, including involvement of the same actor [220]
Common topics [144].

In one embodiment of the system, anomalies by association [850] are computed as follows. The system configuration defines indirection levels that are incorporated into anomalies [270] when events [100] are correlated with other events [100]. In one embodiment of the present invention, an indirection level is a value I between 0 and 1 which is used to compute the new confidence level [870] every time a new relationship is established using the following expression;

$$\text{conf}_{A\text{-}B} = \text{Max}(\text{conf}_A, \text{conf}_B) + I\text{Min}(\text{conf}_A, \text{conf}_B)$$

Values of I are for example:
I=1 for strong sources of causal evidence [108], such as formal or informal workflow processes [128], shared attachments or textblock patterns [124], and for any topical, organizational, or referential association.
I=0.5 for weaker sources of causal evidence [108], such as lexical content similarity, or communications [123] joined based on pragmatic tagging.

For temporal associations, I is a function of the time difference between the associated events [100], namely $I=\exp(-\gamma|t_A-t_B|)$, with $\gamma$ dependent on the type of events [100] considered (since different event types correspond to very different time scales).

Baseline Referentials

Baseline values for all types of behavioral features (including statistical measures and periodic features), computed for a particular subject [272] called the target subject [272], are stored in the baseline repository. They are continuously adapted by the behavioral modeling component [445] using the accumulation of collected data.

Figure 30:
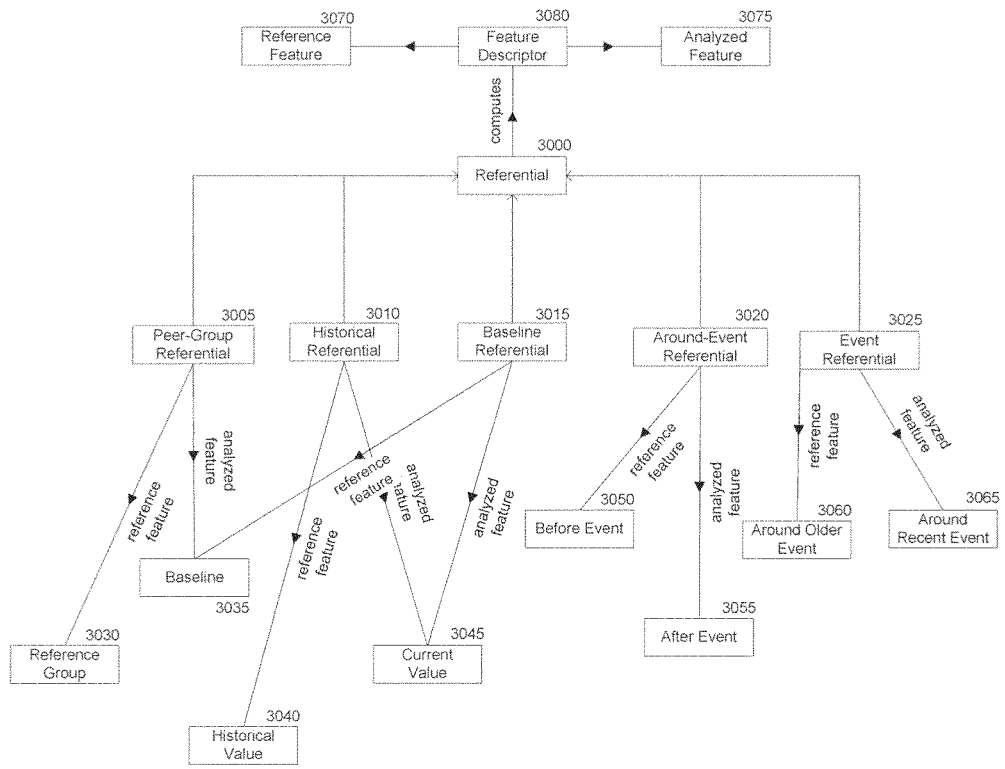
FIG. 30 is a block diagram showing the referential types used for anomaly detection in accordance with an embodiment of the present disclosure.

Every behavioral feature lends itself to one of several pairwise comparisons, each based on the definition of a referential [3000]. FIG. 30 shows the types of referentials [3000] provided by the anomaly detection component [450] in a default embodiment of the invention. The value tested for anomalies [270] is called the analyzed feature [3075], while the value representing the norm is called the reference feature [3070].

Note also that features can correspond to absolute or relative values. To take a statistical measure as an example, such as number of emails sent by an actor (individual or aggregate), the feature can be either the absolute number of emails sent or the fraction it represents relative to the total number of emails sent by all actors [220] or by actors [220] in one of the groups [225] to which he belongs to.

Many other referentials can be used. In an alternative embodiment, the system lets the user combine several of these built-in referentials (for example an around-event referential [3020] and a peer-group referential [3005]). In yet another alternative embodiment, referentials [3000] can be created whose definition themselves depend on the analyzed and reference features, such as a filter on their reference events [100] (for example, when these features are statistical features related to electronic communications [123], custom peer groups can be defined by restricting the actors [220] to those having discussed a particular topic [144]).

When the referential [3000] is a baseline referential [3015], the target subject's [272] baseline value [3035] (considered her normal behavior) and her current value [3045] are compared. The rationale for this kind of comparison is that individual actors [220] as well as actor groups [225] are creatures of habit who tend to develop their own patterns of communication, of interaction with the data and other actors [220], etc. The system thus aims at modeling as many idiosyncrasies of the considered actor [220] or group [225] as possible, and at detecting the cases where the current model diverges from the past model. In addition to this goal, observing permanent change, either individually or at a group level, is also of utmost importance since it guarantees the accuracy of the anomaly detection process as well as often provides insightful information on the data itself.

When the referential [3000] is a historical referential [3010] the current value [3045] is compared to a historical value [3040] (i.e. a fixed amount of time in the past).

When the referential [3000] is an around-event referential [3020], the target subject's [272] baseline values before and after an external event [170] are compared: the value before that point in time [3050] is the reference feature, while the value after that point in time [3055] is the analyzed feature. The idea here is that if the behavior of a subject [272] tends to change significantly following a particularly sensitive external event [170], this may suggest that the subject [272] was specifically involved in that external event [170].

When the referential [3000] is a periodic event referential [3025], the changes in the target subjects [272] feature values [3065] around a more recent external event [170] are compared to the same feature values [3060] around an older external event [170].

When the referential [3000] is a peer-group referential [3005], the target subject's [272] baseline value [3035] is compared to the baseline values of similar subjects [272] defined as a peer group [3030]. This is particularly useful in the cases where no normal behavior can be easily defined on the subject [272], but more generally it provides a much more exhaustive way to detect behavioral anomalies, especially in presence of malicious activities: intuitively, in order to escape the detection capabilities of the present invention, an individual who wants to commit fraud would need not only to hide its own malicious actions so they do not appear suspicious with respect to his past behavior, but would also need to ensure that they do not appear suspicious in the light of other people's actions. The baseline values of similar subjects [272] represented as a peer group [3035] are computed as summaries of the behaviors of similar actors [220] or groups [225], for example by averaging each relevant (observed or derived) feature. A peer group [3035], can be defined in a number of ways, which include but are not limited to:

- Actors [220] with an identical function or a peer-level, different function in the company, as defined for example in an organizational chart.
- Actors [220] or groups of actors [225] having the same responsibilities within the company, as reflected in their work habits.
- Actors [220] who are closest to the considered actor [220] (based on a variety of properties such as the most frequent email recipients, the whole list being defined in U.S. Pat. No. 7,143,091). In one embodiment the n closest actors [220] are selected, in another embodiment the cutoff occurs at a proximity threshold.
- Other actors belonging to the same circle of trust [255] as the considered actor [220]. (Where circles of trust [255] are defined in U.S. Pat. No. 7,143,091 and comprise professional circles of trust, personal cliques or friendship-based circles of trust, and event- or crisis-motivated circles of trust.)
- Formal workflows belonging to the same business line as the considered workflow process [128].
- Ad-hoc workflow processes similar to the considered workflow process [128] in any of the following meanings: shared workflow stages [154], shared media (i.e. type of communication channel [1568] or of document [162]), involvement of the same actors [220], and similar timeframes.

The methods available in the present invention to detect anomalies by deviation [805] are detailed in the rest of this section.

Defecting Anomalies by Deviation

Figure 29:
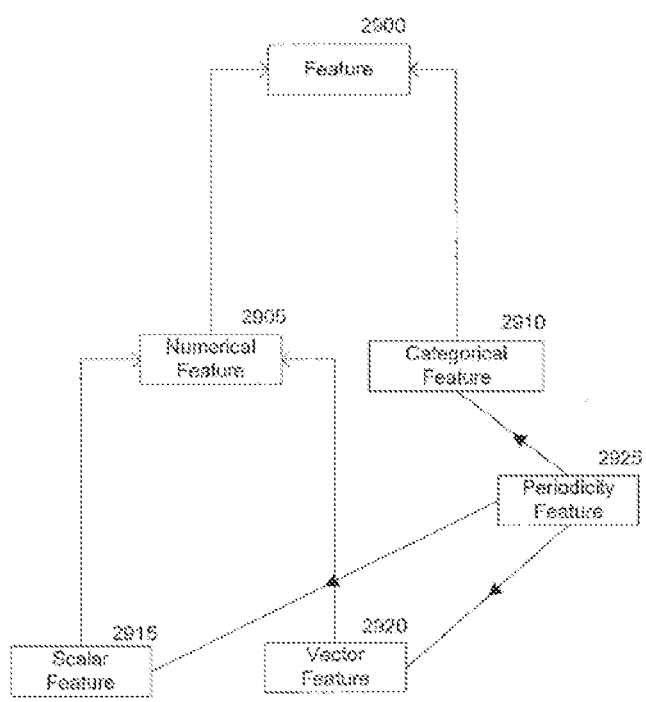
FIG. 29 is a block diagram showing the different types of features used for anomaly detection in accordance with an embodiment of the present disclosure.

Anomalies by deviation [805] can be detected on any type of feature [2900] associated to events [100]. As illustrated in FIG. 29, in the default embodiment of the invention, the following types of features [2900] are supported by the system:

- Scalar features [2915] are all numerical features [2905] that take a single value. An anomaly by deviation [805] on a scalar feature represents an unexpected trend in that feature [2900], intuitively meaning that the habits of particular actors [220] have changed drastically. An example of such an anomaly by deviation is when the daily volume of communications [123] sent by an individual actor [220] on a particular communication channel [156] has significantly changed over time.
- Vector features [2920] are the multidimensional variant of scalar features [2915].
- Periodicity features [2925] correspond to periodic patterns [126] that disappear or are modified, meaning that regularities in the occurrence of specific events [100] have changed or disappeared. An example of deviation from a periodic pattern [126] is when irregularities occur in a meeting scheduled at a fixed interval, or in recurring data archiving operations.

Periodicity features [2925] can always be treated as a combination of scalar features and categorical features by considering the time elapsed between successive instances of the periodic pattern [126] as a specific type of scalar feature [2915], as well as including all features [2900] attached to each occurrence (i.e. to each periodic sequence [132]). Therefore only numerical features [2905] and categorical features [2910] actually need to be considered.

The amplitude of each deviation is mapped into the interval [0,1] where 1 represents the absence of deviation, and this value is used as a multiplier of the confidence level [870] of the considered anomaly [270].

In order to detect anomalies by deviation [805] on a given feature [2900], a few parameters are needed to configure the model for each actor [220] or group [225]. Note that as for most parameters used for tuning the system, these parameters should not be exposed to the user and should remain as stable as possible so as to minimize their impact on recall rate and precision. Also, a default value is available for these parameters, but this value can be overridden to reflect that different actors [220] have different behavioral characteristics (for example, the time scales for answering email messages can vary tremendously across individuals, which must be accounted for in the behavioral model [200].)

These parameters include:
v: length of the sliding time window [380] for baseline pattern computation
w: length of the sliding time window [380] for computation of the current trend (w is typically an order of magnitude smaller than v)
For each observed or derived feature [2920], a threshold multiplier A to detect abnormal deviations. Another embodiment of the invention defines 2 levels of anomaly so that 2 thresholds are needed, with the lower threshold indicating suspicious, potentially abnormal observations that need to be confirmed by subsequent abnormal observations before becoming flagrant anomalies. Possible values for the threshold multiplier are given in the next section.

The first step in detecting anomalies by deviation is to define the reference features [3070] against which analyzed features [3075] will be compared.

A feature descriptor [3080] is an aggregated value computed over a time interval. In one embodiment of the invention, one or more of the following definitions are available for a feature descriptor [3080]:
The average value of the feature [2920];
The linear regression of the feature [2920];
The variance of the feature [2920];
Any combination of the previous values.

Once the descriptor [3080] has been defined for a given feature [2920], it is straightforward to compute it on an analyzed feature [3075]: this analyzed feature [3075] is usually defined as a sliding window [380] of recent data for the target subject [272], or as a window around an event [100] (unique or recurring) in the case where behaviors around two different events [100] have to be compared.

Computing the descriptor [3080] on a reference feature [3070] is somewhat less obvious, and is described in the following paragraph. We can already distinguish two cases:

To compute the descriptor [3080] on a reference feature [3070] in the case of a time-based referential (i.e. not a peer-group referential [3005]), in the default embodiment of the system, the descriptor [3080] is the average feature value over all observations in time. In another embodiment, the descriptor [3080] is the feature value of the best exemplar among the observations, i.e. the value that minimizes the sum of distances to the other observations.

To compute the descriptor [3080] on a reference feature [3070] in the case of a peer-group referential [3005], the same method is used after replacing the set of observations at different points in time by the set of subjects [272] that constitute the reference group [3030].

Computing Reference Features

This paragraph describes in more detail how a descriptor [3080] is computed on a reference feature [3070], and in particular what information needs to be stored and updated for that computation.

In the case of a baseline referential [3015], the system only needs to maintain two descriptors [3080] for the target subject [272], in a sliding time window [380] of size w and a sliding time window [380] of size v, both ending at the current time.

In the case of a historical referential [3010], the system only needs to maintain two descriptors [3080] for the target subject [272], in a sliding time window [380] of size w ending at the current time t and a sliding time window of size w ending at t−T. (Note that necessarily T≤w in the case of a recurring event.)

In the case of an around-event referential [3020], the system only needs to maintain two descriptors [3080] for the target subject [272], in a time window of size w starting at the event's end time and a time window of size w ending the event's end time. When the event [100] is a recurring event [101], the positions of these windows are updated every time a new occurrence of the event has been detected.

The case of a peer-group referential [3005] is the least simple one to compute. Firstly, the reference group [3030] can be defined either exogenously or endogenously to the feature [2900] considered. For any given feature [2900], the system may use an exogenous definition of the reference group [3030], or an endogenous definition, or both.

As mentioned previously, exogenous definitions for a reference group [3030] include but are not limited to:
Group [225] of closest actors of the target actor [220] (when the subject [272] is an actor [220])
Set of actors [220] having the same role as the target actor [220]
Set of ad-hoc workflows most similar to the target workflow process [128].

To compute an endogenous reference group [3030], the system sorts a list of all subjects [272] homogenous to the target subject [272]. Homogeneous means a subject of the same type (actor [220] to actor [220], group [225] to group [225], or workflow process [128] to workflow process [128]) or of a compatible type (actor [220] to group [225]. The list is sorted according to a distance defined over feature descriptors [3080]. In the default embodiment the distance is the Euclidian distance between the feature descriptors [3080]. In another embodiment it is a linear combination of the Euclidian distance between the feature descriptors [3080] and of the Euclidian distance between the variances of the feature descriptors [3080].

Finally, the system re-computes the reference group [3030] (be it endogenously or exogenously defined) at regular intervals. In one embodiment of the invention this interval is a fixed multiple of w, for example 10w. In another embodiment, the interval is adapted to the feature [2900] considered: for example if characteristic time scales are available for that feature then the median value of these time scales over the reference group is used as the time interval for the next computation of the reference group.

The mechanism to detect anomalies by deviation [805] is executed at fixed time interval w. Two cases have to be considered depending on the type of referential [3000].

In the case of a time-based referential (i.e. any referential [3000] which is not a peer-group referential [3005]), a deviation is detected when the absolute value of the difference between the analyzed feature descriptor [3080] and the reference feature descriptor [3080] is larger than A times the variance of the reference feature descriptor [3080] across the reference observations.

In the case of a peer-group referential [3005], a deviation is detected using the same criterion after replacing the variance across the set of observations in time with the variance across the set of subjects comprising the reference group.

In one embodiment, the threshold multiplier A has a default value of 10, and is tuned to larger or smaller values based on feedback given by the user regarding detected anomalies by deviation (see the section on Anomaly detection tuning).

Predicted Behavior

By leveraging behavioral norms and deviations from those norms in the behavioral model [200] built and continuously maintained by the behavioral modeling component [445], the system also predicts individual behavior; in other words it uses the past to predict the near future.

Predicted behavior [262] computed by this invention includes anomalous behavior and also more generally includes any kind of future events [100] that are deemed to have a high likelihood of occurring, based on past events [100]. Examples of behavior predicted by the system in the default embodiment include but are not limited to:

- Using the behavioral trait [295] measuring acceptance of criticism and described previously in this invention, the system has recorded in the model that a particular actor [220] always reacts very aggressively to negative performance reviews. Then, when the occurrence of the next performance review is detected by any kind of mechanism (for example, an ontology classifier [150] flagging review language in electronic communication [123]), the system will raise an alert at a future point in time at which the subjects negativity is expected to peak, such as 2 weeks after the results of the review have been communicated.
- Using the behavioral trait [295] measuring social proximity between a pair of actors and described previously in this invention, the system has recorded several situations in the past in which members of a particular group of actors [225] severed a strong relationship with some other actor [220]. These past situations shared a number of precursory signs, such as the discussion of a (presumably sensitive) topic [144] in the month preceding the severance of the relationship, or the involvement of a common third-party in the electronic communications [123]. Then, when the same patterns are observed at some point in time for another member of that same group [225], the system will predict that the social relationship will be similarly damaged within a short time frame.
- When an anomaly [270] has been detected soon after several past occurrences of a recurring event [101], the system will predict a similar anomaly [270] when a new occurrence of the same recurring event [101] has been detected. For instance, if a particular group of actors [225] always takes a discussion [136] offline (which is described as a call-me event, along with a method to detect it, in U.S. Pat. No. 7,519,589, the disclosure of which is incorporated by reference herein for all purposes) after a regularly-occurring meeting, the system will predict a call-me event right after the next occurrence of the meeting. As a result, an analyst or operator of the system would have good reasons to investigate the content of that particular discussion [136] among those actors [220].

Similarly to anomalies [270] raised on past events, the system automatically assigns a confidence level [870] to predicted anomalies [270]. In the default embodiment, the confidence [870] of a predicted anomaly [270] is always lower than if all events [100] had already been observed. The confidence level [870] is derived from the confidence [870] of the corresponding past anomaly [270] by applying an uncertainty factor, which is simply the prior probability that missing events [100] will be observed given all the events [100] that have been observed so far. For example, in the case in which the missing events [100] are part of a workflow process [128], which is modeled by the default embodiment as a higher-order Markov chain (as described in the section on continuous workflow analysis), the probability of those missing events [100] is directly inferred from the parameters of that Markov chain.

As previously described, one fundamental type of anomalous behavior raised by the system are anomalies by deviation [805], which are detected on any kind of feature [2900] present in the stream of events [100]. Similarly, predicted behavior [202] is inferred on the basis of particular referentials [3000] whenever an analyzed feature [3075] matches the corresponding reference feature [3070], rather than when a deviation is observed between the analyzed feature [3075] and the reference feature [3070]. The fact that the pair-wise comparison operates on baseline behavior [260] guarantees the reliability of this prediction, reference features [3070] are statistically significant as they result from aggregating patterns of behavior over a significant period of time (for example in the case of a baseline referential [3010]) or over a large number of actors [220] (for example in the case of a peer-group referential [3005]).

Alert Generation

The system generates alerts [305] for detected anomalies [270] that meet specific criteria of importance. In the default embodiment of the invention, the unique criterion is Conf*Rel≥κ where Conf is the confidence level [870] of the anomaly, Rel its relevance [280], and κ is a threshold for alert generation.

Figure 31:
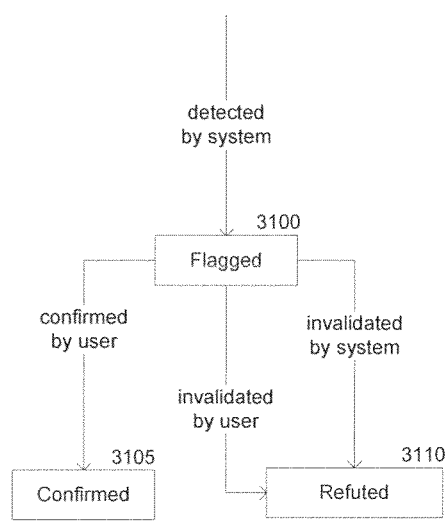
FIG. 31 is a state diagram for anomalies generated by the system in accordance with an embodiment of the present disclosure.

FIG. 31 shows the states in which an alert [305] generated by the system exists, and the transitions between those states:

An alert [305] is generated by an alert profile, which is defined as follows:

- Alerts [305] apply to one or more actors [220], groups [225], or workflow processes [128], sorted by level of involvement in the alert [305]. In the default embodiment, the level of involvement is simply the actor presence in the associated discussions [136] and singleton events [100]. In another embodiment, the number of different personae involved in the associated data increases an actor's [220] involvement in the alert [305].)
- Alerts [305] are defined against a given time window.
- List of data sources considered for this alert profile.
- Alert production mode: email (SMTP or IMAP), syslog event, SNMP trap.

In addition to the system-level parameter κ, the alert [305] generation mechanism is parameterized by the following values:

- A maximum aggregation time period $t_a$ is defined for anomaly detection (i.e. only events [100] within this timeframe are correlated to possibly trigger an alert

[305]. In one embodiment, only events [100] occurring within a sliding window [380] of size $t_a$ are aggregated into an alert [305]. In an alternative embodiment, a window of size $t_a$ is considered around each occurrence of recurring external events, so that events [100] occurring in disjoint windows [380] can be aggregated into an alert [305].

A minimum number of independent isolated events [100] to trigger an alert [305] can also be defined.

In one embodiment of this invention, the user can modify the parameter $t_a$ on which anomalies [270] are accumulated to build up an alert [305], using a slider rule widget with a logarithmic scale with windows ranging from as small as 1 hour to as large as 1 month.

In particular, the definition of these configuration parameters implies that since the number of individual actors [220] covered by the system and the data processing throughput are bounded, then the frequency of generated alerts [305] is in general bounded.

In addition, the user can provide feedback [160] regarding the actual importance of one or more generated alerts [305], as described in the section on Anomaly detection tuning.

Post-Processing Actions

In addition to alert [305] generation, a number of various actions can be configured, including:

Custom report [310] generation;

Quarantine [312]: data items [122] and evidence [202] that are associated to a detected alert [305] can be stored in a quarantine for further investigation, for example by a compliance officer in the corporate organization;

Logging [313]: when an anomaly is detected, the logging functionality either stores metadata relative to the data associated to this anomaly, or stores the native data itself. In the latter case, the way data items are stored can be configured more finely: data can be made anonymous and if the data item is an email, attachments can be stored as well or simply discarded;

Notification [314]: the notification functionality notifies the actor [220] responsible for a suspicious activity, for example the sender of an email that violated a compliance rule. The objective here is to educate employees on corporate policies.

Furthermore, the system can be configured to trigger mitigation and preventive actions as soon as it is notified of an anomaly. The benefits of mitigation and preventive actions are twofold.

First, this is necessary because it provides an extra safety mechanism, thus further reducing the operational risk.

Moreover, these automatically-triggered actions can limit damages resulting from fraudulent or accidental behaviors in cases where human individuals have failed to react to the anomalies [270] (either by negligence or by malevolence).

Examples of mitigation and preventive actions are:

Blocking traffic: this action blocks the suspicious traffic, for example on the SMTP server if the data is email, or by sending a TCP reset if the data is transmitted over HTTP;

Restricting credentials: this action restricts the authorization and access levels of an individual actor [220] or a whole group [225] that is the subject [385] of an alert [305];

Inhibiting functionality: this action blocks specific functionalities of an enterprise application (either for an individual [220], for a group [225], or globally).

Anomaly Detection Tuning

User Feedback

Feedback given by a user of the system on an alert [305] consists of assessing the relevance of the alert [305], i.e. the risk it represents. Based on that feedback, the system updates the relevance [280] of the underlying anomalies.

The system lets the user enter feedback [158] on:
A single alert [305] instance;
Or every instance of a periodically-occurring alert [305];
Or a cluster of alerts [305] computed by the system:
Or an anomaly class [3200] defined against that alert as described later in this section.

Anomaly Classes

A key feature of the anomaly detection tuning mechanism described in this invention is the ability to define a whole anomaly class [3200] showing a particular similarity and providing specific feedback [158] for all the anomalies [270] contained in this class [3200].

An anomaly class [3200] can be defined in a number of ways. In the default embodiment, a class is defined by one or more expansion criteria. Each criterion defines a set of anomalies [270] (including the set of initial anomalies [270] contained in the alert on which the user is entering feedback [158]), and the combination of multiple criteria is interpreted as a conjunction, so that the resulting anomaly class [3200] is the intersection of the anomaly sets. In another embodiment, an additional operator allows combination of several classes [3200], in which case the combination is interpreted as a disjunction; this allows the ability to capture the union of anomaly classes [3200] using a single set of criteria.

Figure 32:
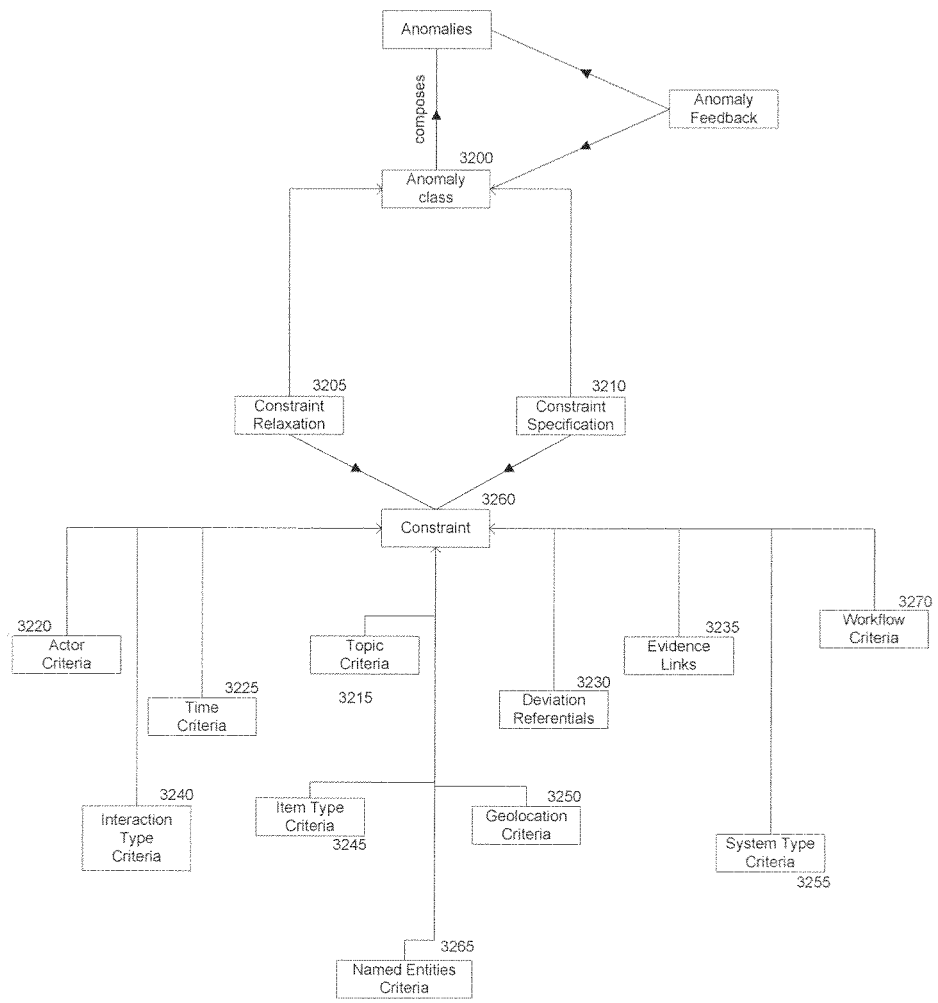
FIG. 32 is a flowchart for defining an anomaly class when entering user feedback in accordance with an embodiment of the present disclosure.

In another embodiment, as illustrated in FIG. 32, an anomaly class [3200] can be defined in two different ways. The first is to define a class by relaxing constraints [3205] on a given anomaly [270], which allows the capture of very targeted classes [3200], in which all anomalies [270] share many properties with the initial anomaly [270]. The second is to define a class [3200] by specifying similarity constraints [3210] with respect to a given anomaly [270], which allows the system to capture broader classes [3200], in which anomalies [270] only share one or a few properties with the initial anomaly [270].

An anomaly class [3200] can be defined by constraint relaxation [3205] on anomaly A by using any number of the following constraints [3260]:

Actor criteria [3220]: Include anomalies [270] involving any actors [220]; alternatively, include anomalies [270] involving only some of the actors [220] $a_1, \ldots, a_n$ of A; alternatively, include anomalies [270] where actors [220] $a_1, \ldots, a_n$ of A are expanded to the group [225] of similar actors (which can be defined in a number of ways including personal cliques [255], similar business roles, etc.).

Time criteria [3225]: Include anomalies [270] with any time frame; alternatively, include anomalies [270] matching a given time specification (which is matched by A).

Topic criteria [3215]: Include anomalies [270] having any associated topics [144]; alternatively, include anomalies [270] containing only some of the topics [144] $t_1, \ldots, t_n$ of A.

Deviation referentials [3230]: In case A is an anomaly by deviation, include anomalies by deviation detected against other referentials [3000].

Named entities criteria [3265]: Include anomalies referring only to some of the named entities $E_1, \ldots, E_n$ of A.

Evidence links [3235]: In case A is an anomaly by association, [850], include anomalies [270] carrying only some of the evidence links [108] $L_1, \ldots L_n$ of A. For any type of anomaly [270], include anomalies [270] which are associated to A by a given evidence link [108], even if the confidence of that evidence [108] is not necessarily above the detection threshold. Types of evidence links that can be specified by the user include but are not limited to: causal relationship, shared workflow process [128], shared textblock pattern [124], shared periodic pattern [126], association to an external event [170].

System type criteria [3255]: Include anomalies [270] involving only some of the systems $S_1, \ldots, S_n$ of A (where systems are either machines or applications).

Item type criteria [3245]: Include anomalies [270] involving only some of the item types $T_1, \ldots, T_n$ of A.

Interaction type criteria [3240]: Include anomalies [270] involving only some of the action types $A_1, \ldots, A_n$ appearing in A. In one embodiment, interaction types that can be specified by the user include but are not limited to: actor-actor communications [123] (exchanging some message, belonging to the same list of recipients), collaboration (shared meeting attendance, work on creating common content), actor-data interactions (check-in operations, data modifications), and system or application interactions (logging into a system, creating a document in an application, creating data on a particular machine).

Geo-location criteria [3250]: Include anomalies involving only some of the geographical locations $g_1, \ldots, g_n$ appearing in A.

Alternatively, an anomaly class [3200] can be defined by constraint specification on the basis of anomaly [270] A by using any number of the following criteria:

Capture all anomalies [270] involving the same actors [220] as A; alternatively, capture all anomalies [270] sharing actors [220] $a_1, \ldots, a_n$ of A; alternatively, capture all anomalies [270] including actors [220] similar to actors $a_1 \ldots, a_n$ of A (where similar actors [220] can be defined in a number of ways including personal cliques [255], similar business roles, etc.)

Capture all anomalies [270] having textblock hits [130] for some textblock patterns [124] $c_1, \ldots, c_n$ that also correspond to textblock hits [130] in A.

Actor criteria [3220]: Capture all anomalies [270] overlapping the time frame of A; alternatively, capture all anomalies [270] overlapping the time frame of events [100] $e_1, \ldots, e_n$ of A; alternatively, capture all anomalies [270] in the temporal neighborhood of A (where proximity is defined for example by specifying the size of a time window).

Topic criteria [3215]: Capture all anomalies [270] sharing topics $t_1, \ldots, t_n$ with A.

Named entities criteria [3265]: Capture all anomalies [270] sharing named entities $E_1, \ldots, E_n$ with A.

System type criteria [3255]: Capture all anomalies [270] sharing systems $S_1, \ldots, S_n$ with A (where systems are either machines or applications)

Item type criteria [3245]: Capture all anomalies [270] sharing item types $T_1 \ldots, T_n$ with A.

Workflow criteria [3270]: Capture all anomalies [270] involving workflow processes [128] $W_1, \ldots, W_n$ also present in A; alternatively, capture all anomalies [270] involving some specific workflow stages [154] within these workflow processes [128].

Interaction type criteria [3240]: Capture all anomalies [270] sharing action types $A_1, \ldots, A_n$ with A Geo-location criteria [3250]: Capture all anomalies [270] sharing geographical locations $g_1, \ldots, g_n$ with A.

The feedback [158] given by the user on an anomaly [270] or an anomaly class [3200] is a binary value, "relevant" or "irrelevant", meaning that the anomaly [270] is confirmed [3105] or refuted [3110]. The next section explains how the system automatically tunes the anomaly detection component [450] using that feedback [158].

Feedback on Atomic Anomalies

The first type of anomaly [270] that the user can give feedback [158] on is an atomic anomaly [830]. For example, if the event [100] corresponds to a previously blacklisted topic [144], the user may decide to relax the constraint on this topic [144] by applying a lower index of relevance to all events [100] corresponding to the detection of this topic [144].

In addition, some abnormal events are defined with respect to a threshold value, so that another way to tune the detection of this type of anomaly is to simply change the threshold at which an event [100] is considered abnormal: for example, what minimal value of a shared folder's volatility will constitute an anomaly [270].

Feedback on Anomalies by Association

Anomalies by association can also be tuned by a user at a fine-grained level, in addition to the indirection level of each association type described in the section on Anomaly detection, which is part of the system configuration.

For example, if a topical association indicates that two events [100] share a given topic [144] T, feedback [158] can then be given in the following ways:
  Either by indicating the relevance [280] of this whole class of association, so that all topical associations will be impacted.
  Or by indicating the relevance [280] of similar association instances, so that in this case all associations of events [100] sharing topic [144] T will be impacted.
  Or by indicating the relevance [280] of this specific association only.

Feedback on Anomalies by Deviation

Figure 33:
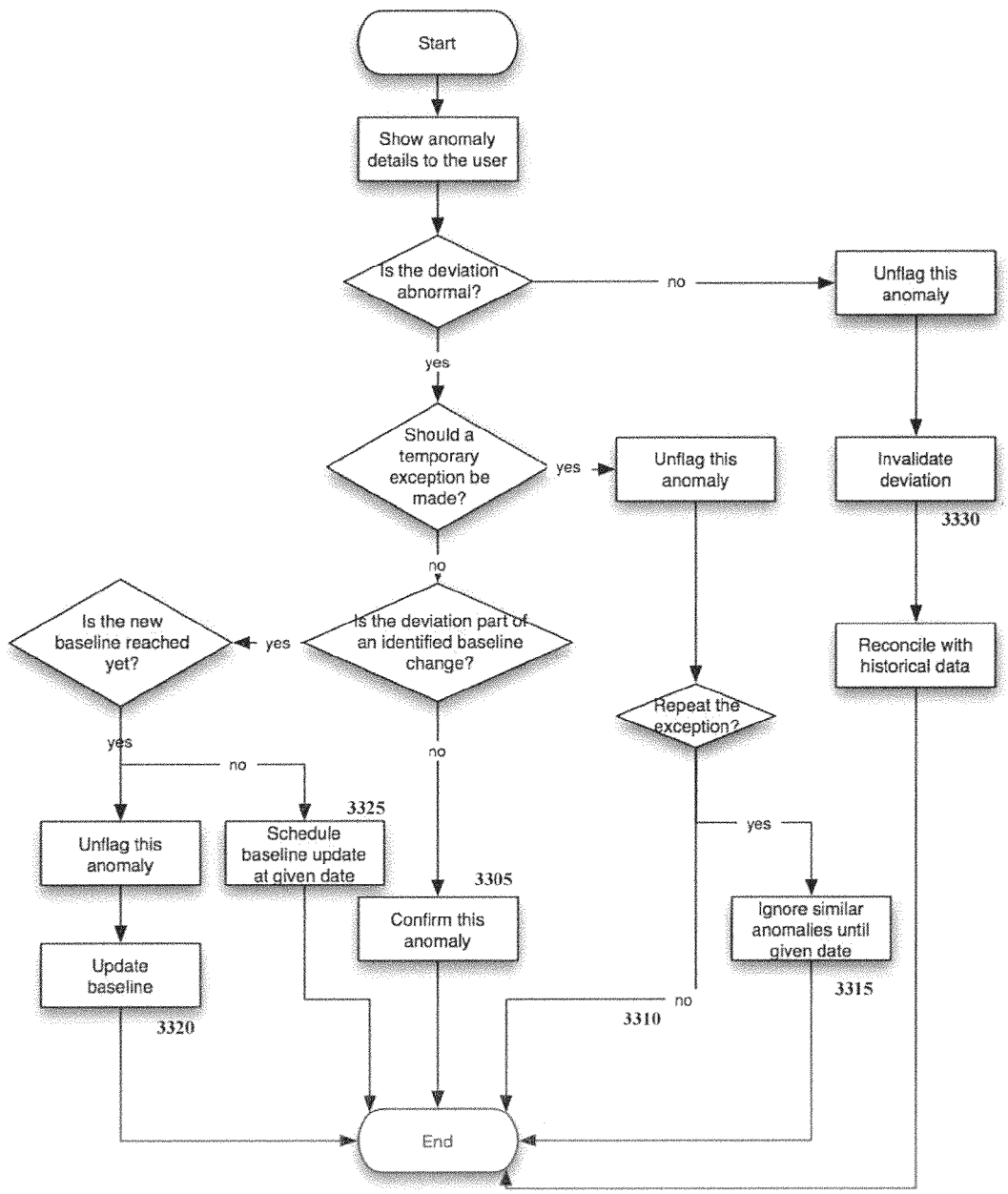
FIG. 33 is a flowchart of the user feedback process for an anomaly by deviation in accordance with an embodiment of the present disclosure.

FIG. 33 shows the process by which a user can give feedback [158] on an anomaly by deviation [805]. Such feedback [158] includes the following options:
1. Confirms the anomaly [3305]: this validates that the anomaly [270] is indeed relevant and presents some risk;
2. Mark the anomaly as unique exception [3310]: this implies that this occurrence will be discarded, but also that any future occurrence of the same anomaly [270] will be detected;
3. Take an action with respect to the baseline:
   a. Decrease sensitivity [3330]: this means that the deviation threshold will be increased for the relevant feature (thus indicating that this occurrence is a false positive and will be refuted [3110]);
   b. Mark the anomaly as a temporary exception [3315]: for a given period of time, the relevant feature will not be monitored, after which the same baseline is expected to resume, so that the same anomaly [270] would be detected again;
   c. Mark this observation as new baseline [3320]: when choosing this option, the user indicates that a sudden baseline change is known to have happened, and that the data-driven monitor should override the baseline trend with the recent trend;
   d. Mark as ongoing baseline change [3325]: when choosing this option, the user indicates that a slow baseline change is known to be happening, and that the data-driven monitor should update the baseline trend as long as this change is occurring, then start monitoring again when the trend has stabilized.

In addition, as in the general case previously described, when indicating a change to the baseline trend, the user may wish to apply the change to a whole class [3200] of similar anomalies, such as those concerning other actors [220] or those covering another topic [144].

It should also be noted that the real-world facts known by an analyst can also be indirectly fed into the system, by giving feedback [158] including but not limited to the following types:
- A slow change or trend is taking place;
- Exceptional circumstances require making temporary exceptions in the definition of abnormality in a given context (topic, actors, time, etc.).

Threshold Adjustment

The anomaly detection component [450] in this invention contains an additional mechanism to fine-tune the detection of anomalies by deviation [805]. Rather than the specific types of Boolean feedback previously described (whereby the user indicates whether an anomaly [270] or anomaly class [3200] is absolutely relevant or absolutely irrelevant), this additional mechanism allows a user to manually change the threshold at which a deviation is detected on a given feature.

For example, the user [455] adjusts the threshold (as defined in the section on Anomaly detection tuning) used for detecting abnormal variations of the information flow between two actors [220], or abnormal variations of the measure of centrality of a given actor [220], or the breach in the theoretical workflow process [128] for a given type of document [162].

Also, the user can adjust the weights associated with each behavioral metric [290] used to assess individual behavior [210] or collective behavior [215] associated with a particular trait [295], as described in the Individual Behavior Assessment Section. In one embodiment of the invention, this is done by manually setting the numeric weights of each metric [290]. In another embodiment, this is done using a slider widget acting as a lever to adjust the weight of each metric [290] while visually controlling the impact of those adjustments on the actor rankings [275], as described in the Alert Visualizations Section.

In the default embodiment of the invention, the threshold adjustment mechanism is available only to advanced users of the application since it requires a lower-level understanding of the anomaly detection model. The benefit of this additional mechanism is that it allows more accurate feedback on which dimensions of a detected anomaly [270] need to be given more (or less) importance.

Anomaly Relevance Adjustment

The most straightforward mechanism by which the system adjusts the relevance level of detected anomalies [270] is based on user feedback [158].

As described previously, this feedback [158] can be a Boolean value (relevant/irrelevant), in which case the anomaly relevance [280] is either set to 0 or left at its original value, a relative value (increase/decrease relevance [280])—for example in the case of periodic anomalies—, or this feedback [158] can be a numeric value whereby the user directly indicates the relevance [280] to assign.

An additional mechanism aims to automatically prevent false negatives in the anomaly detection process in the case of anomaly bursts and is referred to as anomaly burst adjustment.

Whenever a new anomaly [270] is detected by the system, the time elapsed since the last anomaly [270] is taken into account to adjust the relevance [280] of the newer anomaly. The goal of this mechanism is thus to account for the case of several anomalies detected within a short timeframe which are part of a burst phenomenon and which all have a root cause: the user's attention should be focused on this event [100] (or sequence of events [100]) rather than on every individual anomaly [270].

In one embodiment of the invention, a burst interval is defined: when the interval between two successive anomalies [270] is longer than the burst interval, no burst adjustment is applied; when the interval is shorter, the adjustment is an exponential function of the time interval. The negative exponent factor in this exponential function is optimized by the system at regular intervals in order to minimize disagreements between successive anomalies [270], under the hypothesis that all such disagreements are due to burst phenomena and that all agreements occur outside of bursts.

Feedback Relevance Adjustment

In addition to adjusting the relevance [280] of previously detected anomalies [270], the system also automatically adjusts the relevance of feedback [158] entered by the user in two different situations: feedback decay governs the evolution of feedback relevance over time, while feedback reinforcement describes the impact of recent user feedback on prior feedback.

First, every time new feedback [158] is given by the user to indicate the actual relevance [280] of a particular anomaly [270] or an entire anomaly class [3200], this feedback [158] will not be given the same importance in the future: this is because a variety of factors inside or outside the corporate environment may totally or partially invalidate that user decision at a later point in time. This mechanism is referred to as feedback decay. Ideally the user would then remove that feedback [158] from the system (which is allowed by the present invention). However the reliability of the anomaly detection scheme cannot depend upon every user remembering to update their manual input whenever the context requires it. In addition, the other automated tuning mechanism (described in the next paragraph) is contingent on later anomalies [270] being presented to the user for confirmation or refutation; if future data happens not to contain any such similarly abnormal events, this alternative tuning mechanism will not be offered to the user. This is why anomaly feedback [158] entered by a user of the system is subjected to natural decay.

Automatic tuning of the weight of user feedback [158] follows a simple decay scheme so that more recent decisions may optionally be given a greater weight (in this case, a value of relevance [280]) than older ones. The main goal of this mechanism is to avoid false negatives resulting from assigning a constant important over time to past decisions even when the data profile has changed significantly (and also in some cases, when these past decisions are no longer relevant to the users of the system).

In the default embodiment of the invention, user feedback decay follows an exponential decay scheme—as commonly found for example in voting expert systems. Thus, for example, if the value for the half-life of such feedback [158] is one month, the relevance weight associated with these decisions is halved every month.

User feedback [160] is given on two main types of objects produced by the invention: anomalies (as part of the anomaly detection process) and changes in the data profile (as part of the data discovery mechanism optionally provided by the data collection component [400]).

For anomaly feedback [158], the half-life of feedback is optionally adjusted based on the nature of the anomaly, so that the characteristic timescales of the respective actors, data types, and processes involved in the anomaly will be taken into account to compute the feedback half-life for that anomaly.

For data profile feedback [162], the system configuration governs the definition of the decay parameter. The configurations available include, but are not limited to:
- A decay parameter which is proportional to the time elapsed since the change (similarly to the case of anomaly feedback).
- A decay parameter which is proportional to the volume of data analyzed (so that for low data throughputs, the decisions will remain valid for a longer period of time).

In addition to the natural adjustment of feedback weights described previously as feedback decay, the system described in this invention automatically adapts past feedback [158] based on more recent feedback [160] entered by the same or another user: this mechanism, called feedback reinforcement, allows the incorporation of a dynamic knowledge base into the relevance model rather than a static knowledge base built on a case-by-case basis. Furthermore the system guarantees the consistency of relevance decisions with respect to past decisions; additionally, by boosting decisions that have been made multiple times, it also increases the recall rate of actual anomalies [270].

More precisely, when past feedback [160] is positively reinforced by recent feedback [160], its relevance is increased; when it is negatively reinforced, its relevance is decreased.

In the default embodiment of this invention, reinforcement is strictly defined by the subsumption relation between instances of anomaly feedback [158]: since a partial order is defined on anomaly classes [3200], past feedback [158] corresponding to classes [3200] included in more recent feedback [158] are the only ones considered for reinforcement. If the feedback [158] decisions are identical, it is a case of positive reinforcement; if the decisions are opposite, it is a case of negative reinforcement. In another embodiment, reinforcement is more broadly defined, so as to include all pairs of feedback [158] with a non-empty intersection. The system then computes an overlap measure and uses that measure to weigh the reinforcement of the older anomaly [270]: an example of such an overlap measure consists of computing the ratio of shared features (e.g. actors [220], topics [144], groups [225], workflow processes [128], named entities, evidence [108] links and associations, etc.) over the total number of similar features in the older anomaly [270]. For example, if the older feedback [158] is related to an anomaly class [3200] comprising 8 actors [220], and this set of actors [220] overlaps with 3 actors [220] in the anomalies of the more recent feedback [158], then the reinforcement will be weighed by a factor of 3/8.

In one embodiment of the invention, the feedback reinforcement mechanism follows a multiplicative increase/multiplicative decrease scheme commonly found in voting expert systems: the relevance of a positively reinforced anomaly [270] is multiplied by a fixed amount and the relevance of a negatively reinforced anomaly [270] is divided by a given factor. For example, both multiplicative factors are set by default to 2. This factor is then optionally multiplied by a weight associated with the reinforcement operation as described above.

Continuous Multi-Dimensional Scaling

To efficiently display massive datasets in visualizations [204] such as the sequence viewer [440], the present invention relies on a multi-dimensional scaling (MDS) component [425] to compute the visualization layout [305] for such datasets.

The multi-dimensional scaling component [425] uses an incremental multi-dimensional scaling algorithm that is an improvement over a method described in [Morrison 2003].

The algorithm uses a sliding time window of period T. In one embodiment of the invention, the size of T is taken as 3 months, which is the characteristic scale of a stable human behavior along a particular trait, and thus provides a reliable baseline to detect deviations from that baseline that represent anomalous behavior.

The continuous MDS computation is initialized by choosing a core subset of data items, using random sampling from the sliding window ending at the current time, and computing a static layout for those items. In one embodiment, this initial computation uses a spring algorithm initialized with a random layout. As way of example, assume the core subset is of size 300,000 data items, the window is of length 3 months, and the window is updated on a weekly basis. Thus, each week, roughly 23,000 new items are added to the layout and 23,000 obsolete items from the first week in the window are deleted. The amount of data in the window stays roughly constant. The present invention uses an incremental multi-dimensional scaling algorithm to produce an updated layout each week without running a full static MDS algorithm over all 300,000 data items.

In other words, the core subset is used to generate a layout using the basic, static spring-force algorithm. When the current low-dimensionality layout has to be updated by inserting new items, this core subset serves as a basic layout and the position of its member items is not modified. When the current low-dimensionality layout has to be updated by removing existing items, the position of items in the core subset is only updated if the removed item belonged to the core subset.

In the default embodiment of the invention, the core subset size is defined as $\Theta * \sqrt{N}$ where N is the number of items in the initial sliding window and $\Theta$ a small constant, for example $\Theta=10$.

Thus, in addition to the static MDS computation, two basic functions are used to update an existing MDS layout based on a sliding window: insertion of a data item entering the sliding window and deletion of an item leaving the sliding window.

Item Insertion

The continuous MDS computation in this invention uses a variation of [Morrison, 2003] that improves on the interpolation method. The original method places the item to interpolate on a circle around the nearest core subset item, at an angle obtained through minimization of an error criterion on the difference between high-dimensional and low-dimensional distances against all core subset items; also, it computes a sample to refine the position of the interpolation item using an expensive method, even though the sample obtained rarely varies. This method is too computationally intensive to be run in real time, and has additional limitations—the main one being that it only works in two-dimensional spaces. Our proposed method is much faster and, on most datasets, offers as good results for all error criteria used for evaluation.

The method used for inserting a new data item is the same as in [Morrison, 2003] except that interpolation works as follows:
- Sort the core subset items by increasing distance to the item to interpolate.
- Set the position of the item to interpolate to be equal to the position of the nearest neighbor from the core subset (i.e. the first element in the list from the previous step)
- Run the base spring algorithm for the item to interpolate using only the k nearest neighbors from the core subset, where k is a predefined constant. (In the default embodiment of the invention, k=20 is shown to produce good results, comparable to what is produced by setting k=100.)

Item Removal

Item removal proceeds by the following steps:

If the item to remove is not in the core subset, remove it from the item set

Otherwise, pick a random item which is not in the core subset

Re-run the subset iterations from the static algorithm, except that the iteration does not start with random positions but with the current positions for the core subset items, and a random position only for the new item being added Locate areas of change in subset layout by comparing old and new positions and flagging data items exceeding a pre-defined threshold Re-run interpolation of the neighbor items belonging to an area of change, using the interpolation method described in the previous paragraph.

This method of performing item removal allows the basic layout to change over time while still preserving the original layout.

Sequence Viewer

The sequence viewer [440] is a real-time data visualization included in this invention that provides the user with a synthetic, continuously updated view of a potentially massive number of event sequences [166] (which typically reflect individual and collective behavior) by leveraging the visualization layout [355] produced by the multi-dimensional scaling (MDS) component [425] previously described.

The sequence viewer [440] is thus a unique and highly efficient visual representation of massive datasets that also has insightful analytical benefits. More precisely, it offers the following advantages:

The sequence viewer [415] presents the user with a potentially huge number of sequences [166] of any type of events [100] in a compact and synthetic manner.

In addition, the sequence viewer [415] produces a layout that groups together event sequences [166] following the same pattern and brings closer together sequences [166] that exhibit similar patterns. The result is that unusual sequences stand out from the rest of the data and can be analyzed further: where unusual sequences [166] are understood as sequences [166] that do not belong to a cluster of sequences [166] matching a dominant pattern. For example, when the sequence viewer [440] is used to display instances of a business workflow, unusual sequences [166] correspond to deviations from the typical steps in the realization of an ad-hoc workflow process [128], or from a non-compliant realization of a formal process [128].

Finally, in terms of categorization, the sequence viewer [415] increases the completeness of any categorization scheme by leveraging the structure represented by the underlying sequences [166], especially when they are based on discussions [136]. This is because the sequence viewer [415] can categorize items [122] which would otherwise have been missed, for example items [122] with very low text content. These items [122] usually cannot be categorized based on their sole content, however discussions [136] reveal different types of causal relationships items have with other items [122], such as messages constituting actions that agree, disagree, approve, or reject a topically relevant issue found in other items of the same discussion [136]. The sequence viewer [415] can even reveal to the user the existence of an altogether previously unknown workflow process [128].

Construction of Event Sequences

An event sequence [166] can represent any list of time-stamped events [100]. Possible types for such events [100] include but are not limited to: emails and other communications [123] (time-stamped using the date at which the communication [123] was sent), loose documents (which can be time-stamped using the last modification date), or external events [170] (using a natural time-stamp definition). The superset of all events [100] can be optionally filtered by any mechanism relevant to the particular application scenario, following which sequences are defined as lists of items [122] that pass the filter. In the default embodiment of this invention, discussions [136] provide the basis for defining event sequences [166]: for example, if the user can select a particular actor [220], the event sequences [166] will consist of all discussions [136] containing at least one data item [122] involving that actor [220].

Once event sequences [166] are defined, a tagging scheme is applied to determine a unique item tag [142] for each element within an event sequence [166] and produce tagged sequences [138]. This scheme can be defined in any way relevant to the particular application scenario.

In one embodiment of the application, tagging is defined as an ordered list of queries [168] that are continuously run on the incoming stream of events [100], each query [168] being associated with a tag or label. Examples of tagging schemes include but are not limited to.

Discourse-function tagging, applied only to discussions [136] containing electronic communications [123] with extracted text such as emails, instant messages, or phone conversation transcripts;

Workflow stages [154] in instances [134] of a particular workflow process [128];

Revisions in document lifecycles computed by the text-block detection component [470].

For that particular tagging scheme, whenever an item [122] has been hit by at least one query [168], it is tagged with the tag [142] of the first such query [168] appearing in the query list. Any item [122] missed by all queries [168] is either discarded from the event sequence [166] or assigned a default label. In addition, the tagging scheme optionally includes an alignment position definition, which determines a position in each event sequence [166] that will be used for horizontal positioning of each sequence [166] in the sequence viewer's [415] layout. In one embodiment, the alignment position is by default defined as the first item [122] matched by the highest-ranked query [168], and can be overridden by the user with another definition more specific to the particular type of events [100] considered.

Layout Computation

Once a potentially large (and increasing over time) number of tagged sequences [138] has been produced by the system, the sequence viewer [415] uses the result of a continuous MDS computation to produce a one-dimensional layout of those tagged sequences [138].

In one embodiment of the invention, an incremental one-dimensional MDS algorithm as defined in this invention is used and provided by the MDS component [425], in which an optimization is introduced to speed up the layout for this particular profile of data. This optimization phase stems from observing that over a very large number of tagged sequences [138] that represent common events [100], such as those associated with steps in a particular workflow process [128], many tagged sequences [138] will be identical Thus for sequence layout computation, the MDS algorithm provided by the MDS component [425] is a modified version of the previously-described method: it maintains a cache of already-positioned data points (i.e. tagged sequences [138]) so that for each data point incrementally added to the layout in the sliding-window-based [380] MDS algorithm, if that data point already exists in the cache, a counter is incremented but no new position is computed. Conversely, whenever a data point (i.e. a tagged sequence [138]) leaves the sliding window [380] and must be deleted from the layout, that counter is decremented and positions are only updated if that point belonged to the core subset in the MDS algorithm and the counter has reached zero.

The metric definition is also an input to the MDS algorithm. In one embodiment of the invention, the distance definition used in the MDS computation is the shared subsequence distance, which is defined as follows: for two tagged sequences [138] $S_1$ and $S_2$, using their respective alignment positions compute the number of identically tagged items [122] in each tagged sequence [138] at the same position. Let us call this number $c(S_1, S_2)$. Then the distance between $S_1$ and $S_2$ is defined as $$c(S_1,S_2)/\text{Max}(\text{length\_left}(S_1),\text{length\_left}(S_2))+\text{Max}(\text{length\_right}(S_1),\text{length\_right}(S_2))$$

where length_left(S) is the number of items [122] in the tagged sequence [138] S occurring prior to the alignment position and length_right(S) the number of items in S occurring after the alignment position.

In another embodiment, a number of patterns are defined by the user in the form of regular expressions $p_1, \ldots, p_k$ using as symbols the list of all available item tags [142]. These regular expressions are taken to represent particularly significant patterns of events [100], such as sequences [138] know to represent anomalous events [100], or alternatively to represent nominal, standard sequences [138]. The distance between two tagged sequences [138] $S_1$ and $S_2$, called the shared patterns distance, is then computed as the L2 norm of the vectors $P(S_1)$ and $P(S_2)$ where for any tagged sequence [138] S, P(S) is a vector of length k where the i-th component is 0 if S does not match pattern pi and 1 if it does match pi. Optionally: weights can be associated with each dimension in the L2 norm computation in order to reflect different levels of importance among the patterns.

In yet another embodiment, the distance between two tagged sequences [138] is defined as a weighted combination of the shared subsequence distance and of the shared patterns distance.

The continuous sequence viewer [415] is regularly updated so as to organize tagged sequences [138] analyzed in a sliding time window [380]. In one embodiment of the invention, real-time sequence layout computation relies on two types of update operations: major updates and minor updates.

During a major update, a full multi-dimensional algorithm computation is performed on an initial data set consisting of tagged sequences [138] in the sliding window [380]. The algorithm used comprises an iterative step where a subset of tagged sequences [138] sampled from the whole data set is positioned in a number of iteration loops, and an interpolation step in which all tagged sequences [138] outside the sampled subset are positioned by comparing them only to their closest neighbors among subset sequences [138].

One type of multi-dimensional scaling algorithm that lends itself to such a two-step process is the family of force-based algorithms, but other types of algorithms can be used in this invention. Using a typical force-based algorithm, the running time for this step is $O(S^2)$ where S is the size of the interpolation subset.

During a minor update, a list of new tagged sequences [138] is added to the data set and a list of old tagged sequences [138] is removed from the data set. New sequences [138] are positioned using the interpolation step only. An old sequence [138] can be removed without repositioning other sequences [138] if it did not belong to the initial sampled subset. Otherwise, the impact of its removal on its closest neighbors needs to be taken into account.

Using a typical force-based algorithm, the running time for this step if $O(W^{3/2})$ where W is the size of the data entering or leaving the window in a steady-state regime. The default embodiment of this invention performs minor updates using the modified spring-based multi-dimensional scaling algorithm included in the continuous MDS component [425].

Since in continuous mode [375] the system cannot rely on a user validating the resulting layout, a number of techniques are used to automatically assess the reliability of the results and in particular to decide when items entering and leaving the sliding window result in a minor update and when a major update needs to be performed. In one embodiment of the invention, the following validation steps are performed:

Error validation, for example using a global stress function appropriate to force-based algorithms. In one embodiment of the invention, the stress function is the sum of the absolute values of the differences between low-dimensional distance and high-dimensional distance, computed over a random sample of size $\sqrt{N}$, N being the total number of sequences [138] accumulated in the current layout. (It is important that sampling be done over all data items and not only on the core subset.) If the error exceeds a threshold, there is no need to perform further validation and a major update of the layout needs to be performed.

Clustering tendency verification, so as to verify that the data exhibits a clustering structure. This verification is simply done using a statistical test that is fast to compute in real time, allowing comparison of the positioning resulting from multi-dimensional scaling against a reference positioning defined from a random position hypothesis. If the clustering tendency condition is not satisfied, a major update of the layout needs to be performed.

Experimentation using these validation steps has shown the resulting layout to be quite satisfying from a user's point of view for an initial data volume on the order of $S^2$ (where S is the size of the interpolation subset used during each major update) and an incremental data volume in the same range.

Continuous Sequence Visualization

Figure 34:
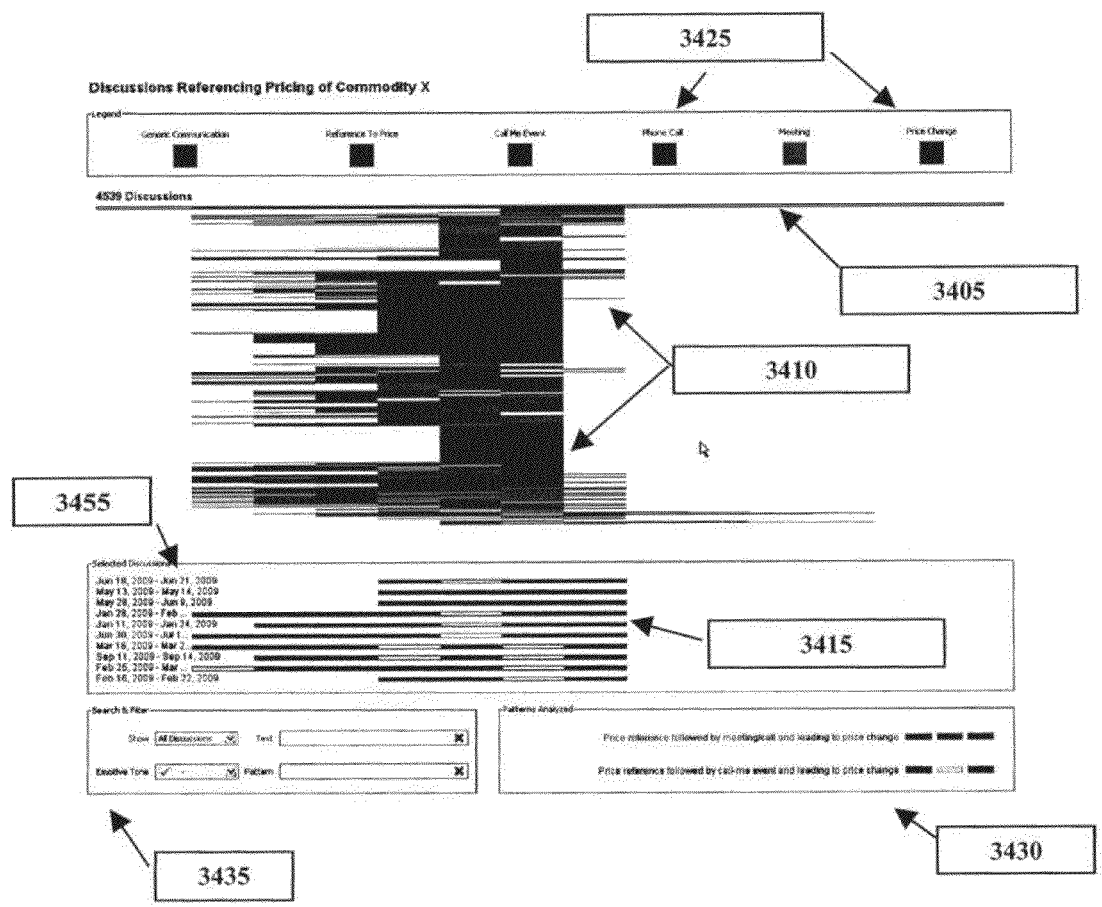
FIG. 34 is a drawing of the continuous sequence viewer in accordance with an embodiment of the present disclosure.

FIG. 34 shows a graphical depiction of the sequence viewer [415] that displays the results of computing the layout over a set of tagged sequences [138] as explained previously.

This visualization is composed of several areas, which are described in the following.

In that visualization, each tag [142] applied to categorize at least one item among all sequences [138] is assigned a specific color. In one embodiment of the invention, the system assigns a random color using a random palette that maximizes the contrast between the most commonly occurring tags [142]. A legend area shows an icon [3425] filled with the chosen solid color for each such tag [142]. In one embodiment, clicking on such an icon allows the user to modify the color assigned to that tag [142].

The zoomed area shows a detailed view of the sequences [138] [3415] that are selected in the compressed area, i.e. that are covered by the zoom box [3405], which is a bounding box acting as a cursor, which allows the user to browse the set of sequences [138] vertically. In one embodiment of the invention, sequence browsing [138] is done by using the up and down arrow keys. Each sequence [138] in the zoomed area is represented horizontally as a series of rectangular areas filled with a solid color selected for the tag [142] of the corresponding item [122]. For each such sequence, clicking on one of its member items [122] brings up a view showing the content of that item [122] (i.e. its extracted text, data and metadata), while clicking on the title area [3455] brings up a composite view of the underlying sequence [138].

The compressed area [3410] shows a synthetic view of the whole set of sequences [138], optionally filtered by one or more criteria. Sequences [138] in the compressed area are aligned horizontally using the alignment position defined previously, just as in the zoomed area. However, because the compressed area shows a number of sequences [138] that is potentially several orders of magnitude larger than the height of the area in pixels, it relies on a color compression mechanism: a number of sequences [138] per pixel is computed, and each item [142] is drawn as a rectangle of unit height that has a color defined using a method called a blending scheme.

A blending scheme takes as input the color of all items [142] represented at a particular integer position on a one-pixel horizontal line in the compressed area. In one embodiment of the invention, the blending scheme is obtained by computing the average in the integer-valued RGB space of all input colors. In an alternative embodiment, the blending scheme computes the average in the decimal-valued HSB space of all input colors. In a third embodiment, the blending scheme computes the resulting HSB value by averaging the hue and saturation, and by defining the brightness as $\Sigma_{k=1 \ldots n}(1/k^2)+B_0$ where $B_0$ is a constant representing the default brightness for items represented in that area.

Another legend area lists the patterns [3430] that were used in the inter-sequence distance definition when using the shared patterns distance or a composite distance definition.

Finally, a search and filter area [3435] lets the user filter the set of sequences [138] displayed in the visualization. In the default embodiment of the invention, the following search and filter criteria are provided:

A free text search;
A criterion on whether only sequences [138] matching at least one pattern should be displayed, or those that do not match any pattern, or all sequences [138];
A filter pattern that can be defined using a simplified regular expression syntax allowing basic constructs including but not limited to sequences [138] of particular items [142], repetitions of items [142], and missing items [142];
A filter on emotive tones or other results from applying ontology classifiers [150].

Sequence Snapshot Contrast

An alternative sequence viewer [415] display allows the user to specify a past date for a sequence-layout snapshot with which to compare a snapshot of the current sequence layout results. Alternatively, two past dates can be specified.

By default, snapshots will be computed over a period of time equal to the length of the sliding time window [380]. This duration can be overridden by the user by specifying a longer time period.

Figure 35:
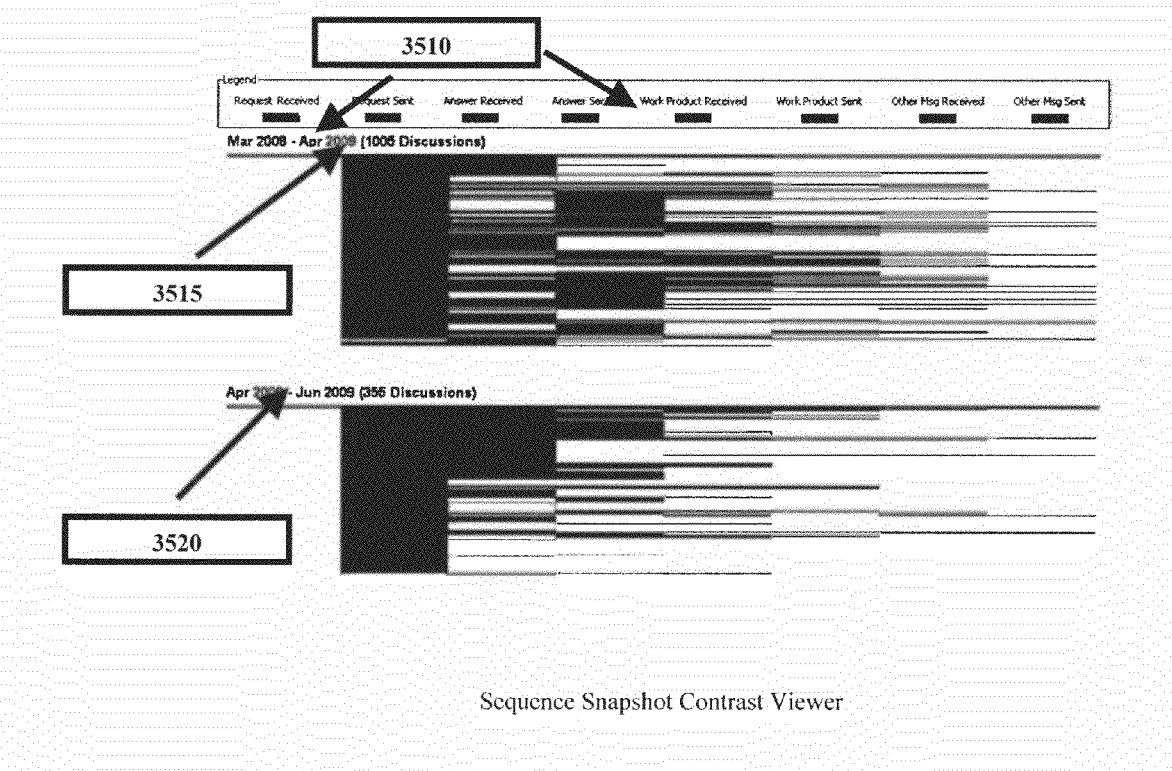
FIG. 35 is a drawing of the sequence snapshot contrast viewer in accordance with an embodiment of the present disclosure.

FIG. 35 shows an example of a sequence snapshot contrast viewer.

A legend area [3510] indicates the color assigned to each tag [142] used to label the items [122] within each tagged sequence [138], as in the continuous sequence visualization. The compressed area is similar to the one described for the continuous variant, except that it is split vertically into two sections: the upper section [3515] shows sequences [138] in the older timeframe, while the lower section [3520] shows sequences [138] in the more recent timeframe.

This contrast visualization lets a user compare salient characteristics of the underlying sequences [138] (which in turn can represent workflow instances [134]. In particular, large differences in the number of sequences [138] are often meaningful, since the contrasted periods have the same duration. The typical length of a sequence [138] in the two time periods is another feature of interest. Also, choosing a color palette that clearly differentiates two or more categories of tags [142] lets a user eyeball the dominant tags in each set of sequences [138], the order in which they appear, etc. For instance, when displaying the occurrences of a workflow process [128] for a particular actor [220], it is usually very informative to choose warm colors (such as red tones) for item types in which that actor [220] is actively involved, such as sending a work product or performing a particular task, and to choose colder colors (such as blue tones) for item types where the actor [220] is not involved or only passively so: the resulting visualization dramatically outlines any significant increase or decrease in that actor's [220] level of engagement in realizing the workflow process [128].

Thus, the sequence snapshot contrast is useful for providing an intuitive and straightforward visualization of the differences between the dominant patterns and the unusual sequences [138] around dates of particular interest, for example dates at which suspicious activities have been independently detected by another mechanism. This feature is particularly appropriate when the dates to compare are far apart, since the continuously updated view described previously does not provide such a perspective in that case.

Alias Usage Browser

The alias usage browser [478] is a continuous visualization [204] used by the present invention to efficiently and intuitively display the results of actor [220] analysis on a continuous basis.

Actor alias identification and persona [230] identification are described in U.S. Pat. No. 7,143,091. These analysis methods allow the system to define disambiguate electronic identities [235] based on the electronic aliases [240] they use communicate on various channels [156], and to assign each actor [220] one or more personae [230] reflecting the fact that an actor [220] might project different personae [230] depending on the topic she is communicating about, with whom she communicated, and more generally in what context and circumstances.

As most visualizations [204] described in this invention, the alias usage browser can be used both reactively and in a proactive, investigative manner. In particular, it lets a user drill down into usage the whole set of electronic identities [235] used by a specific actor [220].

For instance, it shows whether electronic identity [235] usage (e.g. using a specific email account) correlates to particular periods of time, communication [123] recipients, topics [144], or other features. It also provides a useful component of social proximity assessment, since it underlines proximity at the level of individual electronic aliases [240] or actor names [245] rather than at the actor [220] level: for example, it can show with whom a given actor [220] exchanges the largest volume of emails on accounts having her maiden name, even if this volume is negligible compared to her overall communication volume since her work email has her married name. In a more proactive mode, the alias usage browser [478] lets a user drill down into the data and filter that data in a very flexible way.

The alias usage browser [478] relies on the following features resulting either from data and metadata extraction during the processing phase, or from analysis during the post-processing phase (such as alias identification and persona [230] identification):

Electronic identity [235] of the communication [123] initiator including but not limited to: display names, email aliases, IM monikers Electronic identity [235] of the communication [123] recipient(s)

Topics detected using any topic detection [152] method on electronic communications [123]

Formality of communications [123]

Nature of the communications [123], such as personal vs. professional

More generally, categories derived from any categorization component [146].

When using the alias usage browser [478] in an investigative fashion, the user chooses what features are shown as rows and which ones are shown as columns. Optionally, a time period of interest can be selected, otherwise the system will consider and play back all historical data processed and analyzed until the present time. Then the user has the possibility to fully specify the list of rows and the list of columns, or can let the system derive the most meaningful associations. In the default embodiment of the invention, the automatic derivation of matrix components (i.e. of groups of row elements and column elements) relies on an iterative algorithm that computes cross-entropies of a bipartite graph—or equivalently of a binary matrix. This algorithm is efficient in this case because the binary matrices considered are typically very sparse. In essence, the algorithm takes as input parameter the partition size (i.e. the number of groups), starts with initial random assignments of rows and columns among groups of identical size, and upon each iteration, re-assigns successively each row and each column so as to minimize the sum of cross-entropies over the whole partition. Once groups of row elements and column elements have been produced, the system lets the user go through these groups using navigation controls.

Figure 36:
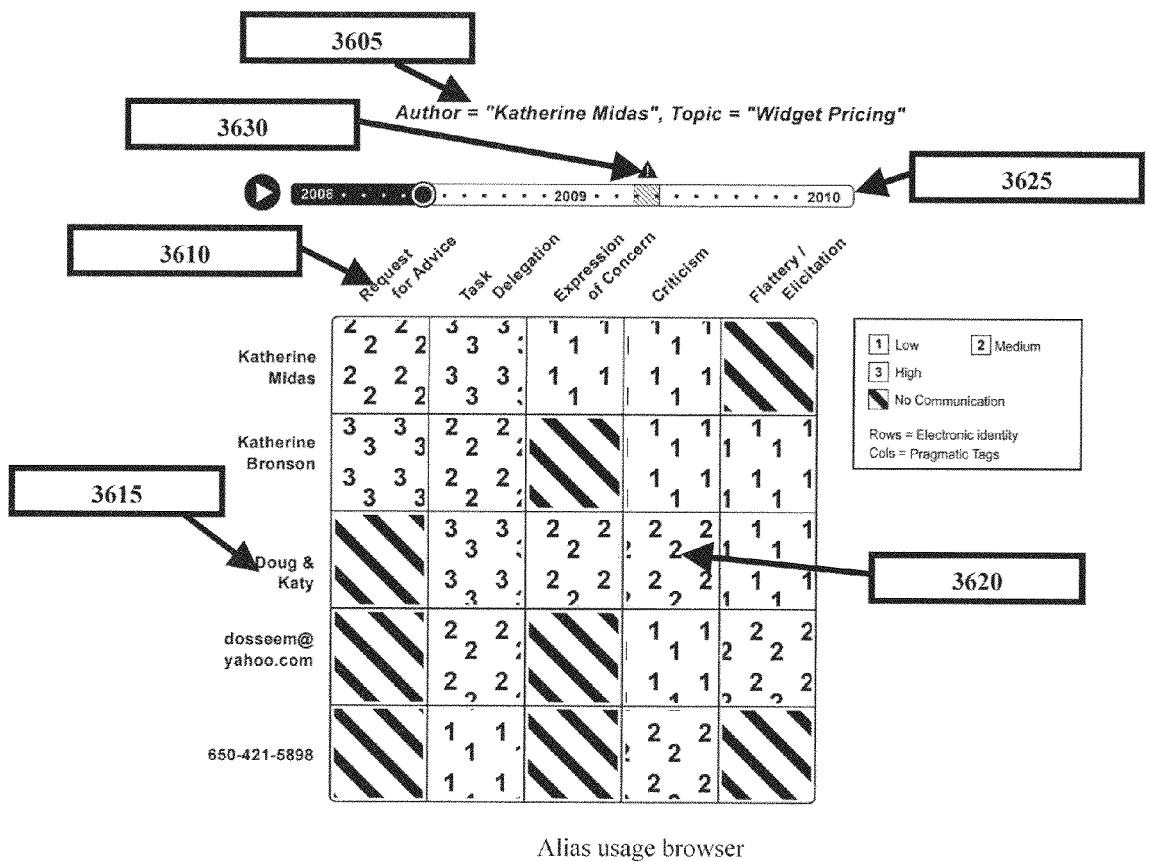
FIG. 36 is a drawing of the alias usage browser in accordance with an embodiment of the present disclosure.

FIG. 36 shows the alias usage browser [478] at some point in time. The title of the visualization [3605] summarizes the bound features in the current state (in this case, an author has been selected whose communications [123] are analyzed, and the topic feature has been bound too), as well as the column feature (electronic identity [235] in this case, which is resolved to the actor [220] as described in the prior patent noted above) and the row feature (pragmatic tag [166] in this case, which is computed by the pragmatic tagging component [430]).

In the default embodiment, each matrix is visualized as a very common representation known as heat map, with a color saturation assigned to each cell [3620] in order to indicate the amount of communication [123] for the corresponding row feature value and given column feature value, as well as for all bounded features. Alternative embodiments give other kinds of visual cues, such as the level of formality, or the intensity of negative or positive sentiment.

Each matrix is animated and offers playback functionality available through a timeline control [3625], similar to those described in the sections on Stressful topics and Temperature gauges visualizations, so that the user can replay past events [100] at normal or faster speed. Optionally, the system can determine the most anomalous time periods and highlight them for the user on the timeline control [3625] using a red color [3630]. In the default embodiment, this is done by leveraging the results of cross-entropy computation described above. For a given matrix, the most anomalous periods correspond to local maxima of cross-entropy in the group considered. For the whole dataset, the most anomalous periods correspond to local maxima of the sum cross-entropy over all groups.

In addition to the timeline control [3625], the user can interact with the alias usage browser [478] in multiple ways, including by drilling down and up into the data. More precisely, every time the alias usage browser [478] shows a particular matrix, the user can drill down into the data in three ways: by right-clicking on a column header [3610] (which binds the value of the column feature to that element and proposes a selection list for a new column feature among unbound features), on a row header [3615] (which binds the value of the row feature to that element and proposes a selection list for a new column feature among unbound features), or on a cell [3620] (which binds both the column and the row values).

Figure 37:
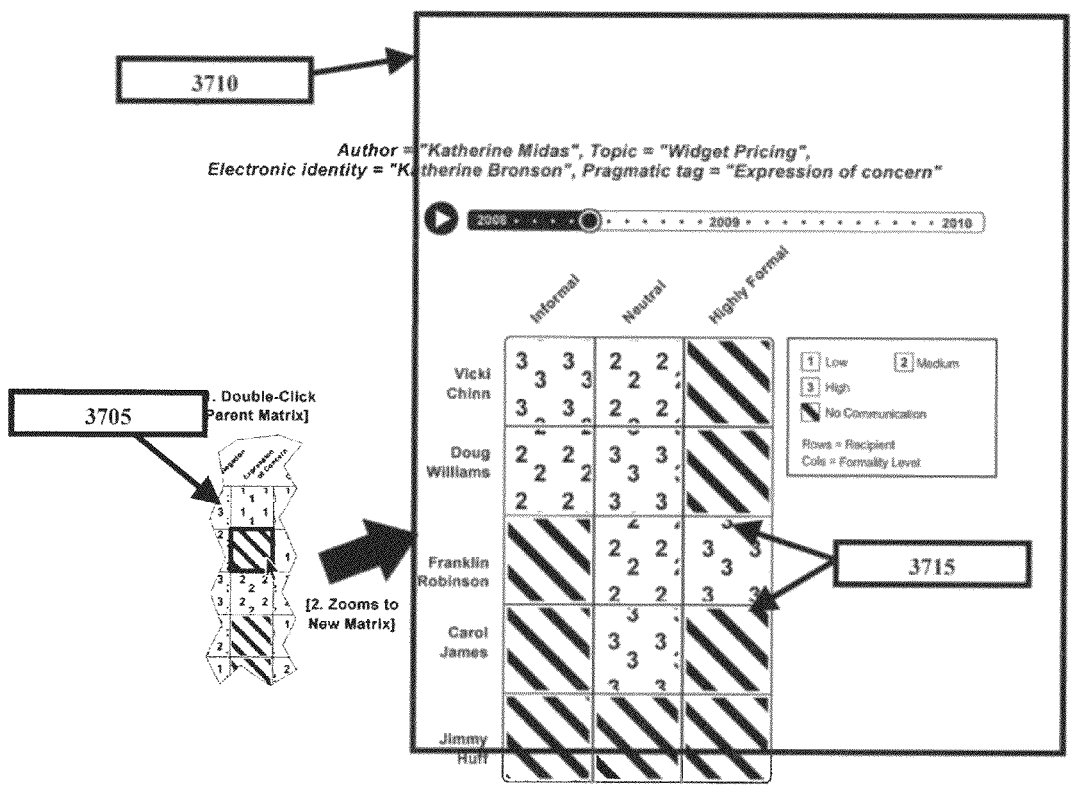
FIG. 37 is a drawing illustrating the navigation through the alias usage browser in accordance with an embodiment of the present disclosure.

FIG. 37 illustrates the animation operated by the alias usage browser [478] whenever the user chooses to drill down into a particular cell [3705] of the current matrix by double-clicking on that cell. In this particular example, the cell which has been double-clicked corresponds to a pragmatic tag [166] "Expression of concern" and an electronic identity [235] "Katherine Bronson". This means that the underlying communication [123] model is restricted to data items [122] matching these two criteria in addition to all other previously-bound features (which in this case were "Katherinne Midas" as author and "Widget pricing" as topic). To visually represent this drilling-down navigation, the rectangle bounding the double-clicked cell is expanded until it occupies the exact space of the original matrix. A new, zoomed-in matrix [3710] is then drawn in place of the original one, with new header values (corresponding to the values of the new row feature "Recipient" and to the values of the new column feature "Formality level" that have either been automatically selected by the system or specified by the user, as described above).

The content of each cell 3715] now represents aggregate information (such as communication [123] volume) for data items [122] having matched all bound features. Also, if the time animation was playing when the user double-clicked the cell, it is not interrupted and continues playing after the zoom-in animation completes. If it was paused, then it is still paused at the same point in time. Double-clicking on a row header [3615] works similarly, except that the animation is vertical only: the row corresponding to the double-clicked header is expanded until it occupies the whole height of the original matrix. The same is true for double-clicking on a column header [3610].

Similarly, if one or more features have already been bound, the user can drill up by right-clicking on a column header [3610], on a row header [3615]; or on a cell [3620].

Animated Actor Network Visualizations

The system uses a continuous actor graph visualization to represent anomalies [270] of various types. In each case, the standard actor graph is decorated with one or more additional visual features.

The standard continuous actor graph visualization displays actors [220] as nodes, and communications [123] and other events [100] as edges, as described in U.S. Pat. No. 7,143,091 in more detail. The display is updated at discrete intervals of time, the interval duration being continuously adjusted by the system: at the end of each interval, newly added edges are displayed, while previously existing edges are aged so that some of them disappear. In one embodiment, this adjustment is based on the following dynamic constraints:

The maximum number of new edges added at the end of each interval

The maximum total number of edges displayed at any given time

The maximum value of the time interval.

Based on these constraints, the system adjusts visualization update parameters (including the value of the interval duration and the decay rate of older edges) and can also decide to ignore some new edges during each interval to meet these constraints.

Animated actor graph visualizations [471] are used to represent a variety of structural anomalies in the graph, both local and global, including but not limited to the following:

Changes of Position within the Network

Figure 39:
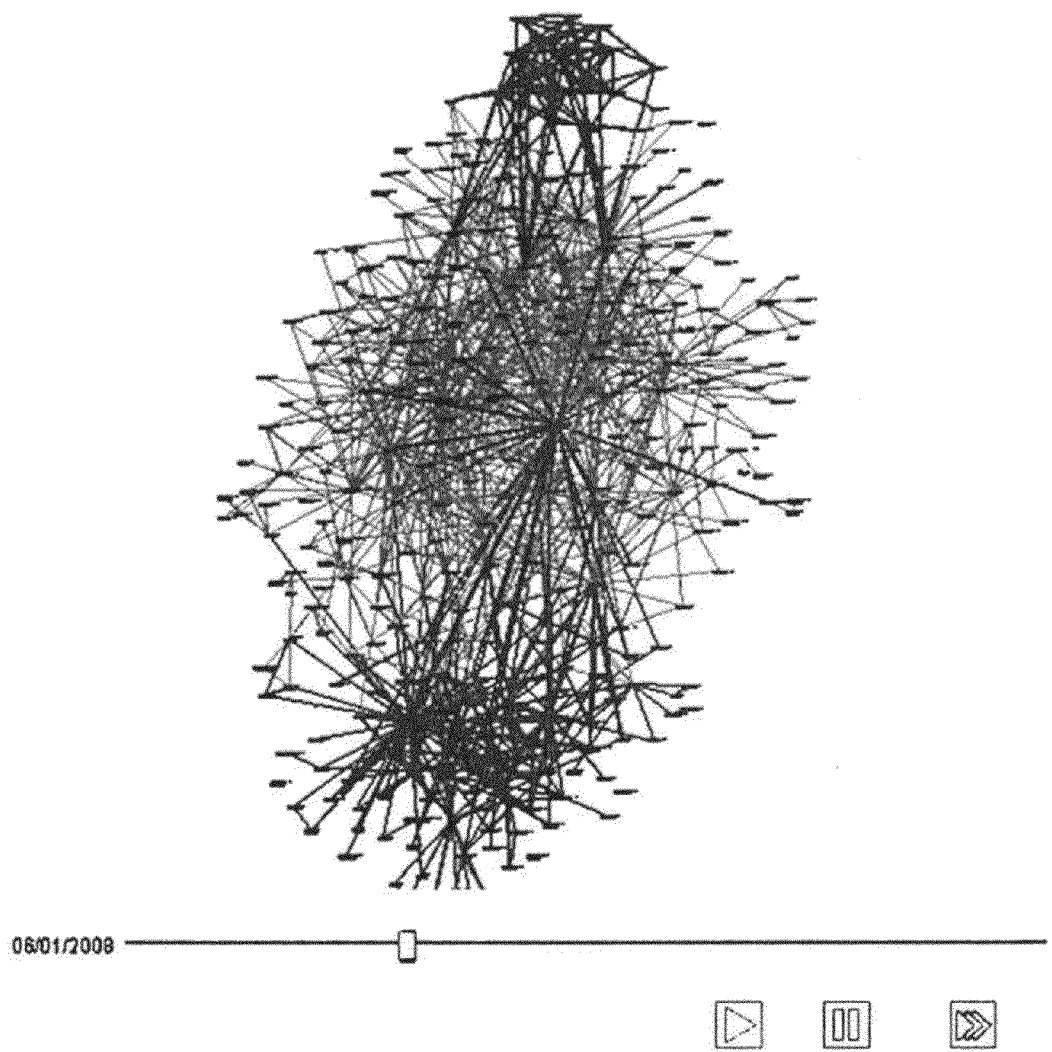
FIG. 39 is a drawing of the animated graph of attention shift in accordance with an embodiment of the present disclosure.

As illustrated in FIG. 39, this visualization consists of an animated graph representing changes in an individual actor's [220] position relative to other actors [220] in the network, and can be used for example to demonstrate the shift of that actor's attention towards outbound communications [123] (e.g. with actors outside the corporation).

For example, in the case of a disengaged employee: people who feel they are hitting the ceiling will often start to look for validation elsewhere, such as via industry standards bodies and conferences; their attention will shift more outwards over time.

The decorations added in this graph visualization are:
Blue edges represent communications [123] from and to the subject
Red edges represent communications [123] exchanged within an outside industry or among business contacts. Thus an abnormally high volume of communications [123] directed towards outbound contacts will manifest itself by an increase in the number of blue edges between the considered actor [220] and actors [220] connected by red edges.
Green edges denote purely social or family actors [220], meaning that no work-related content seems to be being exchanged among them. Non-work related content is useful to provide context, for example to assess whether the actor [220] is just focusing more on anything not directly work-related, or rather diverting more of their professional attention outside of the company.

Changes in Delegation Behavior

Figure 40:
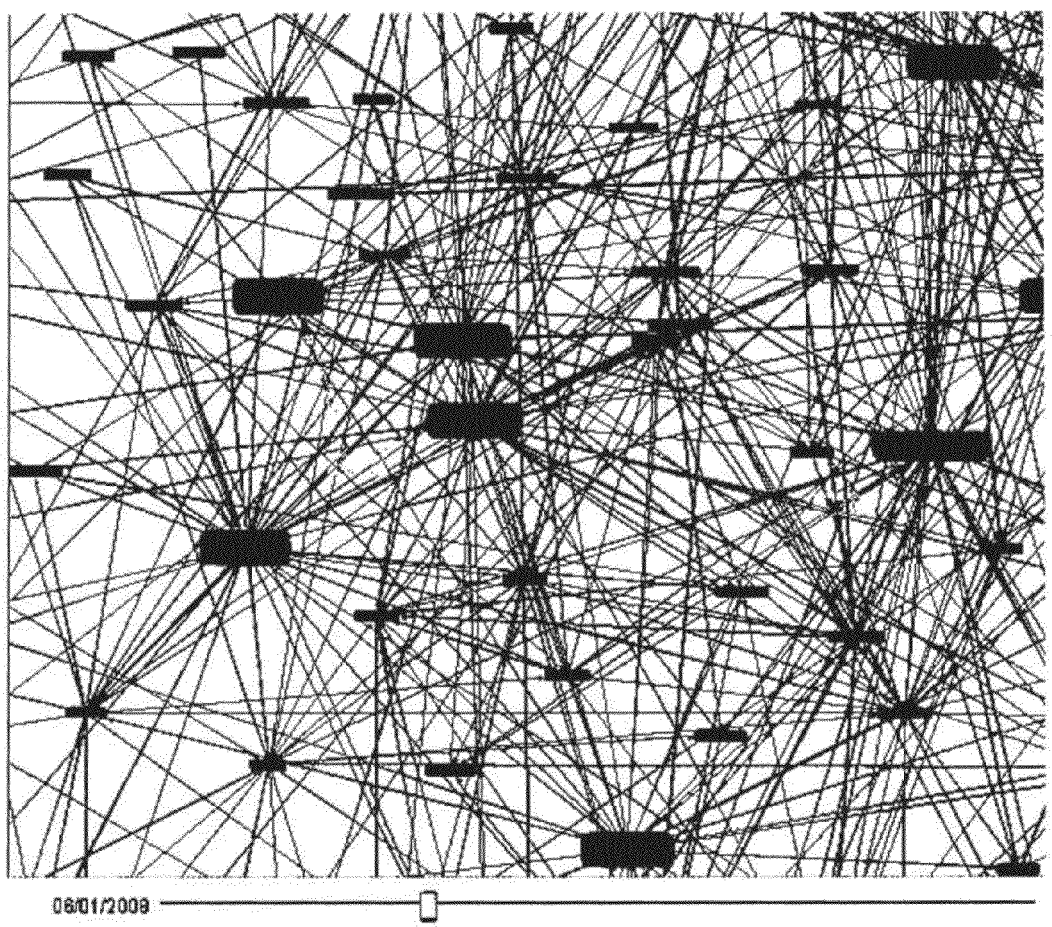
FIG. 40 is a drawing of the animated graph of delegation pattern changes in accordance with an embodiment of the present disclosure.

As illustrated in FIG. 40, this visualization consists of an animated graph representing the evolution of delegation patterns for an individual actor [220] over time.

A typical usage example is that delegating more work without any obvious or apparent reason suggests disengagement of an employee. For example, abandoning a delegation pattern would be worrisome for a managerial position.

To build this graph visualization, centrality is defined with respect to a delegation subgraph, and re-computed at the end of each interval of time between two updates of the layout. In one embodiment, the delegation subgraph is defined as business-related communications [123] with other actors [220] or groups [225] inside the company.

The graph visualization is then decorated as follows:
The node for the considered actor [220] is colored in green
All other actors [220] are colored in blue
The most central names have a red color highlight around them
When the considered actor [220] either enters or leaves the group of most central actors [220], the node flashes in red to attract the user's attention to this change.

Clique Evolution

Figure 41:
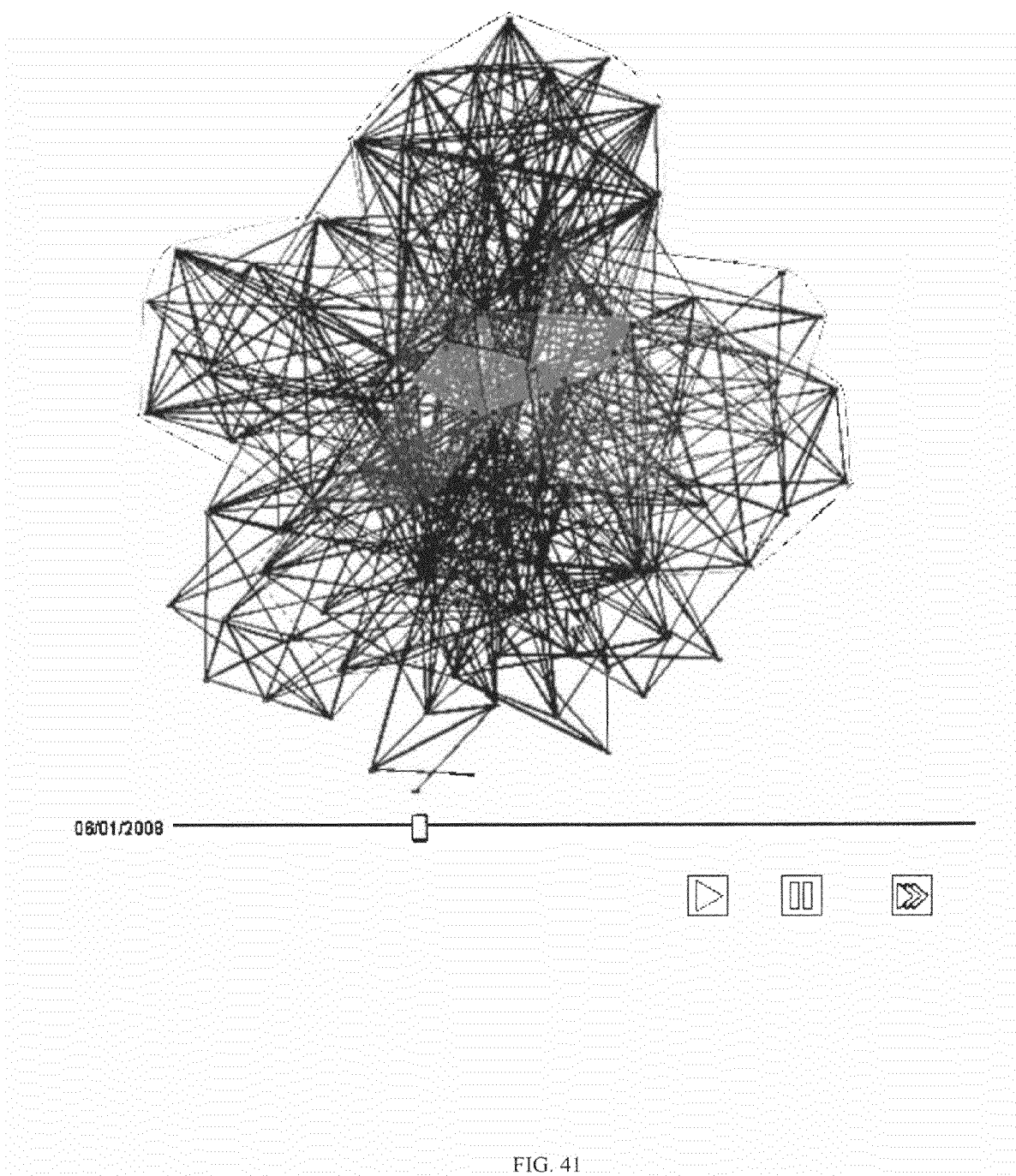
FIG. 41 is a drawing of the animated graph of clique evolution in accordance with an embodiment of the present disclosure.

As illustrated in FIG. 41, this visualization consists of an animated graph representing the evolution of the most distinct cliques [255] in the actor network. This is appropriate to show the emergence or extinction of cliques [255], as well as existing cliques [255] getting tighter or looser over time.

Cliques [255] are updated at the end of each interval of time between two updates of the layout based on new edges and on decayed edges.

The decorations added by this graph visualization are:
Cliques [255] are visualized by coloring the nodes it contains (the clique's [255] boundary being defined for example as the convex hull of these nodes)
Edges corresponding to intra-clique communications [123] are colored in blue
Edges corresponding to inter-clique communications [123] and communications [123] with actors [220] who are not members of any clique are colored in red
When a threshold is passed on the emergence or extinction of one of the cliques [255] (i.e. in the relative variation of its size), that clique is highlighted.

Gap Viewer

The gap viewer component [415] is a timeline-based visualization [204] that shows part of the output of the periodic patterns detection component [405].

The gap viewer primarily achieves two goals: to show non-obvious, and in some cases previously unknown, recurring events [101] and activities; and to show where the regularity is broken for any regularly occurring event [101], for example when events [100] are missing, when unexpected events [100] are present, or when events [100] occur at unusual times.

Figure 42:
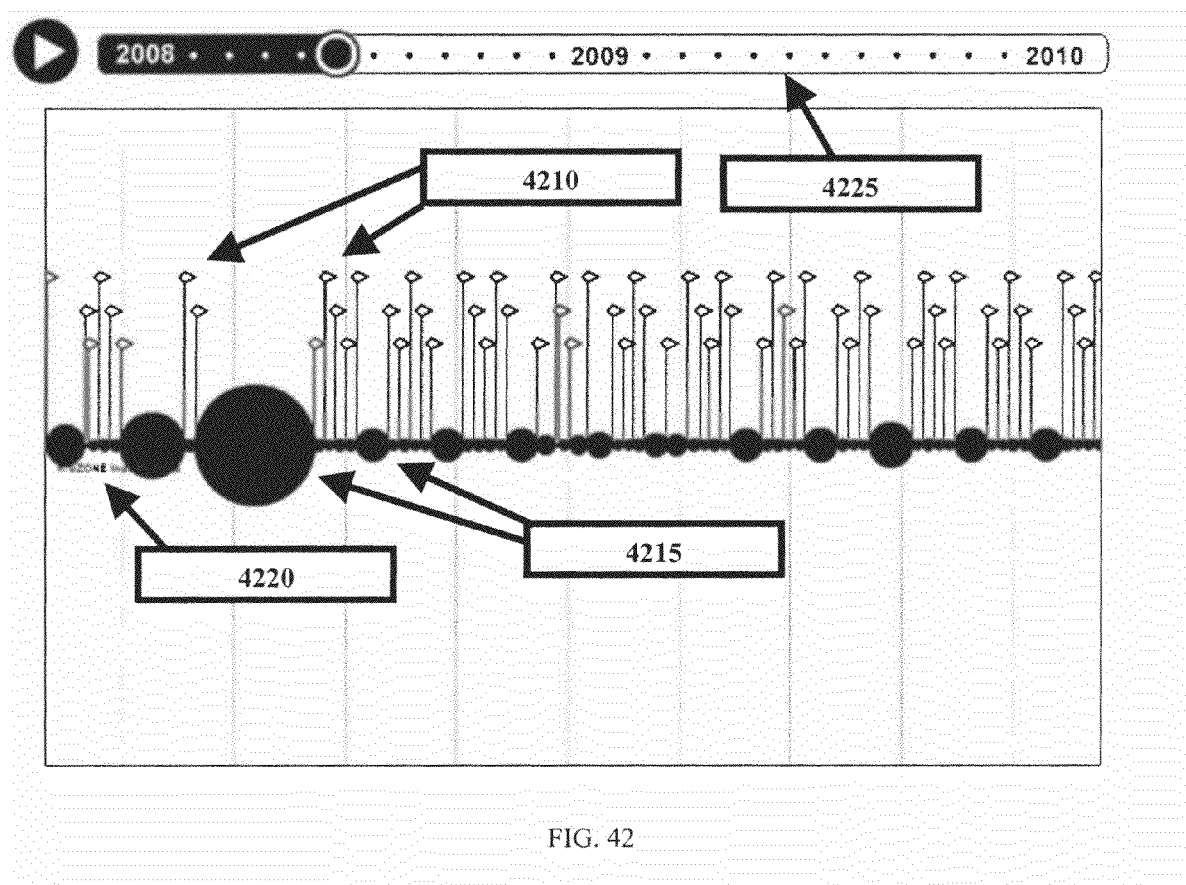
FIG. 42 is a drawing of the continuous gap viewer for a single periodic pattern in accordance with an embodiment of the present disclosure.

As illustrated in FIG. 42, the gap viewer [415] in its basic form uses the output of periodic patterns detection to show where there are gaps in the sequence of occurrence dates of a particular periodic sequence [132].

Each flag [4210] represents a unique occurrence of the periodic sequence [132], for example an instance of a weekly meeting. The flags [4210] allow a user to view the content associated to that particular instance, including the extracted text, as well as other data and metadata.

Circles filled with a solid color, or bubbles [4215], are used to represent gaps between two consecutive occurrences of a periodic sequence [132]. The larger the gap, the bigger is the bubble [4215] drawn for the next occurrence of the periodic sequence [132]. In the default embodiment of this invention, the diameter of each bubble [4215] is proportional to the inter-event interval. Using bubbles [4215] makes the gap more prominent than if they were merely arranged points along a line. This is particularly interesting in the case of communication patterns, for which the presence of important gaps might lead to further look into associated events [100].

For each periodic sequence [132], a representative title [4220] is displayed, which is derived from the periodic patterns detection phase.

The gap viewer shows the events [100] for one or more periodic sequences [132] along a timeline [4225]. The visualization is updated on a continuous basis, so that each time an event [100] occurs as part of a periodic sequence [132], a new bubble [4215] is drawn to indicate the time elapsed since the previous event [100] in that sequence [132]. Simultaneously, the index of periodic sequences [132] is updated so that any subsequent query can return other periodic sequences [132] overlapping this periodic sequence [132] with respect to segments, gaps, or disturbances.

Correlated Periodic Sequences

Figure 43:
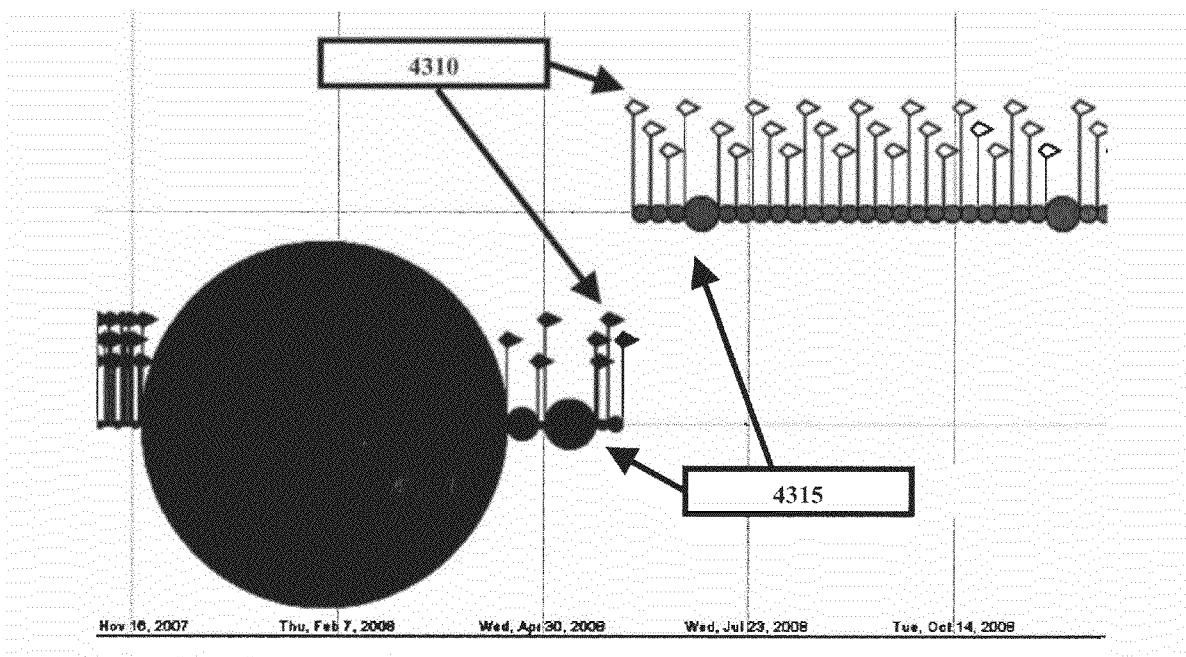
FIG. 43 is a drawing of the continuous gap viewer for correlated periodic patterns in accordance with an embodiment of the present disclosure.

Additionally, the gap viewer can use the periodic patterns query component to display any periodic sequences [132] that are correlated with a particularly interesting or relevant periodic sequence [132]. To this end, the gap viewer supports the simultaneous visualization of multiple correlated sequences [132], as illustrated in FIG. 43.

In that case, each periodic sequence [132] is attributed its own color code, so that bubbles [4315] belonging to different periodic sequences [132] are filled using different colors and flags [4310] representing instances of different periodic sequences [132] are drawn in different colors as well.

This is particularly useful when the system has detected correlations across two or more periodically occurring events [100], including but not limited to:

- A significant overlap of the segments in the respective sequences [132]. This is the most general category of correlations and might suggest many interesting patterns, such as the coordination of a priori independent activities.
- A significant overlap of the gaps in the respective sequences [132]. The fact that regularity is broken during similar time periods suggests that the underlying events [100] might have a correlation which is not obvious to the user, for example that they are associated to one or more common actors [220], which would suggest that these actors [220] were doing something unusual, maybe suspicious, around that time: in particular it might suggest in some cases that these actors [220] attempted to erase electronic traces of their activities during the period of overlapping gaps. In one embodiment, the significance of such an overlap is defined as the ratio of gaps over the total aggregated inter-event duration exceeding a threshold.
- A significant overlap of the disturbances in the respective sequences [132]. In this case, disturbances are defined as events [100] occurring more frequently than expected, or events [100] of another nature replacing expected events [100]. This allows to detect patterns such as the same set of actors [220] attending a regular meeting B at unexpected times that coincide with dates when an occurrence of another regular meeting A is expected to occur.
- A significant alignment of the occurrence times in the respective sequences [132], combined with particular patterns such as the sequences [132] in question involving the same actors [220] in different places. This allows the detection of patterns such as in-person regular meetings involving the same employees in different subsidiaries of a corporation.
- Other types of correlations based on features of the individual events [100]. For example FIG. 43 shows two periodic sequences [132] that involve the same actors [220] attending weekly meetings, where one periodic sequence [132] stops occurring when the other one is initiated. In some cases this is totally innocuous pattern, while in other cases it might reflect an attempt to divert attention from a meeting on a sensitive topic [144], by renaming that meeting or otherwise moving it away from the spotlight.

Social You-Niverse

Figure 48:
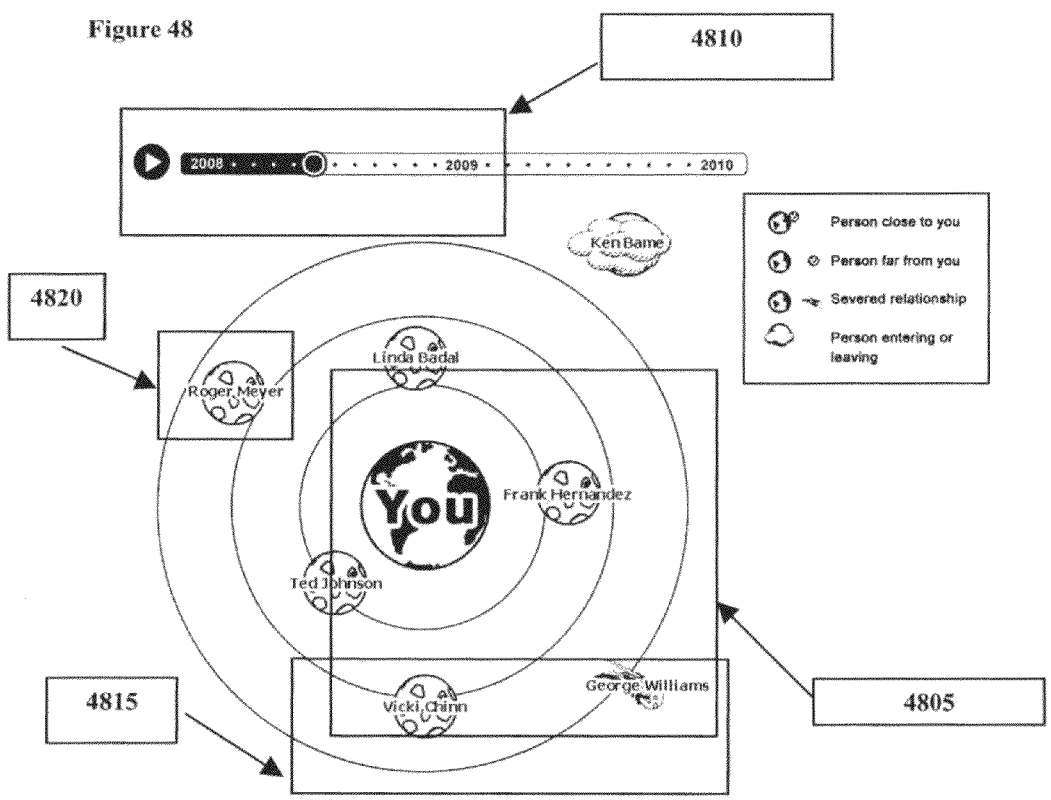
FIG. 48 is a screenshot of one embodiment of the social you-niverse visualization in accordance with an embodiment of the present disclosure.
Figure 49:
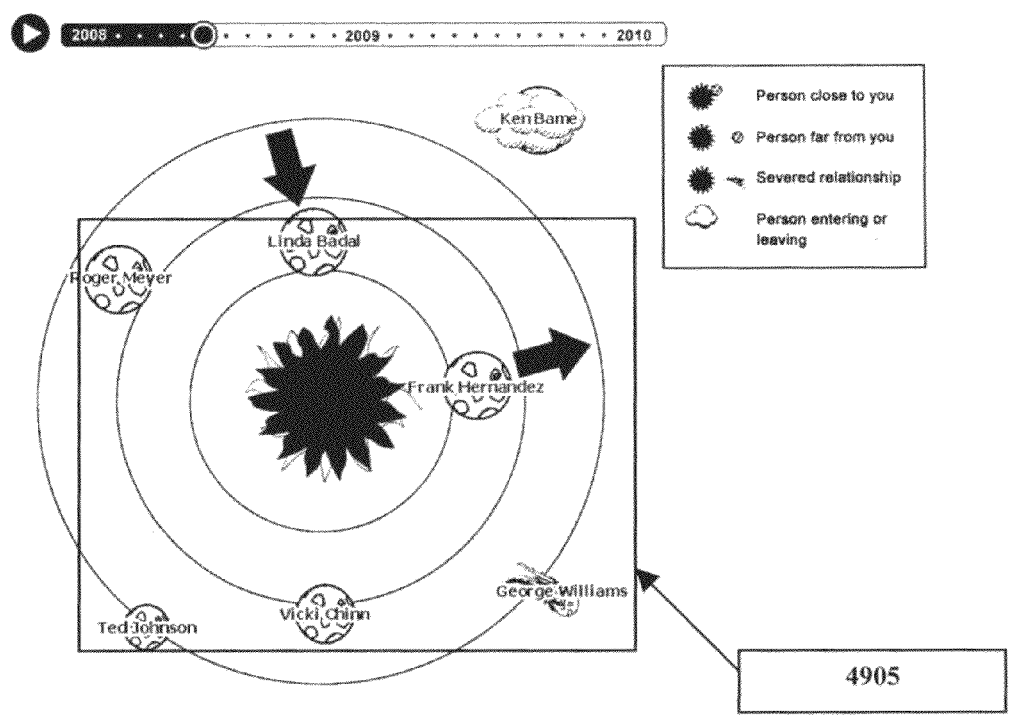
FIG. 49 is a screenshot of one embodiment of the social you-niverse visualization depicting solar system around a star in accordance with an embodiment of the present disclosure.
Figure 50:
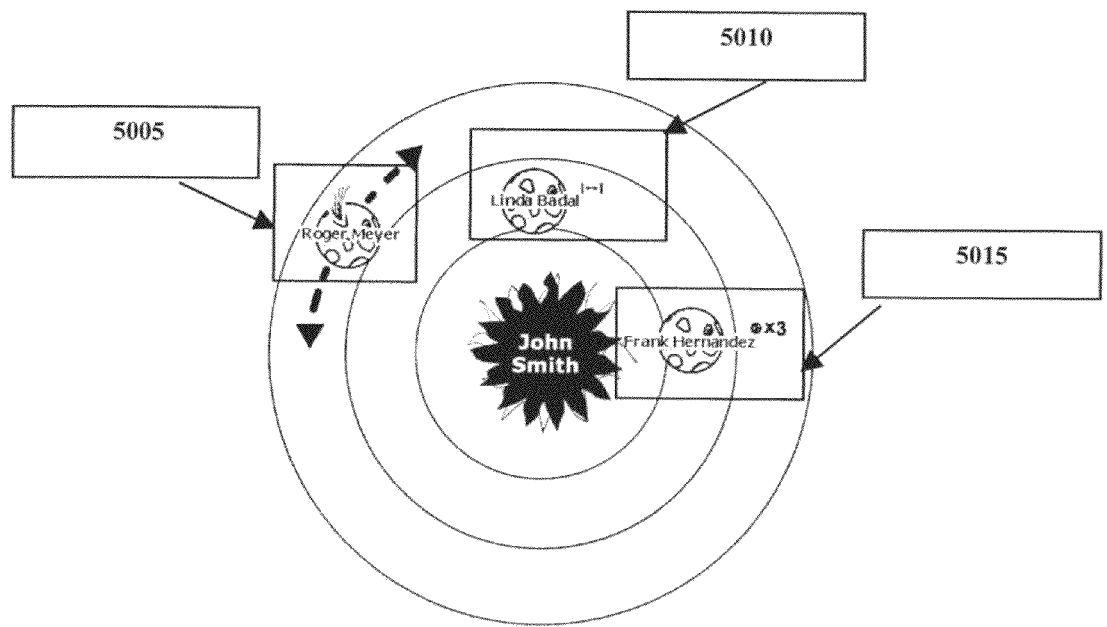
FIG. 50 is a screenshot of one embodiment of the social you-niverse visualization depicting icons or other visual indicators for distance in accordance with an embodiment of the present disclosure.
Figure 51:
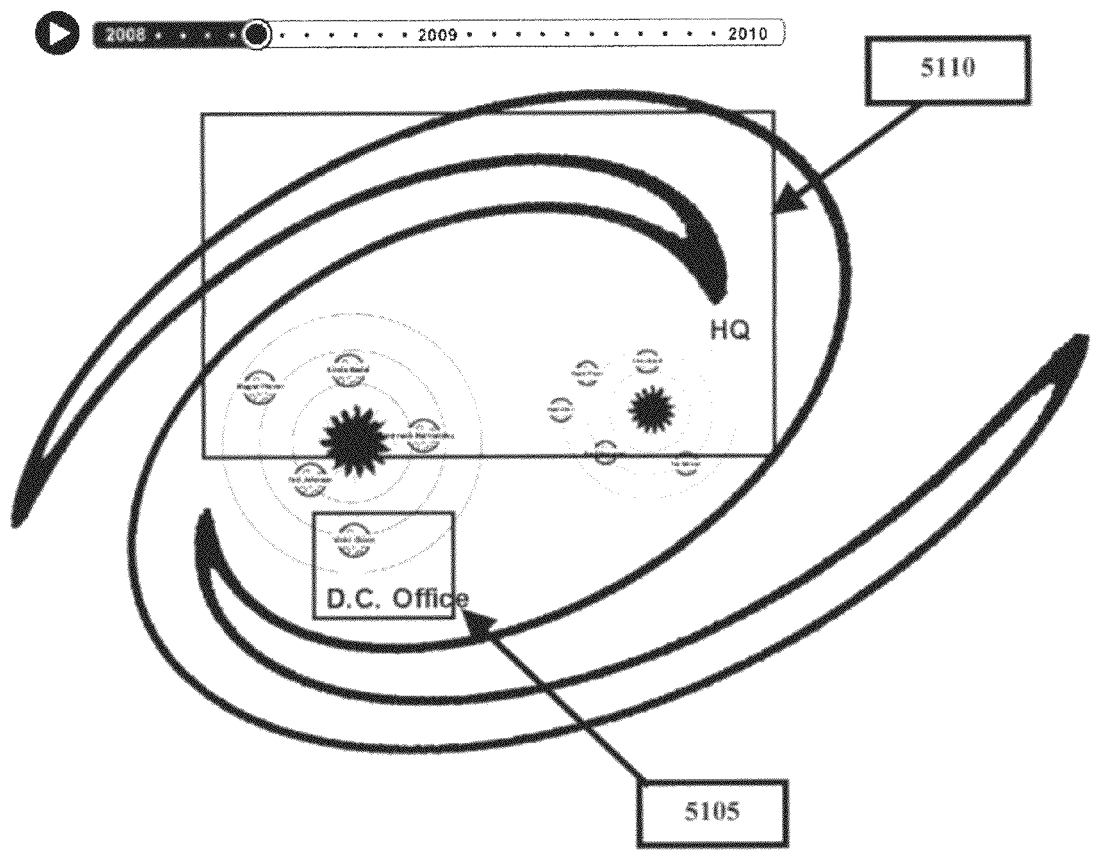
FIG. 51 is a screenshot of one embodiment of the social you-niverse visualization depicting galaxies in accordance with an embodiment of the present disclosure.

As depicted in FIG. 48 most social or organizational groups [225] have one or more persons at their center, around whom all other members of the group [225] are effectively in orbit. The types of person(s) at the center include the social butterfly, the strong natural leader, the guy who has all the answers to the homework problems, the actual boss. The person(s) at the center are the instigators, whether of ideas or parties, the persons of power of one kind or another who are pursued by others.

Computationally, these central persons, and the set of persons orbiting them, can be determined by analyzing social network graphs. In one embodiment, a communication graph is used, as described in U.S. Pat. No. 7,519,589. In another embodiment, edge weights are determined using a composite proximity score, such as that described in U.S. Pat. No. 7,519,589. From the graph, groupings are computed, such as (depending upon the embodiment) cliques [255], partial cliques, or modules, using standard methods. Within each grouping, we compute centrality scores for each actor [220] using some measure of centrality (in some embodiments this is eigenvector centrality, betweenness centrality, or degree centrality), and sort the actors [220] by their scores. From this list, we determine whether this grouping has a central actor [220] or actors [220]. In one embodiment, this is computed by looking at the ratio of each centrality score to the next in the list. If we encounter a ratio above a pre-selected threshold, we declare the actor(s) [220] above this point in the list to be the center of this group [225], which is now referred to as a solar system.

As depicted in FIG. 48 the Social You-niverse visualization [472] represents such groups [225] as distinct solar systems [4805], in different galaxies [5110]. These solar systems can exist separately or as groups of related solar systems displayed as galaxies [5110]. Galaxies [5110] might often represent real groups or types of (including but not limited to) departments, office branches, or even different locations which are subsets of the universe [5105].

Figure 52:
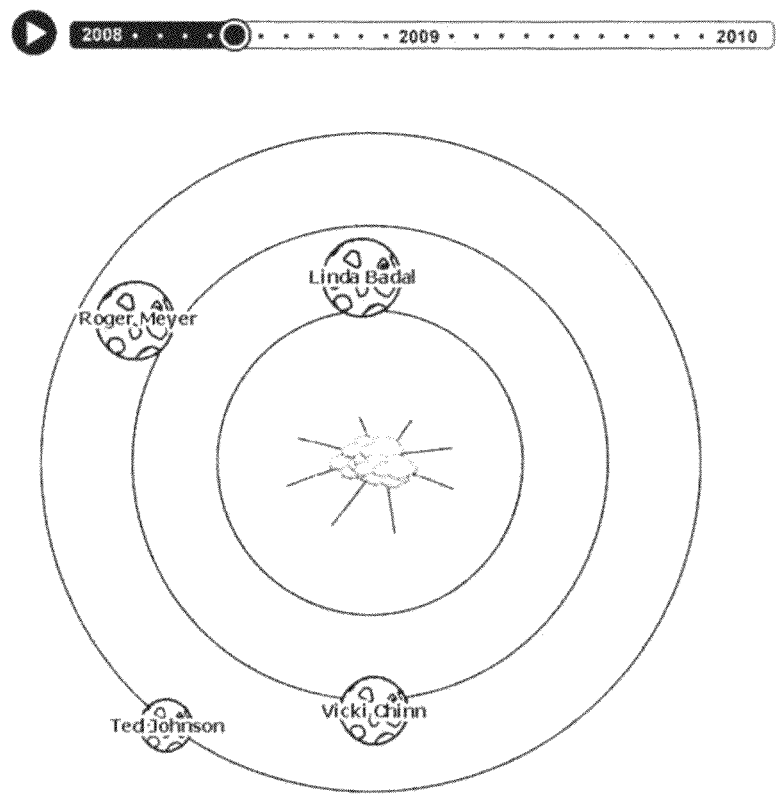
FIG. 52 is a screenshot of one embodiment of the social you-niverse visualization depicting planet orbiting more complex structures in accordance with an embodiment of the present disclosure.
Figure 53:
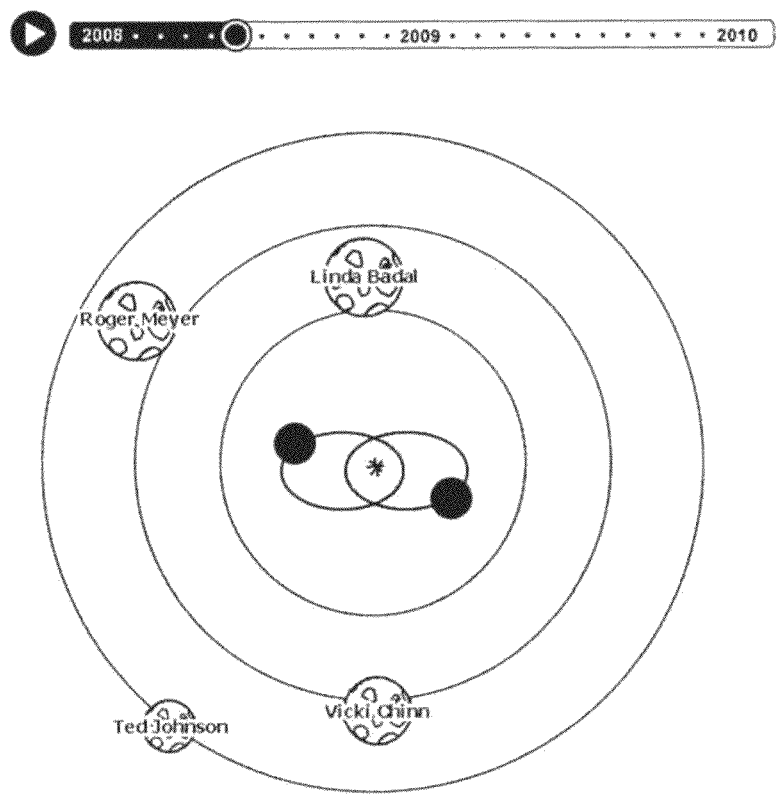
FIG. 53 is a screenshot of one embodiment of the social you-niverse visualization depicting binary or multiple stars in accordance with an embodiment of the present disclosure.
Figure 54:
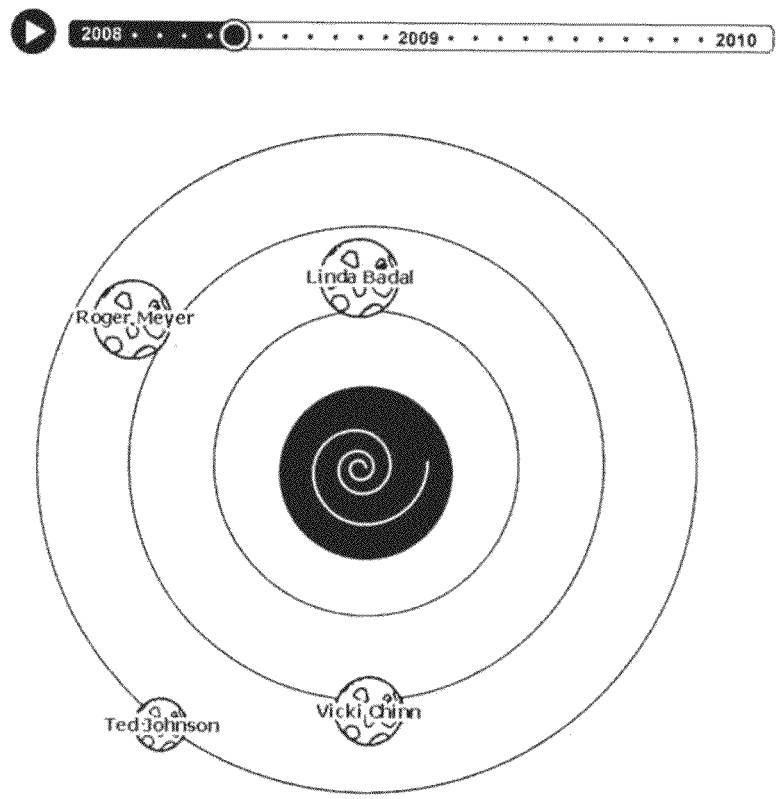
FIG. 54 is a screenshot of one embodiment of the social you-niverse visualization depicting nebulas in accordance with an embodiment of the present disclosure.
Figure 55:
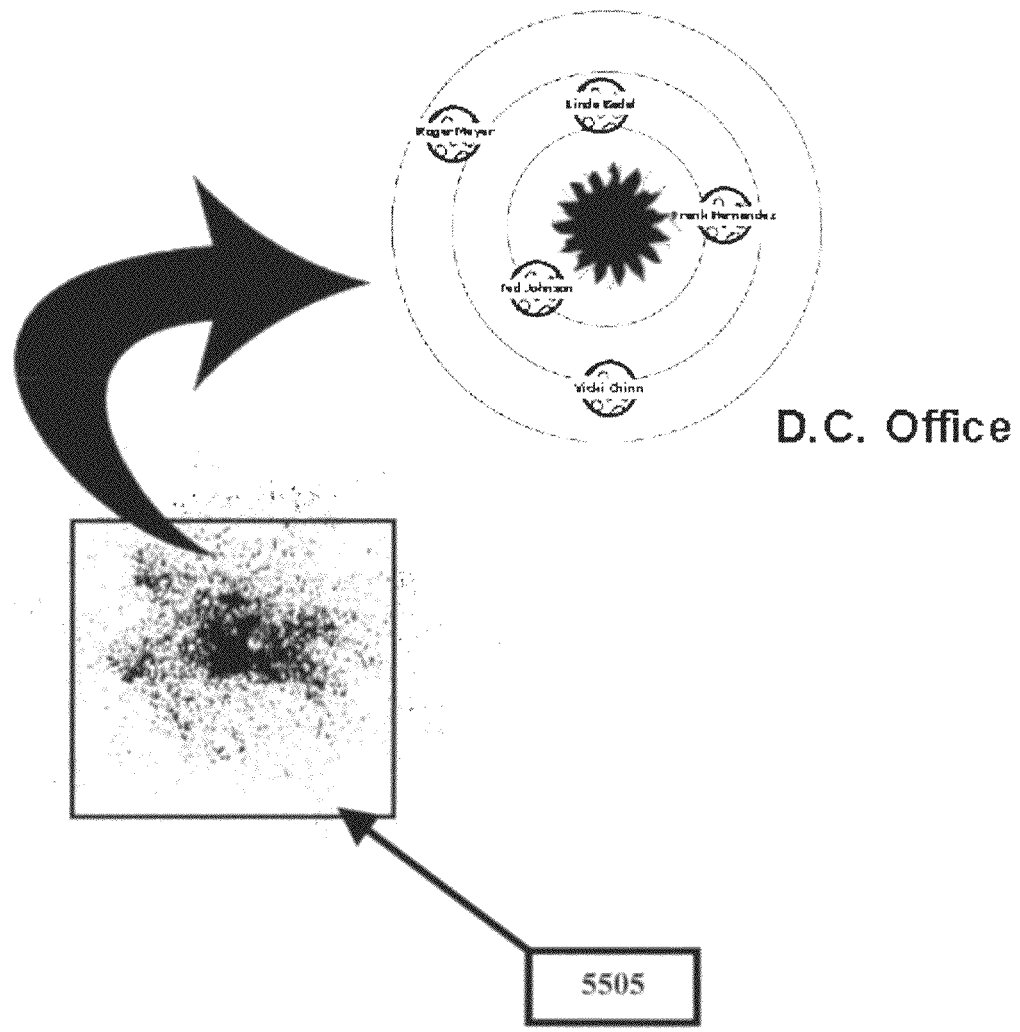
FIG. 55 is a screenshot of one embodiment of the social you-niverse visualization depicting an interstellar cloud of dust in accordance with an embodiment of the present disclosure.

The Social You-niverse visualization [472] can be "played" [4810] so as to see the changes that occur in the universe [5105] over the duration of time for which data is available. These solar systems [4805] can be of varying sizes [4815], depending on how many planets [4820] they should logically include. While planets [4820] in many solar systems [4805] orbit around a single star [4905], or powerful actor [220], in some embodiments, the planets [4820] may orbit around more complex structures as depicted in FIG. 52. These include, but are not limited to binary or even multiple stars as depicted in FIG. 53, black holes (which represent the post-explosion state of a star [4905] or actor [220]) as depicted in FIG. 54 and nebulas (which represent a nascent star).

Figure 56:
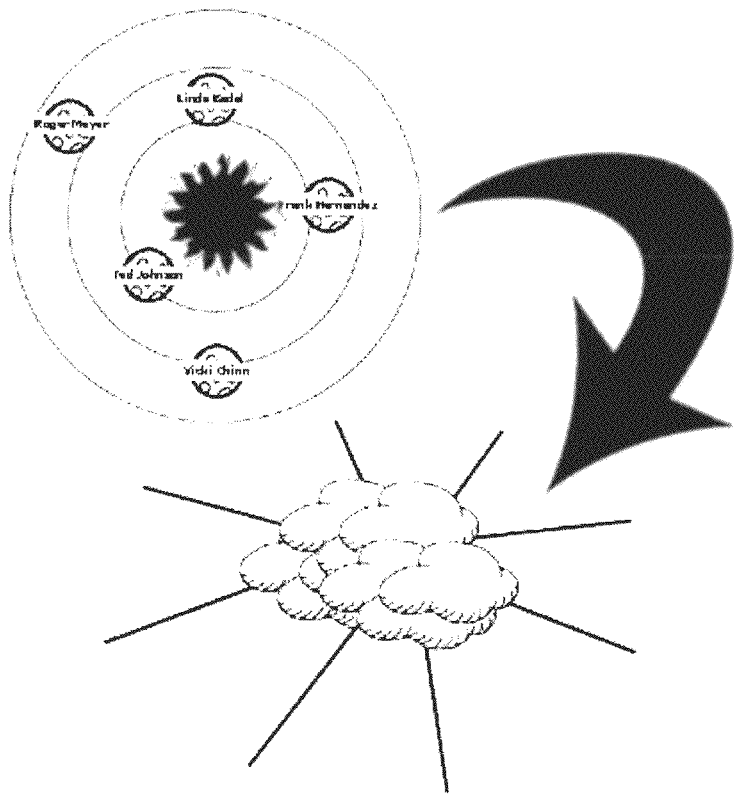
FIG. 56 is a screenshot of one embodiment of the social you-niverse visualization depicting a supernova explosion in accordance with an embodiment of the present disclosure.
Figure 57:
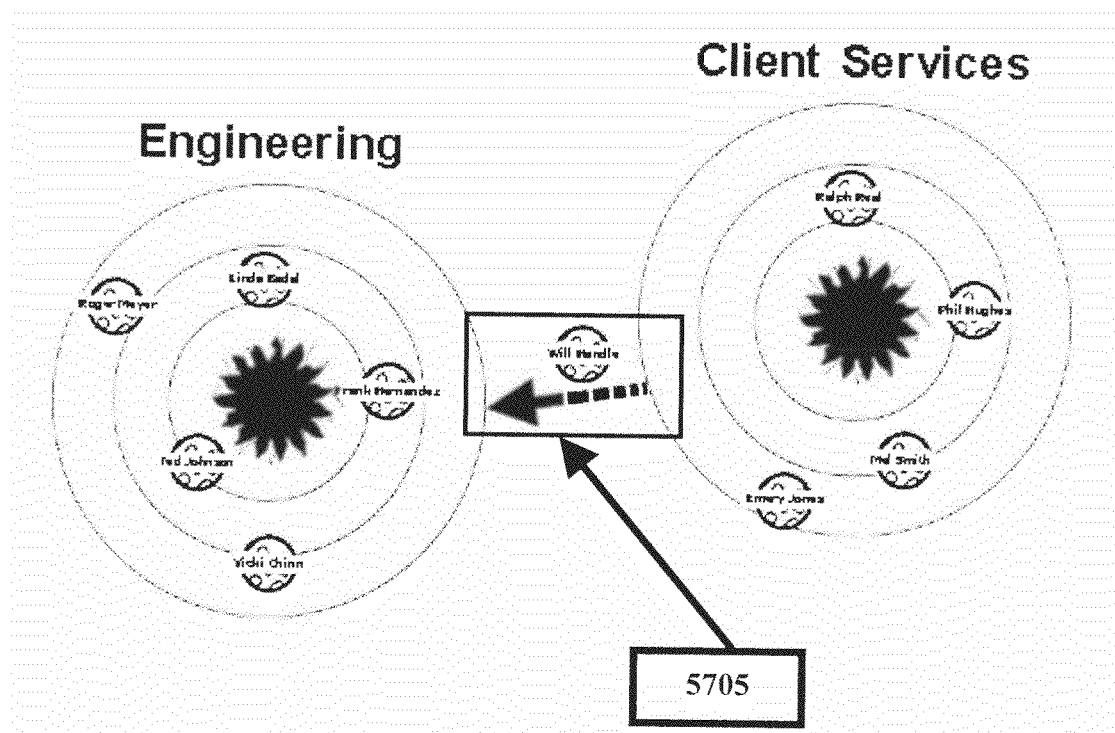
FIG. 57 is a screenshot of one embodiment of the social you-niverse visualization depicting gravitational pull on outer planets in accordance with an embodiment of the present disclosure.

A given solar system [4805] may arise out of an interstellar cloud of dust [5505], or disappear in a supernova explosion as depicted in FIG. 56. These creation and destruction events correspond to real-world events such as a company being acquired by a larger company—so a new division comes into existence within the acquirer—or a division being shut down and hence disappearing from the universe.

Figure 58:
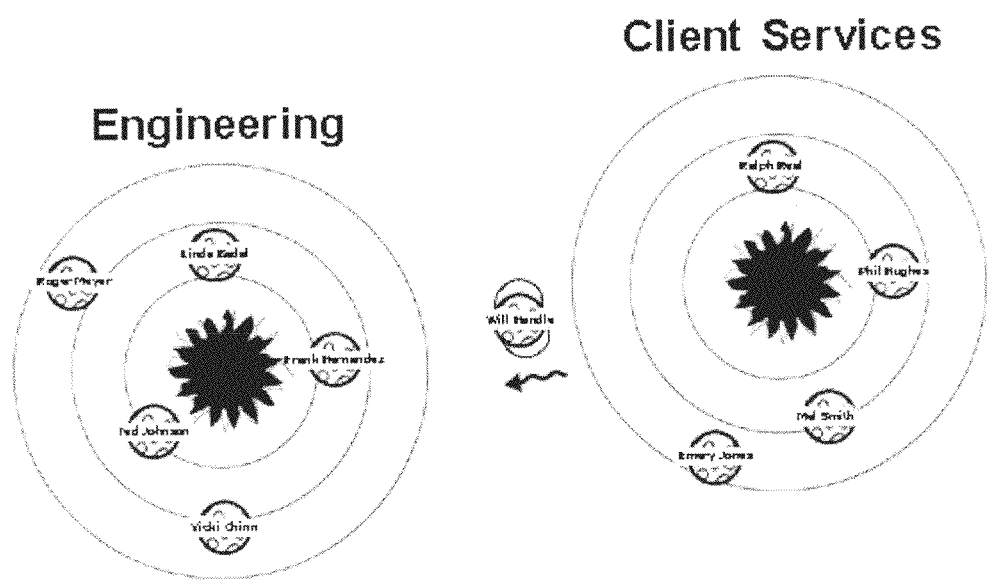
FIG. 58 is a screenshot of one embodiment of the social you-niverse visualization depicting wobbling planets in accordance with an embodiment of the present disclosure.
Figure 59:
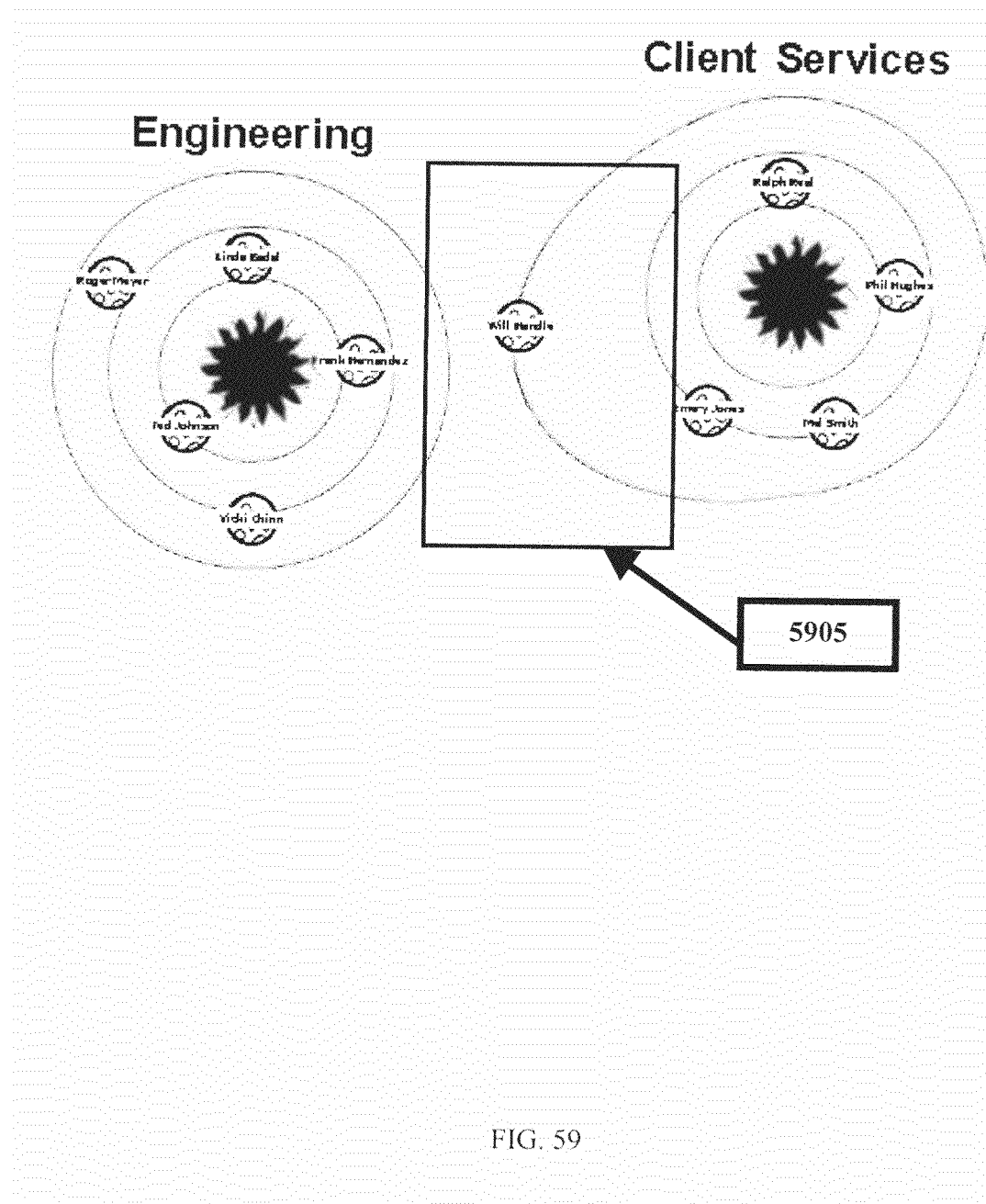
FIG. 59 is a screenshot of one embodiment of the social you-niverse visualization depicting orbits that are stretched in the regions contiguous to the solar system that is exerting the pull in accordance with an embodiment of the present disclosure.

In some embodiments, one solar system [4805] can exert gravitational pull on the outer planets [4820] of neighboring solar systems [4805], just as (for example) a very popular manager's department tends to grow while those of adjacent managers who are less popular tends to wane. In some of these embodiments, these gravitational forces are indicated with various kinds of arrows [5705]; in others they are indicated by the outer planets [4820] wobbling as their orbit approaches the solar system [4805] in question this embodiment is depicted in FIG. 58.

In still others the orbits (in either/both motion and rendered trajectory line) are stretched in the regions contiguous to the solar system [4805] that is exerting the pull [5905].

Figure 60:
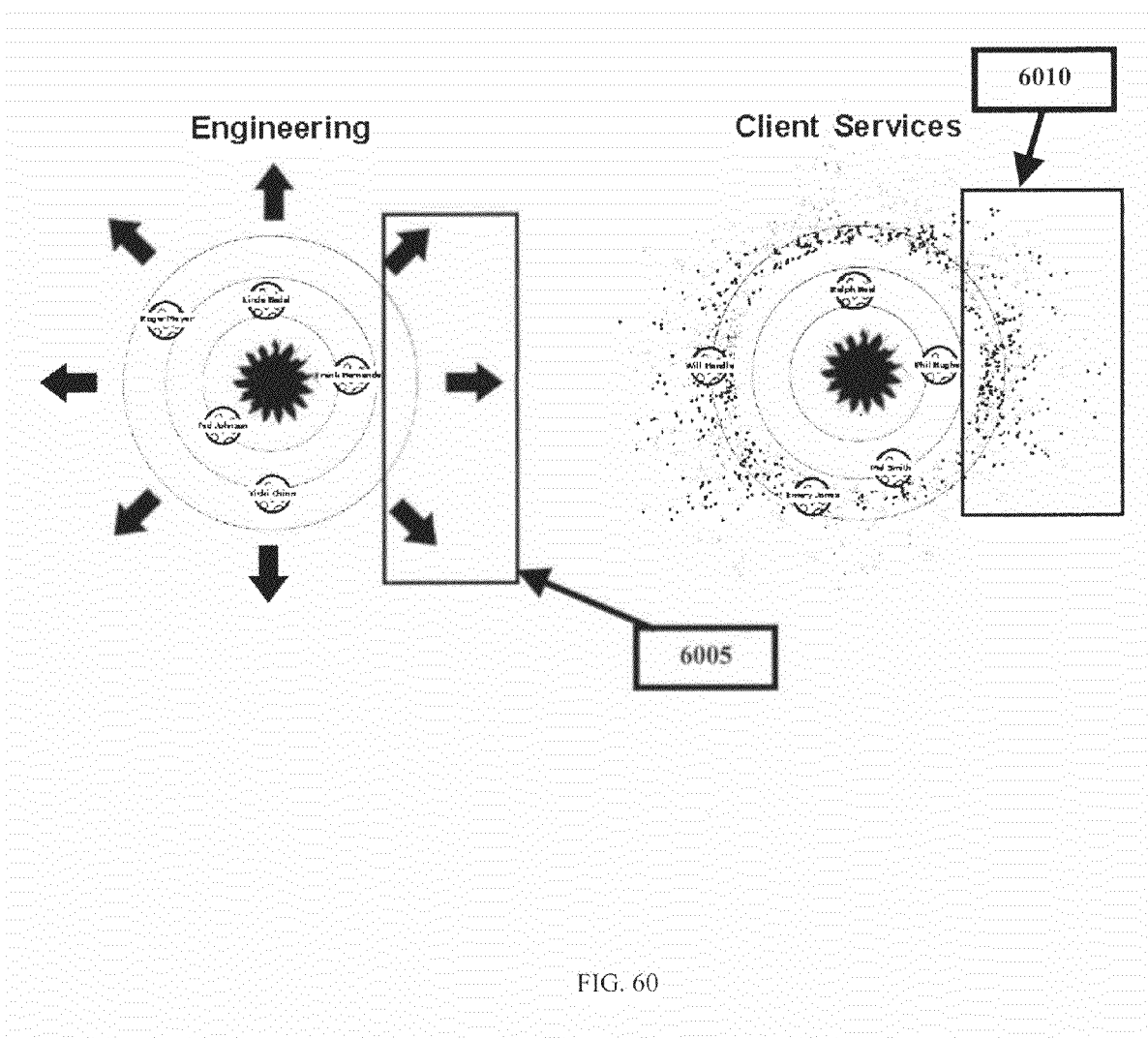
FIG. 60 is a screenshot of one embodiment of the social you-niverse visualization depicting disappearance of planets from the galaxy or universe in accordance with an embodiment of the present disclosure.

In most embodiments, solar systems [4805] may shrink or expand due to either/both the movement of planets [4820] from one solar system [4805] to another and/or due to the appearance or disappearance of planets [4820] from the galaxy or universe altogether as depicted in FIG. 60. In some of these embodiments, such changes in the size or structure of the solar system [4805] are indicated with various kinds of arrows [6005]; in others, dust and other cosmic artifacts are rendered so as to visually suggest the expansion or contraction which has occurred [6010].

Figure 61:
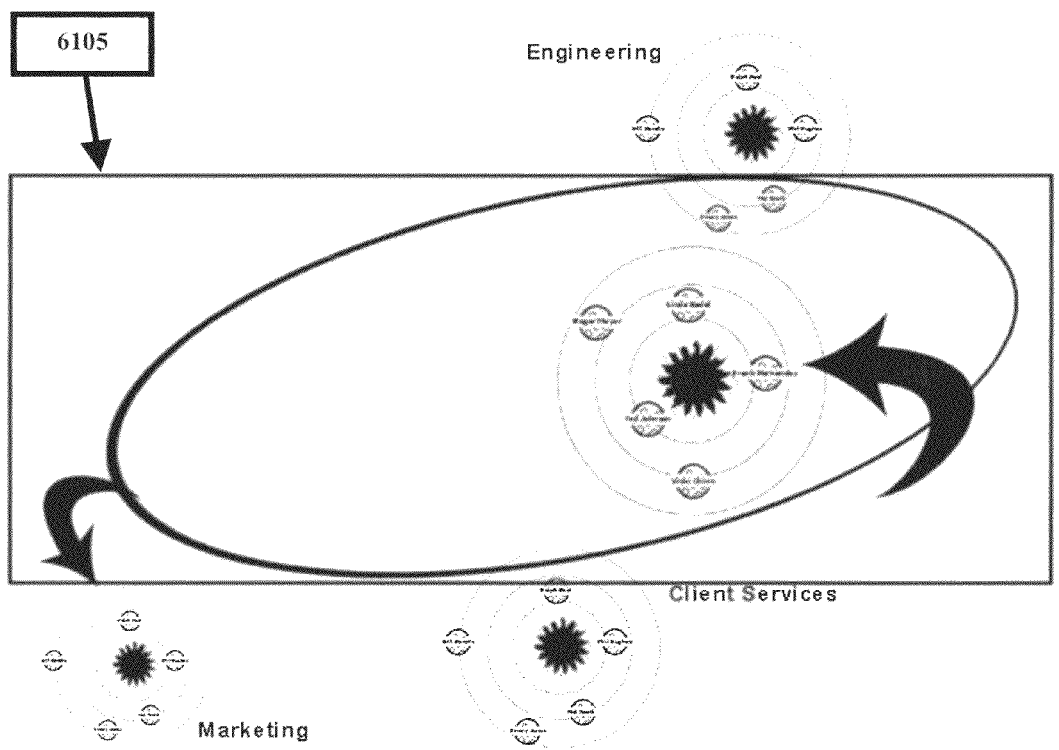
FIG. 61 is a screenshot of one embodiment of the social you-niverse visualization depicting solar systems which are exhibiting the greatest degree of change shift automatically towards the visual center of the screen, so as to make themselves more visible to the user in accordance with an embodiment of the present disclosure.
Figure 62:
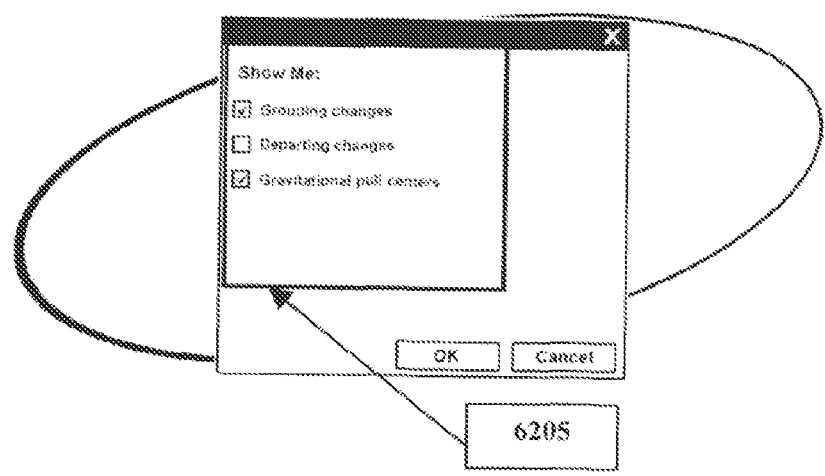
FIG. 62 is a screenshot of one embodiment of the social you-niverse visualization depicting user ability to specify which types of changes in accordance with an embodiment of the present disclosure.
Figure 63:
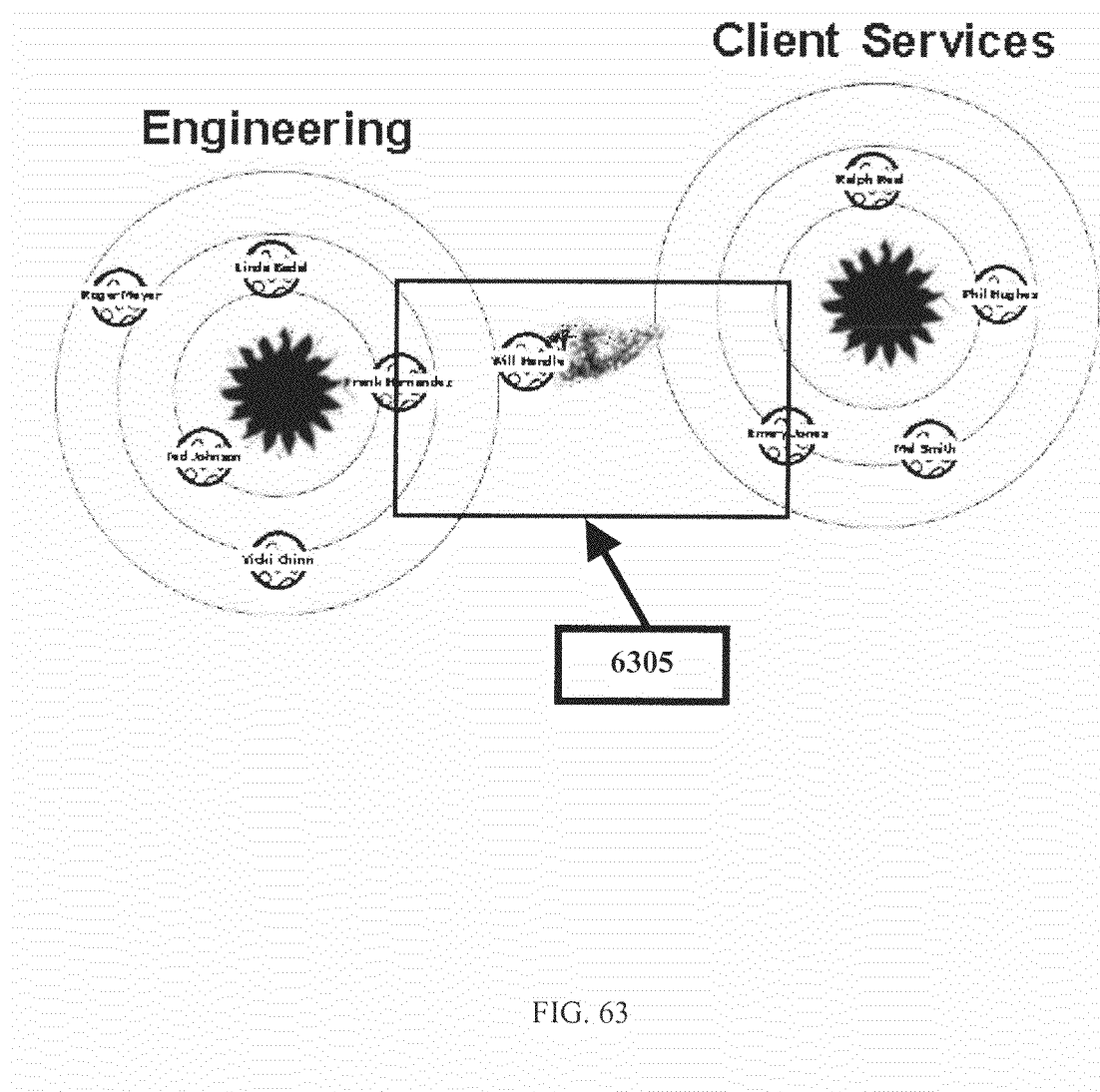
FIG. 63 is a screenshot of one embodiment of the social you-niverse visualization depicting a planet pulled into a new solar system with a trail of dust or other visual artifact to call attention to it self in accordance with an embodiment of the present disclosure.

In some embodiments, the solar systems [4805] (or galaxies [5110]) which are exhibiting the greatest degree of change shift automatically towards the visual center of the screen, so as to make themselves more visible to the user as depicted in FIG. 61. In these embodiments, the more slowly changing solar systems [4805] are pushed out towards the periphery of the view in order to make room for the rapidly evolving ones [6105]. In some of these embodiments, the user can specify which types of change warrant such promotion and which don't [6205]. For example, a planet [4820] leaving the universe entirely may not be seen as an interesting change, whereas a planet [4820] departing for a neighboring solar system [4805] is.

Some embodiments allow planets [4820] to be in multiple simultaneous orbits as doing so allows the capture of some important real world situations, such as people whose job includes two very distinct roles, each of which has them interacting with very different people. Other embodiments force a choice. In most of these embodiments, a planet [4820] will visibly be pulled into the new solar system [4805], often with a trail of dust or other artifact to call attention to it self [6305]. Still other embodiments allow the user [455] to choose the behavior in this regard. Some embodiments offer a simplified view from the point of view of the individual person. In these embodiments, the person is the sun around which the actors [220] closest to them are represented as planets [4820] in orbit around them. This is an inherently egocentric view, since in reality, most people are in someone else's orbit. Many different measures, or blends of measures, can be used in order to determine the definition of closest, including measures for social and professional proximity as discussed in U.S. Pat. No. 7,519,589.

Figure 64:
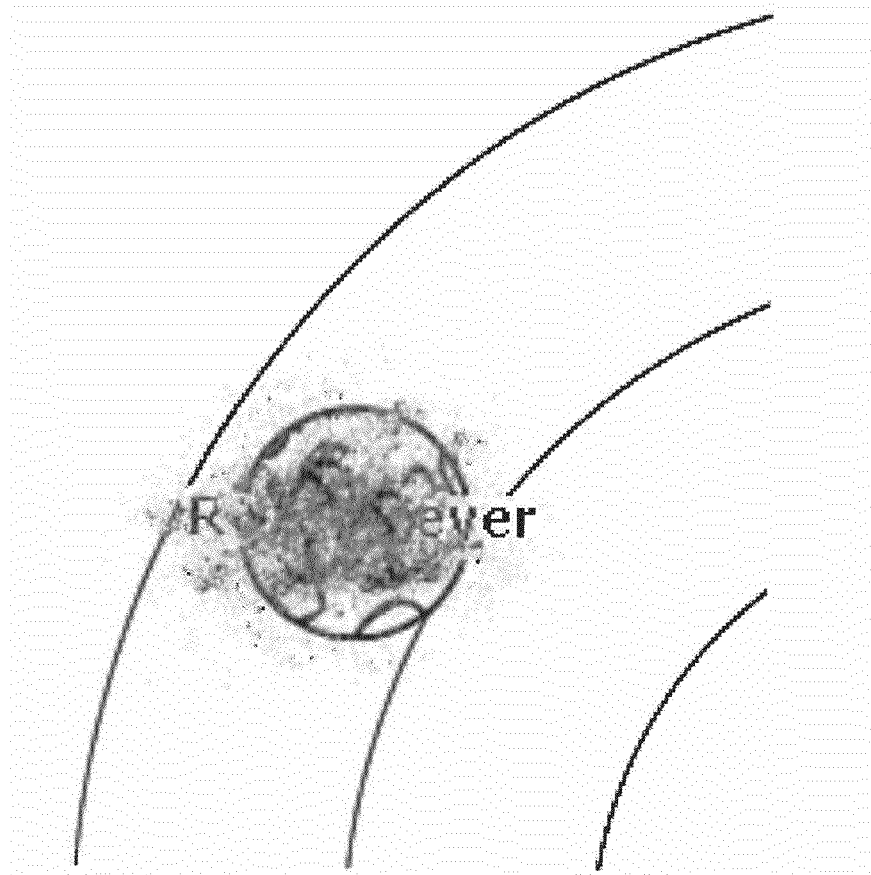
FIG. 64 is a screenshot of one embodiment of the social you-niverse visualization depict clouds of dust used to cloak planets which represent individuals about whom little is known in accordance with an embodiment of the present disclosure.
Figure 65:
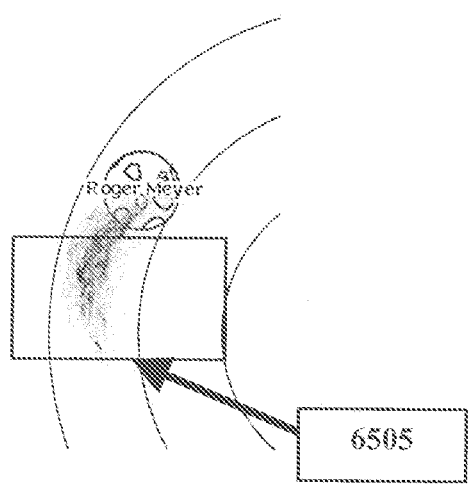
FIG. 65 is a screenshot of one embodiment of the social you-niverse visualization depicting dust rendered over as much space as necessary, for as long as necessary, in order to accurately portray the extent and duration of the data loss in accordance with an embodiment of the present disclosure.
Figure 66:
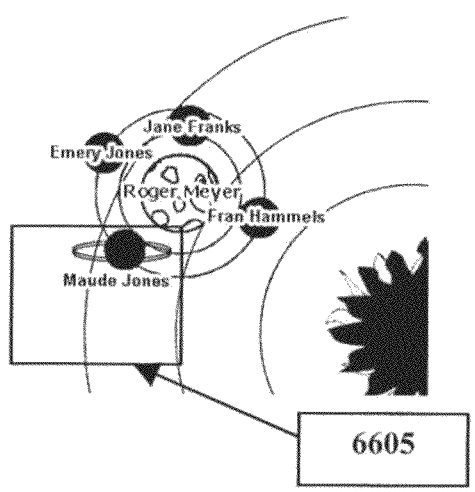
FIG. 66 is a screenshot of one embodiment of the social you-niverse visualization depict moons orbiting other planets which represent the "followers" or entourage of that actor in accordance with an embodiment of the present disclosure.
Figure 67:
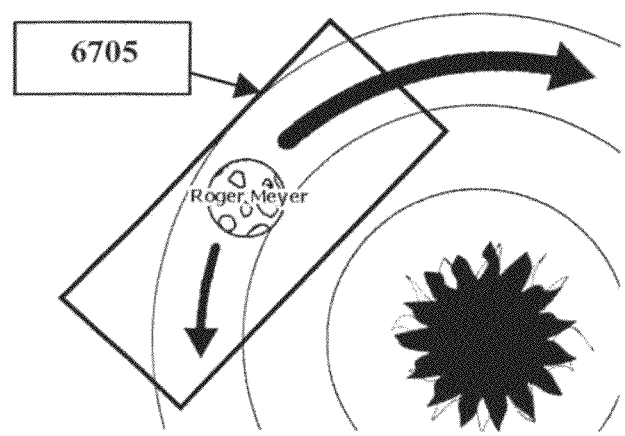
FIG. 67 is a screenshot of one embodiment of the social you-niverse visualization depicting orbits relative speed in accordance with an embodiment of the present disclosure.
Figure 68:
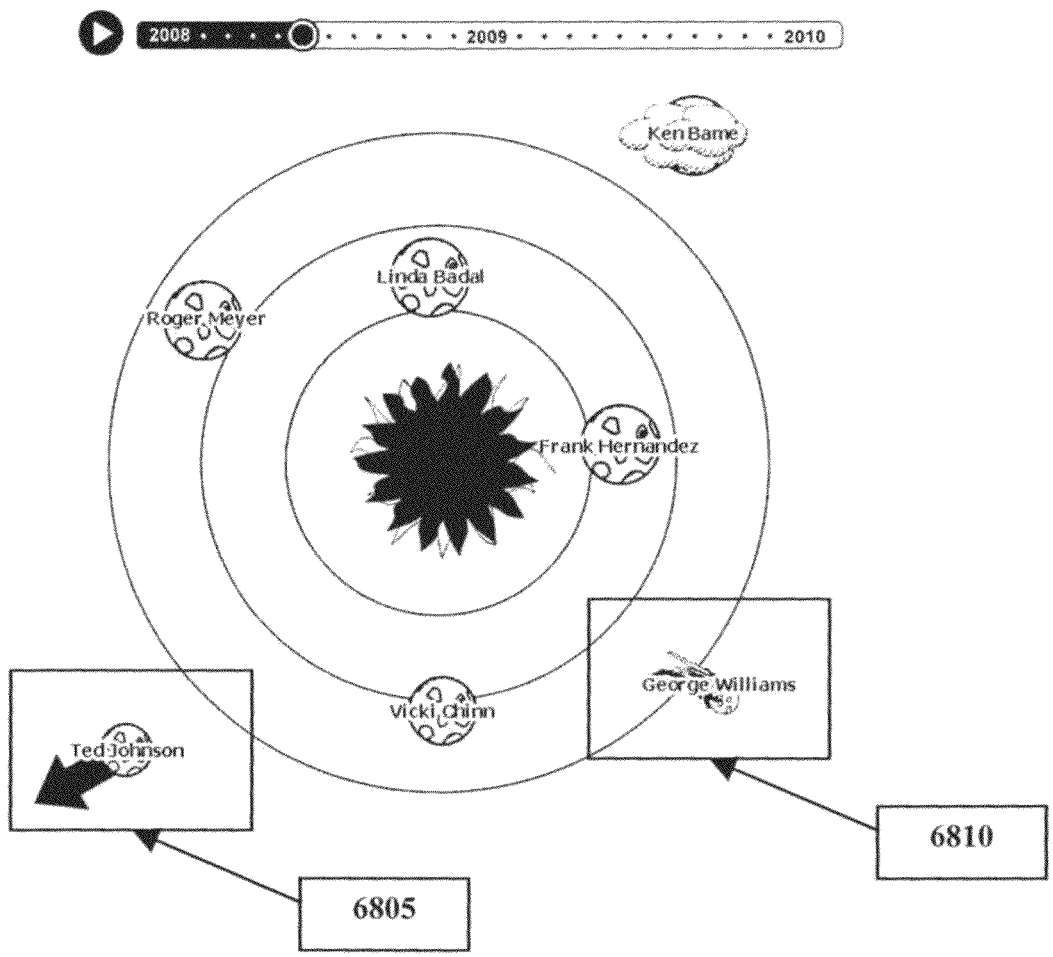
FIG. 68 is a screenshot of one embodiment of the social you-niverse visualization in accordance with an embodiment of the present disclosure.
Figure 69:
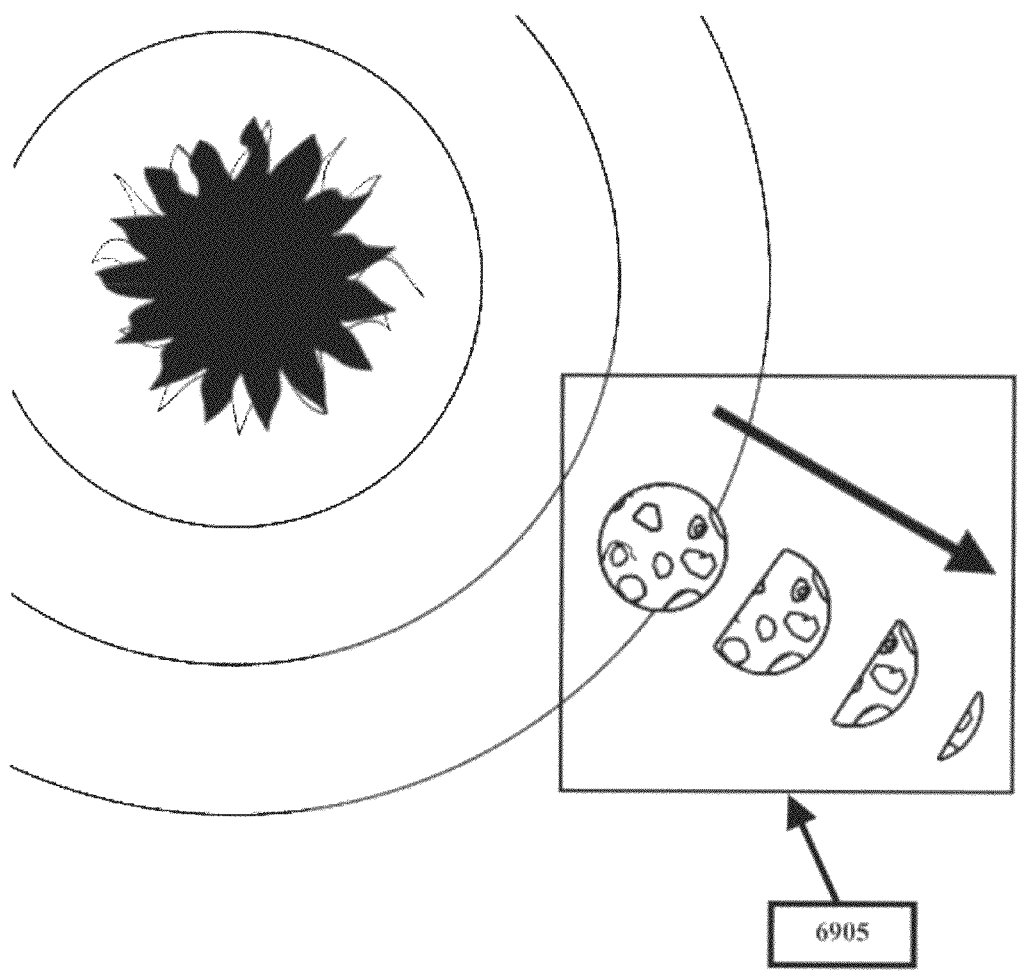
FIG. 69 is a screenshot of one embodiment of the social you-niverse visualization depict a planet gradually drifting out of the orbit of the current solar system and disappearing in accordance with an embodiment of the present disclosure.
Figure 70:
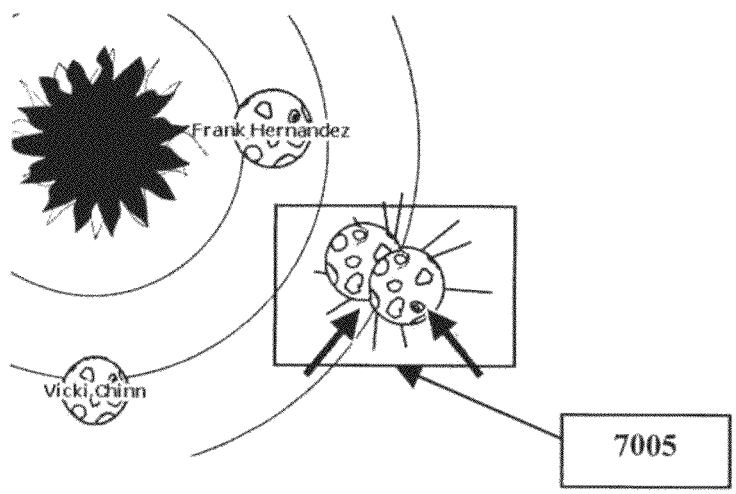
FIG. 70 is a screenshot of one embodiment of the social you-niverse visualization depicting two actors experiencing conflict and the planets representing them smashing together in accordance with an embodiment of the present disclosure.
Figure 71:
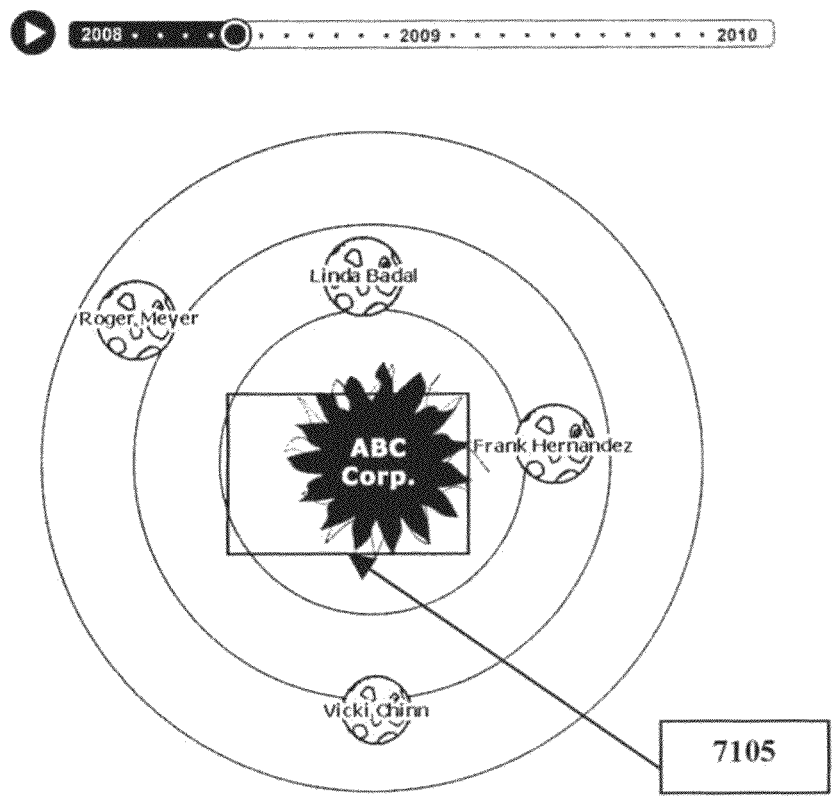
FIG. 71 is a screenshot of one embodiment of the social you-niverse visualization depicting concepts or topics instead of moons, starts or planets in accordance with an embodiment of the present disclosure.
Figure 72:
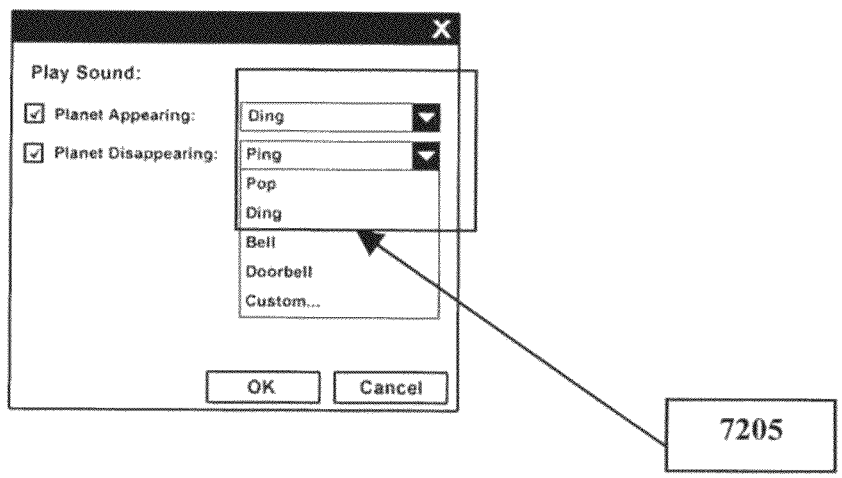
FIG. 72 is a screenshot of one embodiment of the social you-niverse visualization depicting optional sound effects in accordance with an embodiment of the present disclosure.

In most of these embodiments, the orbits of different planets [4820] change as the distance among the real-world actors [220] varies; a planet [4820] may drift into a more distant orbit, or tighten its orbit. In some embodiments, the user may configure different characteristics of the planet [4820] so as to represent different characteristics of the related actors [220]. For example, the color of the planet [4820] could be used to specify actor [220] gender, and the size of her organizational position. In some embodiments, clouds of dust are used to cloak planets [4820] which represent individuals about whom little is known; this embodiment is depicted in FIG. 64. In some embodiments such visual effects are also used to indicate temporary loss of visibility such as would occur if access to a particular stream were cut off for some reason. In these embodiments, the dust is rendered over as much space as necessary, for as long as necessary, in order to accurately portray the extent and duration of the data loss [6505].

In some embodiments, orbiting planets [4820] can themselves have moons [6610] orbiting them which represent the "followers" or entourage of that actor. Likewise, if appropriate to the underlying data, the moons [6610] can have some smaller objects orbiting them. In some embodiments, orbiting planets [4820] with their own moons [6610] are rendered with Saturn-like rings as a visual cue to the existence of the orbiting objects [6605].

In some embodiments, there is the notion of an "upwardly mobile" actor and the reverse. The former are represented as planets [4820] with more relative rapid orbits, so as to be more eye catching [6705] Solar systems [4805] with faster moving planets [4820] will in this way seem less sleepy and stagnant than those with less rapidly moving planets [4820].

In most embodiments, planets [4820] may be destroyed to correspond to the real-world event in which the relevant actor [220] has permanently left the scene [6805]. In some of these embodiments, the planet [4820] explodes in a fireball [6810], leaving behind a trail of cosmic dust as a reminder of its prior existence [6810]. In some embodiments if the actor [220] has merely left a particular group [225] but continues to appear elsewhere in the observable universe, the planet [4820] will gradually drift out of the orbit of the current solar system [4805] and disappear (but not explode) [6905]. In some embodiments, a planet [4820] will flame out leaving behind a trail of cosmic dust if there is evidence of a severed relationship such as an argument, or increasing levels of hostility. In some embodiments, the visual intensity of the explosion will vary according to the extent of the hostility and observed negative emotion. In some embodiments, the planet [4820] will simply disappear from the orbit if the actor [220] disappear, regardless of the reason. In some embodiments, in the event two actors [220] are experiencing conflict, the planets [4820] representing them will smash together [7005]. In some of these embodiments, such smashing together only occurs as part of the destruction of one or both planets [4820] (at least with respect to the particular solar system [4805]).

In some embodiments, planets [4820] moons [6605], and stars can represent groups [225] of actors rather than individual actors [220]. In other embodiments, these objects can also represent concepts or topics [7105]. For example, this would allow a group of planets [4820] to be orbiting (that is, bound together by) a topic [144] of immense common interest.

In some embodiment, actors [220] represented by planets [4820] can be part of a multiple solar systems [4805]. In such a case an indicator or icon will be used to tell the user [455] that an actor [220] is represented in the universe multiple times.

In some embodiment, a visual indication such as a gauge near each planet [4820] or an astronomical chart marking is used to indicate that an actor [220] continuously holds a certain distance from another actor [220] represented by a star [4905].

In some embodiments, there are optional sound effects [7205]. In most of these embodiments, only the solar system [4805] or galaxy [5110] currently in focus will have their sound effects played. In these embodiments, such sound effects include, but are not limited to: explosions when planets [4820] flame out, a grinding noise if two planets [4820] are banging against one another, a "swoosh" sound if a planet [4820] is pulled from one solar system [4805] to another, and a "ping" sound if a new star comes into existence.

In some embodiments, the angriness level or the negative tone in the communication [123] of an actor [220] is represented with wobbling stars [4905] and planets [4820], solar flares and volcanic eruptions on planets [4820]

Some embodiments of the invention will use this same visualization to depict relationships among actors other than social proximity. These other relationships include, but are not limited to: shared interests, shared opinions, common purchase. One application for example would allow commerce sites to take a user's identity, automatically look up their social media "friends", compile data as to what they are broadcasting on different publicly available social media about their activities, and draw the visualization according to commonalities in recent activities and topics.

Temperature Gauge Visualization

Just as the Stressful Topics visualization [473] revolves around the idea of analyzing like-minded groups of people and observing how they exert influence over one another, some embodiments of the Temperature gauges visualization [474] are focused on examining divergences in opinion within a group of people.

Figure 73:
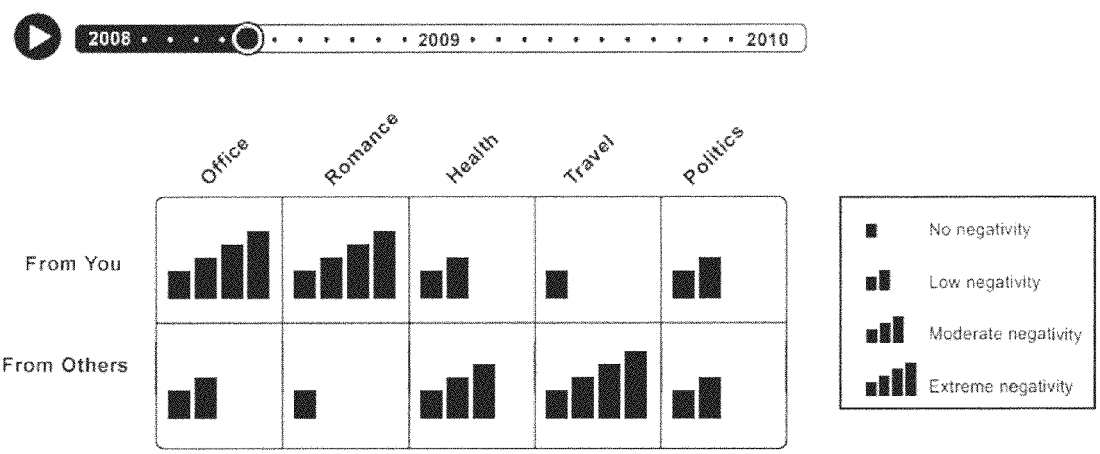
FIG. 73 is a screenshot of one embodiment of the temperature gauge visualization in accordance with an embodiment of the present disclosure.
Figure 74:
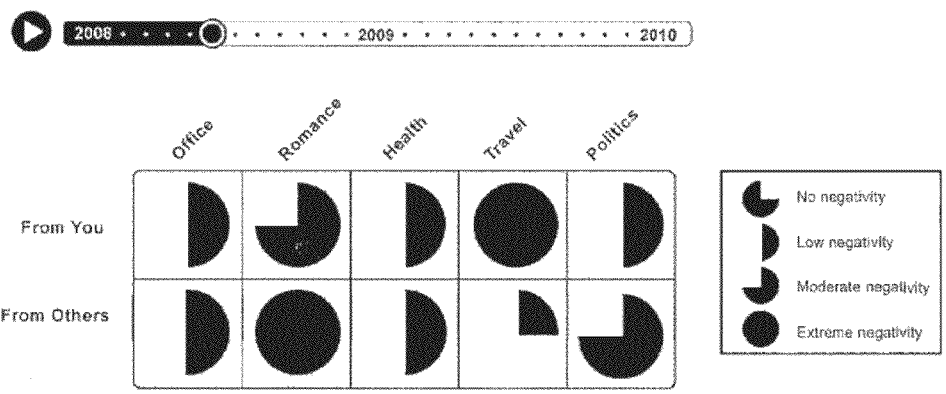
FIG. 74 is a screenshot of one embodiment of the temperature gauge visualization depicting notion of "neutral" and various types of negative sentiments in accordance with an embodiment of the present disclosure.
Figure 75:
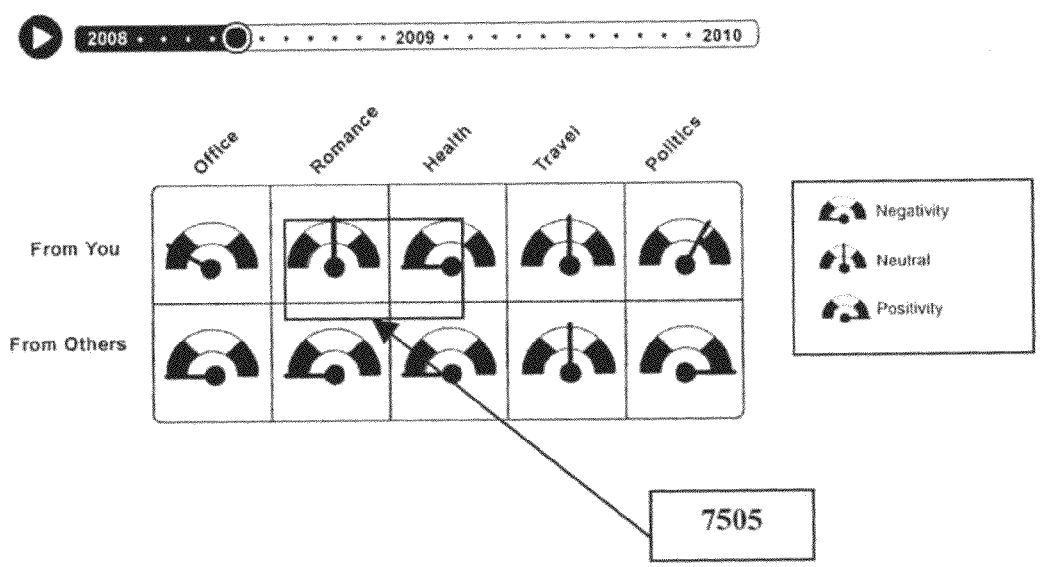
FIG. 75 is a screenshot of one embodiment of the temperature gauge visualization depicting expression of positive sentiments by having the midpoint in the gauge in accordance with an embodiment of the present disclosure.

In some embodiments of the temperature gauges visualization [474] as pictured in FIG. 73, the user [455] provides the set of actors [220]—including potentially the set of all available actors [220]—to examine and the system determines the topics [144] with the greatest amount of observable divergence of opinion. As elsewhere, topics [144] may be determined by any topic detection [152] mechanism, including but not limited to various types of topic clustering, ontologies [148] and taxonomies, or discussions [136]. Since accurately determining positive sentiment expression on most types of data is very difficult, many embodiments only recognize the notion of "neutral" and various types of negative sentiments, as pictured in the legend in FIG. 74 However some embodiments could also allow the expression of positive sentiments by having the midpoint in the gauge [7505] icon be neutral; anything to the left of that or below it (depending on orientation and exact style of the gauge) would be positive sentiment.

In other embodiments, the user [455] specifies which topics [144] are considered most important, so that these topics [144] will pre-empt other less important topics [144] which may show greater variation in sentiment, thus setting much lower thresholds—including no threshold at all—for such interesting topics [144]. In some embodiments, the user [455] may specify how many actors [220] and/or topics [144] to include in the same matrix. In some embodiments, the user [455] may specify that apparent chain reactions—meaning that actor [220] A expresses negative sentiment on a particular topic [144], then actors [220] B and C subsequently do—should be given different treatment than the case in which actor [220] A alone expresses such negative sentiments within the time frame for which data is available.

In some embodiments, the user [455] may set various kinds of thresholds to establish what kinds and degrees of divergences of sentiment are useful or interesting ones. For example, if half of an actor [220] population is positive on a particular topic [144] such as a presidential candidate, but the other half is negative: the differences may not be particularly interesting, as there is a broad support basis for both positions. By contrast, in the case of a malicious insider, the sentiments expressed may run almost uniquely counter to those of the group [225] at large because they may be happy when something bad happens to the organization.

As a result, in some embodiments, each actor [220] has only one gauge associated to them. This one gauge captures their overall negative sentiment level so that as the timeline widget is used to play the temperature gauges visualization [474], the needle on the gauge adjusts accordingly. This is for the purpose of noting divergences in overall mood that are not apparently linked to a particular topic [144]. For example, on the day of the 9/11 terrorist attacks, the vast majority of people expressed various kinds of negative sentiments.

In some embodiments, the gauges may be associated with groups [225] of actors such as departments rather than individual actors [220]. In some embodiments, there are optional sound cues which are played when a gauge that is in focus or visible (depending on the embodiment) exceeds a certain user-specified threshold, so as to draw further attention to it.

Figure 76:
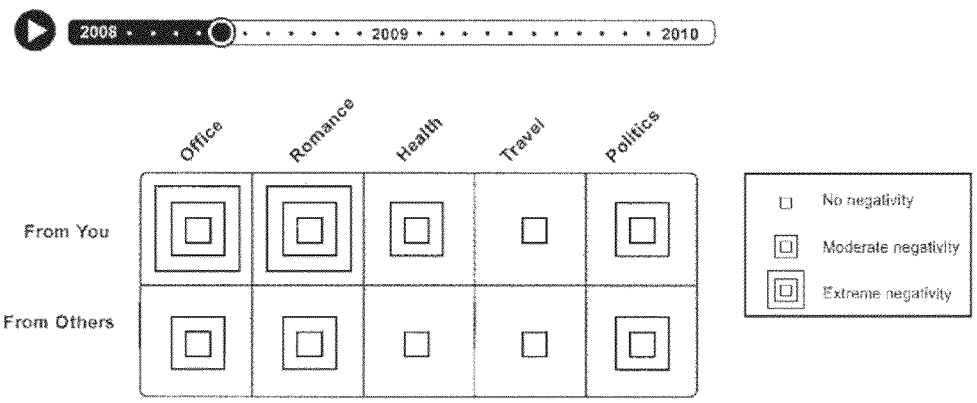
FIG. 76 is a screenshot of one embodiment of the temperature gauge visualization depicting emoticons of different kinds instead of temperature gauge icons in accordance with an embodiment of the present disclosure.
Figure 77:
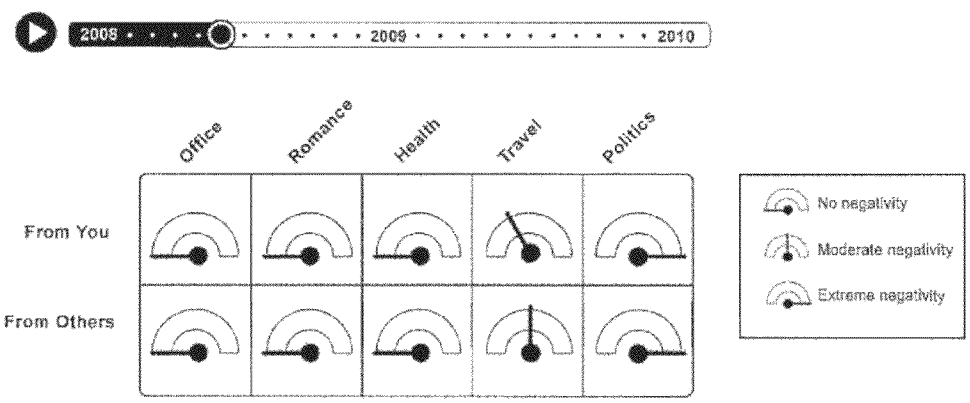
FIG. 77 a screenshot of one embodiment of the temperature gauge visualization depicting emoticons of different kinds instead of temperature gauge icons in accordance with an embodiment of the present disclosure.

Some embodiments of the stressful topics visualization [473] are used as described here, but with emoticons of different kinds instead of temperature gauge icons as depicted in FIGS. 76 and 77. In some of these embodiments, the emoticons are further refined so as to indicate varying levels of the negative emotion being expressed. For example, the emoticon used to represent anger could have varying hues or saturations of red to indicate intensity. Likewise, some embodiments of the temperature gauges visualization [474] can be used in the same manner as in the stressful topics visualization [473].

Stressful Topics Visualization

Figure 78:
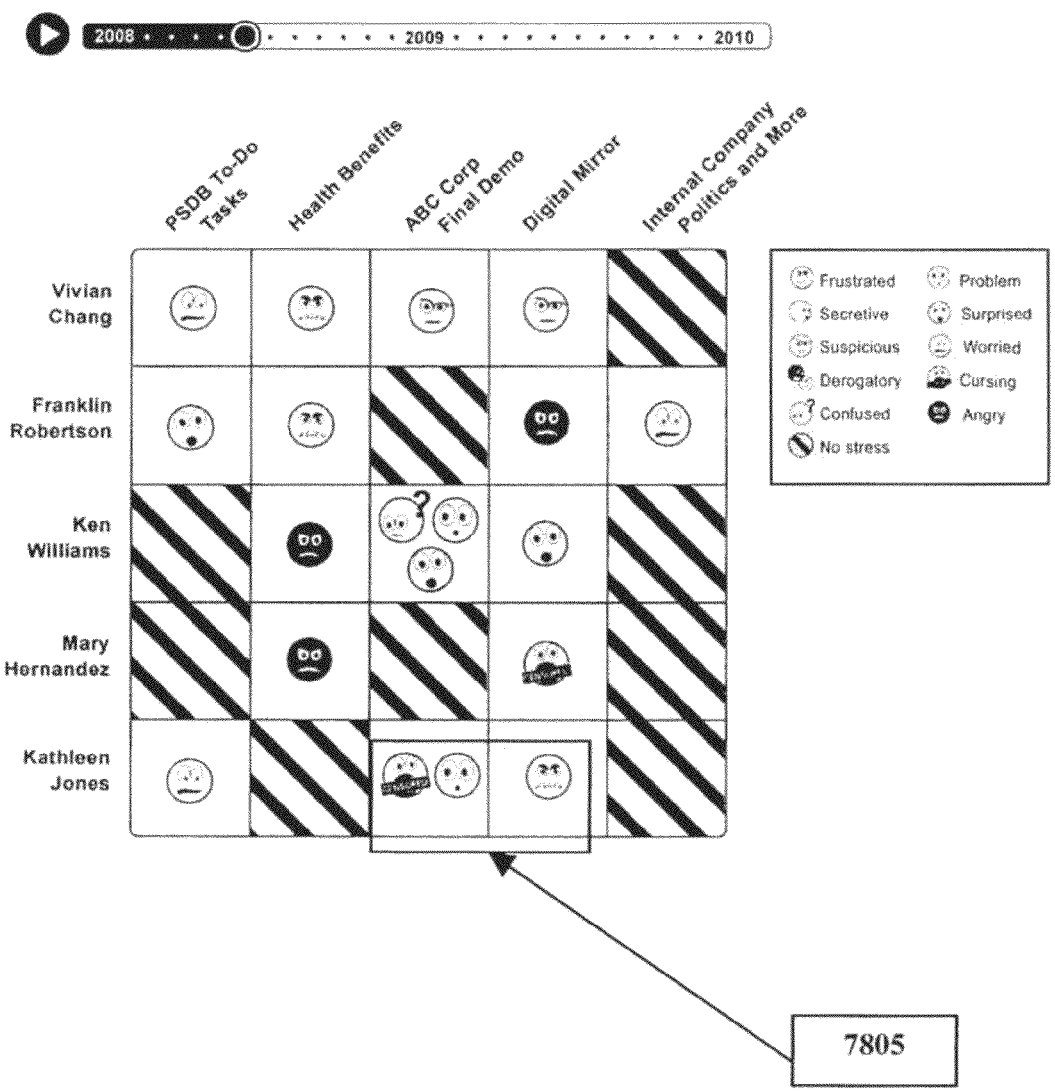
FIG. 78 is a screenshot of one embodiment of the stressful topics visualization depicting a matrix representation in which actors and topics are respectively represented in rows and columns in accordance with an embodiment of the present disclosure.

As introduced in U.S. Pat. No. 7,519,589, a matrix representation in which actors [220] and topics [114] are respectively represented in rows and columns (or vice versa) as shown in FIG. 78 and in which individual intersections between actors [220] and topics [144] in the matrix are adorned with emoticons [7805] to express various emotive tones employed by these actors [220] with respect to these topics [144], provides an effective and compact means of capturing friction-generating issues The stressful topics visualization [474] included in the present invention extends this concept in the following important ways:

Each actor [220] who expresses a negative sentiment is said to have a group of "hot" topics [144]. In one embodiment, an actor's [220] "hot" topics [144] are those for which the actor [220] expresses any negative sentiment. In another embodiment, they are topics [144] for which the actor [220] expresses negative sentiment in a number of items [122] greater than some pre-chosen threshold. In another embodiment, a percentage of the actor's [220] items [122] greater than some pre-chosen threshold is used. In addition, an actor [220] who expresses negative sentiment is said to have an affinity set of other actors [220] who express similar sentiments on similar topics [144] in one embodiment these groups [225] are computed by associating with each actor [220] a vector with one entry per topic [144] specifying the level of negative sentiment this actor [220] expresses with regard to this topic [144]. These vectors are clustered together using standard clustering techniques or using the continuous clustering component [412] that is part of this invention. Each cluster represents an affinity set of actors [220].

Within each affinity set, one or more actors [220] may be identified who start the cascade of negative commentary that then "bleeds" onto other actors [220]. In one embodiment, this is determined by first clustering the utterances of negative sentiment within an affinity set based upon the date they were made. Any actors [220] who originate at least one of the first k negative utterances in each cluster more than p percent of the time, where k and p are configured by the user, are considered to be starters of negative commentary cascades, Likewise, certain topics [144] may tend to provoke negative sentiments from the same group [225] of actors [225] over time, and tend to trend negatively together as a group. In one embodiment, these "hot actors" for this topic [144] are those which express negative sentiment in a number of items [122] within this topic [144] where the number of such items is greater than some pre-chosen threshold. In another embodiment, they are those actors [220] who express negative sentiment in some percentage of the items [122] within this topic [144]], where that percentage is greater than some pre-chosen threshold. Further, just as with actors [220], negative sentiments expressed about one topic [144] may often start a cascade of negative sentiments expressed about other topics [144] in the same group. In one embodiment these groups of topics [144] are detected by the method described above for actors [220], with the roles of actors [220] and topics [144] reversed.

Such "negative affinity" relationships are often important to understand, since things like mood are rarely constrained to the specific stimulus that caused the ill humor. They also provide a helpful construct to scale this style of visualization [204] to data sets which may contain arbitrary numbers of actors [220] expressing negative sentiment.

In the original invention, it was specified that users could determine which specific topics [144] and actors [220] they wanted to have represented in the visualization; they could also just specify the top N relative to any group [225]. Users could also create aggregate actors [220] (e.g. the marketing department) and aggregate topics [144] (e.g. "contracts"). Certain classes of actors [220] and topics [144] could be determined by the user to be of the same broad category, which would influence the visual treatment of the appropriate rows or columns so as to provide a visual cue to the user of the similarity. This makes it easier to see at a glance or from a thumbnail that, for example, many of the stressful topics [144] pertain to a particular class of customer.

Figure 79:
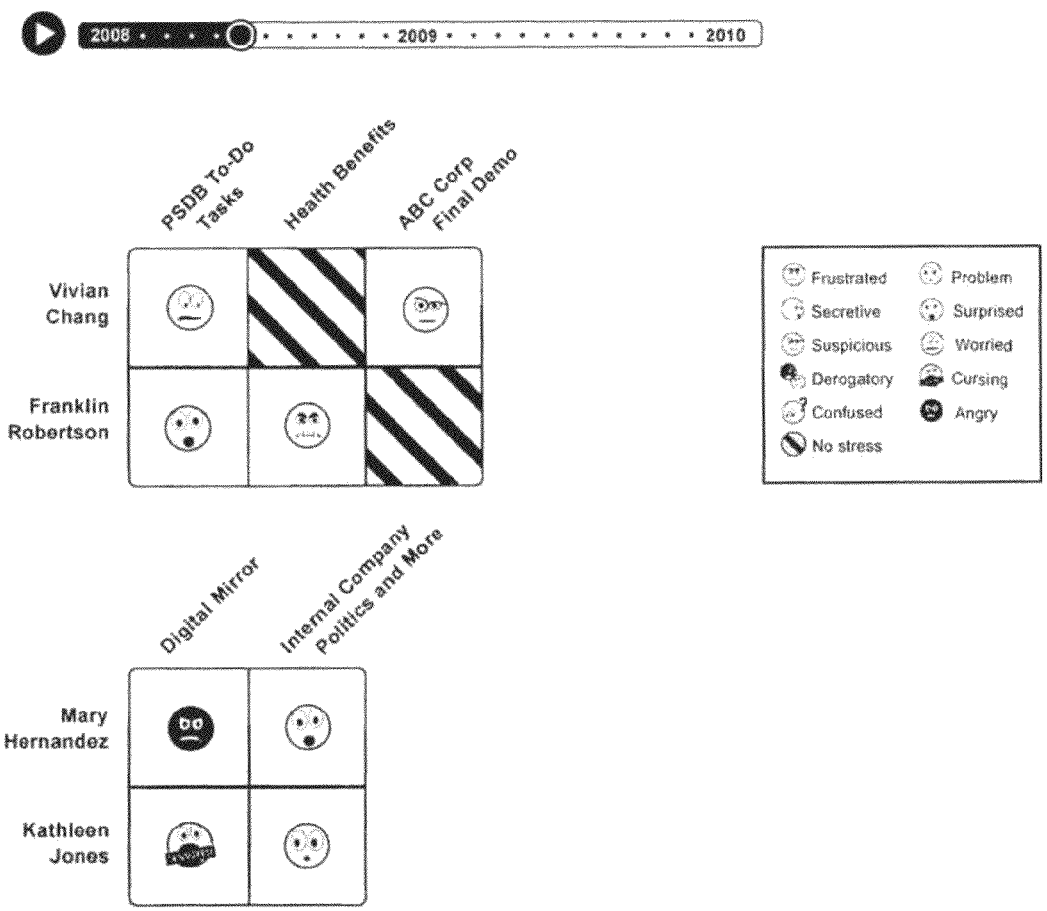
FIG. 79 is a screenshot of one embodiment of the stressful topics visualization in accordance with an embodiment of the present disclosure.
Figure 80:
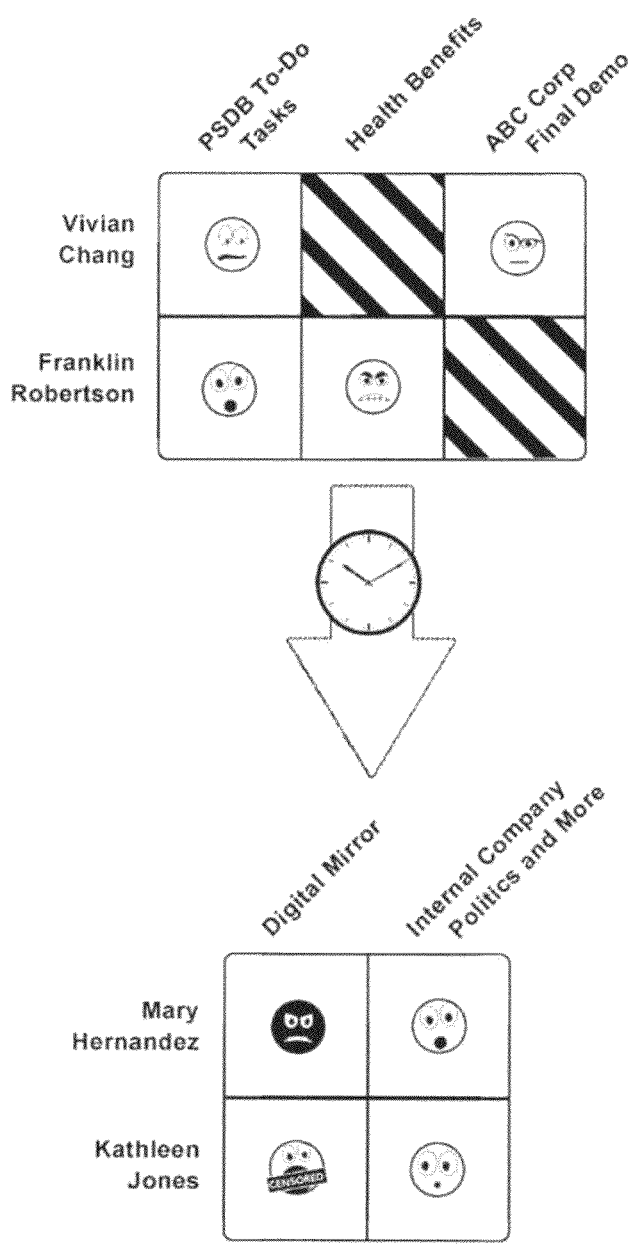
FIG. 80 is a screenshot of one embodiment of the stressful topics visualization depicting change over the course of time in accordance with an embodiment of the present disclosure.
Figure 81:
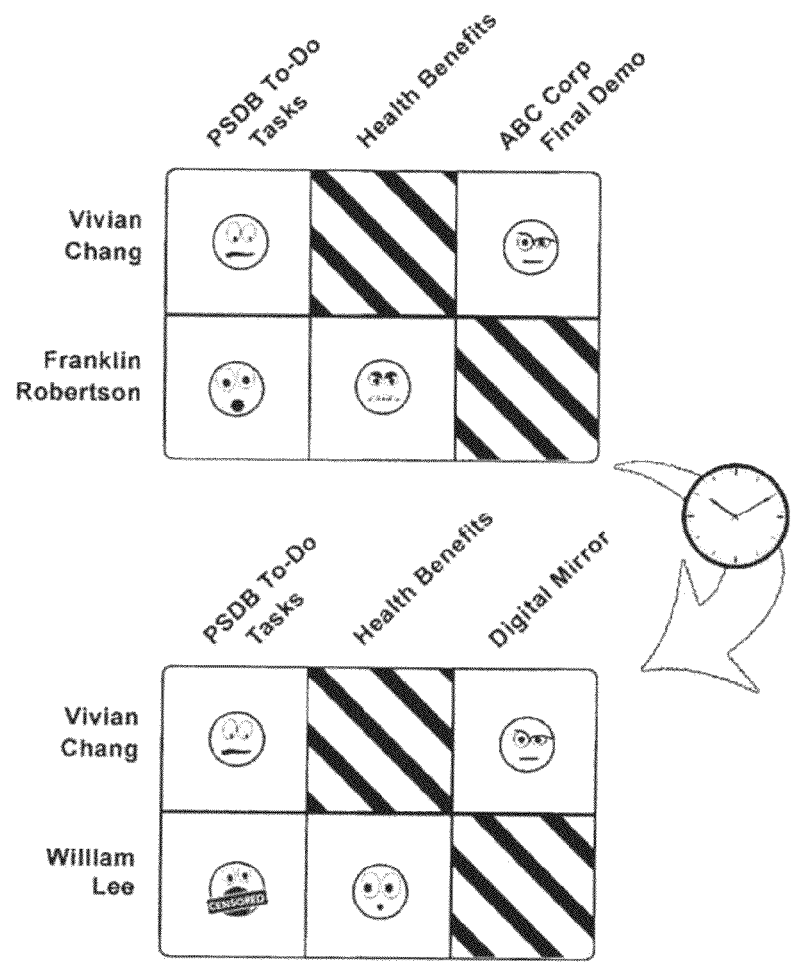
FIG. 81 is a screenshot of one embodiment of the stressful topics visualization depicting changes in individual rows and columns in a matrix in accordance with an embodiment of the present disclosure.
Figure 82:
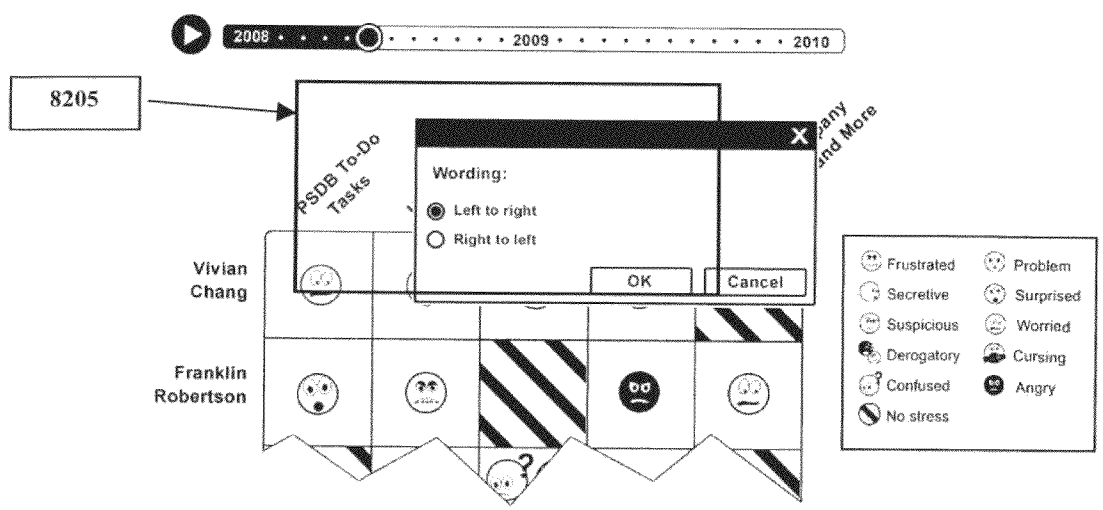
FIG. 82 is a screenshot of one embodiment of the stressful topics visualization depicting a way to account for languages with word orderings other than left to right in accordance with an embodiment of the present disclosure.
Figure 83:
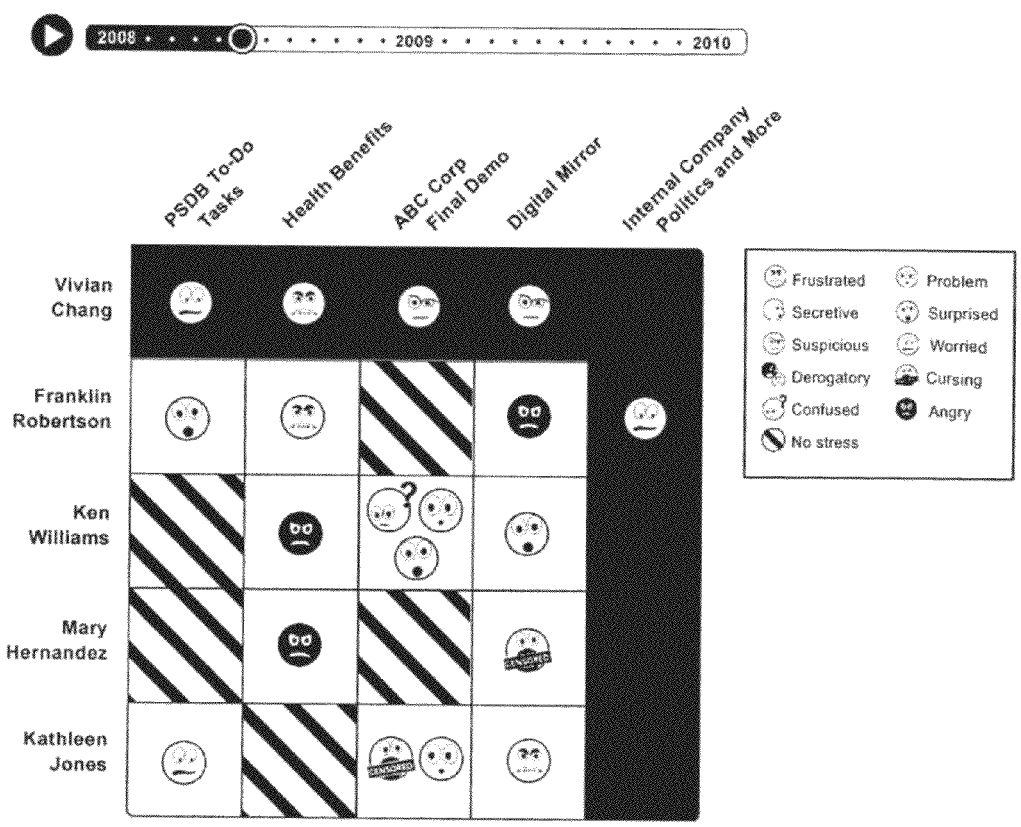
FIG. 83 is a screenshot of one embodiment of the stressful topics visualization depicting color designation for rows and columns which have been swapped over time in accordance with an embodiment of the present disclosure.

As illustrated in FIG. 79 the stressful topics visualization [473] included in the present invention now adds the capability whereby, in some embodiments, the software automatically determines and visualizes the relevant matrices in response to the user [455] providing either/both specific actors [220] and/or specific topics [144]. Specifically, the selection of a particular topic [144] or actor [220] may now imply the inclusion of another topic [144] or actor [220] in the same group, and hence pull in additional topics [144]/actors [220] as well. This will result in matrices of varying sizes rather than a fixed size. Specifying actors [220] or topics [144] which do not overlap with one another will result in the creation of a new matrix for each; if the actors [220] and/or topics [144] logically intersect, they will be added to the same matrix In the original invention, the user could "play" the visualization, so that the emoticons [7805] came and went over time according to the emotions being expressed by different actors [220] at the time. As illustrated in FIG. 80, since both actors [220] and topics [144] can change over the course of time, the stressful topics visualization [473] now offers the user the option of having the software automatically determine a matrix in which the topics [144] and actors [220] are fixed for as long as makes sense; if for example an actor [220] drops out of circulation, the existing matrix will be automatically replaced with a new matrix without that actor [220] and which reflects any other appropriate changes. In addition, in one embodiment, individual rows and columns in a matrix may change as shown in FIG. 81. In some such embodiments, the software automatically renders (for example) the row representing an actor [220] who is known to disappear at a later point to the right of the matrix so that the change is less distracting to users who read left to right. In some embodiments, the software is configurable to account for languages with word orderings other than left to right [8205]. In some embodiments, the system will automatically rearrange rows or columns as appropriate in order to visually emphasize patterns, such as two actors [220] reacting very similarly to the same topics [144]. In some embodiments, as illustrated in FIG. 83, rows and columns which have been swapped over time are designated in a different color than those which have remained in place for the full time span of the matrix.

Figure 84:
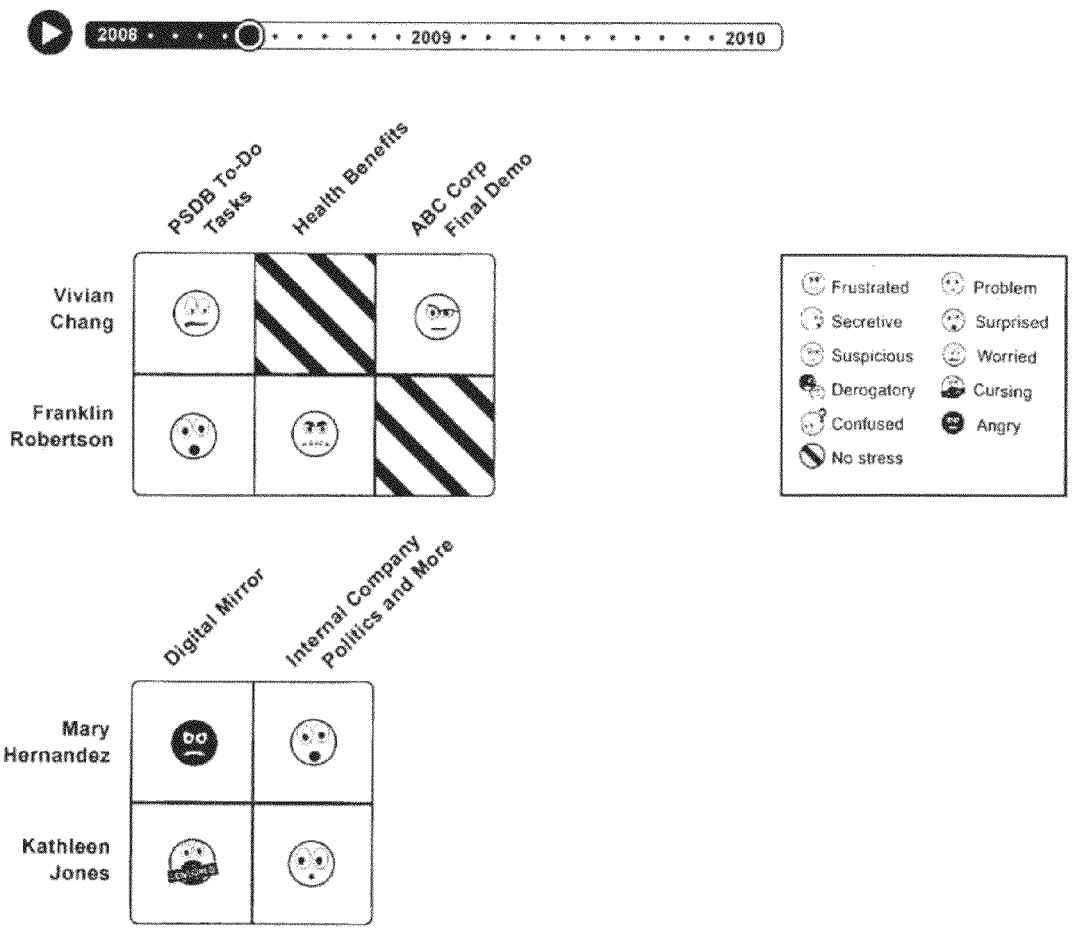
FIG. 84 is a screenshot of one embodiment of the stressful topics visualization depicting ability to play a visualization which contains an arbitrary number of different matrices according to the same timeline in accordance with an embodiment of the present disclosure.
Figure 85:
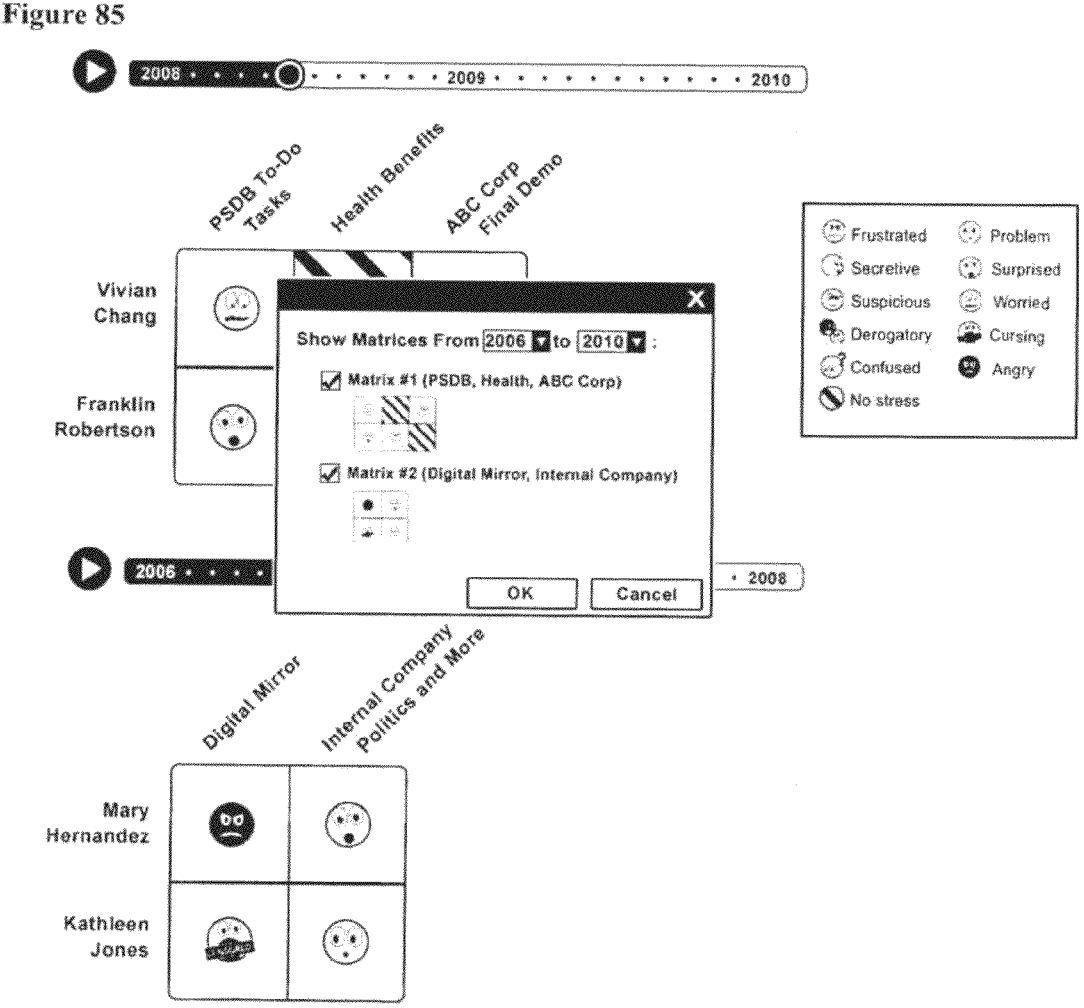
FIG. 85 is a screenshot of one embodiment of the stressful topics visualization depicting user ability to select either/both matrices from different timeframes, and/or different timeframes from the same matrix and play these matrices all together in accordance with an embodiment of the present disclosure.
Figure 86:
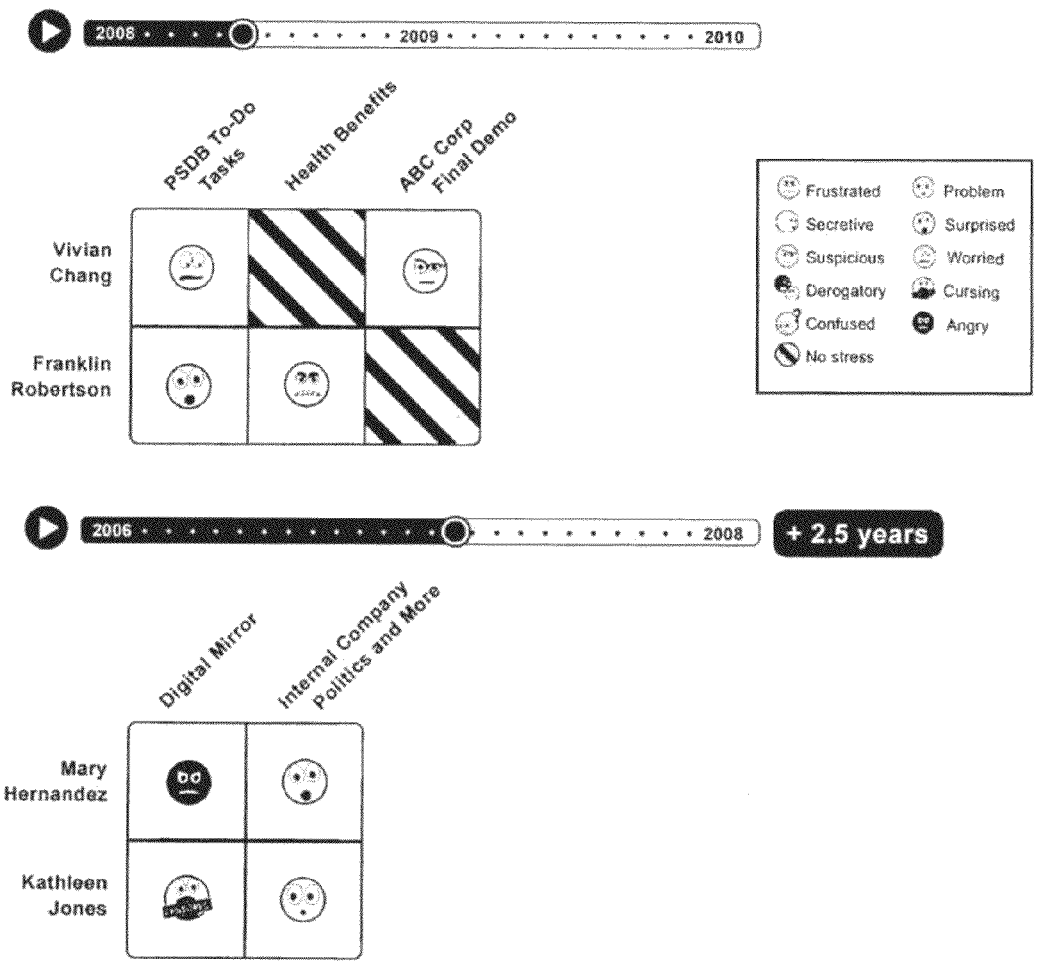
FIG. 86 is a screenshot of one embodiment of the stressful topics visualization depicting display indicating the offset unit of time in accordance with an embodiment of the present disclosure.

As depicted in FIG. 84, the stressful topics visualization [473] now offers the ability in some embodiments to "play" a visualization which contains an arbitrary number of different matrices according to the same timeline. In some embodiments, as illustrated in FIG. 85, the user may select either/both matrices from different timeframes, and/or different timeframes from the same matrix and play these matrices all together. In these embodiments, as illustrated in FIG. 86 when the visualization is played, the display indicates the offset unit of time, for example +1 week since the start, since the timeframes are different by definition.

Figure 87:
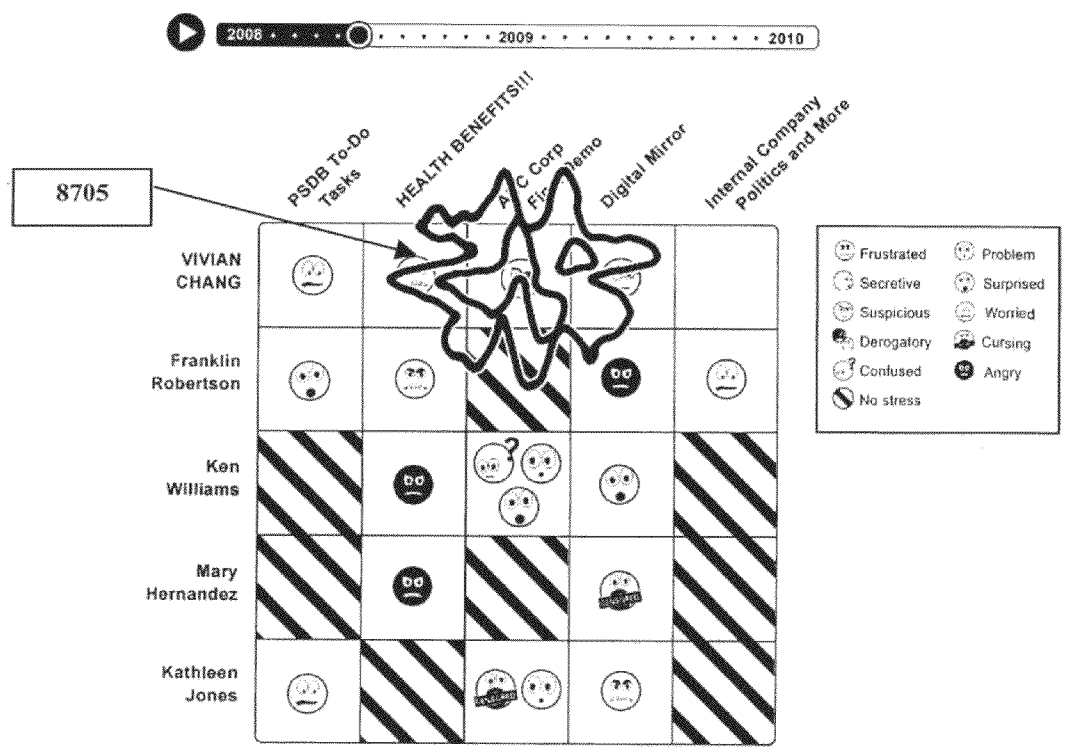
FIG. 87 is a screenshot of one embodiment of the stressful topics visualization depicting a heat map implementation in accordance with an embodiment of the present disclosure.
Figure 88:
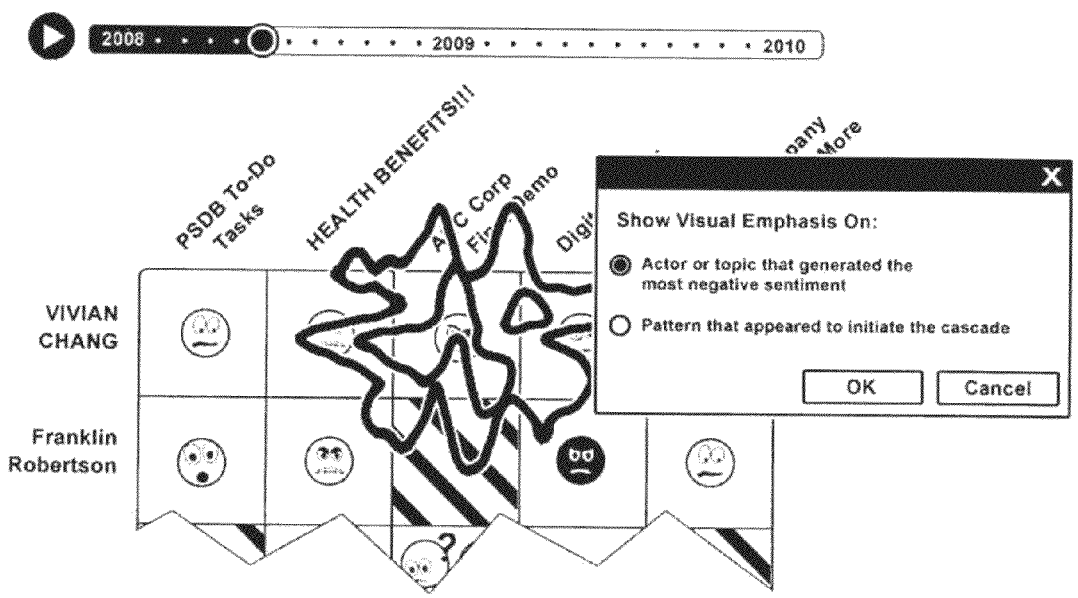
FIG. 88 is a screenshot of one embodiment of the stressful topics visualization depicting the user ability determine whether they want to see a visual emphasis in accordance with an embodiment of the present disclosure
Figure 89:
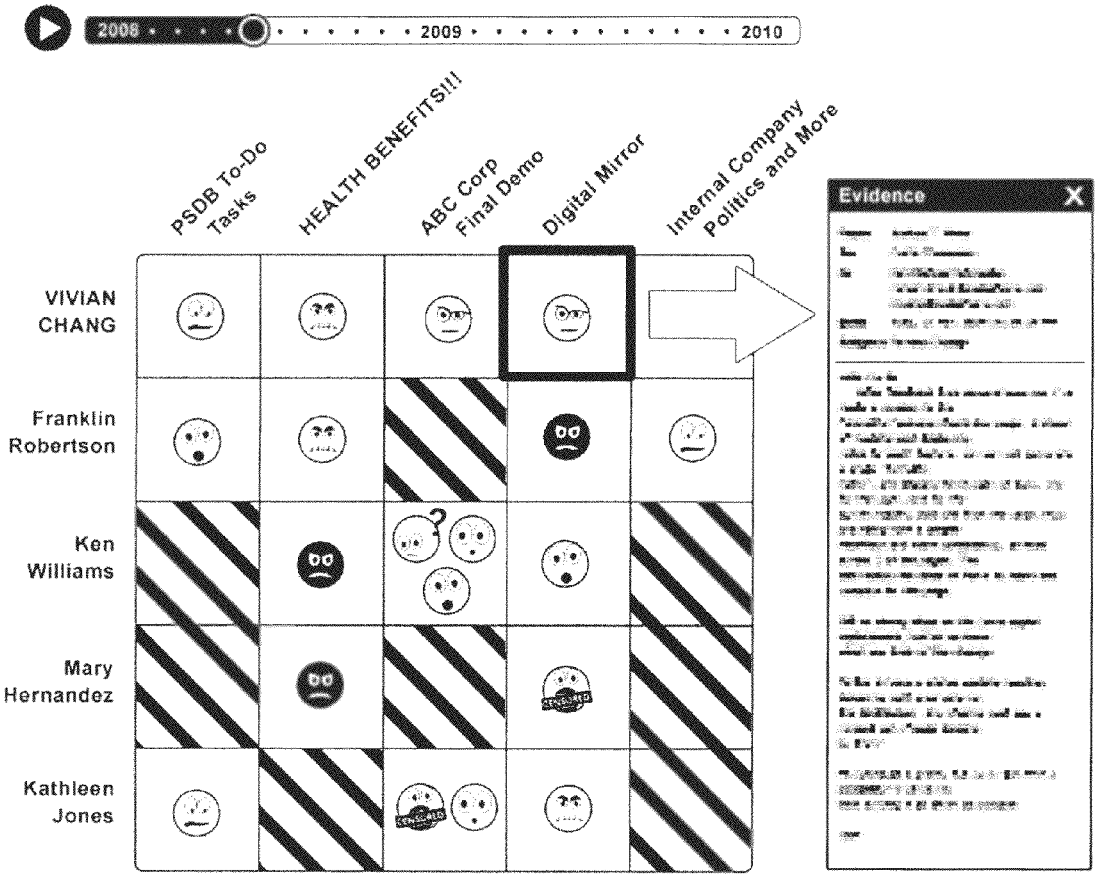
FIG. 89 is a screenshot of one embodiment of the stressful topics visualization in accordance with an embodiment of the present disclosure.

The stressful topics visualization [473] now offers the ability in some embodiments for "bleeding" between topics [144] and actors [220] to leave a visual artifact as the visualization is played. This is important to allow recurring patterns in the data to remain highlighted as the visualization is played; the fact that a pattern has occurred and is recurring does not mean that it will be present all of the time, and is indeed unlikely to be. In some embodiments, as illustrated in FIG. 87, this is implemented as a heat map [8705]. As illustrated in FIG. 88, the user can determine whether they want to see a visual emphasis on the actor [220] or topic [144] that generated the most negative sentiment or the one that appeared to initiate the cascade. Both have important, but different, applications. The heat map [8705] may be implemented in any number of ways, including color saturation level, use of the different colors in the color spectrum and so on.

In some embodiments, the heat map [8705] will decay over time if no further relevant activity is detected for extended periods of time. Otherwise, for data sets that span very long periods of time, the heat map [8705] would often saturate. Some embodiments will augment the heat map [8705] with arrows indicating the direction of "bleeding" in any orientation.

We now offer the ability in some embodiments for the user to click on the name of an actor [220] (or actor group [225]) or topic [144] (or topic group) or individual emoticon [7805], individual matrix label or bleeding/heat map [8705] in order to see specific evidence [202] which supports the inclusion of the object in the particular matrix, the appearance of the particular emoticon, the grouping of these particular objects together in the same matrix, or the appearance of a bleeding/heat map [8705], as appropriate. In most embodiments this is done via direct manipulation with the mouse. "Hot" items result in a cursor change to the mouse. In most embodiments, evidence [202] can take a number of different forms, including but not limited to the following:

Statistical output such as covariate analysis or clustering
Charts reflecting statistical output
Examples of specific communications [123]
Examples, text or graphical or sequences of communications [123] so as to clearly establish the order of events [100].

In some embodiments, non-lexical evidence may be added to the lexical evidence as further evidence [202] of stress or other negative emotion. In some embodiments this includes, but is not limited to, use of font markup such as bolding or red color, excessive use of punctuation, and all caps.

Some embodiments support an alternate mode which allows the user to see the difference between the density of content which contains negative sentiment and the density of content for that content period. This facilitates the user being able to discern the difference between topics [144] which are disproportionately stressful or friction-generating and those which merely have a very large amount of content associated with them, a roughly normal percentage of which contain negative sentiment. Some embodiments offer side by side comparisons of the same matrix, while others will divide the window in half, replicating each matrix in both halves; still others will render pairs of matrices side by side. Some embodiments may also combine use of the emoticons to express negative sentiment with the backdrop of a heat map [8705] based on all content related to the topic [144].

In related embodiments, the type of visualization strategy described here can be used to capture the reactions of groups

[225] of actors—determined by any type of means, and even if the actors [220] in question do not interact with one another—to different products or topics [144] as mined from specific e-commerce or social media sites or the Internet as a whole.

Pecking Order

A "pecking order" [9005] is defined as a partial ordering which reflects some kind of hierarchical relationship amongst a group [225] of strongly interrelated people. Such interrelated groups [225] of actors often correlate to specific topics [144] of interest or tasks, such as work groups, or hobbyist communities. As the phrase "pecking order" suggests, those people at the top of the hierarchy are the ones deemed to be the most important. In most embodiments, "importance" is determined by how often—and in what order—a particular actor is added to an email address field, and is cited or otherwise referred to in any kind of document [162] or text, Many embodiments give additional weight to consistency of behavior in this regard among different actors [220]. For example, it is more telling if 10 actors [220] often cite Jane first than if one person almost always does and others only rarely do, even if the number of "first cites" is the same or greater. In most embodiments, it is possible to exclude orderings which are purely alphabetical as well as those which directly reflect the official organizational hierarchy.

The default embodiment for the pecking order computation is as follows:

- A first phase consists in collecting information from the stream of events [100] to analyze, and in extracting the actors [220] involved with that event [100] and their respective (or local) order. This consists of extracting the "To", "Cc" or "Bcc" recipient lists for emails, author lists for documents [162], etc.
- Each local order is then referred to as a "context". From each context, every possible pair of actors [220] is recorded with the context they were extracted from. For contexts which have a very large number of actors [220], the relationship between the first actor [220] in the list and the last one does not carry as much meaning as the relationship between closely related actors [220] inside the list. In this case, sub-contexts of the original context are instead analyzed by applying a sliding window [380] over the original list of actors [220]
- The computation consists in analyzing the different contexts collected for each pair of actors [220]. This includes but is not limited to extracting most common contexts, detecting common patterns among similar contexts, disregarding pairs for which the opposite pair has a similar or higher frequency, and disregarding uncommon actors. Similar contexts are combined based on context frequencies and actor frequencies inside each context.

The purpose of the pecking order visualization [476] is to reflect evolution in any type of hierarchy among people. Such hierarchies include, but are not limited to, corporate hierarchies, non-corporate organizations (e.g. charity, volunteer, community, or church groups) and pure social hierarchies.

Figure 90:
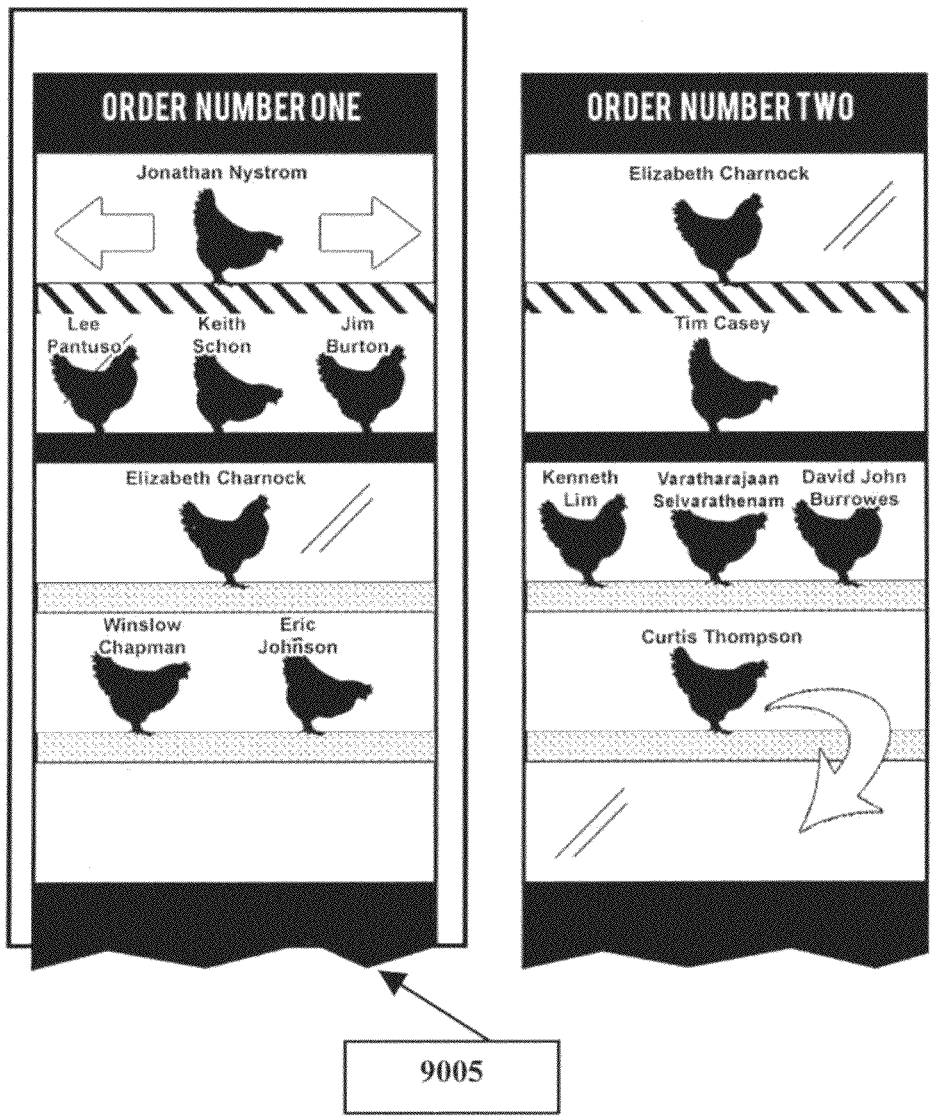
FIG. 90 is a screenshot of one embodiment of the pecking order visualization in accordance with an embodiment of the present disclosure.
Figure 91:
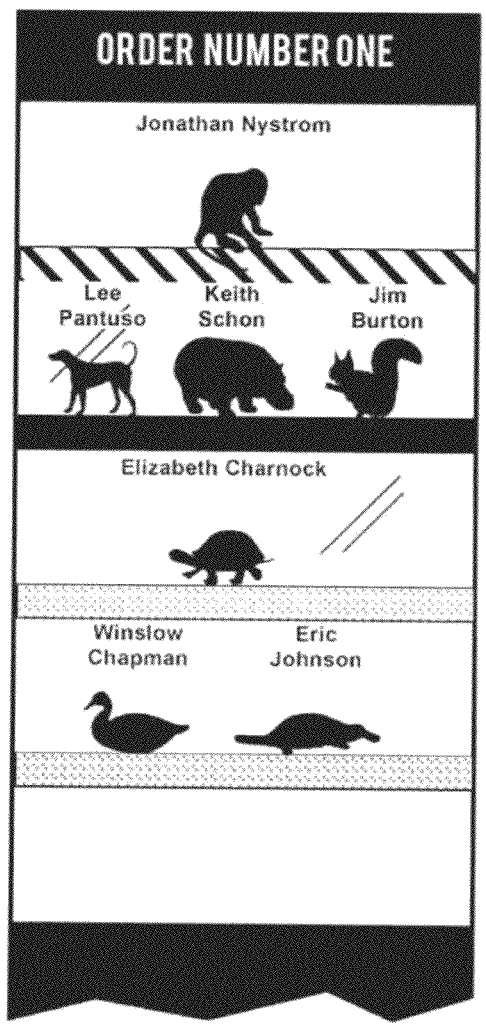
FIG. 91 is a screenshot of one embodiment of the pecking order visualization depicting user ability to choose other animals in accordance with an embodiment of the present disclosure.
Figure 92:
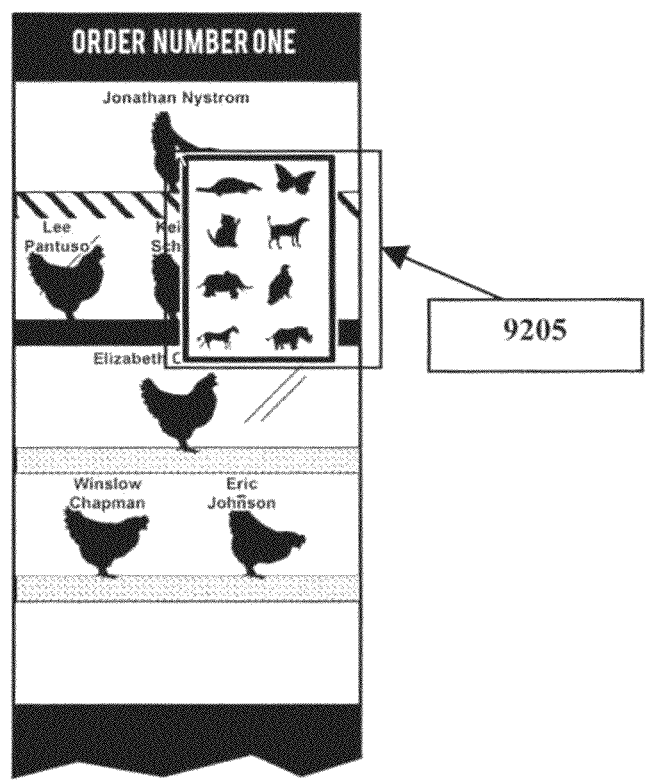
FIG. 92 is a screenshot of one embodiment of the pecking order visualization depicting allowing the user to choose the animal type generally, or with respect to a particular actor, type of actor, or specific hierarchy instance in accordance with an embodiment of the present disclosure.

In one embodiment of the pecking order visualization [476], chickens are used to represent individual humans as illustrated in FIG. 90. However, pigeons, other types of birds, squirrels, rats, snakes, or other types of animals as illustrated in FIG. 91, objects and/or sounds could be used in other embodiments. Some embodiments will allow the user to choose the animal type generally, or with respect to a particular actor [220], type of actor [220], or specific hierarchy instance [9205].

Figure 93:
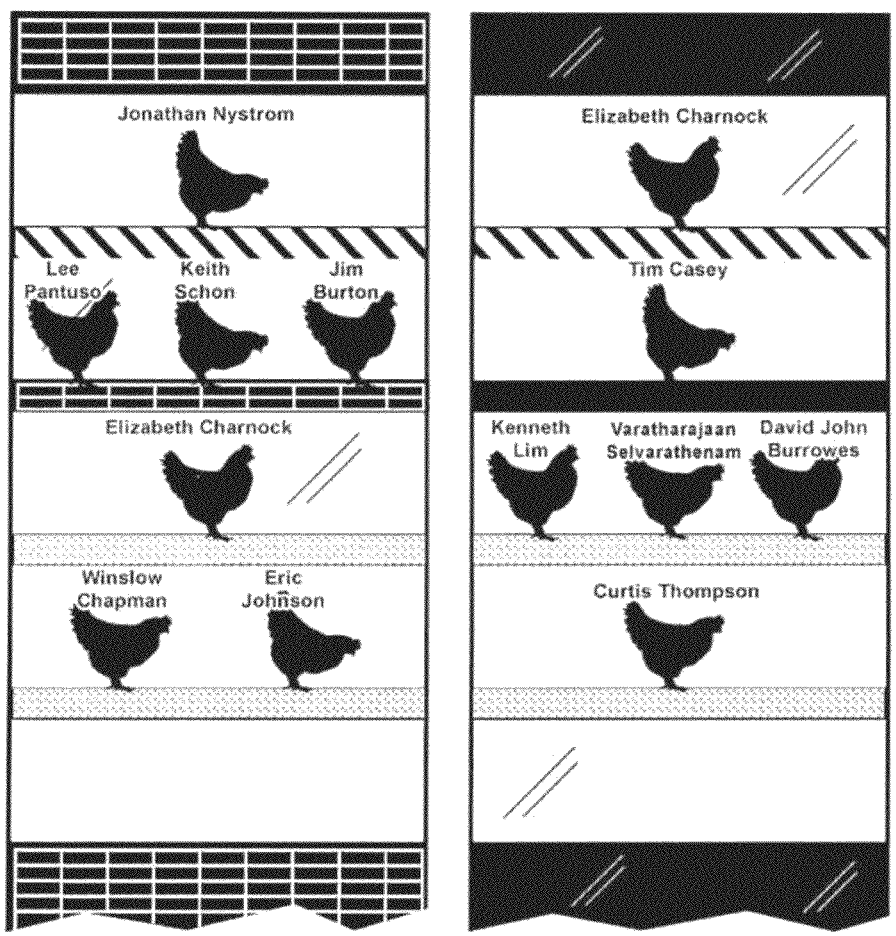
FIG. 93 is a screenshot of one embodiment of the pecking order visualization depicting each individual pecking order is represented by a building in accordance with an embodiment of the present disclosure.

As illustrated in FIG. 93, each individual pecking order is represented by a building in one embodiment. Each building has a number of ledges that must be greater than or equal to the number of levels in the particular hierarchy it is housing. Each building will contain some number of animals, each of which represents a real-world actor [220] in the pecking order. Buildings may vary by color or style according to both embodiment and user preference. In some embodiments, older pecking orders will have older looking building facades; likewise newer ones will boast more modern facades.

Since most real-world data sets will contain multiple pecking orders, the visualization will generally contain several contiguous buildings or more.

In some embodiments, a building displays the name of its associated pecking order. In some embodiments the name of a pecking order is the name of the most frequently discussed topic [144] among the actors [220] in question. In other embodiments, it is the name of the ad hoc workflow [128] that is most frequent among these actors [220]. In still other embodiments, it will be the name of the department of either the majority of actors [220] or the actor(s) [220] which appear on the highest level of the pecking order, depending on the exact embodiment.

Figure 94:
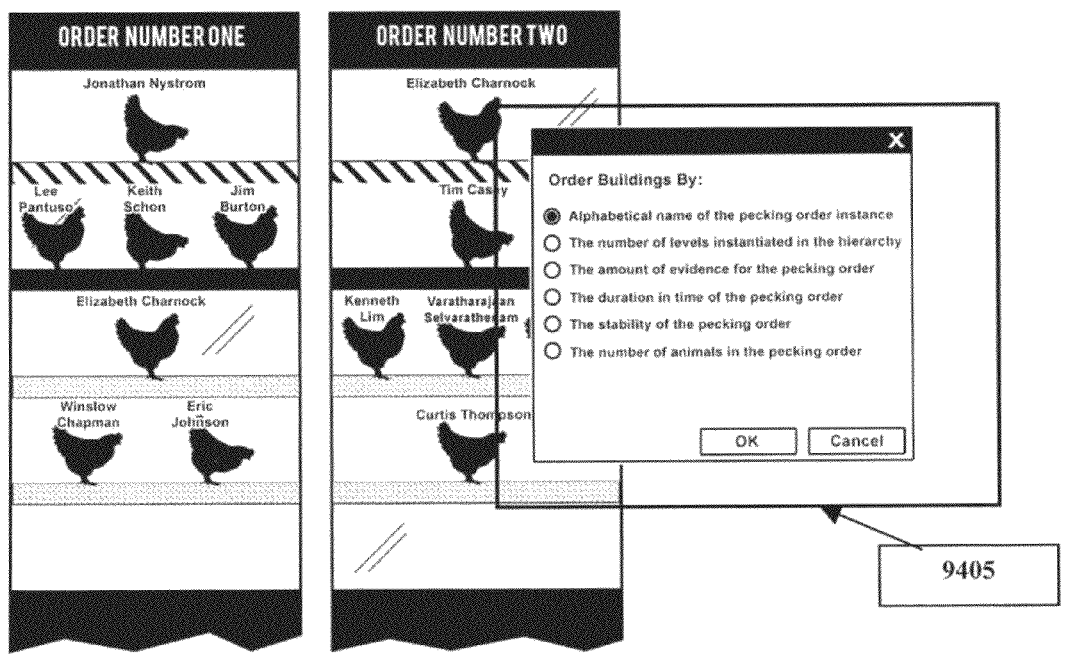
FIG. 94 is a screenshot of one embodiment of the pecking order visualization depicting user ability to specify the left-to-right order in which the buildings are rendered from choices in accordance with an embodiment of the present disclosure.

In some embodiments, as illustrated in FIG. 94, the user can specify the left-to-right order in which the buildings are rendered from choices which include, but are not limited to, alphabetical name of the pecking order instance [9405], the number of levels instantiated in the hierarchy, the amount of evidence [202] for the pecking order, the duration in time of the pecking order, the stability of the pecking order, and the number of animals in the pecking order.

In some embodiments, the name of the pecking order is the name of the most frequently discussed topic among the actors in question. In other embodiments, it is the name of the ad hoc workflow that is most frequent among these actors. In still other embodiments, it will be the name of the department of either the majority of actors or the actor(s) which appear on the highest level of the pecking order, depending on the exact embodiment.

Figure 95:
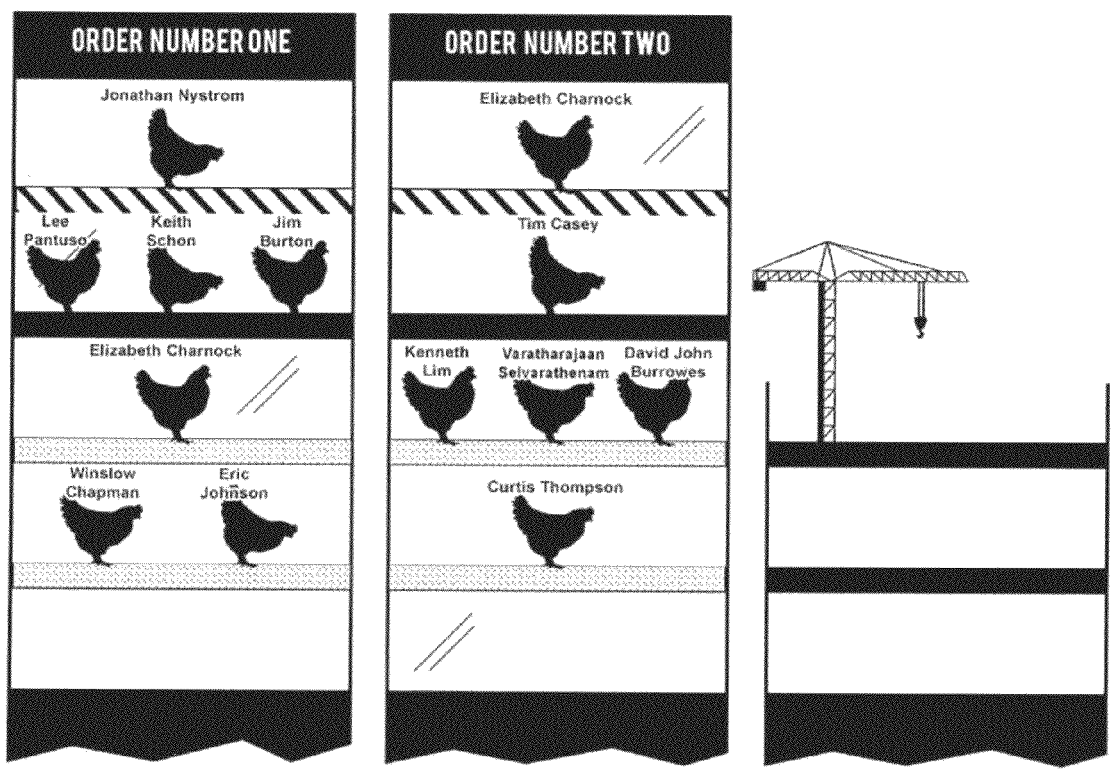
FIG. 95 is a screenshot of one embodiment of the pecking order visualization depicting the building being built in accordance with an embodiment of the present disclosure.
Figure 96:
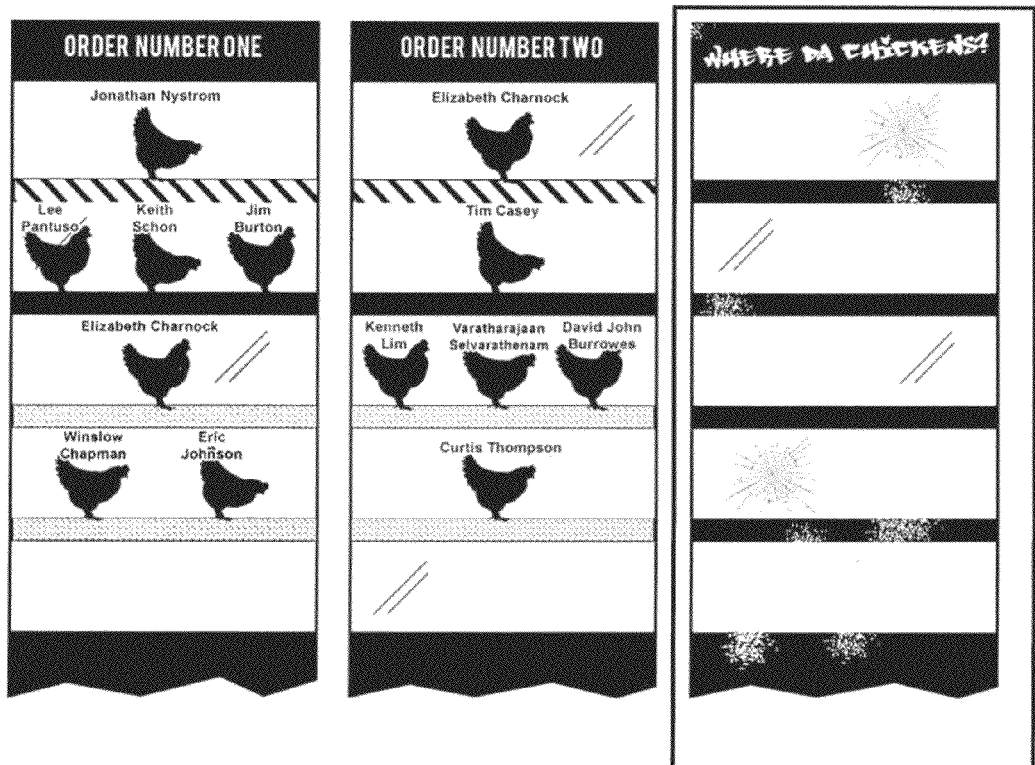
FIG. 96 is a screenshot of one embodiment of the pecking order visualization depicting the building accumulating broken windows, graffiti, and other signs of disuse in accordance with an embodiment of the present disclosure.
Figure 97:
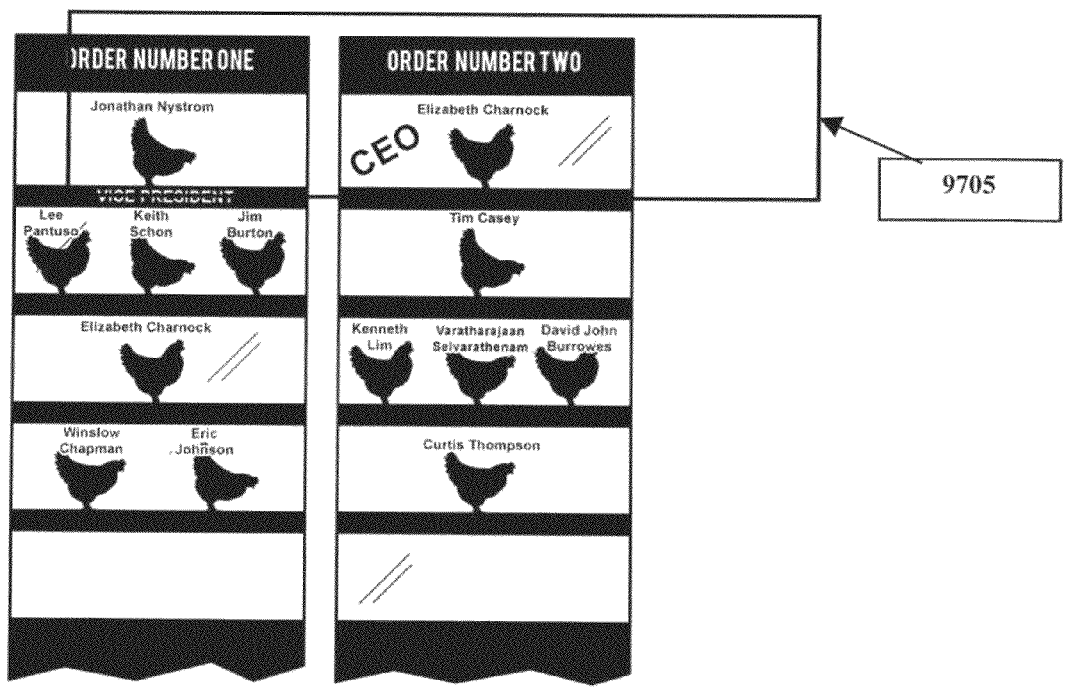
FIG. 97 is a screenshot of one embodiment of the pecking order visualization depicting ledges or levels designated with labels such as "vice president" in accordance with an embodiment of the present disclosure.
Figure 98:
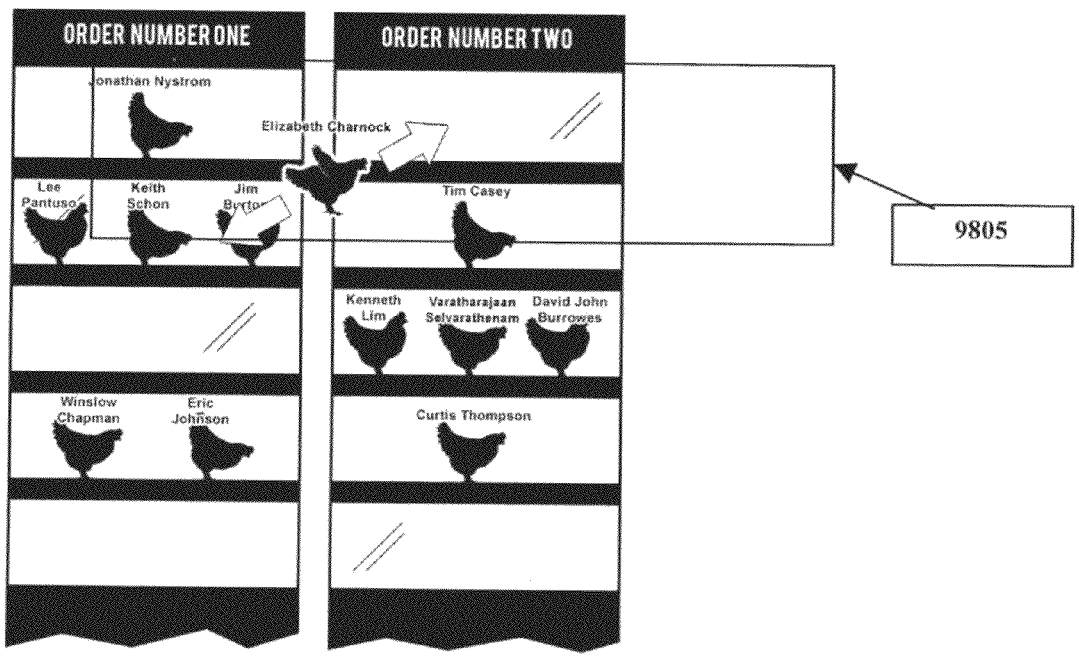
FIG. 98 is a screenshot of one embodiment of the pecking order visualization depicting a chicken flying between the different pecking order instances in accordance with an embodiment of the present disclosure.
Figure 99:
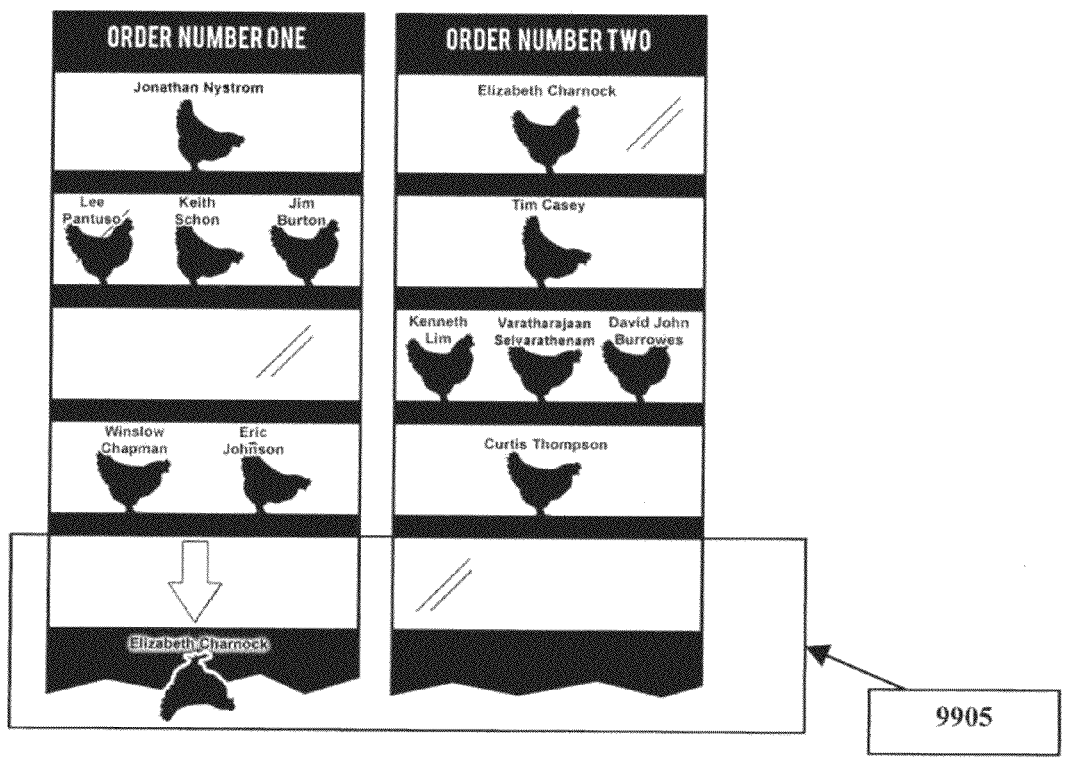
FIG. 99 is a screenshot of one embodiment of the pecking order visualization depict a chicken representing an actor who is no longer on the scene will fall to the ground in a manner that clearly suggests it is dead in accordance with an embodiment of the present disclosure.
Figure 100:
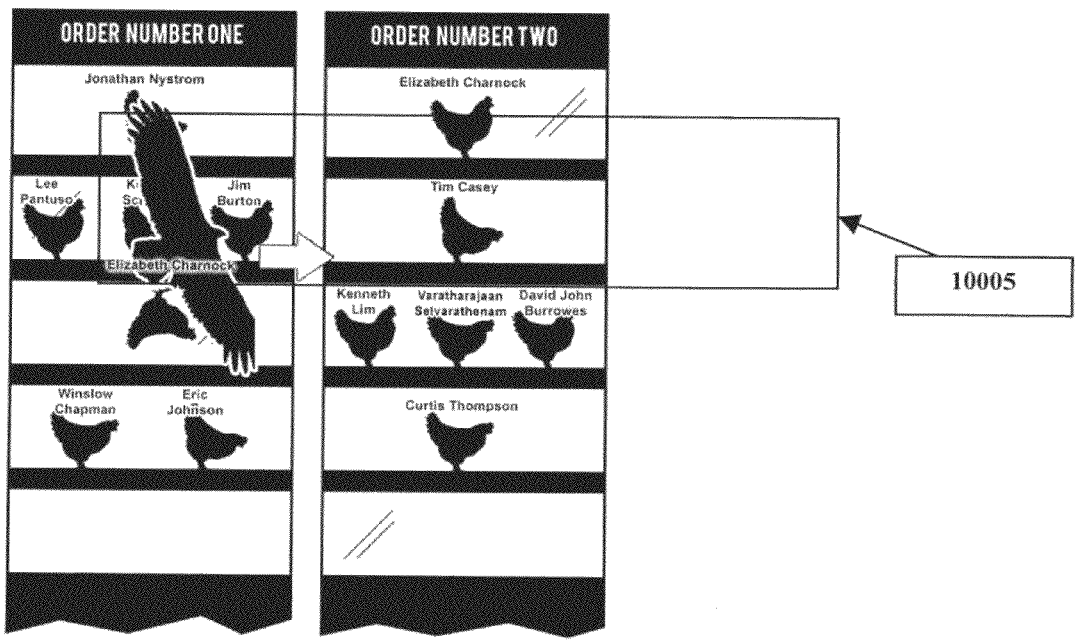
FIG. 100 is a screenshot of one embodiment of the pecking order visualization depict a chicken representing an actor who is no longer on the scene will fall to the ground in a manner that clearly suggests it is dead being carried away by vultures and so on in accordance with an embodiment of the present disclosure.

In one embodiment, a pecking order instance may change over time as the pecking order visualization [476] is "played" in the following ways:

1. A new instance is created—for example, a new business division comes into existence—causing the rendering of a new building with the appropriate features and animals. In some embodiments, the visualization depicts the building being built as shown in FIG. 95.
2. Likewise an existing instance is destroyed because, using the same example, a division has been shut down. In some embodiments, the building collapses into dust, in others a wrecking crew may come along, and so on. However, as illustrated in FIG. 96 in other instances, the building may remain, but accumulate broken windows, graffiti, and other signs of disuse [9605].
3. In some embodiments, ledges or "levels" may be designated with labels such as "vice president" [9705]. These names, and the levels with which they are associated may change as appropriate given the backing data. In some embodiments, these names may appear to be etched into the building, in others appear in overhangs; in still others it is according to the user's preference.
4. Chickens (or other animals) may appear or disappear from a particular pecking order instance, depending on the participation level of the person they are representing. In some embodiments, chickens are permitted to be concurrently present in more than one pecking order instance—for example, if an actor [220] plays two distinct roles in an organization. In other embodiments, as illustrated in FIG. 98 the chicken would fly (or otherwise move, depending on its animal type) [9805] between the different pecking order instances of which it is a member, proportionally spending time in each pecking order according to how much time the actor [220] spends in each role. In some embodiments, a chicken representing an actor [220] who is no longer on the scene will fall to the ground in a manner that clearly suggests it is dead [9905]. In some embodiments, the carcass may be removed in various ways according to user preference including an undertaker, getting flattened by a car in a cartoon-like manner, being carried away by vultures and so on [10005].

Figure 101:
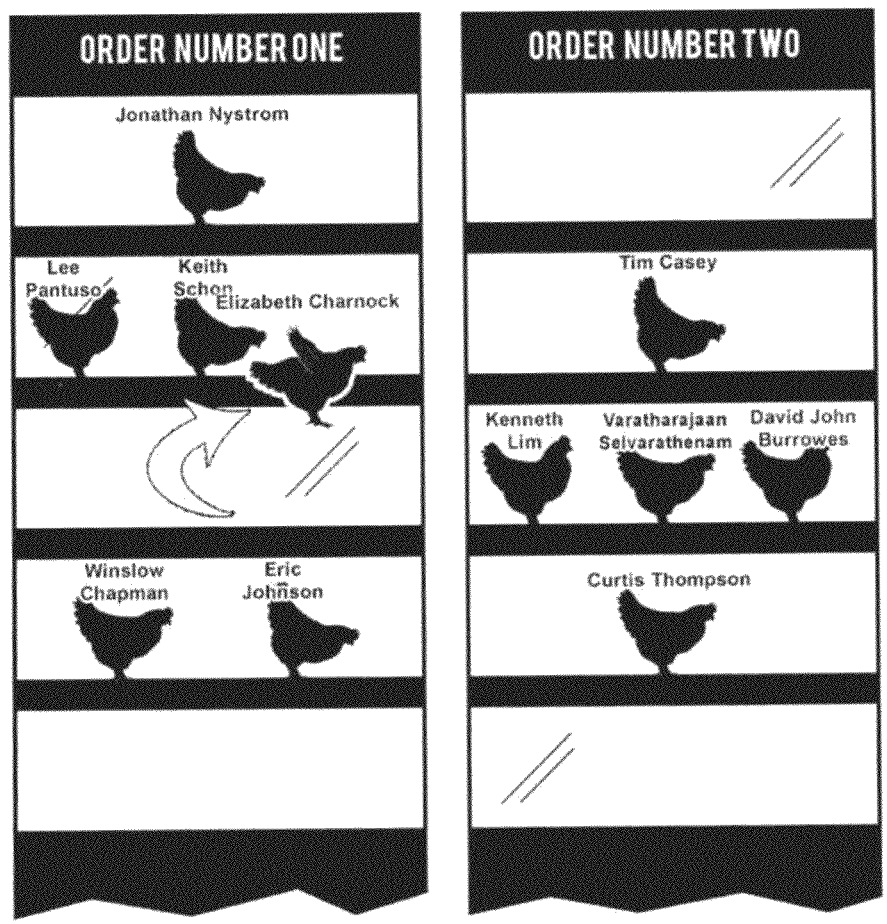
FIG. 101 is a screenshot of one embodiment of the pecking order visualization depicting chickens (or other animals) ascending or descending from one level to the next according to the backing data in accordance with an embodiment of the present disclosure.

5. As illustrated in FIG. 101, chickens (or other animals) may ascend or descend from one level to the next according to the backing data [202]. The type of movement is consistent with the type of animal; for example a chicken would fly up to the next ledge. A chicken need not displace an existing chicken unless the backing data [202] warrants it. For example, in many pecking order instances there may be two equally important chickens at the top.

Figure 102:
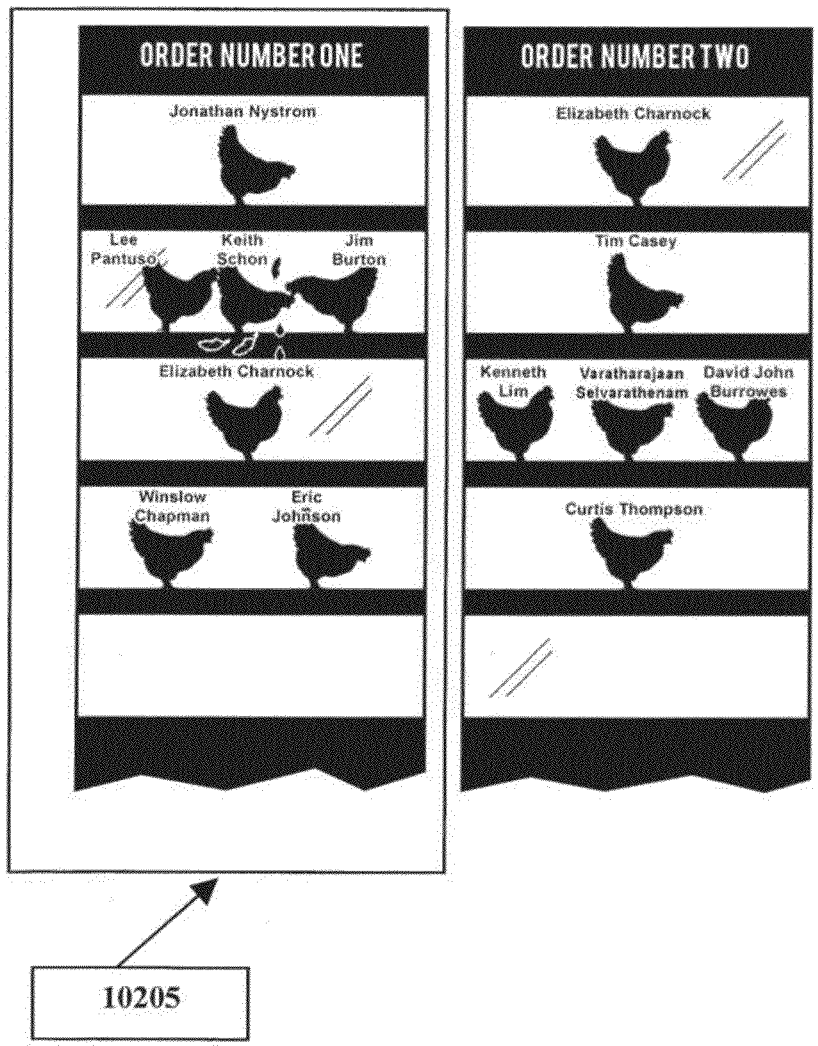
FIG. 102 is a screenshot of one embodiment of the pecking order visualization depicting chickens ganging up on one or more other chickens if the actors they represent are engaged in an argument or power struggle in accordance with an embodiment of the present disclosure.
Figure 103:
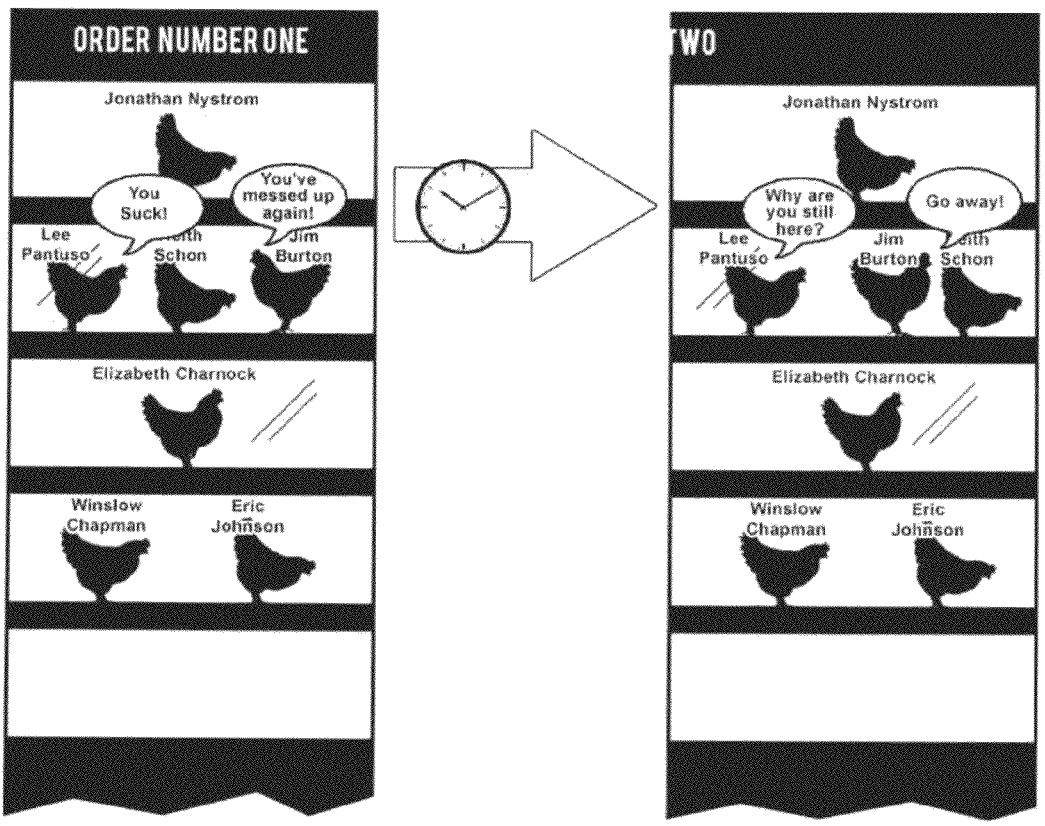
FIG. 103 is a screenshot of one embodiment of the pecking order visualization in accordance with an embodiment of the present disclosure.
Figure 104:
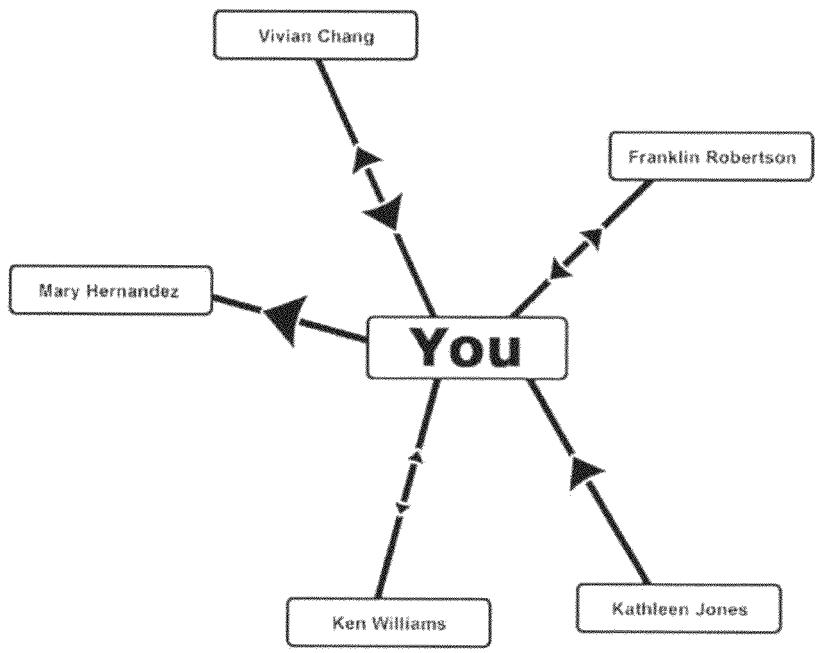
FIG. 104 is a screenshot of one embodiment of the buck passing visualization in accordance with an embodiment of the present disclosure.

6. In some embodiments, as illustrated in FIG. 102 one or more chickens can gang up on one or more other chickens if the actors [220] they represent are engaged in an argument or power struggle. In this event, the chickens will peck at one another [10205], drawing blood and plucking feathers—or whatever analogous actions would be appropriate based on the choice of animal. In some embodiment text from items of evidence used to infer such power struggles are displayed in word balloons associated with the corresponding chickens. This is illustrated in FIG. 103.

Buck Passing Visualization

The idea of "buck passing" in this context is a task that is passed along or delegated absent accompanying guidance or instruction. Whether such "buck passing" is considered appropriate depends on a variety of factors, including but not limited to: the reporting relationships connecting the individuals in question, the nature of the task being delegated, the state of the "buck passer" (for example, about to go out on medical leave), whether or not there has been prior discussion on the task through another medium that is not available (for example, an in-person conversation) and that is unreferenced in the communication data that is available.

Thus a software system is not able to determine whether or not any particular instance of buck passing is appropriate. However, it can determine whether or not any given instance of buck passing is typical with respect to the actors [220] involved, typical for those with their respective roles, or typical with respect to the organization at large. It can also determine, via various forms of topic detection [152] and ad hoc workflow process [128] identification, whether or not buck passing is usual for tasks relating to these particular topics [144] or in the particular type of workflow process [128]. Likewise, it can determine whether atypical buck passing is part of a deviation [265] from normal behavior for an individual by examining other divergences from expected behavior [260] during a particular interval of time—for example, lots of negative sentiment and stressful emotions being expressed.

Figure 105:
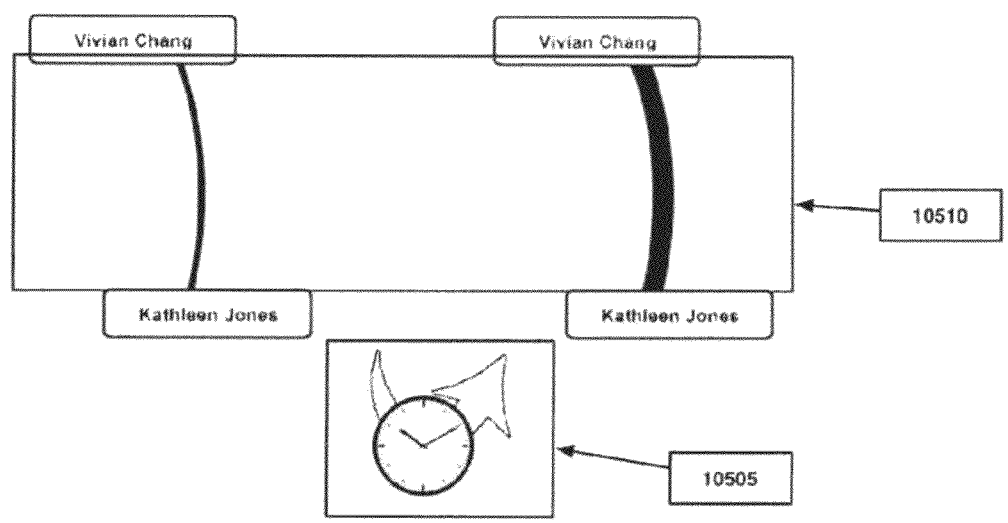
FIG. 105 a screenshot of one embodiment of the buck passing visualization is viewed as a graph in which two objects are connected together by an arc in accordance with an embodiment of the present disclosure.
Figure 106:
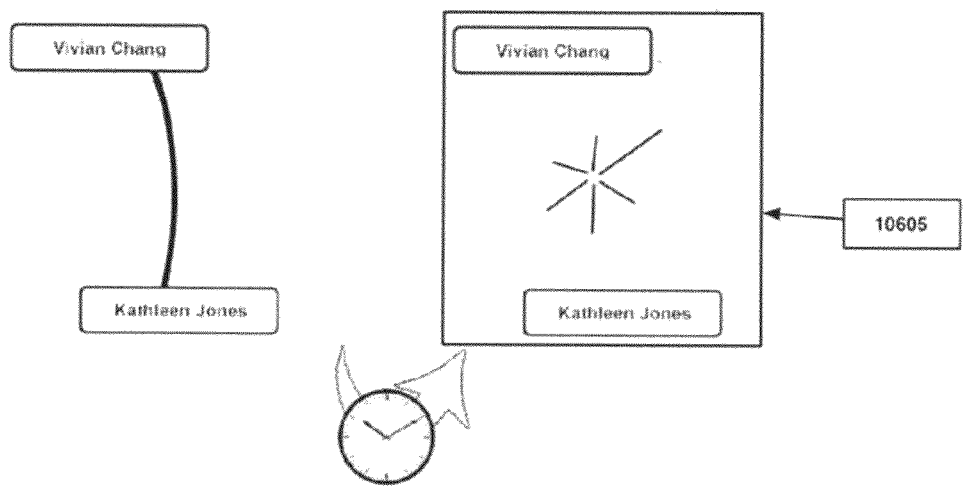
FIG. 106 is a screenshot of one embodiment of the buck passing visualization depicting an arc that becomes thin enough as a result of lack of buck passing that it will simply disappear from the view in accordance with an embodiment of the present disclosure.
Figure 107:
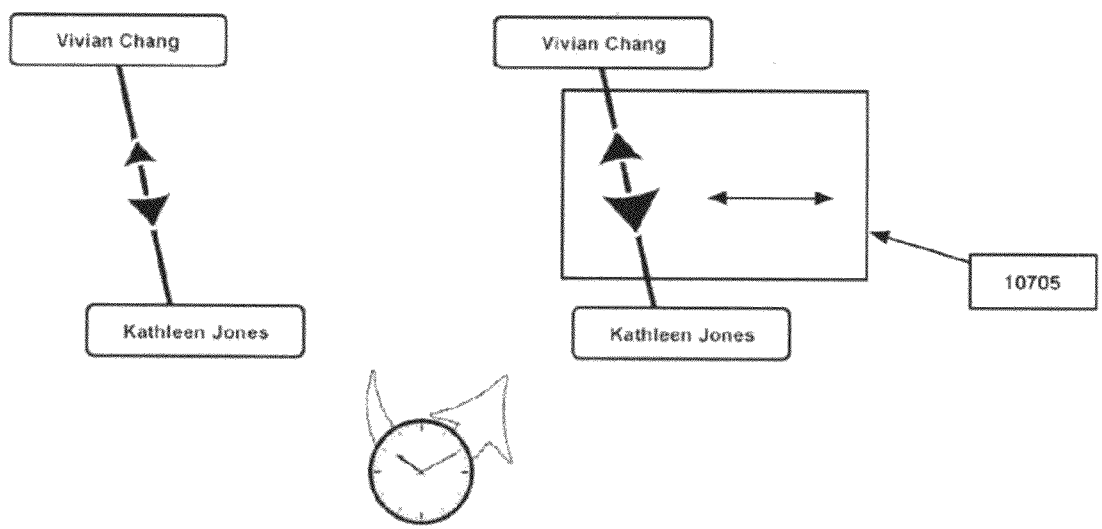
FIG. 107 a screenshot of one embodiment of the buck passing visualization depicting buck passing relationships which have expanded or contracted over the course of the available data in accordance with an embodiment of the present disclosure.
Figure 108:
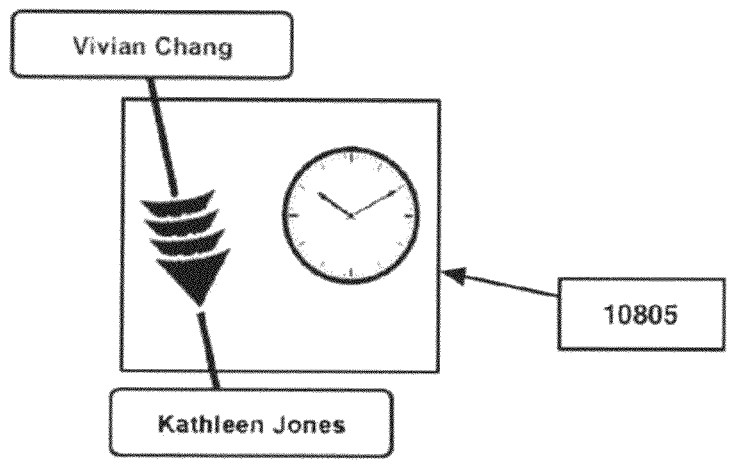
FIG. 108 is a screenshot of one embodiment of the buck passing visualization depicting horizontally-aligned pairs of arrows which point at one another if the buck passing has diminished, and point in opposite directions if it has increased in accordance with an embodiment of the present disclosure.

By "lack of accompanying guidance or instructions" in this context we mean any reference to specific details including, but not limited to: proper nouns, numbers (such as price, number of units, flight numbers), alphanumerics (such as model number) dates or times. In some embodiments, a user-determined amount of lexical content that excludes salutations and other designated pleasantries such as thanks can be considered an indication of guidance In continuous mode [375], the buck passing visualization [475] can be played with a timeline widget [10505]. As illustrated in FIG. 105, in some embodiments buck passing is viewed as a graph in which two objects are connected together by an arc if (and only if) there is buck passing occurring between the two objects, which may represent individual actors [220] or groups [225]. In some embodiments, this arc will get thicker or thinner depending on the amount of buck passing that occurs as the timeline is played [10510]. In some embodiments the color of the arc will change to reflect this. In some embodiments, an arc that becomes thin enough as a result of lack of buck passing will simply disappear from the view [10605]. In some embodiments there is a mode in which one can see buck passing relationships which have expanded or contracted over the course of the available data as illustrated in FIG. 107. In some of these embodiments, this is accomplished visually through horizontally-aligned pairs of arrows which point at one another if the buck passing has diminished, and point in opposite directions if it has increased [10705].

In most embodiments, as illustrated in FIG. 107, arrows reflect the direction of the buck passing; 2-way buck passing is represented by a double-sided arrow [10705]. In some embodiments, an animated arrow will be drawn—meaning that arrows move along the arc—to further emphasize a dramatic increase in buck passing [10805].

Figure 109:
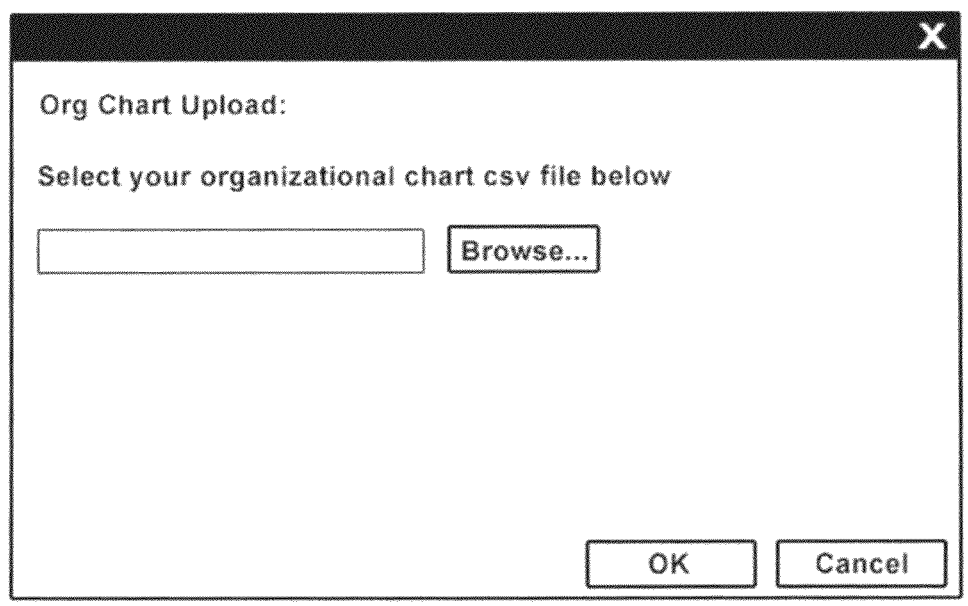
FIG. 109 is a screenshot of one embodiment of the buck passing visualization depicting horizontally-aligned pairs of arrows which point at one another if the buck passing has diminished, and point in opposite directions if it has increased in accordance with an embodiment of the present disclosure.
Figure 110:
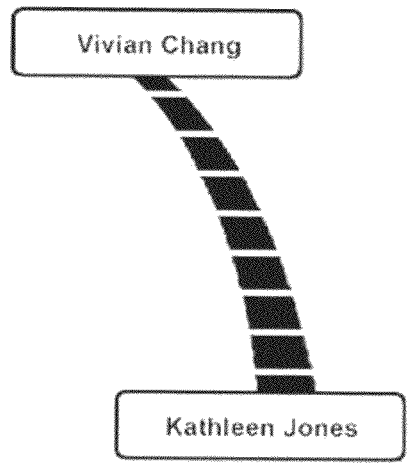
FIG. 110 is a screenshot of one embodiment of the buck passing visualization depicting various visual treatments to illustrate the buck passing relationship in accordance with an embodiment of the present disclosure.

Although the software cannot "know" what is appropriate buck-passing, many embodiments allow the input of an organizational chart with the effect that reporting relationships are indicated with a separate visual treatment in the view as shown in FIG. 109. This allows instances in which a manager is delegating tasks to one of her employees to be bucketed separately from instances in which one co-worker is buck passing to another without the benefit of a reporting relationship. As illustrated in FIG. 110 separate visual treatment includes, but is not limited to: different style of arc, different color of arc, altering the transparency of the arc and not displaying such "buck passing" from manager to employee altogether.

Figure 111:
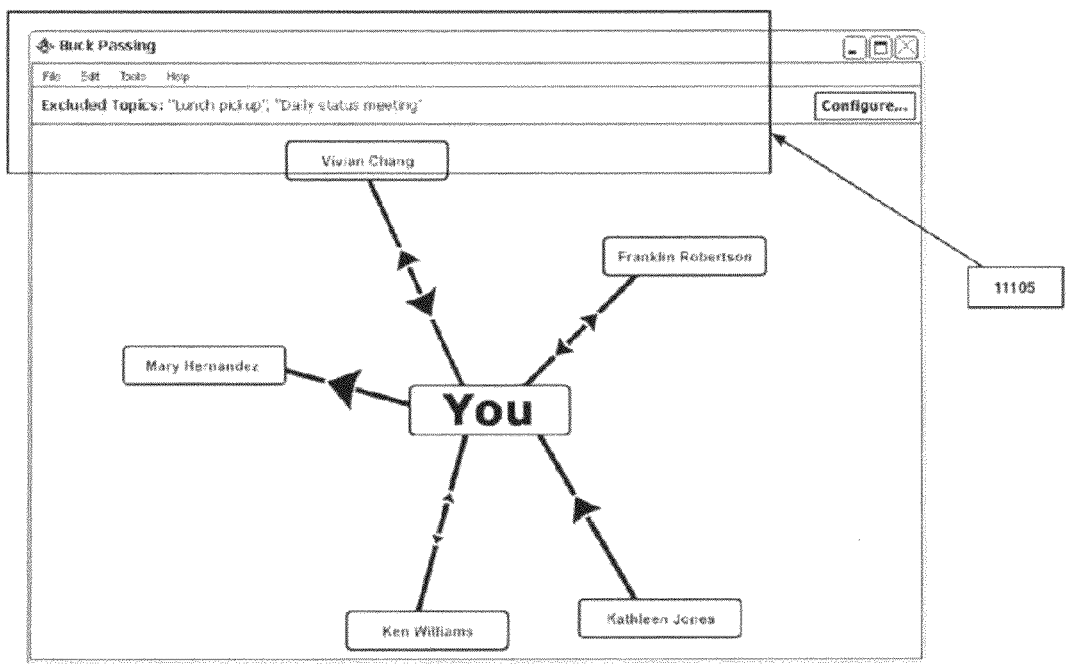
FIG. 111 is a screenshot of one embodiment of the buck passing visualization depicting user ability to specify types of topics and ad hoc workflow processes that should not be considered as instances of buck passing in accordance with an embodiment of the present disclosure.
Figure 112:
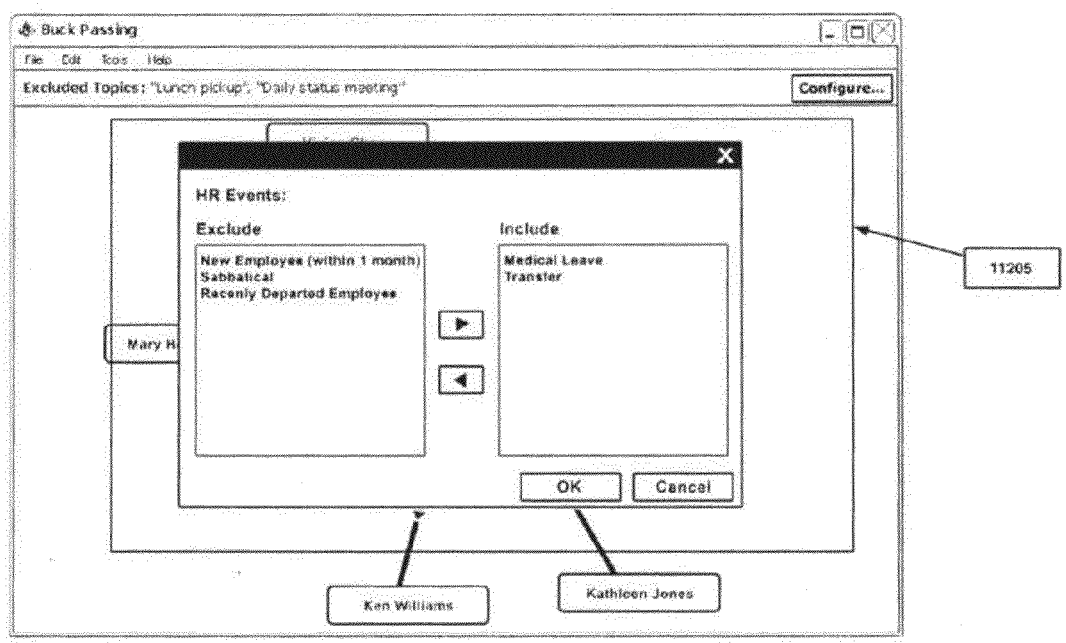
FIG. 112 is a screenshot of one embodiment of the buck passing visualization depicting different classes of identifiable tasks that can be specified to have differing visual treatments by the user so as to make them easily distinguishable from one another in accordance with an embodiment of the present disclosure.
Figure 113:
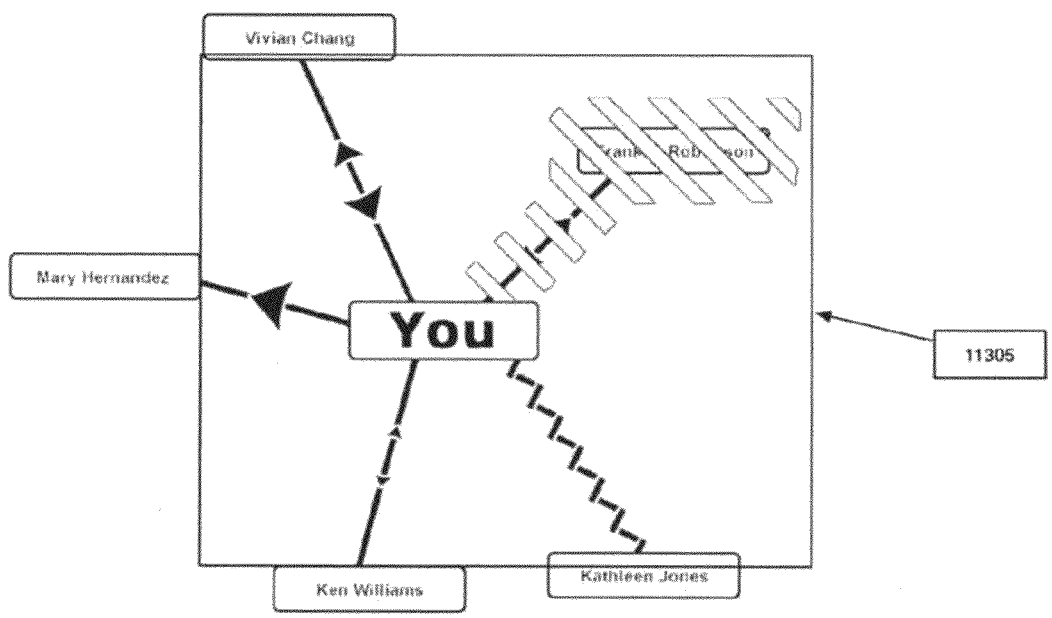
FIG. 113 is a screenshot of one embodiment of the buck passing visualization depicting a different visual treatment for nodes that represent actors who have changed roles and the arcs that represent pre-existing buck-passing relationships in accordance with an embodiment of the present disclosure.

Likewise, in some embodiments, as illustrated in FIG. 111, users may specify types of topics [144] and ad hoc workflow processes [128] that should not be considered as instances of buck passing [11105]. For example, a user might decide that it is not buck passing if someone asks the secretary to go out and get sandwiches. In some embodiments, as illustrated in FIG. 112 different classes of identifiable tasks can be specified to have differing visual treatments by the user so as to make them easily distinguishable from one another [11205]. In some embodiments, HR events are factored into the buck passing visualization [475] either to exclude certain buck passing instances from the view or to alter their visual treatment for a specified time period. These include, but are not limited to: the arrival of a new employee (who does not yet know the ropes), the departure of an employee, an employee leaving for a significant vacation, medical leave or sabbatical, and the transfer of someone to a new position within the company. The motivation for excluding such events [100] is that they are not likely to be meaningful outside of the specific context of their occurrence; they are thus not considered unexplained anomalies [270] in behavior but rather what is expected in the circumstance.

Different embodiments handle the issue of people coming and going or changing roles within the organization in different ways. Such transitions will often disrupt buck-passing routines, since the trusted resource is either less available or not available at all. Particularly hard to change buck-passing behaviors often will follow the actor [220] to their next role within the company. To that end, some embodiments provide a different visual treatment for nodes that represent actors [220] who have changed roles and the arcs that represent pre-existing buck-passing relationships [11305]. Some embodiments gray out or dim the node and connecting arcs to an actor [220] who is no longer in the same role and leave this treatment in place until the stream of buck passing is redirected to one or more others.

Since apart from such extenuating circumstances, buck-passing behavior is often fairly static—meaning that as a graph it is fairly constant as long as the same actors [220] remain in place—changes in buck-passing behavior are an important input into the behavioral model [200].

In some embodiments, any kind of detectable delegation is displayed rather than only buck passing. In some of these embodiments, arcs and arrows representing buck-passing are displayed in a different visual style than those which represent delegation with some amount of instruction or guidance. In the event that both apply between any pair of individual actors [220], some embodiments may render two distinct lines while others may combine different line styles on the same line, for example by alternating between the two styles in equal segments, or segments whose length is proportional to the respective degree of usage.

In some embodiments, any visual change to an arc directed at a particular node also causes that change in visual style to propagate to the node for increased visual emphasis. This is especially helpful as the graphs become quite large.

Love Life Visualization

In this increasingly wired age, even brief flirtations often leave behind a thick electronic trail; longer relationships generally leave behind ample material even from the perspective of future biographers. Previously existing practical limitations in how frequently—and in what circumstances—one can communicate with the target of one's desire have been largely eradicated by the near ubiquity of mobile texting devices in some populations.

This newly available excess of documentation provides the ability for introspection, to detect recurring patterns in one's relationships. Romantic relationships are also interesting from the perspective of investigation for a variety of reasons including that they can account for significant changes in behavior.

Figure 114:
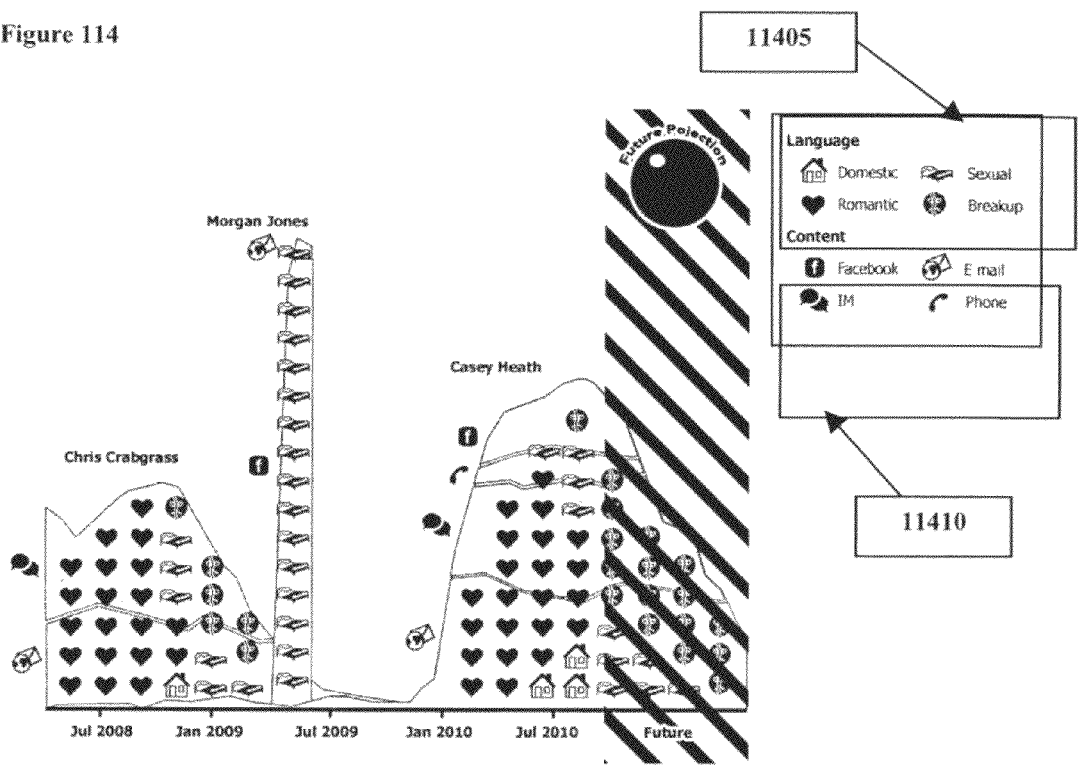
FIG. 114 is a screenshot of one embodiment of the love life visualization in accordance with an embodiment of the present disclosure.
Figure 115:
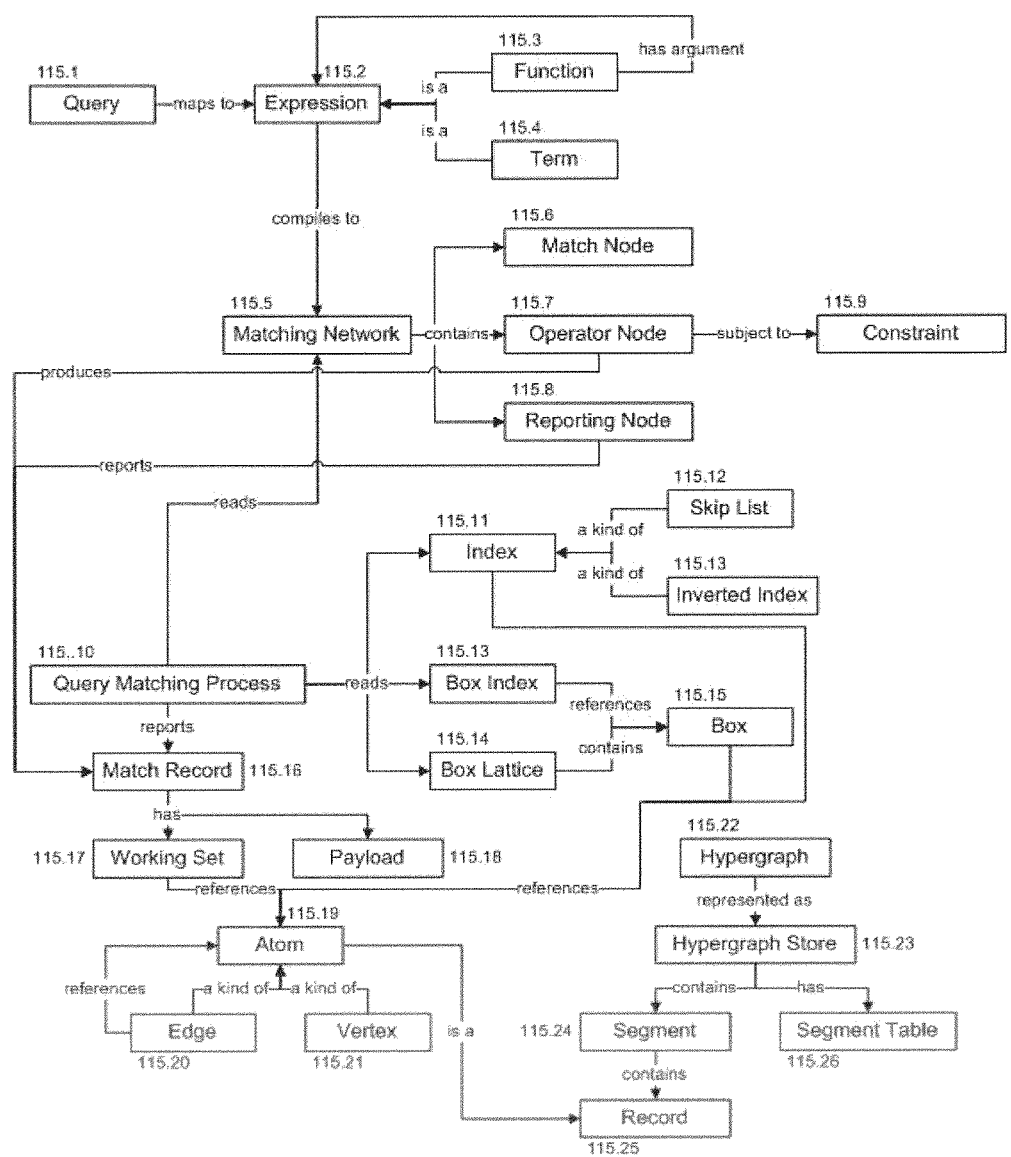
FIG. 115 is a Conceptual Diagram of the Hypergraph System in accordance with an embodiment of the present disclosure.
Figure 116:
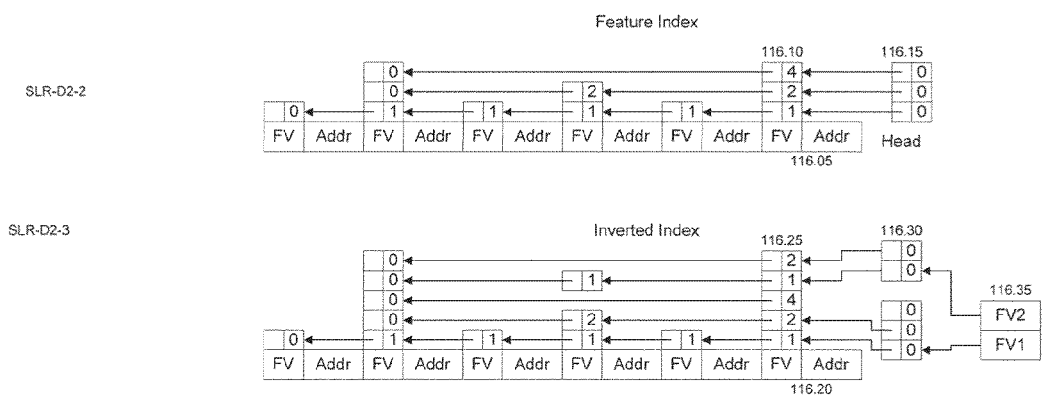
FIG. 116 is a diagram of Indexed Data Sources in accordance with an embodiment of the present disclosure.

As pictured in FIG. 114, love life visualization [477] pictorially depicts a number of key aspects of a romantic and/or sexual relationship. (In most embodiments, the presence of such a relationship is inferred by specific romantic or sexual language, even if indirect (e.g. "last night was sensational.") However some embodiments may opt to use other sources of evidence, including but not limited to the burstiness of communication.) These aspects include, but are not limited to, the following:

Icons are used to indicate different types of language usage [11405] by frequency of occurrence, including but not limited to explicit sexual language, romantic language, domestic language, and breakup language. Neutral or unidentifiable language is not pictured, but is available as an indication in many embodiments. Other embodiments may use different categories including but not limited to flirtatious, affectionate, and platonic friendship. In some embodiments, the number of icons of a particular sort shown is calculated relative to other relationships, and/or relative to other types of language used in the same relationship. Some embodiments represent the absolute number of occurrences, but at the cost of having to effectively decrease the size of the icons in the event of large numbers of occurrences.

Type of media used [11410] is indicated by different color wedges in some embodiments, including the one pictured. In some embodiments, annotations are used to designate the type of media. The choice of media is important, since some types of media are more aggressive or interactive than others.

In some embodiments, both the amplitude and length of the relationship as measured by electronic communications [123] is shown in a line graph, and in a bar graph in others. Most embodiments allow for relationships that overlap in time to be visually displayed as overlapping. Some embodiments allow the view to be played with the timeline widget while others display the information statically due to its potential visual complexity.

As described in the section on predicted behavior [262], some embodiments of this invention use the past to predict the future, either (or both) based on prior patterns of a particular actor [220], or a population that is demographically similar to him or her. In the love life visualization [477], for example, a given person may have a history of relationships which begin with a sexual encounter and end very shortly thereafter, but may at the same time have had several longer term relationships which did not start off as one night stands. In such embodiments, at least one new relationship must be underway in order to have an outcome to predict. Some of these embodiments use different visual effects so as to make clear that future visibility is much less clear than recording of historical fact. These visual effects include, but are not limited to, dimming or graying out, an overlay with partial opacity, and the use of partially obscuring transformations or filters.

Many embodiments provide a filtering capability to deal with data sets in which the number of overlapping or concurrent romantic relationships is too large to be reasonably displayed at once. Different embodiments may take different approaches to this problem. These include, but are not limited to: the system automatically determining like groups of relationships based on their statistical similarities and cycling through them, allowing the user to specify which properties of the relationship should be used to assign priority for display, and showing one relationship of each discernible type, with a nearby icon allowing the user to see more relationships of the same type.

Related embodiments may use a similar view to depict types of relationships that are not necessarily romantic in nature, but which peak and then often fall off. For example, some people have a pattern of acquiring "cool new" friends with whom they have a sort of platonic fascination before the novelty wears off and they lose interest; another example would be salespeople who put the hard press on customers until they sign up, but who may then quickly lose interest afterwards. In examples such as this last, "romantic" language might be replaced with flattering language, but the concept of being able to both observe similarities in relationships of the same general kind and to predict the near future based upon them remains the same.

Alert Visualizations

Alert Timeline Visualization

Figure 44:
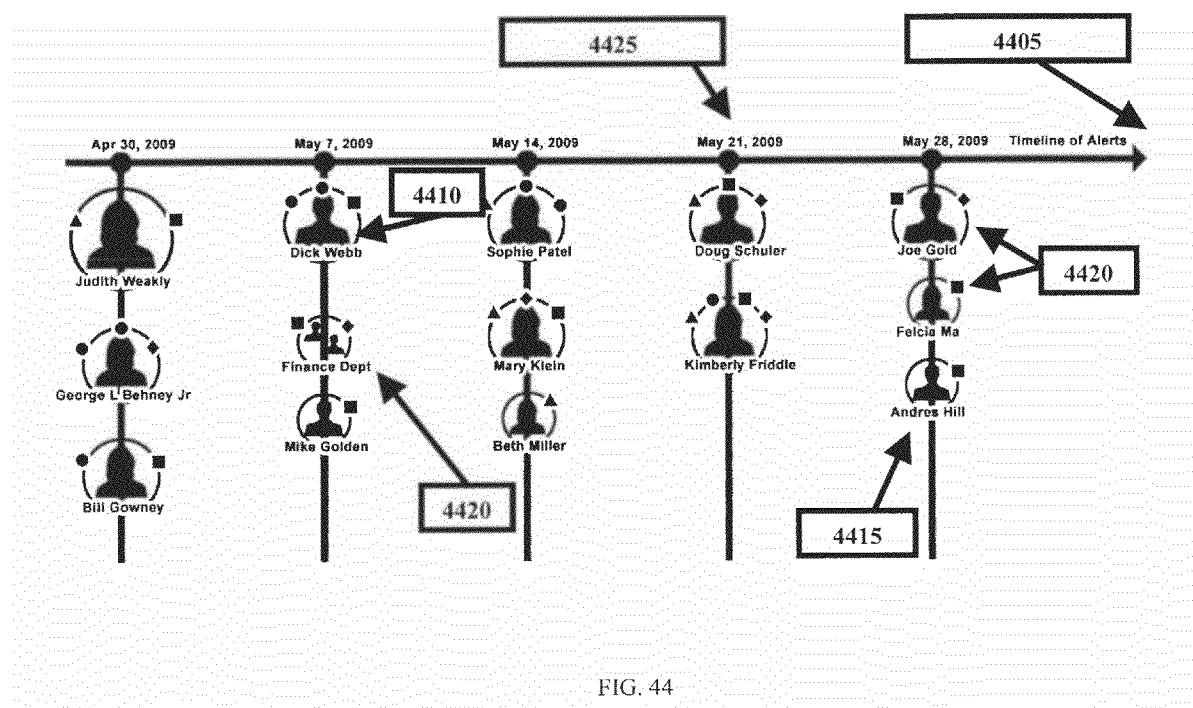
FIG. 44 is a drawing of the alert timeline visualization in accordance with an embodiment of the present disclosure.

FIG. 44 represents alerts [305] produced by the system organized as a timeline view.

This view is based on anomalies [270] which have been detected with a sufficient level of confidence and whose relevance [280] (i.e. likelihood to represent potentially harmful behavior or at least worth investigating, as opposed to unusual behavior explained by external factors) accumulated over a bounded time period exceeds a threshold. The detection of those anomalies [270] is based on the results of various analysis stages, including but not limited to: discussion building, ad hoc workflow analysis, topic detection [152], etc., augmented with continuous anomaly detection capabilities on heterogeneous data. The timeline view shows alerts [305] that are defined as aggregates of anomalies [270] meeting these criteria.

The visualization is based on a timeline [4405], which is updated on a continuous basis [375] as new alerts [305] are raised; existing alerts [305] are confirmed or invalidated, etc.

Each alert [305] is laid out horizontally according to its first detection date and vertically according to its relevance [4410].

This view uses discretized occurrence dates [4425] (for example, the diagram here shows a discretization step of one week). In one embodiment, the discretization step is chosen by the system so as to keep the count of anomalies occurring at a given date below a predefined number. In another embodiment, the user is free to adjust the discretization step, which can be useful (for example, to have an overview of the anomalies [270] detected over a long period of time, this allows the user to quickly see if the general trend is towards an increase or a decrease of the rate of anomalies [270] detected, even if many anomalies [270] are then associated to the same occurrence date).

Each alert [305] is attributed to a unique entity called the alert subject [385], which is defined similarly to the corresponding anomaly subject, and can be of the following types:
  An individual actor [220], which means that the actor [220] should be further investigated to determine if the anomalous behavior corresponds to a potential threat coming from one or more malicious insiders or can be explained in any other way
  A group [225] (either formally defined from a corporate data source, such as an organizational chart, or an informal group identified by the system), which similarly means that members of that group [225] should receive particular attention from system users or analysts.
  A workflow process [128] (either formally enforced or derived by the system).
  An external event [170]. In some cases, this external event partly or fully explains the anomalous patterns detected, such as a terrorist alert which causes a significant level of chaos within the organization. Conversely, the external event might be caused by the behavior flagged as anomalous, and thus evidence [202] provided by the system will help investigating the external event [170], such as when that external event [170] is an alert reported by an intrusion detection system or a corporate hotline complaint.

Visually, each anomaly [270] is represented by a circle (which is also called the "orbit", and whose diameter and width are determined as described below) drawn around a representation of the alert subject [385].

When several alerts [305] fall into the same time bin, they are sorted vertically by relevance, with the most relevant alerts [305] placed higher up in the bin. The alert timeline view can be filtered on the main characteristics of the underlying data items [122], including but not limited to:
  Actor [220] roles and positions in the organizational chart;
  Behavioral patterns (e.g. communication patterns, emotive tones);
  Occurrence date (for example to only show anomalies [270] past a certain date, or to only show anomalies [270] occurring on weekends).

The relative levels of importance of the alerts [305] are outlined by the diameter of the orbit drawn around each alert subject [385]: by default, the diameter of this circle is proportional to the alert relevance level.

The relevance of an alert [305] is computed from the relevance [280] of the anomalies [270] it comprises. In the default embodiment of this invention, the relevance of an alert [305] attributed to a subject [385] S is the sum of the relevance levels of each anomaly [270] with respect to S. In another embodiment, the relevance level is simply the number of distinct anomalies [270] constituting the alert [305].

The orbit's drawing width indicates the severity of the alert [305]. At the center of this circle is an identifier of the alert subject [385].

The representation scheme of each alert subject [385] is entirely configurable.

In one embodiment, the application administrator can choose from the following modes to represent the alert subjects [385] which are an individual actor [220]:
  One mode where a photograph and the full name [245] of the actor [220] is displayed;
  One fully anonymized mode where no picture is displayed and a unique identifier (for example "User #327") designates the actor [220];
  One intermediate mode where only the actor group(s) [225] to which an individual actor [220] belongs are displayed;
  Another kind of intermediate mode where an actor's [220] role or title is displayed but not the exact electronic identity [235] (for example "Sales #92" to designate a sales role).

In another embodiment, both individual actors [220] and groups [225] are represented as avatars matching the organizational entity (for example business unit or department) they belong to, and as in the previous case the caption shows their electronic identity [235], or an identifier, or nothing depending on the anonymization level configured in the anonymization scheme [340].

The alert timeline visualization distinguishes predicted alerts [307] from past alerts [306] in a straightforward manner since those two types of alerts [305] are naturally separated by the time-based layout. In one embodiment, this is achieved by simply delineating the present time using a vertical separation line, without visually representing predicted alerts [307] differently from past alerts [306]. In another embodiment, the background of the visualization is grayed out on the right-hand side (i.e. for predicted alerts [307]) compared to the left-hand side (i.e. for past alerts [306]).

Also, a contextual menu allows to discover the electronic identity [235] of each alert subject [385], as well as to open a new window showing information on the subject [385]. For example, the actor's [220] information page can be displayed, or the ad hoc workflow process [128] and workflow instances [134] as described in U.S. Pat. No. 7,519,589.

Around the circle are positioned [4430] the target(s) [390] of the alert. An icon with a distinctive shape and color indicates the target [390] type (actor [220], group [225], external event [170], or workflow process [128]) and a tooltip indicates the number of targets [390] of the given type impacted by the alert [305]. For example, the tooltip might say "3 workflow-related anomalies" to indicate that anomalous behavior has been detected which spans 3 distinct workflow processes [128] (and possibly many more workflow instances [134] of those workflow processes [128]).

As for the alert subject [385], a contextual menu allows to display additional information on the targets [390] of a given type, such as the name and description of each workflow process [128] involved in the alert [305] (what are their main workflow stages [154], who are the main actors [220] performing those workflow processes [128], etc.).

Behavioral Alerts Visualization

The present invention relies on an alternative layout for alerts which reflects the behavioral model [200] built as described in the Behavioral Model Section.

Figure 45:
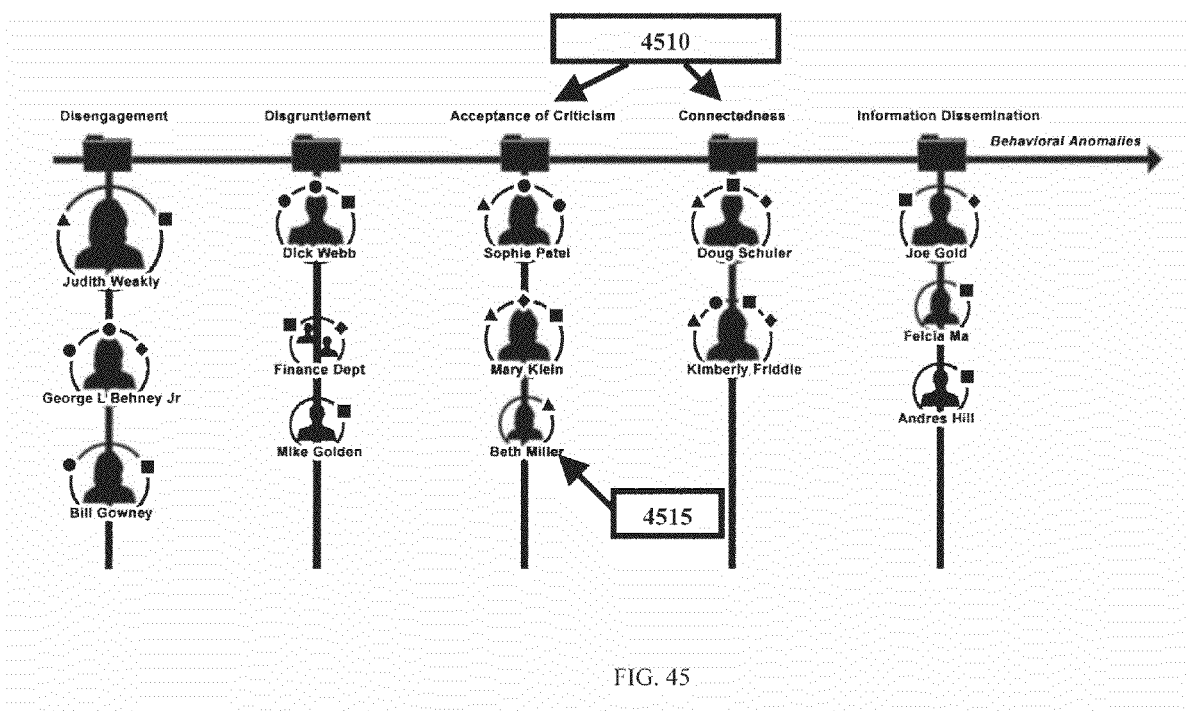
FIG. 45 is a drawing of the behavior-based alert visualization in accordance with an embodiment of the present disclosure.

FIG. 45 illustrates the behavior-based alert visualization provided by the system. In that visualization, alerts [305] are no longer binned by occurrence time as for the previous visualization, but by behavioral trait [295] represented on the X axis [4510]. Alerts [305] represented in this visualization are attributed to an individual actor [220] or a group [225], so that alert subjects [385] have the same interpretation as in the alert timeline view.

However, in the behavior-based alert visualization, alerts [305] are ranked by level of anomaly attributed to the alert subject [385] along that particular behavioral trait [295]. This provides a very synthetic representation of the most anomalous individual behaviors [210] and collective behaviors [215] flagged by the system at any point in time. In one embodiment, a parameter n dictates the number of subjects [385] (individual actors [220] and groups [225]) flagged for each behavioral trait [295], so that only the top n most anomalous actors [220] are displayed in a particular column. In another embodiment, the number of actors [220] for which an alert [305] is raised is not constant, but depends on a statistical test such as passing a threshold on the difference between an actor's [220] score [285] against a behavioral trait [295] and the mean score [285] over all other actors [220], measured in number of standard deviations. In yet another embodiment, the mean value and the standard deviation are computed over a group [225] of peers, such as actors [220] in the same organizational entity, actors [220] with the same job description, or groups [225] with a similar function.

In the behavior-based alert visualization, icons [4515] with a distinctive shape and color positioned around the circle representing an alert [305] have different semantics from the alert timeline view: each such shape here represents a behavioral metric [290], i.e. a particular method of scoring an actor [220] along a behavioral trait [295]. In one embodiment of the application, hovering over one of these icons with the mouse shows the actor's [220] absolute score [285] and relative ranking [275] along that behavioral metric [290], while clicking on one of these icons opens a visualization [204] associated to that metric [290] for that particular actor [220], and/or displays evidence [202] which supports the score [285] attributed to the actor [220], depending on whether the behavioral metric [290] has a visual interpretation.

Contrary to the alert timeline view, the behavior-based alert visualization does not show the evolution of anomalous behavior over time on a horizontal axis, but updates the visualization to reflect temporal changes. As other visualizations described in this invention, this visualization can be played back to show historical changes in the behavioral model [200].

Figure 46:
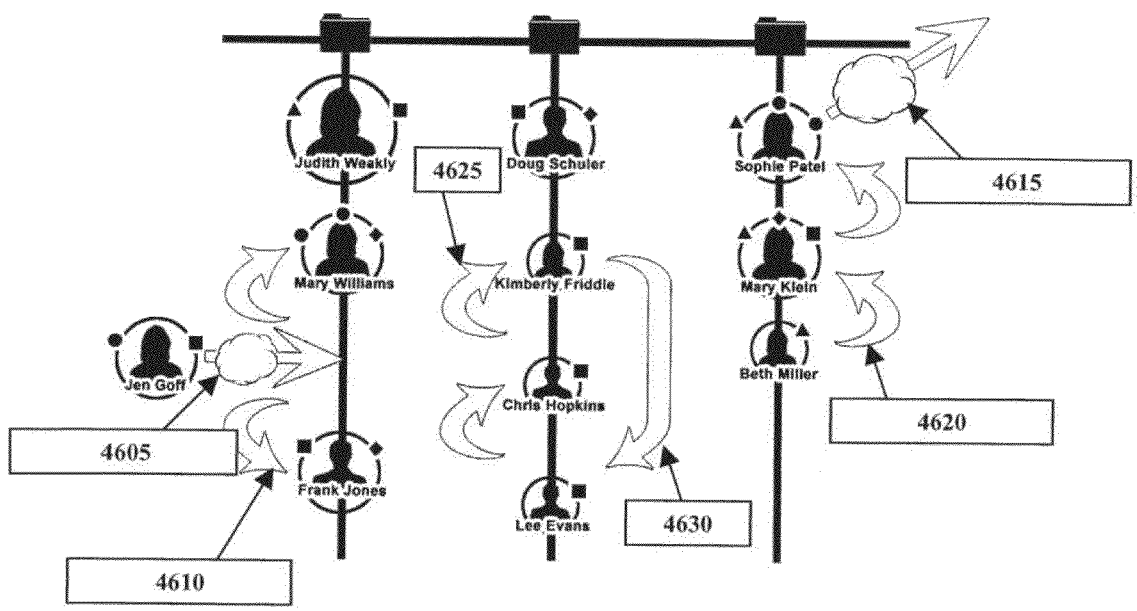
FIG. 46 is an illustration of the animation of the behavior-based alert visualization in accordance with an embodiment of the present disclosure.

As illustrated in FIG. 46, the presence of alerts [305] associated to specific individual actors [220] or groups [225], as well as what column they appear in (the behavioral trait [295] flagged as anomalous) and their vertical position, will be updated to reflect those changes. This temporal evolution is represented in the visualization by animating the graphical widgets representing alerts [305] with movements evocative of bubbles floating up and down, appearing and disappearing.

In particular, bubbles will form [4605] to signify that new alerts [305] have been detected: those bubbles will appear in the appropriate column and expand to reach the appropriate level based on the score [285] of the alert subject [385] along the given behavioral trait [295]. If necessary, these new bubbles will push existing bubbles to lower levels [4610].

Secondly, some alerts [305] will disappear over time when an actor's [220] behavior has reached its baseline [260] again: the corresponding bubbles will explode [4615], and any bubbles below them will be pulled up to higher levels [4620].

Thirdly, some anomalous behaviors might continue to be flagged but with an increased severity, or alternatively a decreased severity, whenever the score [285] along a given behavioral trait [295] has increased or decreased for the subject [385] while remaining in the top ranks: in that case, a bubble might pass over another bubble so that they exchange places [4625], with the former becoming larger (hence floating toward the surface) and the latter becoming smaller [4630] (hence sinking deeper).

Figure 47:
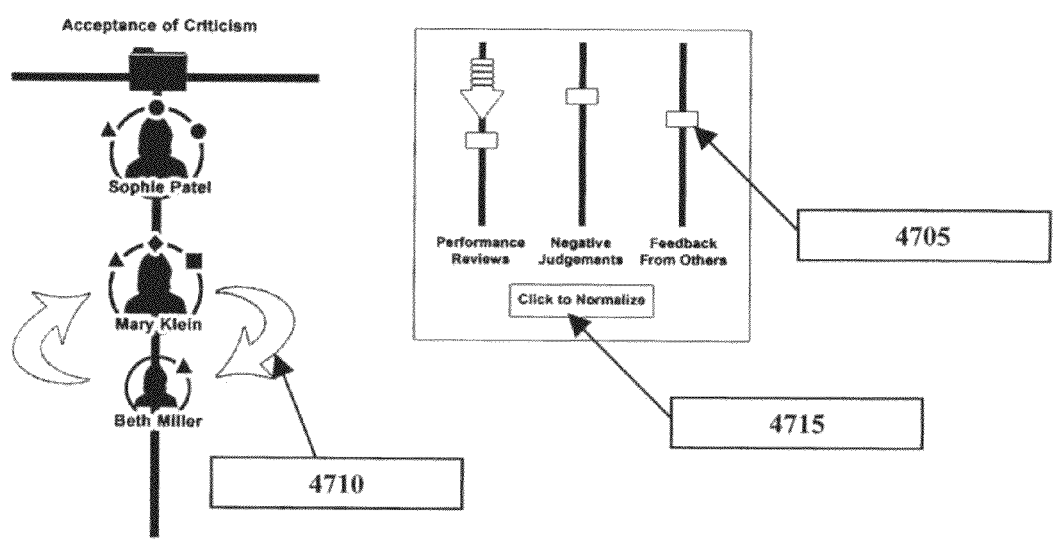
FIG. 47 is an illustration of the effect of behavioral metric tuning in the behavior-based alert visualization in accordance with an embodiment of the present disclosure.

As described in FIG. 47, another interaction mechanism provided by the behavior-based alert visualization consists of providing feedback on manual adjustments to metric weights made by an expert user. In one embodiment of the invention, a set of slider controls [4705] appears which can be adjusted to update the weights, and every time the user changes one of the values the bubbles in the corresponding column move up or down [4710], appear or disappear to reflect the impact on the final scores [285] for that behavioral trait [295]. Along with the set of slider controls, a button [4715] lets the user reset weights to the values resulting from normalizing the behavioral metrics [290] as described in the section on Behavioral model.

As for the timeline alert visualization, visual effects are used in the behavioral alerts visualization to distinguish predicted alerts [307] from past alerts [306]. In one embodiment, predicted alerts [307] are visualized similarly to past alerts [306] but with a dimming effect applied whose intensity is a negative function of the confidence level [870] for the corresponding predicted alert [307].

In one embodiment, live operations are supported by the system. In some embodiments, operations such as querying of the clustering component's current results as well as its current state are allowed. This is performed on top of the regular continuous forwarding of results. Other examples of live operation include live adjustment of key parameters such as similarity measures.

In one embodiment, periodic events detection supports live operations. In some embodiments, live operations include real-time indexing and querying of the periodic patterns database based on structural information, (including but not limited to periodic sequence length, periods, gaps, etc.) or based on semantic information. These live operations are performed on top of the regular continuous forwarding of results. Other operations in some embodiments include recombination of existing periodic patterns to create richer, more informative, higher-order periodic patterns.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A data-driven method of continuous anomaly detection based on behavioral modeling and heterogeneous information analysis that does not require definition of a set of rules or definition of anomalous patterns, the method comprising:
    collecting heterogeneous, structured and unstructured, text-bearing and non-text-bearing sociological data that includes data on human behavior;
    processing and categorizing a plurality of events in quasi-real-time;
    clustering the plurality of events from the sociological data in quasi-real-time;
    building predictive models of at least one of individual behavior and collective behavior in quasi-real-time for behavior and information analysis;
    analyzing behavior and information based on a multidimensional, normalcy-based behavioral model;
    detecting behavioral anomalies in the collected sociological data;
    displaying an animated and interactive visualization of the multidimensional, normalcy-based behavioral model; and
    displaying an animated and interactive visualization of the detected behavior-based and time-based anomalies,
    wherein different types of anomalies are detected based on the results of data analysis and individual and collective behavior modeling,
    wherein a monitoring or anomaly detection system provides a source of anomalies,
    wherein baseline patterns are computed with respect to different referentials and used as a source of anomalies corresponding to deviations from the baseline patterns, and
    wherein rankings of individuals against behavioral traits are a source of anomalies corresponding to abnormal behavior.

2. The method of claim 1, wherein a flow of an incoming data stream and an aging of data from the data stream are governed by one or more event seeping policies, which can be configured according to a strategy including one of a sliding window strategy or a least-relevant-first strategy.

3. The method of claim 1, wherein data is collected from a data source, in an online or offline manner, and either incrementally or continuously.

4. The method of claim 3, wherein a collection mode and a collection rate of each data source are continuously adjusted based on parameters selected from the group consisting of data collection throughput, data processing throughput, data prioritization, data lifecycle, and data relevance for anomaly detection.

5. The method of claim 3, wherein new features of the data are automatically discovered during data collection.

6. The method of claim 1, wherein an incoming stream of events is clustered in real time based on a similarity measure between events, producing usable sets of clusters and updating them as events are acquired from the underlying data stream.

7. The method of claim 6, further comprising querying for current results or a current state of a clustering process.

8. The method of claim 6, wherein clustering on the same set of events streamed in different orders produces the same result.

9. The method of claim 1, further comprising continuously deriving evidence from an incoming stream of events.

10. The method of claim 9, wherein the evidence is stored as a hypergraph including a representation of nodes and edges, wherein discussions are built from the evidence in quasi-real-time using criteria to close pending discussions.

11. The method of claim 1, further comprising running a number of queries on an incoming stream of events by compiling queries into a Petri net structure.

12. The method of claim 1, further comprising automatically mining periodic events in the presence of irregularities, wherein the periodic events are presented in a continuous visualization, and correlations can be established across periodic events; and wherein the mining of periodic events includes real-time indexing and querying of a periodic patterns database based on structural information or semantic information.

13. The method of claim 1, wherein detecting anomalies is tuned based on user feedback which is maintained and adjusted automatically over time.

14. The method of claim 1, wherein the results of anomaly detection are presented in a user interface in which anomalies can be browsed by detection time or by behavioral trait, and in which the user can efficiently give feedback on the results of anomaly detection to ensure sustained accuracy and performance of anomaly detection.

15. The method of claim 1, further comprising automatically detecting workflow models and instances of workflow models from the incoming stream of events.

16. A data-driven method of continuous anomaly detection based on behavioral modeling and heterogeneous information analysis that does not require definition of a set of rules or definition of anomalous patterns, the method comprising:
    collecting heterogeneous, structured and unstructured, text-bearing and non-text-bearing sociological data that includes data on human behavior;
    processing and categorizing a plurality of events in quasi-real-time;
    clustering the plurality of events from the sociological data in quasi-real-time;
    building predictive models of at least one of individual behavior and collective behavior in quasi-real-time for behavior and information analysis;
    analyzing behavior and information based on a multidimensional, normalcy-based behavioral model;
    detecting behavioral anomalies in the collected sociological data;
    displaying an animated and interactive visualization of the multidimensional, normalcy-based behavioral model;
    displaying an animated and interactive visualization of the detected behavior-based and time-based anomalies;
    detecting anomalies with third-party systems such as rule-based anomaly detection systems; and
    generating actionable alerts by aggregating anomalies along time windows, across individuals or groups, and/or across an unbounded number of dimensions in the data.

* * * * *